US010269345B2

(12) United States Patent
Castillo Sanchez et al.

(10) Patent No.: US 10,269,345 B2
(45) Date of Patent: Apr. 23, 2019

(54) INTELLIGENT TASK DISCOVERY

(71) Applicant: Apple Inc., Cupertino, CA (US)

(72) Inventors: Jose A. Castillo Sanchez, Cupertino, CA (US); Garett R. Nell, Redmond, WA (US); Kimberly D. Beverett, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/269,740

(22) Filed: Sep. 19, 2016

(65) Prior Publication Data
US 2017/0358304 A1 Dec. 14, 2017

Related U.S. Application Data

(60) Provisional application No. 62/348,888, filed on Jun. 11, 2016.

(51) Int. Cl.
G10L 15/22 (2006.01)
G06F 3/0484 (2013.01)
(Continued)

(52) U.S. Cl.
CPC .......... G10L 15/22 (2013.01); G06F 3/04842 (2013.01); G10L 13/08 (2013.01); G10L 15/1815 (2013.01); G10L 2015/223 (2013.01)

(58) Field of Classification Search
CPC ..................................................... G10L 15/22
See application file for complete search history.

(56) References Cited

U.S. PATENT DOCUMENTS 1,559,320 A 10/1925 Hirsh
2,180,522 A 11/1939 Henne
(Continued)

FOREIGN PATENT DOCUMENTS

| CA | 2666438 C | 6/2013 |
|---|---|---|
| CH | 681573 A5 | 4/1993 |
| CN | 1263385 A | 8/2000 |
| CN | 1274440 A | 11/2000 |
| CN | 1369858 A | 9/2002 |
| CN | 1378156 A | 11/2002 |
| CN | 1383109 A | 12/2002 |

(Continued)

OTHER PUBLICATIONS

2004 Chrysler Pacifica: U-Connect Hands-Free Communication System, The Best and Brightest of 2004, Brief Article, Automotive Industries, Sep. 2003, 1 page.

(Continued)

Primary Examiner — Douglas Godbold
(74) Attorney, Agent, or Firm — Dentons US LLP

(57) ABSTRACT

This relates to systems and processes for operating an automated assistant to process messages. In one example process, an electronic device receives a communication including a text string and determines whether a portion of the text string is associated with a data type of a plurality of data types. The data type is associated with at least one task. In accordance with a determination that the portion of the text string is associated with the data type, the electronic device receives a user input indicative of a task of the at least one task, and in response, causes the task to be performed based on the portion of the text string. In accordance with a determination that the portion of the text string is not associated with the data type, the electronic device foregoes causing the task to be performed based on the portion of the text string.

56 Claims, 24 Drawing Sheets

(51) Int. Cl.
*G10L 13/08* (2013.01)
*G10L 15/18* (2013.01)

(56) References Cited

U.S. PATENT DOCUMENTS

| | | |
|---|---|---|
| 2,495,222 A | 1/1950 | Blerig |
| 3,704,345 A | 11/1972 | Coker et al. |
| 3,710,321 A | 1/1973 | Rubenstein |
| 3,787,542 A | 1/1974 | Gallagher et al. |
| 3,828,132 A | 8/1974 | Flanagan et al. |
| 3,979,557 A | 9/1976 | Schulman et al. |
| 4,013,085 A | 3/1977 | Wright |
| 4,081,631 A | 3/1978 | Feder |
| 4,090,216 A | 5/1978 | Constable |
| 4,107,784 A | 8/1978 | Van Bemmelen |
| 4,108,211 A | 8/1978 | Tanaka |
| 4,159,536 A | 6/1979 | Kehoe et al. |
| 4,181,821 A | 1/1980 | Pirz et al. |
| 4,204,089 A | 5/1980 | Key et al. |
| 4,241,286 A | 12/1980 | Gordon |
| 4,253,477 A | 3/1981 | Eichman |
| 4,278,838 A | 7/1981 | Antonov |
| 4,282,405 A | 8/1981 | Taguchi |
| 4,310,721 A | 1/1982 | Manley et al. |
| 4,332,464 A | 6/1982 | Bartulis et al. |
| 4,348,553 A | 9/1982 | Baker et al. |
| 4,384,169 A | 5/1983 | Mozer et al. |
| 4,386,345 A | 5/1983 | Narveson et al. |
| 4,433,377 A | 2/1984 | Eustis et al. |
| 4,451,849 A | 5/1984 | Fuhrer |
| 4,485,439 A | 11/1984 | Rothstein |
| 4,495,644 A | 1/1985 | Parks et al. |
| 4,513,379 A | 4/1985 | Wilson et al. |
| 4,513,435 A | 4/1985 | Sakoe et al. |
| 4,555,775 A | 11/1985 | Pike |
| 4,577,343 A | 3/1986 | Oura |
| 4,586,158 A | 4/1986 | Brandle |
| 4,587,670 A | 5/1986 | Levinson et al. |
| 4,589,022 A | 5/1986 | Prince et al. |
| 4,611,346 A | 9/1986 | Bednar et al. |
| 4,615,081 A | 10/1986 | Lindahl |
| 4,618,984 A | 10/1986 | Das et al. |
| 4,642,790 A | 2/1987 | Minshull et al. |
| 4,653,021 A | 3/1987 | Takagi |
| 4,654,875 A | 3/1987 | Srihari et al. |
| 4,655,233 A | 4/1987 | Laughlin |
| 4,658,425 A | 4/1987 | Julstrom |
| 4,670,848 A | 6/1987 | Schramm |
| 4,677,570 A | 6/1987 | Taki |
| 4,680,429 A | 7/1987 | Murdock et al. |
| 4,680,805 A | 7/1987 | Scott |
| 4,686,522 A | 8/1987 | Hernandez et al. |
| 4,688,195 A | 8/1987 | Thompson et al. |
| 4,692,941 A | 9/1987 | Jacks et al. |
| 4,698,625 A | 10/1987 | McCaskill |
| 4,709,390 A | 11/1987 | Atal et al. |
| 4,713,775 A | 12/1987 | Scott et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| RE32,632 E | 3/1988 | Atkinson |
| 4,736,296 A | 4/1988 | Katayama et al. |
| 4,750,122 A | 6/1988 | Kaji et al. |
| 4,754,489 A | 6/1988 | Bokser |
| 4,755,811 A | 7/1988 | Savin et al. |
| 4,759,070 A | 7/1988 | Voroba et al. |
| 4,776,016 A | 10/1988 | Hansen |
| 4,783,804 A | 11/1988 | Juang et al. |
| 4,783,807 A | 11/1988 | Marley |
| 4,785,413 A | 11/1988 | Atsumi |
| 4,790,028 A | 12/1988 | Ramage |
| 4,797,930 A | 1/1989 | Goudie |
| 4,802,223 A | 1/1989 | Lin et al. |
| 4,803,729 A | 2/1989 | Baker |
| 4,807,752 A | 2/1989 | Chodorow |
| 4,811,243 A | 3/1989 | Racine |
| 4,813,074 A | 3/1989 | Marcus |
| 4,819,271 A | 4/1989 | Bahl et al. |
| 4,827,518 A | 5/1989 | Feustel et al. |
| 4,827,520 A | 5/1989 | Zeinstra |
| 4,829,576 A | 5/1989 | Porter |
| 4,829,583 A | 5/1989 | Monroe et al. |
| 4,831,551 A | 5/1989 | Schalk et al. |
| 4,833,712 A | 5/1989 | Bahl et al. |
| 4,833,718 A | 5/1989 | Sprague |
| 4,837,798 A | 6/1989 | Cohen et al. |
| 4,837,831 A | 6/1989 | Gillick et al. |
| 4,839,853 A | 6/1989 | Deerwester et al. |
| 4,852,168 A | 7/1989 | Sprague |
| 4,862,504 A | 8/1989 | Nomura |
| 4,875,187 A | 10/1989 | Smith |
| 4,878,230 A | 10/1989 | Murakami et al. |
| 4,887,212 A | 12/1989 | Zamora et al. |
| 4,896,359 A | 1/1990 | Yamamoto et al. |
| 4,903,305 A | 2/1990 | Gillick et al. |
| 4,905,163 A | 2/1990 | Garber et al. |
| 4,908,867 A | 3/1990 | Silverman |
| 4,914,586 A | 4/1990 | Swinehart et al. |
| 4,914,590 A | 4/1990 | Loatman et al. |
| 4,918,723 A | 4/1990 | Iggulden et al. |
| 4,926,491 A | 5/1990 | Maeda et al. |
| 4,928,307 A | 5/1990 | Lynn |
| 4,931,783 A | 6/1990 | Atkinson |
| 4,935,954 A | 6/1990 | Thompson et al. |
| 4,939,639 A | 7/1990 | Lee et al. |
| 4,941,488 A | 7/1990 | Marxer et al. |
| 4,944,013 A | 7/1990 | Gouvianakis et al. |
| 4,945,504 A | 7/1990 | Nakama et al. |
| 4,953,106 A | 8/1990 | Gansner et al. |
| 4,955,047 A | 9/1990 | Morganstein et al. |
| 4,965,763 A | 10/1990 | Zamora |
| 4,972,462 A | 11/1990 | Shibata |
| 4,974,191 A | 11/1990 | Amirghodsi et al. |
| 4,975,975 A | 12/1990 | Filipski |
| 4,977,598 A | 12/1990 | Doddington et al. |
| 4,980,916 A | 12/1990 | Zinser |
| 4,985,924 A | 1/1991 | Matsuura |
| 4,992,972 A | 2/1991 | Brooks et al. |
| 4,994,966 A | 2/1991 | Hutchins |
| 4,994,983 A | 2/1991 | Landell et al. |
| 5,001,774 A | 3/1991 | Lee |
| 5,003,577 A | 3/1991 | Ertz et al. |
| 5,007,095 A | 4/1991 | Nara et al. |
| 5,007,098 A | 4/1991 | Kumagai |
| 5,010,574 A | 4/1991 | Wang |
| 5,016,002 A | 5/1991 | Levanto |
| 5,020,112 A | 5/1991 | Chou |
| 5,021,971 A | 6/1991 | Lindsay |
| 5,022,081 A | 6/1991 | Hirose et al. |
| 5,027,110 A | 6/1991 | Chang et al. |
| 5,027,406 A | 6/1991 | Roberts et al. |
| 5,027,408 A | 6/1991 | Kroeker et al. |
| 5,029,211 A | 7/1991 | Ozawa |
| 5,031,217 A | 7/1991 | Nishimura |
| 5,032,989 A | 7/1991 | Tornetta |
| 5,033,087 A | 7/1991 | Bahl et al. |
| 5,040,218 A | 8/1991 | Vitale et al. |
| 5,046,099 A | 9/1991 | Nishimura |
| 5,047,614 A | 9/1991 | Bianco |
| 5,047,617 A | 9/1991 | Shepard et al. |
| 5,050,215 A | 9/1991 | Nishimura |
| 5,053,758 A | 10/1991 | Cornett et al. |
| 5,054,084 A | 10/1991 | Tanaka et al. |
| 5,057,915 A | 10/1991 | Von Kohorn |
| 5,062,143 A | 10/1991 | Schmitt |
| 5,067,158 A | 11/1991 | Arjmand |
| 5,067,503 A | 11/1991 | Stile |
| 5,072,452 A | 12/1991 | Brown et al. |
| 5,075,896 A | 12/1991 | Wilcox et al. |
| 5,079,723 A | 1/1992 | Herceg et al. |
| 5,083,119 A | 1/1992 | Trevett et al. |
| 5,083,268 A | 1/1992 | Hemphill et al. |
| 5,086,792 A | 2/1992 | Chodorow |

(56) References Cited

U.S. PATENT DOCUMENTS

| | | |
|---|---|---|
| 5,090,012 A | 2/1992 | Kajiyama et al. |
| 5,091,790 A | 2/1992 | Silverberg |
| 5,091,945 A | 2/1992 | Kleijn |
| 5,103,498 A | 4/1992 | Lanier et al. |
| 5,109,509 A | 4/1992 | Katayama et al. |
| 5,111,423 A | 5/1992 | Kopec, Jr. et al. |
| 5,119,079 A | 6/1992 | Hube et al. |
| 5,122,951 A | 6/1992 | Kamiya |
| 5,123,103 A | 6/1992 | Ohtaki et al. |
| 5,125,022 A | 6/1992 | Hunt et al. |
| 5,125,030 A | 6/1992 | Nomura et al. |
| 5,127,043 A | 6/1992 | Hunt et al. |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,133,023 A | 7/1992 | Bokser |
| 5,142,584 A | 8/1992 | Ozawa |
| 5,144,875 A | 9/1992 | Nakada |
| 5,148,541 A | 9/1992 | Lee et al. |
| 5,153,913 A | 10/1992 | Kandefer et al. |
| 5,157,610 A | 10/1992 | Asano et al. |
| 5,157,779 A | 10/1992 | Washburn et al. |
| 5,161,102 A | 11/1992 | Griffin et al. |
| 5,163,809 A | 11/1992 | Akgun et al. |
| 5,164,900 A | 11/1992 | Bernath |
| 5,164,982 A | 11/1992 | Davis |
| 5,165,007 A | 11/1992 | Bahl et al. |
| 5,167,004 A | 11/1992 | Netsch et al. |
| 5,175,536 A | 12/1992 | Aschliman et al. |
| 5,175,803 A | 12/1992 | Yeh |
| 5,175,814 A | 12/1992 | Anick et al. |
| 5,179,627 A | 1/1993 | Sweet et al. |
| 5,179,652 A | 1/1993 | Rozmanith et al. |
| 5,194,950 A | 3/1993 | Murakami et al. |
| 5,195,034 A | 3/1993 | Garneau et al. |
| 5,195,167 A | 3/1993 | Bahl et al. |
| 5,197,005 A | 3/1993 | Shwartz et al. |
| 5,199,077 A | 3/1993 | Wilcox et al. |
| 5,201,034 A | 4/1993 | Matsuura et al. |
| 5,202,952 A | 4/1993 | Gillick et al. |
| 5,208,862 A | 5/1993 | Ozawa |
| 5,210,689 A | 5/1993 | Baker et al. |
| 5,212,638 A | 5/1993 | Bernath |
| 5,212,821 A | 5/1993 | Gorin et al. |
| 5,216,747 A | 6/1993 | Hardwick et al. |
| 5,218,700 A | 6/1993 | Beechick |
| 5,220,629 A | 6/1993 | Kosaka et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,231,670 A | 7/1993 | Goldhor et al. |
| 5,235,680 A | 8/1993 | Bijnagte |
| 5,237,502 A | 8/1993 | White et al. |
| 5,241,619 A | 8/1993 | Schwartz et al. |
| 5,252,951 A | 10/1993 | Tannenbaum et al. |
| 5,253,325 A | 10/1993 | Clark |
| 5,255,386 A | 10/1993 | Prager |
| 5,257,387 A | 10/1993 | Richek et al. |
| 5,260,697 A | 11/1993 | Barrett et al. |
| 5,266,931 A | 11/1993 | Tanaka |
| 5,266,949 A | 11/1993 | Rossi |
| 5,267,345 A | 11/1993 | Brown et al. |
| 5,268,990 A | 12/1993 | Cohen et al. |
| 5,274,771 A | 12/1993 | Hamilton et al. |
| 5,274,818 A | 12/1993 | Vasilevsky et al. |
| 5,276,616 A | 1/1994 | Kuga et al. |
| 5,276,794 A | 1/1994 | Lamb, Jr. |
| 5,278,980 A | 1/1994 | Pedersen et al. |
| 5,282,265 A | 1/1994 | Rohra Suda et al. |
| 5,283,818 A | 2/1994 | Klausner et al. |
| 5,287,448 A | 2/1994 | Nicol et al. |
| 5,289,562 A | 2/1994 | Mizuta et al. |
| RE34,562 E | 3/1994 | Murakami et al. |
| 5,291,286 A | 3/1994 | Murakami et al. |
| 5,293,254 A | 3/1994 | Eschbach |
| 5,293,448 A | 3/1994 | Honda |
| 5,293,452 A | 3/1994 | Picone et al. |
| 5,296,642 A | 3/1994 | Konishi |
| 5,297,170 A | 3/1994 | Eyuboglu et al. |
| 5,297,194 A | 3/1994 | Hunt et al. |
| 5,299,125 A | 3/1994 | Baker et al. |
| 5,299,284 A | 3/1994 | Roy |
| 5,301,109 A | 4/1994 | Landauer et al. |
| 5,303,406 A | 4/1994 | Hansen et al. |
| 5,305,205 A | 4/1994 | Weber et al. |
| 5,305,421 A | 4/1994 | Li et al. |
| 5,305,768 A | 4/1994 | Gross et al. |
| 5,309,359 A | 5/1994 | Katz et al. |
| 5,315,689 A | 5/1994 | Kanazawa et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,325,462 A | 6/1994 | Farrett |
| 5,326,270 A | 7/1994 | Ostby et al. |
| 5,327,342 A | 7/1994 | Roy |
| 5,327,498 A | 7/1994 | Hamon |
| 5,329,608 A | 7/1994 | Bocchieri et al. |
| 5,333,236 A | 7/1994 | Bahl et al. |
| 5,333,266 A | 7/1994 | Boaz et al. |
| 5,333,275 A | 7/1994 | Wheatley et al. |
| 5,335,011 A | 8/1994 | Addeo et al. |
| 5,335,276 A | 8/1994 | Thompson et al. |
| 5,341,293 A | 8/1994 | Vertelney et al. |
| 5,341,466 A | 8/1994 | Perlin et al. |
| 5,345,536 A | 9/1994 | Hoshimi et al. |
| 5,349,645 A | 9/1994 | Zhao |
| 5,353,374 A | 10/1994 | Wilson et al. |
| 5,353,376 A | 10/1994 | Oh et al. |
| 5,353,377 A | 10/1994 | Kuroda et al. |
| 5,353,408 A | 10/1994 | Kato et al. |
| 5,353,432 A | 10/1994 | Richek et al. |
| 5,357,431 A | 10/1994 | Nakada et al. |
| 5,367,640 A | 11/1994 | Hamilton et al. |
| 5,369,575 A | 11/1994 | Lamberti et al. |
| 5,369,577 A | 11/1994 | Kadashevich et al. |
| 5,371,853 A | 12/1994 | Kao et al. |
| 5,371,901 A | 12/1994 | Reed et al. |
| 5,373,566 A | 12/1994 | Murdock |
| 5,377,103 A | 12/1994 | Lamberti et al. |
| 5,377,301 A | 12/1994 | Rosenberg et al. |
| 5,377,303 A | 12/1994 | Firman |
| 5,384,671 A | 1/1995 | Fisher |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,236 A | 2/1995 | Klausner et al. |
| 5,390,279 A | 2/1995 | Strong |
| 5,390,281 A | 2/1995 | Luciw et al. |
| 5,392,419 A | 2/1995 | Walton |
| 5,396,625 A | 3/1995 | Parkes |
| 5,400,434 A | 3/1995 | Pearson |
| 5,404,295 A | 4/1995 | Katz et al. |
| 5,406,305 A | 4/1995 | Shimomura et al. |
| 5,408,060 A | 4/1995 | Muurinen |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,422,656 A | 6/1995 | Allard et al. |
| 5,424,947 A | 6/1995 | Nagao et al. |
| 5,425,108 A | 6/1995 | Hwang et al. |
| 5,428,731 A | 6/1995 | Powers, III |
| 5,434,777 A | 7/1995 | Luciw |
| 5,440,615 A | 8/1995 | Caccuro et al. |
| 5,442,598 A | 8/1995 | Haikawa et al. |
| 5,442,780 A | 8/1995 | Takanashi et al. |
| 5,444,823 A | 8/1995 | Nguyen |
| 5,449,368 A | 9/1995 | Kuzmak |
| 5,450,523 A | 9/1995 | Zhao |
| 5,455,888 A | 10/1995 | Iyengar et al. |

(56) References Cited

U.S. PATENT DOCUMENTS

| | | |
|---|---|---|
| 5,457,768 A | 10/1995 | Tsuboi et al. |
| 5,459,488 A | 10/1995 | Geiser |
| 5,463,696 A | 10/1995 | Beernink et al. |
| 5,463,725 A | 10/1995 | Henckel et al. |
| 5,465,401 A | 11/1995 | Thompson |
| 5,469,529 A | 11/1995 | Bimbot et al. |
| 5,471,611 A | 11/1995 | McGregor |
| 5,473,728 A | 12/1995 | Luginbuhl et al. |
| 5,475,587 A | 12/1995 | Anick et al. |
| 5,475,796 A | 12/1995 | Iwata |
| 5,477,447 A | 12/1995 | Luciw et al. |
| 5,477,448 A | 12/1995 | Golding et al. |
| 5,477,451 A | 12/1995 | Brown et al. |
| 5,479,488 A | 12/1995 | Lennig et al. |
| 5,481,739 A | 1/1996 | Staats |
| 5,483,261 A | 1/1996 | Yasutake |
| 5,485,372 A | 1/1996 | Golding et al. |
| 5,485,543 A | 1/1996 | Aso |
| 5,488,204 A | 1/1996 | Mead et al. |
| 5,488,727 A | 1/1996 | Agrawal et al. |
| 5,490,234 A | 2/1996 | Narayan |
| 5,491,758 A | 2/1996 | Bellegarda et al. |
| 5,491,772 A | 2/1996 | Hardwick et al. |
| 5,493,677 A | 2/1996 | Balogh et al. |
| 5,495,604 A | 2/1996 | Harding et al. |
| 5,497,319 A | 3/1996 | Chong et al. |
| 5,500,903 A | 3/1996 | Gulli |
| 5,500,905 A | 3/1996 | Martin et al. |
| 5,500,937 A | 3/1996 | Thompson-Rohrlich |
| 5,502,774 A | 3/1996 | Bellegarda et al. |
| 5,502,790 A | 3/1996 | Yi |
| 5,502,791 A | 3/1996 | Nishimura et al. |
| 5,515,475 A | 5/1996 | Gupta et al. |
| 5,521,816 A | 5/1996 | Roche et al. |
| 5,524,140 A | 6/1996 | Klausner et al. |
| 5,530,861 A | 6/1996 | Diamant et al. |
| 5,533,182 A | 7/1996 | Bates et al. |
| 5,535,121 A | 7/1996 | Roche et al. |
| 5,536,902 A | 7/1996 | Serra et al. |
| 5,537,317 A | 7/1996 | Schabes et al. |
| 5,537,618 A | 7/1996 | Boulton et al. |
| 5,537,647 A | 7/1996 | Hermansky et al. |
| 5,543,588 A | 8/1996 | Bisset et al. |
| 5,543,897 A | 8/1996 | Altrieth, III |
| 5,544,264 A | 8/1996 | Bellegarda et al. |
| 5,548,507 A | 8/1996 | Martino et al. |
| 5,555,343 A | 9/1996 | Luther |
| 5,555,344 A | 9/1996 | Zunkler |
| 5,559,301 A | 9/1996 | Bryan, Jr. et al. |
| 5,559,945 A | 9/1996 | Beaudet et al. |
| 5,564,446 A | 10/1996 | Wiltshire |
| 5,565,888 A | 10/1996 | Selker |
| 5,568,536 A | 10/1996 | Tiller et al. |
| 5,568,540 A | 10/1996 | Greco et al. |
| 5,570,324 A | 10/1996 | Geil |
| 5,572,576 A | 11/1996 | Klausner et al. |
| 5,574,823 A | 11/1996 | Hassanein et al. |
| 5,574,824 A | 11/1996 | Slyh et al. |
| 5,577,135 A | 11/1996 | Grajski et al. |
| 5,577,164 A | 11/1996 | Kaneko et al. |
| 5,577,241 A | 11/1996 | Spencer |
| 5,578,808 A | 11/1996 | Taylor |
| 5,579,037 A | 11/1996 | Tahara et al. |
| 5,579,436 A | 11/1996 | Chou et al. |
| 5,581,484 A | 12/1996 | Prince |
| 5,581,652 A | 12/1996 | Abe et al. |
| 5,581,655 A | 12/1996 | Cohen et al. |
| 5,583,993 A | 12/1996 | Foster et al. |
| 5,584,024 A | 12/1996 | Shwartz |
| 5,586,540 A | 12/1996 | Marzec et al. |
| 5,594,641 A | 1/1997 | Kaplan et al. |
| 5,596,260 A | 1/1997 | Moravec et al. |
| 5,596,676 A | 1/1997 | Swaminathan et al. |
| 5,596,994 A | 1/1997 | Bro |
| 5,608,624 A | 3/1997 | Luciw |
| 5,608,698 A | 3/1997 | Yaimanoi et al. |
| 5,608,841 A | 3/1997 | Tsuboka |
| 5,610,812 A | 3/1997 | Schabes et al. |
| 5,613,036 A | 3/1997 | Strong |
| 5,613,122 A | 3/1997 | Burnard et al. |
| 5,615,378 A | 3/1997 | Nishino et al. |
| 5,615,384 A | 3/1997 | Allard et al. |
| 5,616,876 A | 4/1997 | Cluts |
| 5,617,386 A | 4/1997 | Choi |
| 5,617,507 A | 4/1997 | Lee et al. |
| 5,617,539 A | 4/1997 | Ludwig et al. |
| 5,619,583 A | 4/1997 | Page et al. |
| 5,619,694 A | 4/1997 | Shimazu |
| 5,621,859 A | 4/1997 | Schwartz et al. |
| 5,621,903 A | 4/1997 | Luciw et al. |
| 5,627,939 A | 5/1997 | Huang et al. |
| 5,634,084 A | 5/1997 | Malsheen et al. |
| 5,636,325 A | 6/1997 | Farrett |
| 5,638,425 A | 6/1997 | Meador, III et al. |
| 5,638,489 A | 6/1997 | Tsuboka |
| 5,638,523 A | 6/1997 | Mullet et al. |
| 5,640,487 A | 6/1997 | Lau et al. |
| 5,642,464 A | 6/1997 | Yue et al. |
| 5,642,466 A | 6/1997 | Narayan |
| 5,642,519 A | 6/1997 | Martin |
| 5,644,656 A | 7/1997 | Akra et al. |
| 5,644,727 A | 7/1997 | Atkins |
| 5,644,735 A | 7/1997 | Luciw et al. |
| 5,649,060 A | 7/1997 | Ellozy et al. |
| 5,652,828 A | 7/1997 | Silverman |
| 5,652,884 A | 7/1997 | Palevich |
| 5,652,897 A | 7/1997 | Linebarger et al. |
| 5,661,787 A | 8/1997 | Pocock |
| 5,664,055 A | 9/1997 | Kroon |
| 5,664,206 A | 9/1997 | Murow et al. |
| 5,670,985 A | 9/1997 | Cappels, Sr. et al. |
| 5,675,704 A | 10/1997 | Juang et al. |
| 5,675,819 A | 10/1997 | Schuetze |
| 5,678,039 A | 10/1997 | Hinks et al. |
| 5,678,053 A | 10/1997 | Anderson |
| 5,682,475 A | 10/1997 | Johnson et al. |
| 5,682,539 A | 10/1997 | Conrad et al. |
| 5,684,513 A | 11/1997 | Decker |
| 5,687,077 A | 11/1997 | Gough, Jr. |
| 5,689,287 A | 11/1997 | Mackinlay et al. |
| 5,689,616 A | 11/1997 | Li |
| 5,689,618 A | 11/1997 | Gasper et al. |
| 5,692,205 A | 11/1997 | Berry et al. |
| 5,696,962 A | 12/1997 | Kupiec |
| 5,697,793 A | 12/1997 | Huffman et al. |
| 5,699,082 A | 12/1997 | Marks et al. |
| 5,701,400 A | 12/1997 | Amado |
| 5,706,442 A | 1/1998 | Anderson et al. |
| 5,708,659 A | 1/1998 | Rostoker et al. |
| 5,708,822 A | 1/1998 | Wical |
| 5,710,886 A | 1/1998 | Christensen et al. |
| 5,710,922 A | 1/1998 | Alley et al. |
| 5,712,949 A | 1/1998 | Kato et al. |
| 5,712,957 A | 1/1998 | Waibel et al. |
| 5,715,468 A | 2/1998 | Budzinski |
| 5,717,877 A | 2/1998 | Orton et al. |
| 5,721,827 A | 2/1998 | Logan et al. |
| 5,721,949 A | 2/1998 | Smith et al. |
| 5,724,406 A | 3/1998 | Juster |
| 5,724,985 A | 3/1998 | Snell et al. |
| 5,726,672 A | 3/1998 | Hernandez et al. |
| 5,727,950 A | 3/1998 | Cook et al. |
| 5,729,694 A | 3/1998 | Holzrichter et al. |
| 5,729,704 A | 3/1998 | Stone et al. |
| 5,732,216 A | 3/1998 | Logan et al. |
| 5,732,390 A | 3/1998 | Katayanagi et al. |
| 5,732,395 A | 3/1998 | Silverman |
| 5,734,750 A | 3/1998 | Arai et al. |
| 5,734,791 A | 3/1998 | Acero et al. |
| 5,736,974 A | 4/1998 | Selker |
| 5,737,487 A | 4/1998 | Bellegarda et al. |
| 5,737,609 A | 4/1998 | Reed et al. |
| 5,737,734 A | 4/1998 | Schultz |
| 5,739,451 A | 4/1998 | Winksy et al. |

(56) References Cited

U.S. PATENT DOCUMENTS

| | | |
|---|---|---|
| 5,740,143 A | 4/1998 | Suetomi |
| 5,742,705 A | 4/1998 | Parthasarathy |
| 5,742,736 A | 4/1998 | Haddock |
| 5,745,116 A | 4/1998 | Pisutha-Arnond |
| 5,745,843 A | 4/1998 | Wetters et al. |
| 5,745,873 A | 4/1998 | Braida et al. |
| 5,748,512 A | 5/1998 | Vargas |
| 5,748,974 A | 5/1998 | Johnson |
| 5,749,071 A | 5/1998 | Silverman |
| 5,749,081 A | 5/1998 | Whiteis |
| 5,751,906 A | 5/1998 | Silverman |
| 5,757,358 A | 5/1998 | Osga |
| 5,757,979 A | 5/1998 | Hongo et al. |
| 5,758,024 A | 5/1998 | Alleva |
| 5,758,079 A | 5/1998 | Ludwig et al. |
| 5,758,083 A | 5/1998 | Singh et al. |
| 5,758,314 A | 5/1998 | McKenna |
| 5,758,318 A | 5/1998 | Kojima et al. |
| 5,759,101 A | 6/1998 | Von Kohorn |
| 5,761,640 A | 6/1998 | Kalyanswamy et al. |
| 5,761,687 A | 6/1998 | Hon et al. |
| 5,764,852 A | 6/1998 | Williams |
| 5,765,131 A | 6/1998 | Stentiford et al. |
| 5,765,168 A | 6/1998 | Burrows |
| 5,771,276 A | 6/1998 | Wolf |
| 5,774,834 A | 6/1998 | Visser |
| 5,774,855 A | 6/1998 | Foti et al. |
| 5,774,859 A | 6/1998 | Houser et al. |
| 5,777,614 A | 7/1998 | Ando et al. |
| 5,778,405 A | 7/1998 | Ogawa |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,797,008 A | 8/1998 | Burrows |
| 5,799,268 A | 8/1998 | Boguraev |
| 5,799,269 A | 8/1998 | Schabes et al. |
| 5,799,276 A | 8/1998 | Komissarchik et al. |
| 5,799,279 A | 8/1998 | Gould et al. |
| 5,801,692 A | 9/1998 | Muzio et al. |
| 5,802,466 A | 9/1998 | Gallant et al. |
| 5,802,526 A | 9/1998 | Fawcett et al. |
| 5,806,021 A | 9/1998 | Chen et al. |
| 5,812,697 A | 9/1998 | Sakai et al. |
| 5,812,698 A | 9/1998 | Platt et al. |
| 5,815,142 A | 9/1998 | Allard et al. |
| 5,815,225 A | 9/1998 | Nelson |
| 5,818,142 A | 10/1998 | Edleblute et al. |
| 5,818,451 A | 10/1998 | Bertram et al. |
| 5,818,924 A | 10/1998 | King et al. |
| 5,822,288 A | 10/1998 | Shinada |
| 5,822,720 A | 10/1998 | Bookman et al. |
| 5,822,730 A | 10/1998 | Roth et al. |
| 5,822,743 A | 10/1998 | Gupta et al. |
| 5,825,349 A | 10/1998 | Meier et al. |
| 5,825,352 A | 10/1998 | Bisset et al. |
| 5,825,881 A | 10/1998 | Colvin, Sr. |
| 5,826,261 A | 10/1998 | Spencer |
| 5,828,768 A | 10/1998 | Eatwell et al. |
| 5,828,999 A | 10/1998 | Bellegarda et al. |
| 5,832,428 A | 11/1998 | Chow et al. |
| 5,832,433 A | 11/1998 | Yashchin et al. |
| 5,832,435 A | 11/1998 | Silverman |
| 5,833,134 A | 11/1998 | Ho et al. |
| 5,835,077 A | 11/1998 | Dao et al. |
| 5,835,079 A | 11/1998 | Shieh |
| 5,835,721 A | 11/1998 | Donahue et al. |
| 5,835,732 A | 11/1998 | Kikinis et al. |
| 5,835,893 A | 11/1998 | Ushioda |
| 5,839,106 A | 11/1998 | Bellegarda |
| 5,841,902 A | 11/1998 | Tu |
| 5,842,165 A | 11/1998 | Raman et al. |
| 5,845,255 A | 12/1998 | Mayaud |
| 5,848,410 A | 12/1998 | Walls et al. |
| 5,850,480 A | 12/1998 | Scanlon |
| 5,850,629 A | 12/1998 | Holm et al. |
| 5,852,801 A | 12/1998 | Hon et al. |
| 5,854,893 A | 12/1998 | Ludwig et al. |
| 5,855,000 A | 12/1998 | Waibel et al. |
| 5,857,184 A | 1/1999 | Lynch |
| 5,859,636 A | 1/1999 | Pandit |
| 5,860,063 A | 1/1999 | Gorin et al. |
| 5,860,064 A | 1/1999 | Henton |
| 5,860,075 A | 1/1999 | Hashizume et al. |
| 5,862,223 A | 1/1999 | Walker et al. |
| 5,862,233 A | 1/1999 | Poletti |
| 5,864,806 A | 1/1999 | Mokbel et al. |
| 5,864,815 A | 1/1999 | Rozak et al. |
| 5,864,844 A | 1/1999 | James et al. |
| 5,864,855 A | 1/1999 | Ruocco et al. |
| 5,864,868 A | 1/1999 | Contois |
| 5,867,799 A | 2/1999 | Lang et al. |
| 5,870,710 A | 2/1999 | Ozawa et al. |
| 5,873,056 A | 2/1999 | Liddy et al. |
| 5,873,064 A | 2/1999 | De Armas et al. |
| 5,875,427 A | 2/1999 | Yamazaki |
| 5,875,429 A | 2/1999 | Douglas |
| 5,875,437 A | 2/1999 | Atkins |
| 5,876,396 A | 3/1999 | Lo et al. |
| 5,877,751 A | 3/1999 | Kanemitsu et al. |
| 5,877,757 A | 3/1999 | Baldwin et al. |
| 5,878,393 A | 3/1999 | Hata et al. |
| 5,878,394 A | 3/1999 | Muhling |
| 5,878,396 A | 3/1999 | Henton |
| 5,880,411 A | 3/1999 | Gillespie et al. |
| 5,880,731 A | 3/1999 | Liles et al. |
| 5,884,039 A | 3/1999 | Ludwig et al. |
| 5,884,262 A | 3/1999 | Wise et al. |
| 5,884,323 A | 3/1999 | Hawkins et al. |
| 5,890,117 A | 3/1999 | Silverman |
| 5,890,122 A | 3/1999 | Van et al. |
| 5,891,180 A | 4/1999 | Greeninger et al. |
| 5,893,126 A | 4/1999 | Drews et al. |
| 5,893,132 A | 4/1999 | Huffman et al. |
| 5,895,448 A | 4/1999 | Vysotsky et al. |
| 5,895,464 A | 4/1999 | Bhandari et al. |
| 5,895,466 A | 4/1999 | Goldberg et al. |
| 5,896,321 A | 4/1999 | Miller et al. |
| 5,896,500 A | 4/1999 | Ludwig et al. |
| 5,899,972 A | 5/1999 | Miyazawa et al. |
| 5,905,498 A | 5/1999 | Diament et al. |
| 5,907,597 A | 5/1999 | Mark |
| 5,909,666 A | 6/1999 | Gould et al. |
| 5,912,951 A | 6/1999 | Checchio et al. |
| 5,912,952 A | 6/1999 | Brendzel |
| 5,913,185 A | 6/1999 | Martino et al. |
| 5,913,193 A | 6/1999 | Huang et al. |
| 5,915,001 A | 6/1999 | Uppaluru et al. |
| 5,915,236 A | 6/1999 | Gould et al. |
| 5,915,238 A | 6/1999 | Tjaden |
| 5,915,249 A | 6/1999 | Spencer |
| 5,917,487 A | 6/1999 | Ulrich |
| 5,918,303 A | 6/1999 | Yamaura et al. |
| 5,920,327 A | 7/1999 | Seidensticker, Jr. |
| 5,920,836 A | 7/1999 | Gould et al. |
| 5,920,837 A | 7/1999 | Gould et al. |
| 5,923,757 A | 7/1999 | Hocker et al. |
| 5,924,068 A | 7/1999 | Richard et al. |
| 5,926,769 A | 7/1999 | Valimaa et al. |
| 5,926,789 A | 7/1999 | Barbara et al. |
| 5,930,408 A | 7/1999 | Seto |
| 5,930,751 A | 7/1999 | Cohrs et al. |
| 5,930,754 A | 7/1999 | Karaali et al. |
| 5,930,769 A | 7/1999 | Rose |
| 5,930,783 A | 7/1999 | Li et al. |
| 5,933,477 A | 8/1999 | Wu |
| 5,933,806 A | 8/1999 | Beyerlein et al. |
| 5,933,822 A | 8/1999 | Braden-Harder et al. |
| 5,936,926 A | 8/1999 | Yokouchi et al. |
| 5,937,163 A | 8/1999 | Lee et al. |
| 5,940,811 A | 8/1999 | Norris |
| 5,940,841 A | 8/1999 | Schmuck et al. |
| 5,941,944 A | 8/1999 | Messerly |

(56) References Cited

U.S. PATENT DOCUMENTS

| | | |
|---|---|---|
| 5,943,043 A | 8/1999 | Furuhata et al. |
| 5,943,049 A | 8/1999 | Matsubara et al. |
| 5,943,052 A | 8/1999 | Allen et al. |
| 5,943,429 A | 8/1999 | Haendel et al. |
| 5,943,443 A | 8/1999 | Itonori et al. |
| 5,943,670 A | 8/1999 | Prager |
| 5,946,647 A | 8/1999 | Miller et al. |
| 5,946,648 A | 8/1999 | Halstead et al. |
| 5,948,040 A | 9/1999 | DeLorme et al. |
| 5,949,961 A | 9/1999 | Sharman |
| 5,950,123 A | 9/1999 | Schwelb et al. |
| 5,952,992 A | 9/1999 | Helms |
| 5,953,541 A | 9/1999 | King et al. |
| 5,956,021 A | 9/1999 | Kubota et al. |
| 5,956,699 A | 9/1999 | Wong et al. |
| 5,960,385 A | 9/1999 | Skiena et al. |
| 5,960,394 A | 9/1999 | Gould et al. |
| 5,960,422 A | 9/1999 | Prasad |
| 5,963,208 A | 10/1999 | Dolan et al. |
| 5,963,924 A | 10/1999 | Williams et al. |
| 5,963,964 A | 10/1999 | Nielsen |
| 5,966,126 A | 10/1999 | Szabo |
| 5,970,446 A | 10/1999 | Goldberg et al. |
| 5,970,451 A | 10/1999 | Lewis et al. |
| 5,970,460 A | 10/1999 | Bunce et al. |
| 5,970,474 A | 10/1999 | LeRoy et al. |
| 5,973,612 A | 10/1999 | Deo et al. |
| 5,973,676 A | 10/1999 | Kawakura |
| 5,974,146 A | 10/1999 | Randle et al. |
| 5,977,950 A | 11/1999 | Rhyne |
| 5,982,352 A | 11/1999 | Pryor |
| 5,982,370 A | 11/1999 | Kamper |
| 5,982,891 A | 11/1999 | Ginter et al. |
| 5,982,902 A | 11/1999 | Terano |
| 5,983,179 A | 11/1999 | Gould et al. |
| 5,983,184 A | 11/1999 | Noguchi |
| 5,983,216 A | 11/1999 | Kirsch et al. |
| 5,987,132 A | 11/1999 | Rowney |
| 5,987,140 A | 11/1999 | Rowney et al. |
| 5,987,401 A | 11/1999 | Trudeau |
| 5,987,404 A | 11/1999 | Della Pietra et al. |
| 5,987,440 A | 11/1999 | O'Neil et al. |
| 5,990,887 A | 11/1999 | Redpath et al. |
| 5,991,441 A | 11/1999 | Jourjine |
| 5,995,460 A | 11/1999 | Takagi et al. |
| 5,995,590 A | 11/1999 | Brunet et al. |
| 5,995,918 A | 11/1999 | Kendall et al. |
| 5,998,972 A | 12/1999 | Gong |
| 5,999,169 A | 12/1999 | Lee |
| 5,999,895 A | 12/1999 | Forest |
| 5,999,908 A | 12/1999 | Abelow |
| 5,999,927 A | 12/1999 | Tukey et al. |
| 6,005,495 A | 12/1999 | Connolly et al. |
| 6,006,274 A | 12/1999 | Hawkins et al. |
| 6,009,237 A | 12/1999 | Hirabayashi et al. |
| 6,011,585 A | 1/2000 | Anderson |
| 6,014,428 A | 1/2000 | Wolf |
| 6,016,471 A | 1/2000 | Kuhn et al. |
| 6,017,219 A | 1/2000 | Adams, Jr. et al. |
| 6,018,705 A | 1/2000 | Gaudet |
| 6,018,711 A | 1/2000 | French-St. George et al. |
| 6,020,881 A | 2/2000 | Naughton et al. |
| 6,023,536 A | 2/2000 | Visser |
| 6,023,676 A | 2/2000 | Erell |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,029,135 A | 2/2000 | Krasle |
| 6,035,267 A | 3/2000 | Watanabe et al. |
| 6,035,303 A | 3/2000 | Baer et al. |
| 6,035,336 A | 3/2000 | Lu et al. |
| 6,038,533 A | 3/2000 | Buchsbaum et al. |
| 6,040,824 A | 3/2000 | Maekawa et al. |
| 6,041,023 A | 3/2000 | Lakhansingh |
| 6,047,255 A | 4/2000 | Williamson |
| 6,047,300 A | 4/2000 | Walfish et al. |
| 6,052,654 A | 4/2000 | Gaudet et al. |
| 6,052,656 A | 4/2000 | Suda et al. |
| 6,054,990 A | 4/2000 | Tran |
| 6,055,514 A | 4/2000 | Wren |
| 6,055,531 A | 4/2000 | Bennett et al. |
| 6,061,646 A | 5/2000 | Martino et al. |
| 6,064,767 A | 5/2000 | Muir et al. |
| 6,064,951 A | 5/2000 | Park et al. |
| 6,064,959 A | 5/2000 | Young et al. |
| 6,064,960 A | 5/2000 | Bellegarda et al. |
| 6,064,963 A | 5/2000 | Gainsboro |
| 6,067,519 A | 5/2000 | Lowry |
| 6,069,648 A | 5/2000 | Suso et al. |
| 6,070,138 A | 5/2000 | Iwata |
| 6,070,139 A | 5/2000 | Miyazawa et al. |
| 6,070,140 A | 5/2000 | Tran |
| 6,070,147 A | 5/2000 | Harms et al. |
| 6,073,033 A | 6/2000 | Campo |
| 6,073,036 A | 6/2000 | Heikkinen et al. |
| 6,073,091 A | 6/2000 | Kanevsky et al. |
| 6,073,097 A | 6/2000 | Gould et al. |
| 6,076,051 A | 6/2000 | Messerly et al. |
| 6,076,060 A | 6/2000 | Lin et al. |
| 6,076,088 A | 6/2000 | Paik et al. |
| 6,078,885 A | 6/2000 | Beutnagel |
| 6,078,914 A | 6/2000 | Redfern |
| 6,081,750 A | 6/2000 | Hoffberg et al. |
| 6,081,774 A | 6/2000 | de Hita et al. |
| 6,081,780 A | 6/2000 | Lumelsky |
| 6,085,204 A | 7/2000 | Chijiwa et al. |
| 6,088,671 A | 7/2000 | Gould et al. |
| 6,088,731 A | 7/2000 | Kiraly et al. |
| 6,092,036 A | 7/2000 | Hamann et al. |
| 6,092,038 A | 7/2000 | Kanevsky et al. |
| 6,092,043 A | 7/2000 | Squires et al. |
| 6,094,649 A | 7/2000 | Bowen et al. |
| 6,097,391 A | 8/2000 | Wilcox |
| 6,101,468 A | 8/2000 | Gould et al. |
| 6,101,470 A | 8/2000 | Eide et al. |
| 6,105,865 A | 8/2000 | Hardesty |
| 6,108,627 A | 8/2000 | Sabourin |
| 6,108,640 A | 8/2000 | Slotznick |
| 6,111,562 A | 8/2000 | Downs et al. |
| 6,111,572 A | 8/2000 | Blair et al. |
| 6,115,686 A | 9/2000 | Chung et al. |
| 6,116,907 A | 9/2000 | Baker et al. |
| 6,119,101 A | 9/2000 | Peckover |
| 6,121,960 A | 9/2000 | Carroll et al. |
| 6,122,340 A | 9/2000 | Darley et al. |
| 6,122,614 A | 9/2000 | Kahn et al. |
| 6,122,616 A | 9/2000 | Henton |
| 6,122,647 A | 9/2000 | Horowitz et al. |
| 6,125,284 A | 9/2000 | Moore et al. |
| 6,125,346 A | 9/2000 | Nishimura et al. |
| 6,125,356 A | 9/2000 | Brockman et al. |
| 6,129,582 A | 10/2000 | Wilhite et al. |
| 6,138,098 A | 10/2000 | Shieber et al. |
| 6,138,158 A | 10/2000 | Boyle et al. |
| 6,141,642 A | 10/2000 | Oh |
| 6,141,644 A | 10/2000 | Kuhn et al. |
| 6,144,377 A | 11/2000 | Oppermann et al. |
| 6,144,380 A | 11/2000 | Shwarts et al. |
| 6,144,938 A | 11/2000 | Surace et al. |
| 6,144,939 A | 11/2000 | Pearson et al. |
| 6,151,401 A | 11/2000 | Annaratone |
| 6,154,551 A | 11/2000 | Frenkel |
| 6,154,720 A | 11/2000 | Onishi et al. |
| 6,157,935 A | 12/2000 | Tran et al. |
| 6,161,084 A | 12/2000 | Messerly et al. |
| 6,161,087 A | 12/2000 | Wightman et al. |
| 6,161,944 A | 12/2000 | Leman |
| 6,163,769 A | 12/2000 | Acero et al. |
| 6,163,809 A | 12/2000 | Buckley |
| 6,167,369 A | 12/2000 | Schulze |

(56) References Cited

U.S. PATENT DOCUMENTS

| | | |
|---|---|---|
| 6,169,538 B1 | 1/2001 | Nowlan et al. |
| 6,172,948 B1 | 1/2001 | Keller et al. |
| 6,173,194 B1 | 1/2001 | Vanttila |
| 6,173,251 B1 | 1/2001 | Ito et al. |
| 6,173,261 B1 | 1/2001 | Arai et al. |
| 6,173,263 B1 | 1/2001 | Conkie |
| 6,173,279 B1 | 1/2001 | Levin et al. |
| 6,177,905 B1 | 1/2001 | Welch |
| 6,177,931 B1 | 1/2001 | Alexander et al. |
| 6,179,432 B1 | 1/2001 | Zhang et al. |
| 6,182,028 B1 | 1/2001 | Karaali et al. |
| 6,182,099 B1 | 1/2001 | Nakasato |
| 6,185,533 B1 | 2/2001 | Holm et al. |
| 6,188,391 B1 | 2/2001 | Seely et al. |
| 6,188,967 B1 | 2/2001 | Kurtzberg et al. |
| 6,188,999 B1 | 2/2001 | Moody |
| 6,191,939 B1 | 2/2001 | Burnett |
| 6,192,253 B1 | 2/2001 | Charlier et al. |
| 6,192,340 B1 | 2/2001 | Abecassis |
| 6,195,641 B1 | 2/2001 | Loring et al. |
| 6,199,076 B1 | 3/2001 | Logan et al. |
| 6,205,456 B1 | 3/2001 | Nakao |
| 6,208,044 B1 | 3/2001 | Viswanadham et al. |
| 6,208,932 B1 | 3/2001 | Ohmura et al. |
| 6,208,956 B1 | 3/2001 | Motoyama |
| 6,208,964 B1 | 3/2001 | Sabourin |
| 6,208,967 B1 | 3/2001 | Pauws et al. |
| 6,208,971 B1 | 3/2001 | Bellegarda et al. |
| 6,212,564 B1 | 4/2001 | Harter et al. |
| 6,216,102 B1 | 4/2001 | Martino et al. |
| 6,216,131 B1 | 4/2001 | Liu et al. |
| 6,217,183 B1 | 4/2001 | Shipman |
| 6,222,347 B1 | 4/2001 | Gong |
| 6,226,403 B1 | 5/2001 | Parthasarathy |
| 6,226,533 B1 | 5/2001 | Akahane |
| 6,226,614 B1 | 5/2001 | Mizuno et al. |
| 6,226,655 B1 | 5/2001 | Borman et al. |
| 6,230,322 B1 | 5/2001 | Saib et al. |
| 6,232,539 B1 | 5/2001 | Looney et al. |
| 6,232,966 B1 | 5/2001 | Kurlander |
| 6,233,545 B1 | 5/2001 | Datig |
| 6,233,547 B1 | 5/2001 | Denber et al. |
| 6,233,559 B1 | 5/2001 | Balakrishnan |
| 6,233,578 B1 | 5/2001 | Machihara et al. |
| 6,237,025 B1 | 5/2001 | Ludwig et al. |
| 6,240,303 B1 | 5/2001 | Katzur |
| 6,243,681 B1 | 6/2001 | Guji et al. |
| 6,246,981 B1 | 6/2001 | Papineni et al. |
| 6,248,946 B1 | 6/2001 | Dwek |
| 6,249,606 B1 | 6/2001 | Kiraly et al. |
| 6,259,436 B1 | 7/2001 | Moon et al. |
| 6,259,826 B1 | 7/2001 | Pollard et al. |
| 6,260,011 B1 | 7/2001 | Heckerman et al. |
| 6,260,013 B1 | 7/2001 | Sejnoha |
| 6,260,016 B1 | 7/2001 | Holm et al. |
| 6,260,024 B1 | 7/2001 | Shkedy |
| 6,266,098 B1 | 7/2001 | Cove et al. |
| 6,266,637 B1 | 7/2001 | Donovan et al. |
| 6,268,859 B1 | 7/2001 | Andresen et al. |
| 6,269,712 B1 | 8/2001 | Zentmyer |
| 6,271,835 B1 | 8/2001 | Hoeksma |
| 6,272,456 B1 | 8/2001 | De Campos |
| 6,272,464 B1 | 8/2001 | Kiraz et al. |
| 6,275,795 B1 | 8/2001 | Tzirkel-Hancock |
| 6,275,824 B1 | 8/2001 | O'Flaherty et al. |
| 6,278,443 B1 | 8/2001 | Amro et al. |
| 6,278,970 B1 | 8/2001 | Milner |
| 6,282,507 B1 | 8/2001 | Horiguchi et al. |
| 6,282,511 B1 | 8/2001 | Mayer |
| 6,285,785 B1 | 9/2001 | Bellegarda et al. |
| 6,285,786 B1 | 9/2001 | Seni et al. |
| 6,289,085 B1 | 9/2001 | Miyashita et al. |
| 6,289,124 B1 | 9/2001 | Okamoto |
| 6,289,301 B1 | 9/2001 | Higginbotham et al. |
| 6,289,353 B1 | 9/2001 | Hazlehurst et al. |
| 6,292,772 B1 | 9/2001 | Kantrowitz |
| 6,292,778 B1 | 9/2001 | Sukkar |
| 6,295,390 B1 | 9/2001 | Kobayashi et al. |
| 6,295,541 B1 | 9/2001 | Bodnar et al. |
| 6,297,818 B1 | 10/2001 | Ulrich et al. |
| 6,298,314 B1 | 10/2001 | Blackadar et al. |
| 6,298,321 B1 | 10/2001 | Karlov et al. |
| 6,300,947 B1 | 10/2001 | Kanevsky |
| 6,304,844 B1 | 10/2001 | Pan et al. |
| 6,304,846 B1 | 10/2001 | George et al. |
| 6,307,548 B1 | 10/2001 | Flinchem et al. |
| 6,308,149 B1 | 10/2001 | Gaussier et al. |
| 6,310,610 B1 | 10/2001 | Beaton et al. |
| 6,311,152 B1 | 10/2001 | Bai et al. |
| 6,311,157 B1 | 10/2001 | Strong |
| 6,311,189 B1 | 10/2001 | deVries et al. |
| 6,317,237 B1 | 11/2001 | Nakao et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,321,179 B1 | 11/2001 | Glance et al. |
| 6,323,846 B1 | 11/2001 | Westerman et al. |
| 6,324,499 B1 | 11/2001 | Lewis et al. |
| 6,324,502 B1 | 11/2001 | Handel et al. |
| 6,324,512 B1 | 11/2001 | Junqua et al. |
| 6,324,514 B2 | 11/2001 | Matulich et al. |
| 6,330,538 B1 | 12/2001 | Breen |
| 6,331,867 B1 | 12/2001 | Eberhard et al. |
| 6,332,175 B1 | 12/2001 | Birrell et al. |
| 6,334,103 B1 | 12/2001 | Surace et al. |
| 6,335,722 B1 | 1/2002 | Tani et al. |
| 6,336,365 B1 | 1/2002 | Blackadar et al. |
| 6,336,727 B1 | 1/2002 | Kim |
| 6,340,937 B1 | 1/2002 | Stepita-Klauco |
| 6,341,316 B1 | 1/2002 | Kloba et al. |
| 6,343,267 B1 | 1/2002 | Kuhn et al. |
| 6,345,240 B1 | 2/2002 | Havens |
| 6,345,250 B1 | 2/2002 | Martin |
| 6,351,522 B1 | 2/2002 | Vitikainen |
| 6,351,762 B1 | 2/2002 | Ludwig et al. |
| 6,353,442 B1 | 3/2002 | Masui |
| 6,353,794 B1 | 3/2002 | Davis et al. |
| 6,356,287 B1 | 3/2002 | Ruberry et al. |
| 6,356,854 B1 | 3/2002 | Schubert et al. |
| 6,356,864 B1 | 3/2002 | Foltz et al. |
| 6,356,905 B1 | 3/2002 | Gershman et al. |
| 6,357,147 B1 | 3/2002 | Darley et al. |
| 6,359,572 B1 | 3/2002 | Vale |
| 6,359,970 B1 | 3/2002 | Burgess |
| 6,360,227 B1 | 3/2002 | Aggarwal et al. |
| 6,360,237 B1 | 3/2002 | Schulz et al. |
| 6,363,348 B1 | 3/2002 | Besling et al. |
| 6,366,883 B1 | 4/2002 | Campbell et al. |
| 6,366,884 B1 | 4/2002 | Bellegarda et al. |
| 6,374,217 B1 | 4/2002 | Bellegarda |
| 6,374,226 B1 | 4/2002 | Hunt et al. |
| 6,377,530 B1 | 4/2002 | Burrows |
| 6,377,925 B1 | 4/2002 | Greene, Jr. et al. |
| 6,377,928 B1 | 4/2002 | Saxena et al. |
| 6,381,593 B1 | 4/2002 | Yano et al. |
| 6,385,586 B1 | 5/2002 | Dietz |
| 6,385,662 B1 | 5/2002 | Moon et al. |
| 6,389,114 B1 | 5/2002 | Dowens et al. |
| 6,397,183 B1 | 5/2002 | Baba et al. |
| 6,397,186 B1 | 5/2002 | Bush et al. |
| 6,400,806 B1 | 6/2002 | Uppaluru |
| 6,400,996 B1 | 6/2002 | Hoffberg et al. |
| 6,401,065 B1 | 6/2002 | Kanevsky et al. |
| 6,401,085 B1 | 6/2002 | Gershman et al. |
| 6,405,169 B1 | 6/2002 | Kondo et al. |
| 6,405,238 B1 | 6/2002 | Votipka |
| 6,408,272 B1 | 6/2002 | White et al. |
| 6,411,924 B1 | 6/2002 | De Hita et al. |
| 6,411,932 B1 | 6/2002 | Molnar et al. |
| 6,415,250 B1 | 7/2002 | Van Den Akker |
| 6,417,873 B1 | 7/2002 | Fletcher et al. |
| 6,418,431 B1 | 7/2002 | Mahajan et al. |
| 6,421,305 B1 | 7/2002 | Gioscia et al. |

(56) References Cited

U.S. PATENT DOCUMENTS

| | | |
|---|---|---|
| 6,421,672 B1 | 7/2002 | McAllister et al. |
| 6,421,707 B1 | 7/2002 | Miller et al. |
| 6,424,944 B1 | 7/2002 | Hikawa |
| 6,430,531 B1 | 8/2002 | Polish |
| 6,430,551 B1 | 8/2002 | Thelen et al. |
| 6,434,522 B1 | 8/2002 | Tsuboka |
| 6,434,524 B1 | 8/2002 | Weber |
| 6,434,529 B1 | 8/2002 | Walker et al. |
| 6,434,604 B1 | 8/2002 | Harada et al. |
| 6,437,818 B1 | 8/2002 | Ludwig et al. |
| 6,438,523 B1 | 8/2002 | Oberteuffer et al. |
| 6,442,518 B1 | 8/2002 | Van Thong et al. |
| 6,442,523 B1 | 8/2002 | Siegel |
| 6,446,076 B1 | 9/2002 | Burkey et al. |
| 6,448,485 B1 | 9/2002 | Barile |
| 6,448,986 B1 | 9/2002 | Smith |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,453,312 B1 | 9/2002 | Goiffon et al. |
| 6,453,315 B1 | 9/2002 | Weissman |
| 6,456,616 B1 | 9/2002 | Rantanen |
| 6,456,972 B1 | 9/2002 | Gladstein et al. |
| 6,460,015 B1 | 10/2002 | Hetherington et al. |
| 6,460,029 B1 | 10/2002 | Fries et al. |
| 6,462,778 B1 | 10/2002 | Abram et al. |
| 6,463,128 B1 | 10/2002 | Elwin |
| 6,463,413 B1 | 10/2002 | Applebaum et al. |
| 6,466,654 B1 | 10/2002 | Cooper et al. |
| 6,467,924 B2 | 10/2002 | Shipman |
| 6,469,712 B1 | 10/2002 | Hilpert, Jr. et al. |
| 6,469,722 B1 | 10/2002 | Kinoe et al. |
| 6,469,732 B1 | 10/2002 | Chang et al. |
| 6,470,347 B1 | 10/2002 | Gillam |
| 6,473,630 B1 | 10/2002 | Baranowski et al. |
| 6,473,754 B1 | 10/2002 | Matsubayashi et al. |
| 6,477,488 B1 | 11/2002 | Bellegarda |
| 6,477,494 B2 | 11/2002 | Hyde-Thomson et al. |
| 6,487,533 B2 | 11/2002 | Hyde-Thomson et al. |
| 6,487,534 B1 | 11/2002 | Thelen et al. |
| 6,487,663 B1 | 11/2002 | Jaisimha et al. |
| 6,489,951 B1 | 12/2002 | Wong et al. |
| 6,490,547 B1 | 12/2002 | Atkin et al. |
| 6,490,560 B1 | 12/2002 | Ramaswamy et al. |
| 6,493,006 B1 | 12/2002 | Gourdol et al. |
| 6,493,428 B1 | 12/2002 | Hillier |
| 6,493,652 B1 | 12/2002 | Ohlenbusch et al. |
| 6,493,667 B1 | 12/2002 | De Souza et al. |
| 6,499,013 B1 | 12/2002 | Weber |
| 6,499,014 B1 | 12/2002 | Chihara |
| 6,499,016 B1 | 12/2002 | Anderson et al. |
| 6,501,937 B1 | 12/2002 | Ho et al. |
| 6,502,194 B1 | 12/2002 | Berman et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,507,829 B1 | 1/2003 | Richards et al. |
| 6,510,406 B1 | 1/2003 | Marchisio |
| 6,510,412 B1 | 1/2003 | Sasai et al. |
| 6,510,417 B1 | 1/2003 | Woods et al. |
| 6,513,006 B2 | 1/2003 | Howard et al. |
| 6,513,008 B2 | 1/2003 | Pearson et al. |
| 6,513,063 B1 | 1/2003 | Julia et al. |
| 6,519,565 B1 | 2/2003 | Clements et al. |
| 6,519,566 B1 | 2/2003 | Boyer et al. |
| 6,523,026 B1 | 2/2003 | Gillis |
| 6,523,061 B1 | 2/2003 | Halverson et al. |
| 6,523,172 B1 | 2/2003 | Martinez-Guerra et al. |
| 6,526,351 B2 | 2/2003 | Whitham |
| 6,526,382 B1 | 2/2003 | Yuschik |
| 6,526,395 B1 | 2/2003 | Morris |
| 6,529,592 B1 | 3/2003 | Khan |
| 6,529,608 B2 | 3/2003 | Gersabeck et al. |
| 6,532,444 B1 | 3/2003 | Weber |
| 6,532,446 B1 | 3/2003 | King |
| 6,535,610 B1 | 3/2003 | Stewart |
| 6,535,852 B2 | 3/2003 | Eide |
| 6,535,983 B1 | 3/2003 | McCormack et al. |
| 6,536,139 B2 | 3/2003 | Darley et al. |
| 6,538,665 B2 | 3/2003 | Crow et al. |
| 6,542,171 B1 | 4/2003 | Satou et al. |
| 6,542,584 B1 | 4/2003 | Sherwood et al. |
| 6,542,868 B1 | 4/2003 | Badt et al. |
| 6,546,262 B1 | 4/2003 | Freadman |
| 6,546,367 B2 | 4/2003 | Otsuka |
| 6,546,388 B1 | 4/2003 | Edlund et al. |
| 6,549,497 B2 | 4/2003 | Miyamoto et al. |
| 6,553,343 B1 | 4/2003 | Kagoshima et al. |
| 6,553,344 B2 | 4/2003 | Bellegarda et al. |
| 6,556,971 B1 | 4/2003 | Rigsby et al. |
| 6,556,983 B1 | 4/2003 | Altschuler et al. |
| 6,560,903 B1 | 5/2003 | Darley |
| 6,563,769 B1 | 5/2003 | Van Der Meulen |
| 6,564,186 B1 | 5/2003 | Kiraly et al. |
| 6,567,549 B1 | 5/2003 | Marianetti et al. |
| 6,570,557 B1 | 5/2003 | Westerman et al. |
| 6,570,596 B2 | 5/2003 | Frederiksen |
| 6,582,342 B2 | 6/2003 | Kaufman |
| 6,583,806 B2 | 6/2003 | Ludwig et al. |
| 6,584,464 B1 | 6/2003 | Warthen |
| 6,587,403 B1 | 7/2003 | Keller et al. |
| 6,587,404 B1 | 7/2003 | Keller et al. |
| 6,590,303 B1 | 7/2003 | Austin et al. |
| 6,591,379 B1 | 7/2003 | LeVine et al. |
| 6,594,673 B1 | 7/2003 | Smith et al. |
| 6,594,688 B2 | 7/2003 | Ludwig et al. |
| 6,597,345 B2 | 7/2003 | Hirshberg |
| 6,598,021 B1 | 7/2003 | Shambaugh et al. |
| 6,598,022 B2 | 7/2003 | Yuschik |
| 6,598,039 B1 | 7/2003 | Livowsky |
| 6,598,054 B2 | 7/2003 | Schuetze et al. |
| 6,601,026 B2 | 7/2003 | Appelt et al. |
| 6,601,234 B1 | 7/2003 | Bowman-Amuah |
| 6,603,837 B1 | 8/2003 | Kesanupalli et al. |
| 6,604,059 B2 | 8/2003 | Strubbe et al. |
| 6,606,101 B1 | 8/2003 | Malamud et al. |
| 6,606,388 B1 | 8/2003 | Townsend et al. |
| 6,606,632 B1 | 8/2003 | Saulpaugh et al. |
| 6,611,789 B1 | 8/2003 | Darley |
| 6,615,172 B1 | 9/2003 | Bennett et al. |
| 6,615,175 B1 | 9/2003 | Gazdzinski |
| 6,615,176 B2 | 9/2003 | Lewis et al. |
| 6,615,220 B1 | 9/2003 | Austin et al. |
| 6,621,768 B1 | 9/2003 | Keller et al. |
| 6,621,892 B1 | 9/2003 | Banister et al. |
| 6,622,121 B1 | 9/2003 | Crepy et al. |
| 6,622,136 B2 | 9/2003 | Russell |
| 6,623,529 B1 | 9/2003 | Lakritz |
| 6,625,583 B1 | 9/2003 | Silverman et al. |
| 6,628,808 B1 | 9/2003 | Bach et al. |
| 6,631,186 B1 | 10/2003 | Adams et al. |
| 6,631,346 B1 | 10/2003 | Karaorman et al. |
| 6,633,741 B1 | 10/2003 | Posa et al. |
| 6,633,846 B1 | 10/2003 | Bennett et al. |
| 6,633,932 B1 | 10/2003 | Bork et al. |
| 6,642,940 B1 | 11/2003 | Dakss et al. |
| 6,643,401 B1 | 11/2003 | Kashioka et al. |
| 6,643,824 B1 | 11/2003 | Bates et al. |
| 6,647,260 B2 | 11/2003 | Dusse et al. |
| 6,650,735 B2 | 11/2003 | Burton et al. |
| 6,651,042 B1 | 11/2003 | Field et al. |
| 6,651,218 B1 | 11/2003 | Adler et al. |
| 6,654,740 B2 | 11/2003 | Tokuda et al. |
| 6,658,389 B1 | 12/2003 | Alpdemir |
| 6,658,408 B2 | 12/2003 | Yano et al. |
| 6,658,577 B2 | 12/2003 | Huppi et al. |
| 6,661,438 B1 | 12/2003 | Shiraishi et al. |
| 6,662,023 B1 | 12/2003 | Helle |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,671,672 B1 | 12/2003 | Heck |
| 6,671,683 B2 | 12/2003 | Kanno |
| 6,671,856 B1 | 12/2003 | Gillam |

(56) References Cited

U.S. PATENT DOCUMENTS

| | | |
|---|---|---|
| 6,675,169 B1 | 1/2004 | Bennett et al. |
| 6,675,233 B1 | 1/2004 | Du et al. |
| 6,677,932 B1 | 1/2004 | Westerman |
| 6,680,675 B1 | 1/2004 | Suzuki |
| 6,684,187 B1 | 1/2004 | Conkie |
| 6,684,376 B1 | 1/2004 | Kerzman et al. |
| 6,690,387 B2 | 2/2004 | Zimmerman et al. |
| 6,690,800 B2 | 2/2004 | Resnick |
| 6,690,828 B2 | 2/2004 | Meyers |
| 6,691,064 B2 | 2/2004 | Vroman |
| 6,691,090 B1 | 2/2004 | Laurila et al. |
| 6,691,111 B2 | 2/2004 | Lazaridis et al. |
| 6,691,151 B1 | 2/2004 | Cheyer et al. |
| 6,694,295 B2 | 2/2004 | Lindholm et al. |
| 6,694,297 B2 | 2/2004 | Sato |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,701,305 B1 | 3/2004 | Holt et al. |
| 6,701,318 B2 | 3/2004 | Fox et al. |
| 6,704,015 B1 | 3/2004 | Bovarnick et al. |
| 6,704,034 B1 | 3/2004 | Rodriguez et al. |
| 6,704,698 B1 | 3/2004 | Paulsen, Jr. et al. |
| 6,704,710 B2 | 3/2004 | Strong |
| 6,708,153 B2 | 3/2004 | Britton et al. |
| 6,711,585 B1 | 3/2004 | Copperman et al. |
| 6,714,221 B1 | 3/2004 | Christie et al. |
| 6,716,139 B1 | 4/2004 | Hosseinzadeh-Dolkhani et al. |
| 6,718,324 B2 | 4/2004 | Edlund et al. |
| 6,718,331 B2 | 4/2004 | Davis et al. |
| 6,720,980 B1 | 4/2004 | Lui et al. |
| 6,721,728 B2 | 4/2004 | McGreevy |
| 6,721,734 B1 | 4/2004 | Subasic et al. |
| 6,724,370 B2 | 4/2004 | Dutta et al. |
| 6,725,197 B1 | 4/2004 | Wuppermann et al. |
| 6,728,675 B1 | 4/2004 | Maddalozzo, Jr. et al. |
| 6,728,681 B2 | 4/2004 | Whitham |
| 6,728,729 B1 | 4/2004 | Jawa et al. |
| 6,731,312 B2 | 5/2004 | Robbin |
| 6,732,142 B1 | 5/2004 | Bates et al. |
| 6,735,562 B1 | 5/2004 | Zhang et al. |
| 6,735,632 B1 | 5/2004 | Kiraly et al. |
| 6,738,738 B2 | 5/2004 | Henton |
| 6,738,742 B2 | 5/2004 | Badt et al. |
| 6,741,264 B1 | 5/2004 | Lesser |
| 6,742,021 B1 | 5/2004 | Halverson et al. |
| 6,751,592 B1 | 6/2004 | Shiga |
| 6,751,595 B2 | 6/2004 | Busayapongchai et al. |
| 6,751,621 B1 | 6/2004 | Calistri-Yeh et al. |
| 6,754,504 B1 | 6/2004 | Reed |
| 6,757,362 B1 | 6/2004 | Cooper et al. |
| 6,757,365 B1 | 6/2004 | Bogard |
| 6,757,646 B2 | 6/2004 | Marchisio |
| 6,757,653 B2 | 6/2004 | Buth et al. |
| 6,757,718 B1 | 6/2004 | Halverson et al. |
| 6,760,412 B1 | 7/2004 | Loucks |
| 6,760,700 B2 | 7/2004 | Lewis et al. |
| 6,760,754 B1 | 7/2004 | Isaacs et al. |
| 6,762,741 B2 | 7/2004 | Weindorf |
| 6,762,777 B2 | 7/2004 | Carroll |
| 6,763,089 B2 | 7/2004 | Feigenbaum |
| 6,766,294 B2 | 7/2004 | MacGinite et al. |
| 6,766,295 B1 | 7/2004 | Murveit et al. |
| 6,766,320 B1 | 7/2004 | Wang et al. |
| 6,766,324 B2 | 7/2004 | Carlson et al. |
| 6,768,979 B1 | 7/2004 | Menendez-Pidal et al. |
| 6,771,982 B1 | 8/2004 | Toupin |
| 6,772,123 B2 | 8/2004 | Cooklev et al. |
| 6,772,195 B1 | 8/2004 | Hatlelid et al. |
| 6,772,394 B1 | 8/2004 | Kamada |
| 6,775,358 B1 | 8/2004 | Breitenbach et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,778,979 B2 | 8/2004 | Grefenstette et al. |
| 6,782,510 B1 | 8/2004 | Gross et al. |
| 6,784,901 B1 | 8/2004 | Harvey et al. |
| 6,789,094 B2 | 9/2004 | Rudoff et al. |
| 6,789,231 B1 | 9/2004 | Reynar et al. |
| 6,790,704 B2 | 9/2004 | Doyle et al. |
| 6,792,082 B1 | 9/2004 | Levine |
| 6,792,083 B2 | 9/2004 | Dams et al. |
| 6,792,086 B1 | 9/2004 | Saylor et al. |
| 6,792,407 B2 | 9/2004 | Kibre et al. |
| 6,794,566 B2 | 9/2004 | Pachet |
| 6,795,059 B2 | 9/2004 | Endo |
| 6,799,162 B1 | 9/2004 | Goronzy et al. |
| 6,799,226 B1 | 9/2004 | Robbin et al. |
| 6,801,604 B2 | 10/2004 | Maes et al. |
| 6,801,964 B1 | 10/2004 | Mahdavi |
| 6,803,905 B1 | 10/2004 | Capps et al. |
| 6,804,649 B2 | 10/2004 | Miranda |
| 6,804,677 B2 | 10/2004 | Shadmon et al. |
| 6,807,536 B2 | 10/2004 | Achlioptas et al. |
| 6,807,574 B1 | 10/2004 | Partovi et al. |
| 6,809,724 B1 | 10/2004 | Shiraishi et al. |
| 6,810,379 B1 | 10/2004 | Vermeulen et al. |
| 6,813,218 B1 | 11/2004 | Antonelli et al. |
| 6,813,491 B1 | 11/2004 | McKinney |
| 6,813,607 B1 | 11/2004 | Faruquie et al. |
| 6,816,578 B1 | 11/2004 | Kredo et al. |
| 6,820,055 B2 | 11/2004 | Saindon et al. |
| 6,829,018 B2 | 12/2004 | Lin et al. |
| 6,829,603 B1 | 12/2004 | Chai et al. |
| 6,832,194 B1 | 12/2004 | Mozer et al. |
| 6,832,381 B1 | 12/2004 | Mathur et al. |
| 6,836,651 B2 | 12/2004 | Segal et al. |
| 6,836,760 B1 | 12/2004 | Bellegarda et al. |
| 6,839,464 B2 | 1/2005 | Hawkins et al. |
| 6,839,669 B1 | 1/2005 | Gould et al. |
| 6,839,670 B1 | 1/2005 | Stammler et al. |
| 6,839,742 B1 | 1/2005 | Dyer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,850,775 B1 | 2/2005 | Berg |
| 6,850,887 B2 | 2/2005 | Epstein et al. |
| 6,851,115 B1 | 2/2005 | Cheyer et al. |
| 6,856,259 B1 | 2/2005 | Sharp |
| 6,857,800 B2 | 2/2005 | Zhang et al. |
| 6,859,931 B1 | 2/2005 | Cheyer et al. |
| 6,862,568 B2 | 3/2005 | Case |
| 6,862,710 B1 | 3/2005 | Marchisio |
| 6,862,713 B1 | 3/2005 | Kraft et al. |
| 6,865,533 B2 | 3/2005 | Addison et al. |
| 6,868,045 B1 | 3/2005 | Schroder |
| 6,868,385 B1 | 3/2005 | Gerson |
| 6,870,529 B1 | 3/2005 | Davis |
| 6,871,346 B1 | 3/2005 | Kumbalimutt et al. |
| 6,873,953 B1 | 3/2005 | Lennig |
| 6,873,986 B2 | 3/2005 | McConnell et al. |
| 6,876,947 B1 | 4/2005 | Darley et al. |
| 6,877,003 B2 | 4/2005 | Ho et al. |
| 6,879,957 B1 | 4/2005 | Pechter et al. |
| 6,882,335 B2 | 4/2005 | Saarinen |
| 6,882,337 B2 | 4/2005 | Shetter |
| 6,882,747 B2 | 4/2005 | Thawonmas et al. |
| 6,882,955 B1 | 4/2005 | Ohlenbusch et al. |
| 6,882,971 B2 | 4/2005 | Craner |
| 6,885,734 B1 | 4/2005 | Eberle et al. |
| 6,889,361 B1 | 5/2005 | Bates et al. |
| 6,895,084 B1 | 5/2005 | Saylor et al. |
| 6,895,257 B2 | 5/2005 | Boman et al. |
| 6,895,380 B2 | 5/2005 | Sepe, Jr. |
| 6,895,558 B1 | 5/2005 | Loveland |
| 6,898,550 B1 | 5/2005 | Blackadar et al. |
| 6,901,364 B2 | 5/2005 | Nguyen et al. |
| 6,901,399 B1 | 5/2005 | Corston et al. |
| 6,904,405 B2 | 6/2005 | Suominen |
| 6,907,112 B1 | 6/2005 | Guedalia et al. |
| 6,907,140 B2 | 6/2005 | Matsugu et al. |
| 6,910,004 B2 | 6/2005 | Tarbouriech et al. |
| 6,910,007 B2 | 6/2005 | Stylianou et al. |

(56) References Cited

U.S. PATENT DOCUMENTS

| | | |
|---|---|---|
| 6,910,012 B2 | 6/2005 | Hartley et al. |
| 6,910,186 B2 | 6/2005 | Kim |
| 6,911,971 B2 | 6/2005 | Suzuki et al. |
| 6,912,407 B1 | 6/2005 | Clarke et al. |
| 6,912,498 B2 | 6/2005 | Stevens et al. |
| 6,912,499 B1 | 6/2005 | Sabourin et al. |
| 6,915,138 B2 | 7/2005 | Kraft |
| 6,915,246 B2 | 7/2005 | Gusler et al. |
| 6,915,294 B1 | 7/2005 | Singh et al. |
| 6,917,373 B2 | 7/2005 | Vong et al. |
| 6,918,677 B2 | 7/2005 | Shipman |
| 6,924,828 B1 | 8/2005 | Hirsch |
| 6,925,438 B2 | 8/2005 | Mohamed et al. |
| 6,928,149 B1 | 8/2005 | Panjwani et al. |
| 6,928,614 B1 | 8/2005 | Everhart |
| 6,931,255 B2 | 8/2005 | Mekuria |
| 6,931,384 B1 | 8/2005 | Horvitz et al. |
| 6,932,708 B2 | 8/2005 | Yamashita et al. |
| 6,933,928 B1 | 8/2005 | Lilienthal et al. |
| 6,934,394 B1 | 8/2005 | Anderson |
| 6,934,684 B2 | 8/2005 | Alpdemir et al. |
| 6,934,756 B2 | 8/2005 | Maes |
| 6,934,812 B1 | 8/2005 | Robbin et al. |
| 6,937,975 B1 | 8/2005 | Elworthy |
| 6,937,986 B2 | 8/2005 | Denenberg et al. |
| 6,944,593 B2 | 9/2005 | Kuzunuki et al. |
| 6,944,846 B2 | 9/2005 | Ryzhov |
| 6,948,094 B2 | 9/2005 | Schultz et al. |
| 6,950,087 B2 | 9/2005 | Knox et al. |
| 6,950,502 B1 | 9/2005 | Jenkins |
| 6,952,799 B2 | 10/2005 | Edwards et al. |
| 6,954,755 B2 | 10/2005 | Reisman |
| 6,954,899 B1 | 10/2005 | Anderson |
| 6,956,845 B2 | 10/2005 | Baker et al. |
| 6,957,076 B2 | 10/2005 | Hunzinger |
| 6,957,183 B2 | 10/2005 | Malayath et al. |
| 6,960,734 B1 | 11/2005 | Park |
| 6,961,699 B1 | 11/2005 | Kahn et al. |
| 6,961,912 B2 | 11/2005 | Aoki et al. |
| 6,963,759 B1 | 11/2005 | Gerson |
| 6,963,841 B2 | 11/2005 | Handal et al. |
| 6,964,023 B2 | 11/2005 | Maes et al. |
| 6,965,376 B2 | 11/2005 | Tani et al. |
| 6,965,863 B1 | 11/2005 | Zuberec et al. |
| 6,968,311 B2 | 11/2005 | Knockeart et al. |
| 6,970,820 B2 | 11/2005 | Junqua et al. |
| 6,970,881 B1 | 11/2005 | Mohan et al. |
| 6,970,915 B1 | 11/2005 | Partovi et al. |
| 6,970,935 B1 | 11/2005 | Maes |
| 6,976,090 B2 | 12/2005 | Ben-Shaul et al. |
| 6,978,127 B1 | 12/2005 | Bulthuis et al. |
| 6,978,239 B2 | 12/2005 | Chu et al. |
| 6,980,949 B2 | 12/2005 | Ford |
| 6,980,953 B1 | 12/2005 | Kanevsky et al. |
| 6,980,955 B2 | 12/2005 | Okutani et al. |
| 6,983,251 B1 | 1/2006 | Umemoto et al. |
| 6,985,858 B2 | 1/2006 | Frey et al. |
| 6,985,865 B1 | 1/2006 | Packingham et al. |
| 6,985,958 B2 | 1/2006 | Zwiegincew et al. |
| 6,988,063 B2 | 1/2006 | Tokuda et al. |
| 6,988,071 B1 | 1/2006 | Gazdzinski |
| 6,990,450 B2 | 1/2006 | Case et al. |
| 6,996,520 B2 | 2/2006 | Levin |
| 6,996,531 B2 | 2/2006 | Korall et al. |
| 6,996,575 B2 | 2/2006 | Cox et al. |
| 6,999,066 B2 | 2/2006 | Litwiller |
| 6,999,914 B1 | 2/2006 | Boerner et al. |
| 6,999,925 B2 | 2/2006 | Fischer et al. |
| 6,999,927 B2 | 2/2006 | Mozer et al. |
| 7,000,189 B2 | 2/2006 | Dutta et al. |
| 7,002,556 B2 | 2/2006 | Tsukada et al. |
| 7,003,099 B1 | 2/2006 | Zhang et al. |
| 7,003,463 B1 | 2/2006 | Maes et al. |
| 7,003,522 B1 | 2/2006 | Reynar et al. |
| 7,006,969 B2 | 2/2006 | Atal |
| 7,006,973 B1 | 2/2006 | Genly et al. |
| 7,007,026 B2 | 2/2006 | Wilkinson et al. |
| 7,007,239 B1 | 2/2006 | Hawkins et al. |
| 7,010,581 B2 | 3/2006 | Brown et al. |
| 7,013,289 B2 | 3/2006 | Horn et al. |
| 7,013,308 B1 | 3/2006 | Tunstall-Pedoe |
| 7,013,429 B2 | 3/2006 | Fujimoto et al. |
| 7,015,894 B2 | 3/2006 | Morohoshi |
| 7,020,685 B1 | 3/2006 | Chen et al. |
| 7,024,363 B1 | 4/2006 | Comerford et al. |
| 7,024,364 B2 | 4/2006 | Guerra et al. |
| 7,024,366 B1 | 4/2006 | Deyoe et al. |
| 7,024,460 B2 | 4/2006 | Koopmas et al. |
| 7,027,568 B1 | 4/2006 | Simpson et al. |
| 7,027,974 B1 | 4/2006 | Busch et al. |
| 7,027,990 B2 | 4/2006 | Sussman |
| 7,028,252 B1 | 4/2006 | Baru et al. |
| 7,030,861 B1 | 4/2006 | Westerman et al. |
| 7,031,530 B2 | 4/2006 | Driggs et al. |
| 7,031,909 B2 | 4/2006 | Mao et al. |
| 7,035,794 B2 | 4/2006 | Sirivara |
| 7,035,801 B2 | 4/2006 | Jimenez-Feltstrom |
| 7,035,807 B1 | 4/2006 | Brittain et al. |
| 7,036,128 B1 | 4/2006 | Julia et al. |
| 7,036,681 B2 | 5/2006 | Suda et al. |
| 7,038,659 B2 | 5/2006 | Rajkowski |
| 7,039,588 B2 | 5/2006 | Okutani et al. |
| 7,043,420 B2 | 5/2006 | Ratnaparkhi |
| 7,043,422 B2 | 5/2006 | Gao et al. |
| 7,046,230 B2 | 5/2006 | Zadesky et al. |
| 7,046,850 B2 | 5/2006 | Braspenning et al. |
| 7,047,193 B1 | 5/2006 | Bellegarda |
| 7,050,550 B2 | 5/2006 | Steinbiss et al. |
| 7,050,976 B1 | 5/2006 | Packingham |
| 7,050,977 B1 | 5/2006 | Bennett |
| 7,051,096 B1 | 5/2006 | Krawiec et al. |
| 7,054,419 B2 | 5/2006 | Culliss |
| 7,054,888 B2 | 5/2006 | LaChapelle et al. |
| 7,057,607 B2 | 6/2006 | Mayoraz et al. |
| 7,058,569 B2 | 6/2006 | Coorman et al. |
| 7,058,888 B1 | 6/2006 | Gjerstad et al. |
| 7,058,889 B2 | 6/2006 | Trovato et al. |
| 7,062,223 B2 | 6/2006 | Gerber et al. |
| 7,062,225 B2 | 6/2006 | White |
| 7,062,428 B2 | 6/2006 | Hogenhout et al. |
| 7,062,438 B2 | 6/2006 | Kobayashi et al. |
| 7,065,185 B1 | 6/2006 | Koch |
| 7,065,485 B1 | 6/2006 | Chong-White et al. |
| 7,069,213 B2 | 6/2006 | Thompson |
| 7,069,220 B2 | 6/2006 | Coffman et al. |
| 7,069,560 B1 | 6/2006 | Cheyer et al. |
| 7,072,686 B1 | 7/2006 | Schrager |
| 7,072,941 B2 | 7/2006 | Griffin et al. |
| 7,076,527 B2 | 7/2006 | Bellegarda et al. |
| 7,079,713 B2 | 7/2006 | Simmons |
| 7,082,322 B2 | 7/2006 | Harano |
| 7,084,758 B1 | 8/2006 | Cole |
| 7,084,856 B2 | 8/2006 | Huppi |
| 7,085,723 B2 | 8/2006 | Ross et al. |
| 7,085,960 B2 | 8/2006 | Bouat et al. |
| 7,088,345 B2 | 8/2006 | Robinson et al. |
| 7,089,292 B1 | 8/2006 | Roderick et al. |
| 7,092,370 B2 | 8/2006 | Jiang et al. |
| 7,092,887 B2 | 8/2006 | Mozer et al. |
| 7,092,928 B1 | 8/2006 | Elad et al. |
| 7,092,950 B2 | 8/2006 | Wong et al. |
| 7,093,693 B1 | 8/2006 | Gazdzinski |
| 7,095,733 B1 | 8/2006 | Yarlagadda et al. |
| 7,096,183 B2 | 8/2006 | Junqua |
| 7,100,117 B1 | 8/2006 | Chwa et al. |
| 7,103,548 B2 | 9/2006 | Squibbs et al. |
| 7,107,204 B1 | 9/2006 | Liu et al. |
| 7,110,998 B1 | 9/2006 | Bhandari et al. |
| 7,111,248 B2 | 9/2006 | Mulvey et al. |
| 7,111,774 B2 | 9/2006 | Song |
| 7,113,803 B2 | 9/2006 | Dehlin |
| 7,113,943 B2 | 9/2006 | Bradford et al. |
| 7,115,035 B2 | 10/2006 | Tanaka |
| 7,117,231 B2 | 10/2006 | Fischer et al. |

(56) References Cited

U.S. PATENT DOCUMENTS

| | | |
|---|---|---|
| 7,120,865 B1 | 10/2006 | Horvitz et al. |
| 7,123,696 B2 | 10/2006 | Lowe |
| 7,124,081 B1 | 10/2006 | Bellegarda |
| 7,124,082 B2 | 10/2006 | Freedman |
| 7,124,164 B1 | 10/2006 | Chemtob |
| 7,127,046 B1 | 10/2006 | Smith et al. |
| 7,127,394 B2 | 10/2006 | Strong et al. |
| 7,127,396 B2 | 10/2006 | Chu et al. |
| 7,127,403 B1 | 10/2006 | Saylor et al. |
| 7,129,932 B1 | 10/2006 | Klarlund et al. |
| 7,133,900 B1 | 11/2006 | Szeto |
| 7,136,710 B1 | 11/2006 | Hoffberg et al. |
| 7,136,818 B1 | 11/2006 | Cosatto et al. |
| 7,137,126 B1 | 11/2006 | Coffman et al. |
| 7,139,697 B2 | 11/2006 | Häkkinen et al. |
| 7,139,714 B2 | 11/2006 | Bennett et al. |
| 7,139,722 B2 | 11/2006 | Perrella et al. |
| 7,143,028 B2 | 11/2006 | Hillis et al. |
| 7,143,038 B2 | 11/2006 | Katae |
| 7,143,040 B2 | 11/2006 | Durston et al. |
| 7,146,319 B2 | 12/2006 | Hunt |
| 7,146,437 B2 | 12/2006 | Robbin et al. |
| 7,149,319 B2 | 12/2006 | Roeck |
| 7,149,695 B1 | 12/2006 | Bellegarda |
| 7,149,964 B1 | 12/2006 | Cottrille et al. |
| 7,152,070 B1 | 12/2006 | Musick et al. |
| 7,152,093 B2 | 12/2006 | Ludwig et al. |
| 7,154,526 B2 | 12/2006 | Foote et al. |
| 7,155,668 B2 | 12/2006 | Holland et al. |
| 7,158,647 B2 | 1/2007 | Azima et al. |
| 7,159,174 B2 | 1/2007 | Johnson et al. |
| 7,162,412 B2 | 1/2007 | Yamada et al. |
| 7,162,482 B1 | 1/2007 | Dunning |
| 7,165,073 B2 | 1/2007 | Vandersluis |
| 7,166,791 B2 | 1/2007 | Robbin et al. |
| 7,171,350 B2 | 1/2007 | Lin et al. |
| 7,171,360 B2 | 1/2007 | Huang et al. |
| 7,174,042 B1 | 2/2007 | Simmons et al. |
| 7,174,295 B1 | 2/2007 | Kivimaki |
| 7,174,297 B2 | 2/2007 | Guerra et al. |
| 7,174,298 B2 | 2/2007 | Sharma |
| 7,177,794 B2 | 2/2007 | Mani et al. |
| 7,177,798 B2 | 2/2007 | Hsu et al. |
| 7,177,817 B1 | 2/2007 | Khosla et al. |
| 7,181,386 B2 | 2/2007 | Mohri et al. |
| 7,181,388 B2 | 2/2007 | Tian |
| 7,184,064 B2 | 2/2007 | Zimmerman et al. |
| 7,185,276 B2 | 2/2007 | Keswa |
| 7,188,085 B2 | 3/2007 | Pelletier |
| 7,190,351 B1 | 3/2007 | Goren |
| 7,190,794 B2 | 3/2007 | Hinde |
| 7,191,118 B2 | 3/2007 | Bellegarda |
| 7,191,131 B1 | 3/2007 | Nagao |
| 7,193,615 B2 | 3/2007 | Kim et al. |
| 7,194,186 B1 | 3/2007 | Strub et al. |
| 7,194,413 B2 | 3/2007 | Mahoney et al. |
| 7,194,471 B1 | 3/2007 | Nagatsuka et al. |
| 7,194,611 B2 | 3/2007 | Bear et al. |
| 7,194,699 B2 | 3/2007 | Thomson et al. |
| 7,197,120 B2 | 3/2007 | Luehrig et al. |
| 7,197,460 B1 | 3/2007 | Gupta et al. |
| 7,200,550 B2 | 4/2007 | Menezes et al. |
| 7,200,558 B2 | 4/2007 | Kato et al. |
| 7,200,559 B2 | 4/2007 | Wang |
| 7,203,297 B2 | 4/2007 | Vitikainen et al. |
| 7,203,646 B2 | 4/2007 | Bennett |
| 7,206,809 B2 | 4/2007 | Ludwig et al. |
| 7,212,827 B1 | 5/2007 | Veschi |
| 7,216,008 B2 | 5/2007 | Sakata |
| 7,216,066 B2 | 5/2007 | Di et al. |
| 7,216,073 B2 | 5/2007 | Lavi et al. |
| 7,216,080 B2 | 5/2007 | Tsiao et al. |
| 7,218,920 B2 | 5/2007 | Hyon |
| 7,218,943 B2 | 5/2007 | Klassen et al. |
| 7,219,063 B2 | 5/2007 | Schalk et al. |
| 7,219,123 B1 | 5/2007 | Fiechter et al. |
| 7,225,125 B2 | 5/2007 | Bennett et al. |
| 7,228,278 B2 | 6/2007 | Nguyen et al. |
| 7,231,343 B1 | 6/2007 | Treadgold et al. |
| 7,231,597 B1 | 6/2007 | Braun et al. |
| 7,233,790 B2 | 6/2007 | Kjellberg et al. |
| 7,233,904 B2 | 6/2007 | Luisi |
| 7,234,026 B2 | 6/2007 | Robbin et al. |
| 7,236,932 B1 | 6/2007 | Grajski |
| 7,240,002 B2 | 7/2007 | Minamino et al. |
| 7,243,130 B2 | 7/2007 | Horvitz et al. |
| 7,243,305 B2 | 7/2007 | Schabes et al. |
| 7,246,118 B2 | 7/2007 | Chastain et al. |
| 7,246,151 B2 | 7/2007 | Isaacs et al. |
| 7,248,900 B2 | 7/2007 | Deeds et al. |
| 7,251,313 B1 | 7/2007 | Miller et al. |
| 7,251,454 B2 | 7/2007 | White |
| 7,254,773 B2 | 8/2007 | Bates et al. |
| 7,257,537 B2 | 8/2007 | Ross et al. |
| 7,259,752 B1 | 8/2007 | Simmons |
| 7,260,529 B1 | 8/2007 | Lengen |
| 7,260,567 B2 | 8/2007 | Parikh |
| 7,263,373 B2 | 8/2007 | Mattisson |
| 7,266,189 B1 | 9/2007 | Day |
| 7,266,495 B1 | 9/2007 | Beaufays et al. |
| 7,266,496 B2 | 9/2007 | Wang et al. |
| 7,266,499 B2 | 9/2007 | Surace et al. |
| 7,269,544 B2 | 9/2007 | Simske |
| 7,269,556 B2 | 9/2007 | Kiss et al. |
| 7,272,224 B1 | 9/2007 | Normile et al. |
| 7,275,063 B2 | 9/2007 | Horn |
| 7,277,088 B2 | 10/2007 | Robinson et al. |
| 7,277,854 B2 | 10/2007 | Bennett et al. |
| 7,277,855 B1 | 10/2007 | Acker et al. |
| 7,280,958 B2 | 10/2007 | Pavlov et al. |
| 7,283,072 B1 | 10/2007 | Plachta et al. |
| 7,289,102 B2 | 10/2007 | Hinckley et al. |
| 7,290,039 B1 | 10/2007 | Lisitsa et al. |
| 7,292,579 B2 | 11/2007 | Morris |
| 7,292,979 B2 | 11/2007 | Karas et al. |
| 7,292,980 B1 | 11/2007 | August et al. |
| 7,296,019 B1 | 11/2007 | Chandrasekar et al. |
| 7,296,230 B2 | 11/2007 | Fukatsu et al. |
| 7,299,033 B2 | 11/2007 | Kjellberg et al. |
| 7,302,392 B1 | 11/2007 | Thenthiruperai et al. |
| 7,302,394 B1 | 11/2007 | Baray et al. |
| 7,302,686 B2 | 11/2007 | Togawa |
| 7,308,404 B2 | 12/2007 | Venkataraman et al. |
| 7,308,408 B1 | 12/2007 | Stifelman et al. |
| 7,310,329 B2 | 12/2007 | Vieri et al. |
| 7,310,600 B1 | 12/2007 | Garner et al. |
| 7,310,605 B2 | 12/2007 | Janakiraman et al. |
| 7,313,523 B1 | 12/2007 | Bellegarda et al. |
| 7,315,809 B2 | 1/2008 | Xun |
| 7,315,818 B2 | 1/2008 | Stevens et al. |
| 7,318,020 B1 | 1/2008 | Kim |
| 7,319,957 B2 | 1/2008 | Robinson et al. |
| 7,321,783 B2 | 1/2008 | Kim |
| 7,322,023 B2 | 1/2008 | Shulman et al. |
| 7,324,833 B2 | 1/2008 | White et al. |
| 7,324,947 B2 | 1/2008 | Jordan et al. |
| 7,328,155 B2 | 2/2008 | Endo et al. |
| 7,328,250 B2 | 2/2008 | Wang et al. |
| 7,345,670 B2 | 3/2008 | Armstrong |
| 7,345,671 B2 | 3/2008 | Robbin et al. |
| 7,349,953 B2 | 3/2008 | Lisitsa et al. |
| 7,353,139 B1 | 4/2008 | Burrell et al. |
| 7,359,493 B1 | 4/2008 | Wang et al. |
| 7,359,671 B2 | 4/2008 | Richenstein et al. |
| 7,359,851 B2 | 4/2008 | Tong et al. |
| 7,360,158 B1 | 4/2008 | Beeman |
| 7,362,738 B2 | 4/2008 | Taube et al. |
| 7,363,227 B2 | 4/2008 | Mapes-Riordan et al. |
| 7,363,586 B1 | 4/2008 | Briggs et al. |
| 7,365,260 B2 | 4/2008 | Kawashima |
| 7,366,461 B1 | 4/2008 | Brown |
| 7,373,291 B2 | 5/2008 | Garst |
| 7,373,612 B2 | 5/2008 | Risch et al. |
| 7,376,556 B2 | 5/2008 | Bennett |

(56) References Cited

U.S. PATENT DOCUMENTS

| | | |
|---|---|---|
| 7,376,632 B1 | 5/2008 | Sadek et al. |
| 7,376,645 B2 | 5/2008 | Bernard |
| 7,378,963 B1 | 5/2008 | Begault et al. |
| 7,379,874 B2 | 5/2008 | Schmid et al. |
| 7,380,203 B2 | 5/2008 | Keely et al. |
| 7,383,170 B2 | 6/2008 | Mills et al. |
| 7,386,438 B1 | 6/2008 | Franz et al. |
| 7,386,449 B2 | 6/2008 | Sun et al. |
| 7,386,799 B1 | 6/2008 | Clanton et al. |
| 7,389,224 B1 | 6/2008 | Elworthy |
| 7,389,225 B1 | 6/2008 | Jensen et al. |
| 7,392,185 B2 | 6/2008 | Bennett |
| 7,394,947 B2 | 7/2008 | Li et al. |
| 7,398,209 B2 | 7/2008 | Kennewick et al. |
| 7,401,300 B2 | 7/2008 | Nurmi |
| 7,403,938 B2 | 7/2008 | Harrison et al. |
| 7,403,941 B2 | 7/2008 | Bedworth et al. |
| 7,404,143 B2 | 7/2008 | Freelander et al. |
| 7,409,337 B1 | 8/2008 | Potter et al. |
| 7,409,347 B1 | 8/2008 | Bellegarda |
| 7,412,389 B2 | 8/2008 | Yang |
| 7,412,470 B2 | 8/2008 | Masuno et al. |
| 7,415,100 B2 | 8/2008 | Cooper et al. |
| 7,415,469 B2 | 8/2008 | Singh et al. |
| 7,418,389 B2 | 8/2008 | Chu et al. |
| 7,418,392 B1 | 8/2008 | Mozer et al. |
| 7,426,467 B2 | 9/2008 | Nashida et al. |
| 7,426,468 B2 | 9/2008 | Coifman et al. |
| 7,427,024 B1 | 9/2008 | Gazdzinski et al. |
| 7,428,541 B2 | 9/2008 | Houle |
| 7,433,869 B2 | 10/2008 | Gollapudi |
| 7,433,921 B2 | 10/2008 | Ludwig et al. |
| 7,436,947 B2 | 10/2008 | Wadler et al. |
| 7,441,184 B2 | 10/2008 | Frerebeau et al. |
| 7,443,316 B2 | 10/2008 | Lim |
| 7,444,589 B2 | 10/2008 | Zellner |
| 7,447,360 B2 | 11/2008 | Li et al. |
| 7,447,624 B2 | 11/2008 | Fuhrmann et al. |
| 7,447,635 B1 | 11/2008 | Konopka et al. |
| 7,447,637 B1 | 11/2008 | Grant et al. |
| 7,451,081 B1 | 11/2008 | Gajic et al. |
| 7,454,351 B2 | 11/2008 | Jeschke et al. |
| 7,460,652 B2 | 12/2008 | Chang |
| 7,461,043 B2 | 12/2008 | Hess |
| 7,467,087 B1 | 12/2008 | Gillick et al. |
| 7,467,164 B2 | 12/2008 | Marsh |
| 7,472,061 B1 | 12/2008 | Alewine et al. |
| 7,472,065 B2 | 12/2008 | Aaron et al. |
| 7,475,010 B2 | 1/2009 | Chao |
| 7,475,015 B2 | 1/2009 | Epstein et al. |
| 7,475,063 B2 | 1/2009 | Datta et al. |
| 7,477,238 B2 | 1/2009 | Fux et al. |
| 7,477,240 B2 | 1/2009 | Yanagisawa |
| 7,478,037 B2 | 1/2009 | Strong |
| 7,478,091 B2 | 1/2009 | Mojsilovic et al. |
| 7,478,129 B1 | 1/2009 | Chemtob |
| 7,479,948 B2 | 1/2009 | Kim et al. |
| 7,479,949 B2 | 1/2009 | Jobs et al. |
| 7,483,832 B2 | 1/2009 | Tischer |
| 7,483,894 B2 | 1/2009 | Cao |
| 7,487,089 B2 | 2/2009 | Mozer |
| 7,487,093 B2 | 2/2009 | Mutsuno et al. |
| 7,490,034 B2 | 2/2009 | Finnigan et al. |
| 7,490,039 B1 | 2/2009 | Shaffer et al. |
| 7,493,560 B1 | 2/2009 | Kipnes et al. |
| 7,496,498 B2 | 2/2009 | Chu et al. |
| 7,496,512 B2 | 2/2009 | Zhao et al. |
| 7,499,923 B2 | 3/2009 | Kawatani |
| 7,502,738 B2 | 3/2009 | Kennewick et al. |
| 7,505,795 B1 | 3/2009 | Lim et al. |
| 7,508,324 B2 | 3/2009 | Suraqui |
| 7,508,373 B2 | 3/2009 | Lin et al. |
| 7,516,123 B2 | 4/2009 | Betz et al. |
| 7,519,327 B2 | 4/2009 | White |
| 7,519,398 B2 | 4/2009 | Hirose |
| 7,522,927 B2 | 4/2009 | Fitch et al. |
| 7,523,036 B2 | 4/2009 | Akabane et al. |
| 7,523,108 B2 | 4/2009 | Cao |
| 7,526,466 B2 | 4/2009 | Au |
| 7,526,738 B2 | 4/2009 | Ording et al. |
| 7,528,713 B2 | 5/2009 | Singh et al. |
| 7,529,671 B2 | 5/2009 | Rockenbeck et al. |
| 7,529,676 B2 | 5/2009 | Koyama |
| 7,535,997 B1 | 5/2009 | McQuaide, Jr. et al. |
| 7,536,029 B2 | 5/2009 | Choi et al. |
| 7,536,565 B2 | 5/2009 | Girish et al. |
| 7,538,685 B1 | 5/2009 | Cooper et al. |
| 7,539,619 B1 | 5/2009 | Seligman et al. |
| 7,539,656 B2 | 5/2009 | Fratkina et al. |
| 7,541,940 B2 | 6/2009 | Upton |
| 7,542,967 B2 | 6/2009 | Hurst-Hiller et al. |
| 7,542,971 B2 | 6/2009 | Thione et al. |
| 7,543,232 B2 | 6/2009 | Easton, Jr. et al. |
| 7,546,382 B2 | 6/2009 | Healey et al. |
| 7,546,529 B2 | 6/2009 | Reynar et al. |
| 7,548,895 B2 | 6/2009 | Pulsipher |
| 7,552,045 B2 | 6/2009 | Barliga et al. |
| 7,552,055 B2 | 6/2009 | Lecoeuche |
| 7,555,431 B2 | 6/2009 | Bennett |
| 7,555,496 B1 | 6/2009 | Lantrip et al. |
| 7,558,381 B1 | 7/2009 | Ali et al. |
| 7,558,730 B2 | 7/2009 | Davis et al. |
| 7,559,026 B2 | 7/2009 | Girish et al. |
| 7,561,069 B2 | 7/2009 | Horstemeyer |
| 7,562,007 B2 | 7/2009 | Hwang |
| 7,562,032 B2 | 7/2009 | Abbosh et al. |
| 7,565,104 B1 | 7/2009 | Brown et al. |
| 7,565,380 B1 | 7/2009 | Venkatachary |
| 7,571,092 B1 | 8/2009 | Nieh |
| 7,571,106 B2 | 8/2009 | Cao et al. |
| 7,577,522 B2 | 8/2009 | Rosenberg |
| 7,580,551 B1 | 8/2009 | Srihari et al. |
| 7,580,576 B2 | 8/2009 | Wang et al. |
| 7,580,839 B2 | 8/2009 | Tamura et al. |
| 7,584,093 B2 | 9/2009 | Potter et al. |
| 7,584,278 B2 | 9/2009 | Rajarajan et al. |
| 7,584,429 B2 | 9/2009 | Fabritius |
| 7,593,868 B2 | 9/2009 | Margiloff et al. |
| 7,596,269 B2 | 9/2009 | King et al. |
| 7,596,499 B2 | 9/2009 | Anguera et al. |
| 7,596,606 B2 | 9/2009 | Codignotto |
| 7,596,765 B2 | 9/2009 | Almas |
| 7,599,918 B2 | 10/2009 | Shen et al. |
| 7,603,349 B1 | 10/2009 | Kraft et al. |
| 7,603,381 B2 | 10/2009 | Burke et al. |
| 7,606,444 B1 | 10/2009 | Erol et al. |
| 7,609,179 B2 | 10/2009 | Diaz-Gutierrez et al. |
| 7,610,258 B2 | 10/2009 | Yuknewicz et al. |
| 7,613,264 B2 | 11/2009 | Wells et al. |
| 7,614,008 B2 | 11/2009 | Ording |
| 7,617,094 B2 | 11/2009 | Aoki et al. |
| 7,620,407 B1 | 11/2009 | Donald et al. |
| 7,620,549 B2 | 11/2009 | Di Cristo et al. |
| 7,620,894 B1 | 11/2009 | Kahn |
| 7,623,119 B2 | 11/2009 | Autio et al. |
| 7,624,007 B2 | 11/2009 | Bennett |
| 7,627,481 B1 | 12/2009 | Kuo et al. |
| 7,630,901 B2 | 12/2009 | Omi |
| 7,633,076 B2 | 12/2009 | Huppi et al. |
| 7,634,409 B2 | 12/2009 | Kennewick et al. |
| 7,634,413 B1 | 12/2009 | Kuo et al. |
| 7,634,718 B2 | 12/2009 | Nakajima |
| 7,634,732 B1 | 12/2009 | Blagsvedt et al. |
| 7,636,657 B2 | 12/2009 | Ju et al. |
| 7,640,158 B2 | 12/2009 | Detlef et al. |
| 7,640,160 B2 | 12/2009 | Di Cristo et al. |
| 7,643,990 B1 | 1/2010 | Bellegarda |
| 7,647,225 B2 | 1/2010 | Bennett et al. |
| 7,649,454 B2 | 1/2010 | Singh et al. |
| 7,649,877 B2 | 1/2010 | Vieri et al. |
| 7,653,883 B2 | 1/2010 | Hotelling et al. |
| 7,656,393 B2 | 2/2010 | King et al. |
| 7,657,424 B2 | 2/2010 | Bennett |
| 7,657,828 B2 | 2/2010 | Lucas et al. |

(56) References Cited

U.S. PATENT DOCUMENTS

| | | |
|---|---|---|
| 7,657,844 B2 | 2/2010 | Gibson et al. |
| 7,657,849 B2 | 2/2010 | Chaudhri et al. |
| 7,663,607 B2 | 2/2010 | Hotelling et al. |
| 7,664,558 B2 | 2/2010 | Lindahl et al. |
| 7,664,638 B2 | 2/2010 | Cooper et al. |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,683,893 B2 | 3/2010 | Kim |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,245 B2 | 3/2010 | Cox et al. |
| 7,689,408 B2 | 3/2010 | Chen et al. |
| 7,689,409 B2 | 3/2010 | Heinecke |
| 7,689,421 B2 | 3/2010 | Li et al. |
| 7,693,715 B2 | 4/2010 | Hwang et al. |
| 7,693,717 B2 | 4/2010 | Kahn et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,703,091 B1 | 4/2010 | Martin et al. |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 | 4/2010 | Dunning et al. |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,550 B1 | 5/2010 | Feinberg et al. |
| 7,711,565 B1 | 5/2010 | Gazdzinski |
| 7,711,672 B2 | 5/2010 | Au |
| 7,712,053 B2 | 5/2010 | Bradford et al. |
| 7,716,056 B2 | 5/2010 | Weng et al. |
| 7,716,216 B1 | 5/2010 | Harik et al. |
| 7,720,674 B2 | 5/2010 | Kaiser et al. |
| 7,720,683 B1 | 5/2010 | Vermeulen et al. |
| 7,721,226 B2 | 5/2010 | Barabe et al. |
| 7,721,301 B2 | 5/2010 | Wong et al. |
| 7,724,242 B2 | 5/2010 | Hillis et al. |
| 7,724,696 B1 | 5/2010 | Parekh |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,735,012 B2 | 6/2010 | Naik |
| 7,739,588 B2 | 6/2010 | Reynar et al. |
| 7,742,953 B2 | 6/2010 | King et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,708 B2 | 7/2010 | Cohen et al. |
| 7,756,868 B2 | 7/2010 | Lee |
| 7,756,871 B2 | 7/2010 | Yacoub et al. |
| 7,757,173 B2 | 7/2010 | Beaman |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,774,204 B2 | 8/2010 | Mozer et al. |
| 7,774,388 B1 | 8/2010 | Runchey |
| 7,777,717 B2 | 8/2010 | Fux et al. |
| 7,778,432 B2 | 8/2010 | Larsen |
| 7,778,595 B2 | 8/2010 | White et al. |
| 7,778,632 B2 | 8/2010 | Kurlander et al. |
| 7,778,830 B2 | 8/2010 | Davis et al. |
| 7,779,353 B2 | 8/2010 | Grigoriu et al. |
| 7,779,356 B2 | 8/2010 | Griesmer |
| 7,779,357 B2 | 8/2010 | Naik |
| 7,783,283 B2 | 8/2010 | Kuusinen et al. |
| 7,783,486 B2 | 8/2010 | Rosser et al. |
| 7,788,590 B2 | 8/2010 | Taboada et al. |
| 7,788,663 B2 | 8/2010 | Illowsky et al. |
| 7,796,980 B1 | 9/2010 | McKinney et al. |
| 7,797,265 B2 | 9/2010 | Brinker et al. |
| 7,797,269 B2 | 9/2010 | Rieman et al. |
| 7,797,331 B2 | 9/2010 | Theimer et al. |
| 7,797,629 B2 | 9/2010 | Fux et al. |
| 7,801,721 B2 | 9/2010 | Rosart et al. |
| 7,801,728 B2 | 9/2010 | Ben-David et al. |
| 7,801,729 B2 | 9/2010 | Mozer |
| 7,805,299 B2 | 9/2010 | Coifman |
| 7,809,550 B1 | 10/2010 | Barrows |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |
| 7,809,744 B2 | 10/2010 | Nevidomski et al. |
| 7,818,165 B2 | 10/2010 | Carlgren et al. |
| 7,818,176 B2 | 10/2010 | Freeman et al. |
| 7,818,215 B2 | 10/2010 | King et al. |
| 7,818,291 B2 | 10/2010 | Ferguson et al. |
| 7,818,672 B2 | 10/2010 | Mccormack et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,423 B2 | 11/2010 | Schubert |
| 7,831,426 B2 | 11/2010 | Bennett |
| 7,831,432 B2 | 11/2010 | Bodin et al. |
| 7,835,504 B1 | 11/2010 | Donald et al. |
| 7,836,437 B2 | 11/2010 | Kacmarcik et al. |
| 7,840,348 B2 | 11/2010 | Kim et al. |
| 7,840,400 B2 | 11/2010 | Lavi et al. |
| 7,840,447 B2 | 11/2010 | Kleinrock et al. |
| 7,840,581 B2 | 11/2010 | Ross et al. |
| 7,840,912 B2 | 11/2010 | Elias et al. |
| 7,844,394 B2 | 11/2010 | Kim |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,853,900 B2 | 12/2010 | Nguyen et al. |
| 7,865,817 B2 | 1/2011 | Ryan et al. |
| 7,869,999 B2 | 1/2011 | Amato et al. |
| 7,870,118 B2 | 1/2011 | Jiang et al. |
| 7,870,133 B2 | 1/2011 | Krishnamoorthy et al. |
| 7,873,519 B2 | 1/2011 | Bennett |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longe et al. |
| 7,885,390 B2 | 2/2011 | Chaudhari et al. |
| 7,885,844 B1 | 2/2011 | Cohen et al. |
| 7,886,233 B2 | 2/2011 | Rainisto et al. |
| 7,889,184 B2 | 2/2011 | Blumenberg et al. |
| 7,889,185 B2 | 2/2011 | Blumenberg et al. |
| 7,890,330 B2 | 2/2011 | Ozkaragoz et al. |
| 7,890,652 B2 | 2/2011 | Bull et al. |
| 7,895,531 B2 | 2/2011 | Radtke et al. |
| 7,899,666 B2 | 3/2011 | Varone |
| 7,908,287 B1 | 3/2011 | Katragadda |
| 7,912,289 B2 | 3/2011 | Kansal et al. |
| 7,912,699 B1 | 3/2011 | Saraclar et al. |
| 7,912,702 B2 | 3/2011 | Bennett |

(56) References Cited

U.S. PATENT DOCUMENTS

| | | |
|---|---|---|
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,936,339 B2 | 5/2011 | Marggraff et al. |
| 7,936,861 B2 | 5/2011 | Martin et al. |
| 7,941,009 B2 | 5/2011 | Li et al. |
| 7,945,294 B2 | 5/2011 | Zhang et al. |
| 7,945,470 B1 | 5/2011 | Cohen et al. |
| 7,949,529 B2 | 5/2011 | Weider et al. |
| 7,949,534 B2 | 5/2011 | Davis et al. |
| 7,953,679 B2 | 5/2011 | Chidlovskii et al. |
| 7,957,975 B2 | 6/2011 | Burns et al. |
| 7,958,136 B1 | 6/2011 | Curtis et al. |
| 7,962,179 B2 | 6/2011 | Huang |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,244 B1 | 7/2011 | Lewis et al. |
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,014,308 B2 | 9/2011 | Gates et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,019,271 B1 | 9/2011 | Izdepski |
| 8,024,195 B2 | 9/2011 | Mozer et al. |
| 8,024,415 B2 | 9/2011 | Horvitz et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,363 B2 | 10/2011 | Cha et al. |
| 8,046,374 B1 | 10/2011 | Bromwich et al. |
| 8,050,500 B1 | 11/2011 | Batty et al. |
| 8,055,502 B2 | 11/2011 | Clark et al. |
| 8,055,708 B2 | 11/2011 | Chitsaz et al. |
| 8,059,070 B2 | 11/2011 | Goller et al. |
| 8,060,824 B2 | 11/2011 | Brownrigg, Jr. et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,073,695 B1 | 12/2011 | Hendricks et al. |
| 8,077,153 B2 | 12/2011 | Benko et al. |
| 8,078,473 B1 | 12/2011 | Gazdzinski |
| 8,082,153 B2 | 12/2011 | Coffman et al. |
| 8,082,498 B2 | 12/2011 | Salamon et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,335 B2 | 3/2012 | Kennewick et al. |
| 8,140,567 B2 | 3/2012 | Padovitz et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,195,467 B2 | 6/2012 | Mozer et al. |
| 8,195,468 B2 | 6/2012 | Kennewick et al. |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,608 B2 | 7/2012 | alSafadi et al. |
| 8,224,649 B2 | 7/2012 | Chaudhari et al. |
| 8,228,299 B1 | 7/2012 | Maloney et al. |
| 8,239,207 B2 | 8/2012 | Seligman et al. |
| 8,244,712 B2 | 8/2012 | Serlet et al. |
| 8,255,217 B2 | 8/2012 | Stent et al. |
| 8,260,617 B2 | 9/2012 | Dhanakshirur et al. |
| 8,270,933 B2 | 9/2012 | Riemer et al. |
| 8,275,621 B2 | 9/2012 | Alewine et al. |
| 8,279,171 B2 | 10/2012 | Hirai et al. |
| 8,285,546 B2 | 10/2012 | Reich |
| 8,285,551 B2 | 10/2012 | Gazdzinski |
| 8,285,553 B2 | 10/2012 | Gazdzinski |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,801 B2 | 10/2012 | Sweeney et al. |
| 8,301,456 B2 | 10/2012 | Gazdzinski |
| 8,311,834 B1 | 11/2012 | Gazdzinski |

(56) References Cited

U.S. PATENT DOCUMENTS

| | | |
|---|---|---|
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati et al. |
| 8,332,218 B2 | 12/2012 | Cross et al. |
| 8,332,224 B2 | 12/2012 | Di Cristo et al. |
| 8,332,748 B1 | 12/2012 | Karam |
| 8,340,975 B1 | 12/2012 | Rosenberger |
| 8,345,665 B2 | 1/2013 | Vieri et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka |
| 8,391,844 B2 | 3/2013 | Lamiraux et al. |
| 8,396,714 B2 | 3/2013 | Rogers et al. |
| 8,406,745 B1 | 3/2013 | Upadhyay et al. |
| 8,423,288 B2 | 4/2013 | Stahl et al. |
| 8,428,758 B2 | 4/2013 | Naik et al. |
| 8,447,612 B2 | 5/2013 | Gazdzinski |
| 8,452,597 B2 | 5/2013 | Bringert et al. |
| 8,458,115 B2 | 6/2013 | Cai et al. |
| 8,458,278 B2 | 6/2013 | Christie et al. |
| 8,464,150 B2 | 6/2013 | Davidson et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,857 B2 | 7/2013 | Kopparapu et al. |
| 8,515,750 B1 | 8/2013 | Lei et al. |
| 8,521,513 B2 | 8/2013 | Millett et al. |
| 8,527,276 B1 | 9/2013 | Senior et al. |
| 8,560,229 B1 | 10/2013 | Park et al. |
| 8,571,851 B1 | 10/2013 | Tickner et al. |
| 8,583,416 B2 | 11/2013 | Huang et al. |
| 8,589,869 B2 | 11/2013 | Wolfram |
| 8,589,911 B1 | 11/2013 | Sharkey et al. |
| 8,595,004 B2 | 11/2013 | Koshinaka |
| 8,606,568 B1 | 12/2013 | Tickner et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,645,137 B2 | 2/2014 | Bellegarda et al. |
| 8,654,936 B1 | 2/2014 | Tofighbakhsh et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,904 B2 | 3/2014 | Lindahl et al. |
| 8,677,377 B2 | 3/2014 | Cheyer et al. |
| 8,681,950 B2 | 3/2014 | Vlack et al. |
| 8,682,667 B2 | 3/2014 | Haughay et al. |
| 8,688,446 B2 | 4/2014 | Yanagihara et al. |
| 8,688,453 B1 | 4/2014 | Joshi et al. |
| 8,696,364 B2 | 4/2014 | Cohen |
| 8,706,472 B2 | 4/2014 | Ramerth et al. |
| 8,713,119 B2 | 4/2014 | Lindahl et al. |
| 8,713,418 B2 | 4/2014 | King et al. |
| 8,719,006 B2 | 5/2014 | Bellegarda et al. |
| 8,719,014 B2 | 5/2014 | Wagner et al. |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Rodriguez et al. |
| 8,744,852 B1 | 6/2014 | Seymour et al. |
| 8,760,537 B2 | 6/2014 | Johnson et al. |
| 8,762,145 B2 | 6/2014 | Ouchi et al. |
| 8,762,156 B2 | 6/2014 | Chen et al. |
| 8,762,469 B2 | 6/2014 | Lindahl et al. |
| 8,768,693 B2 | 7/2014 | Lempel et al. |
| 8,768,702 B2 | 7/2014 | Boettcher et al. |
| 8,775,931 B2 | 7/2014 | Fux et al. |
| 8,781,841 B1 | 7/2014 | Wang |
| 8,798,995 B1 | 8/2014 | Edara et al. |
| 8,799,000 B2 | 8/2014 | Guzzoni et al. |
| 8,805,690 B1 | 8/2014 | LeBeau et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,868,409 B1 | 10/2014 | Mengibar et al. |
| 8,880,405 B2 | 11/2014 | Cerra et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,903,716 B2 | 12/2014 | Chen et al. |
| 8,930,191 B2 | 1/2015 | Gruber et al. |
| 8,942,986 B2 | 1/2015 | Cheyer et al. |
| 8,943,423 B2 | 1/2015 | Merrill et al. |
| 8,972,878 B2 | 3/2015 | David et al. |
| 8,983,383 B1 | 3/2015 | Haskin |
| 8,996,376 B2 | 3/2015 | Fleizach et al. |
| 8,996,381 B2 | 3/2015 | Mozer et al. |
| 9,009,046 B1 | 4/2015 | Stewart |
| 9,070,366 B1 | 6/2015 | Mathias et al. |
| 9,081,411 B2 | 7/2015 | Kalns et al. |
| 9,081,482 B1 | 7/2015 | Zhai et al. |
| 9,098,467 B1 | 8/2015 | Blanksteen et al. |
| 9,123,338 B1 | 9/2015 | Sanders et al. |
| 9,171,546 B1 * | 10/2015 | Pike ............... G10L 15/265 |
| 9,190,062 B2 | 11/2015 | Haughay |
| 9,218,809 B2 | 12/2015 | Bellegarda |
| 9,218,819 B1 * | 12/2015 | Stekkelpak ........... G10L 15/22 |
| 9,223,537 B2 | 12/2015 | Brown et al. |
| 9,255,812 B2 | 2/2016 | Maeoka et al. |
| 9,258,604 B1 | 2/2016 | Bilobrov et al. |
| 9,292,487 B1 | 3/2016 | Weber |
| 9,299,344 B2 | 3/2016 | Braho et al. |
| 9,305,543 B2 | 4/2016 | Fleizach et al. |
| 9,305,548 B2 | 4/2016 | Kennewick et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,338,493 B2 | 5/2016 | Van Os et al. |
| 9,349,368 B1 | 5/2016 | LeBeau et al. |
| 9,361,084 B1 | 6/2016 | Costa |
| 9,377,871 B2 | 6/2016 | Waddell et al. |
| 9,423,266 B2 | 8/2016 | Clark et al. |
| 9,437,186 B1 | 9/2016 | Liu et al. |
| 2001/0005859 A1 | 6/2001 | Okayama et al. |
| 2001/0020259 A1 | 9/2001 | Sekiguchi et al. |
| 2001/0027394 A1 | 10/2001 | Theimer |
| 2001/0027396 A1 | 10/2001 | Sato |
| 2001/0029455 A1 | 10/2001 | Chin et al. |
| 2001/0030660 A1 | 10/2001 | Zainoulline |
| 2001/0032080 A1 | 10/2001 | Fukada |
| 2001/0041021 A1 | 11/2001 | Boyle et al. |
| 2001/0042107 A1 | 11/2001 | Palm |
| 2001/0044724 A1 | 11/2001 | Hon et al. |
| 2001/0047264 A1 | 11/2001 | Roundtree |
| 2001/0055963 A1 | 12/2001 | Cloutier |
| 2001/0056342 A1 | 12/2001 | Piehn et al. |
| 2001/0056347 A1 | 12/2001 | Chazan et al. |
| 2002/0001395 A1 | 1/2002 | Davis et al. |
| 2002/0002039 A1 | 1/2002 | Qureshey et al. |
| 2002/0002413 A1 | 1/2002 | Tokue |
| 2002/0002461 A1 | 1/2002 | Tetsumoto |
| 2002/0002465 A1 | 1/2002 | Maes |
| 2002/0004703 A1 | 1/2002 | Gaspard, II |
| 2002/0010581 A1 | 1/2002 | Euler et al. |
| 2002/0010584 A1 | 1/2002 | Schultz et al. |

(56) References Cited

U.S. PATENT DOCUMENTS

| | | |
|---|---|---|
| 2002/0010589 A1 | 1/2002 | Nashida et al. |
| 2002/0010726 A1 | 1/2002 | Rogson |
| 2002/0010798 A1 | 1/2002 | Ben-Shaul et al. |
| 2002/0013707 A1 | 1/2002 | Shaw et al. |
| 2002/0013784 A1 | 1/2002 | Swanson |
| 2002/0013852 A1 | 1/2002 | Janik |
| 2002/0015024 A1 | 2/2002 | Westerman et al. |
| 2002/0015064 A1 | 2/2002 | Robotham et al. |
| 2002/0021278 A1 | 2/2002 | Hinckley et al. |
| 2002/0026315 A1 | 2/2002 | Miranda |
| 2002/0026456 A1 | 2/2002 | Bradford |
| 2002/0031254 A1 | 3/2002 | Lantrip et al. |
| 2002/0031262 A1 | 3/2002 | Imagawa et al. |
| 2002/0032048 A1 | 3/2002 | Kitao et al. |
| 2002/0032564 A1 | 3/2002 | Ehsani et al. |
| 2002/0032591 A1 | 3/2002 | Mahaffy et al. |
| 2002/0032751 A1 | 3/2002 | Bharadwaj |
| 2002/0035467 A1 | 3/2002 | Morimoto et al. |
| 2002/0035469 A1 | 3/2002 | Holzapfel |
| 2002/0035474 A1 | 3/2002 | Alpdemir |
| 2002/0040297 A1 | 4/2002 | Tsiao et al. |
| 2002/0040359 A1 | 4/2002 | Green et al. |
| 2002/0042707 A1 | 4/2002 | Zhao et al. |
| 2002/0045438 A1 | 4/2002 | Tagawa et al. |
| 2002/0045961 A1 | 4/2002 | Gibbs et al. |
| 2002/0046025 A1 | 4/2002 | Hain |
| 2002/0046315 A1 | 4/2002 | Miller et al. |
| 2002/0052730 A1 | 5/2002 | Nakao |
| 2002/0052740 A1 | 5/2002 | Charlesworth et al. |
| 2002/0052746 A1 | 5/2002 | Handelman |
| 2002/0052747 A1 | 5/2002 | Sarukkai |
| 2002/0052913 A1 | 5/2002 | Yamada et al. |
| 2002/0054094 A1 | 5/2002 | Matsuda |
| 2002/0055844 A1 | 5/2002 | L'Esperance et al. |
| 2002/0055934 A1 | 5/2002 | Lipscomb et al. |
| 2002/0057293 A1 | 5/2002 | Liao |
| 2002/0059066 A1 | 5/2002 | O'hagan |
| 2002/0059068 A1 | 5/2002 | Rose et al. |
| 2002/0065659 A1 | 5/2002 | Isono et al. |
| 2002/0065797 A1 | 5/2002 | Meidan et al. |
| 2002/0067308 A1 | 6/2002 | Robertson |
| 2002/0069063 A1 | 6/2002 | Buchner et al. |
| 2002/0069071 A1 | 6/2002 | Knockeart et al. |
| 2002/0069220 A1 | 6/2002 | Tran |
| 2002/0072816 A1 | 6/2002 | Shdema et al. |
| 2002/0072908 A1 | 6/2002 | Case et al. |
| 2002/0072914 A1 | 6/2002 | Alshawi et al. |
| 2002/0072915 A1 | 6/2002 | Bower |
| 2002/0073177 A1 | 6/2002 | Clark et al. |
| 2002/0077082 A1 | 6/2002 | Cruickshank |
| 2002/0077817 A1 | 6/2002 | Atal |
| 2002/0078041 A1 | 6/2002 | Wu |
| 2002/0080163 A1 | 6/2002 | Morey |
| 2002/0083068 A1 | 6/2002 | Quass et al. |
| 2002/0085037 A1 | 7/2002 | Leavitt et al. |
| 2002/0086680 A1 | 7/2002 | Hunzinger |
| 2002/0087306 A1 | 7/2002 | Lee et al. |
| 2002/0087508 A1 | 7/2002 | Hull et al. |
| 2002/0087974 A1 | 7/2002 | Sprague et al. |
| 2002/0091511 A1 | 7/2002 | Hellwig et al. |
| 2002/0091529 A1 | 7/2002 | Whitham |
| 2002/0095286 A1 | 7/2002 | Ross et al. |
| 2002/0095290 A1 | 7/2002 | Kahn et al. |
| 2002/0095547 A1 | 7/2002 | Chu et al. |
| 2002/0099552 A1 | 7/2002 | Rubin et al. |
| 2002/0101447 A1 | 8/2002 | Carro |
| 2002/0103641 A1 | 8/2002 | Kuo et al. |
| 2002/0103644 A1 | 8/2002 | Brocious et al. |
| 2002/0103646 A1 | 8/2002 | Kochanski et al. |
| 2002/0107684 A1 | 8/2002 | Gao |
| 2002/0109709 A1 | 8/2002 | Sagar |
| 2002/0110248 A1 | 8/2002 | Kovales et al. |
| 2002/0111198 A1 | 8/2002 | Heie et al. |
| 2002/0111810 A1 | 8/2002 | Khan et al. |
| 2002/0116082 A1 | 8/2002 | Gudorf |
| 2002/0116171 A1 | 8/2002 | Russell |
| 2002/0116185 A1 | 8/2002 | Cooper et al. |
| 2002/0116189 A1 | 8/2002 | Yeh et al. |
| 2002/0116420 A1 | 8/2002 | Allam et al. |
| 2002/0117384 A1 | 8/2002 | Marchant |
| 2002/0120697 A1 | 8/2002 | Generous et al. |
| 2002/0120925 A1 | 8/2002 | Logan |
| 2002/0122053 A1 | 9/2002 | Dutta et al. |
| 2002/0123891 A1 | 9/2002 | Epstein et al. |
| 2002/0123894 A1 | 9/2002 | Woodward |
| 2002/0126097 A1 | 9/2002 | Savolainen |
| 2002/0128821 A1 | 9/2002 | Ehsani et al. |
| 2002/0128827 A1 | 9/2002 | Bu et al. |
| 2002/0128840 A1 | 9/2002 | Hinde et al. |
| 2002/0129057 A1 | 9/2002 | Spielberg |
| 2002/0133347 A1 | 9/2002 | Schoneburg et al. |
| 2002/0133348 A1 | 9/2002 | Pearson et al. |
| 2002/0135565 A1 | 9/2002 | Gordon et al. |
| 2002/0135618 A1 | 9/2002 | Maes et al. |
| 2002/0137505 A1 | 9/2002 | Eiche et al. |
| 2002/0138254 A1 | 9/2002 | Isaka et al. |
| 2002/0138265 A1 | 9/2002 | Stevens et al. |
| 2002/0138270 A1 | 9/2002 | Bellegarda et al. |
| 2002/0138616 A1 | 9/2002 | Basson et al. |
| 2002/0140679 A1 | 10/2002 | Wen |
| 2002/0143533 A1 | 10/2002 | Lucas et al. |
| 2002/0143542 A1 | 10/2002 | Eide |
| 2002/0143551 A1 | 10/2002 | Sharma et al. |
| 2002/0143826 A1 | 10/2002 | Day et al. |
| 2002/0151297 A1 | 10/2002 | Remboski et al. |
| 2002/0152045 A1 | 10/2002 | Dowling et al. |
| 2002/0152255 A1 | 10/2002 | Smith et al. |
| 2002/0154160 A1 | 10/2002 | Hosokawa |
| 2002/0156771 A1 | 10/2002 | Frieder et al. |
| 2002/0161865 A1 | 10/2002 | Nguyen |
| 2002/0163544 A1 | 11/2002 | Baker et al. |
| 2002/0164000 A1 | 11/2002 | Cohen et al. |
| 2002/0165918 A1 | 11/2002 | Bettis |
| 2002/0166123 A1 | 11/2002 | Schrader et al. |
| 2002/0167534 A1 | 11/2002 | Burke |
| 2002/0169592 A1 | 11/2002 | Aityan |
| 2002/0169605 A1 | 11/2002 | Damiba et al. |
| 2002/0173273 A1 | 11/2002 | Spurgat et al. |
| 2002/0173889 A1 | 11/2002 | Odinak et al. |
| 2002/0173961 A1 | 11/2002 | Guerra |
| 2002/0173962 A1 | 11/2002 | Tang et al. |
| 2002/0173966 A1 | 11/2002 | Henton |
| 2002/0177993 A1 | 11/2002 | Veditz et al. |
| 2002/0184003 A1 | 12/2002 | Hakkinen et al. |
| 2002/0184015 A1 | 12/2002 | Li et al. |
| 2002/0184027 A1 | 12/2002 | Brittan et al. |
| 2002/0184189 A1 | 12/2002 | Hay et al. |
| 2002/0189426 A1 | 12/2002 | Hirade et al. |
| 2002/0191029 A1 | 12/2002 | Gillespie et al. |
| 2002/0193996 A1 | 12/2002 | Squibbs et al. |
| 2002/0196911 A1 | 12/2002 | Gao et al. |
| 2002/0198714 A1 | 12/2002 | Zhou |
| 2002/0198715 A1 | 12/2002 | Belrose |
| 2003/0001881 A1 | 1/2003 | Mannheimer et al. |
| 2003/0002632 A1 | 1/2003 | Bhogal et al. |
| 2003/0003609 A1 | 1/2003 | Sauer et al. |
| 2003/0003897 A1 | 1/2003 | Hyon |
| 2003/0004968 A1 | 1/2003 | Romer et al. |
| 2003/0009459 A1 | 1/2003 | Chastain et al. |
| 2003/0013483 A1 | 1/2003 | Ausems et al. |
| 2003/0016770 A1 | 1/2003 | Trans et al. |
| 2003/0018475 A1 | 1/2003 | Basu et al. |
| 2003/0020760 A1 | 1/2003 | Takatsu et al. |
| 2003/0023420 A1 | 1/2003 | Goodman et al. |
| 2003/0023426 A1 | 1/2003 | Pun et al. |
| 2003/0025676 A1 | 2/2003 | Cappendijk |
| 2003/0026392 A1 | 2/2003 | Brown et al. |
| 2003/0026402 A1 | 2/2003 | Clapper |
| 2003/0028380 A1 | 2/2003 | Freeland et al. |
| 2003/0030645 A1 | 2/2003 | Ribak et al. |
| 2003/0033148 A1 | 2/2003 | Silverman et al. |
| 2003/0033152 A1 | 2/2003 | Cameron |
| 2003/0033153 A1 | 2/2003 | Olson et al. |
| 2003/0033214 A1 | 2/2003 | Mikkelsen et al. |

(56) References Cited

U.S. PATENT DOCUMENTS

| | | |
|---|---|---|
| 2003/0036909 A1 | 2/2003 | Kato |
| 2003/0037073 A1 | 2/2003 | Tokuda et al. |
| 2003/0037077 A1 | 2/2003 | Brill et al. |
| 2003/0037254 A1 | 2/2003 | Fischer et al. |
| 2003/0038786 A1 | 2/2003 | Nguyen et al. |
| 2003/0040908 A1 | 2/2003 | Yang et al. |
| 2003/0046075 A1 | 3/2003 | Stone |
| 2003/0046401 A1 | 3/2003 | Abbott et al. |
| 2003/0046434 A1 | 3/2003 | Flanagin et al. |
| 2003/0048881 A1 | 3/2003 | Trajkovic et al. |
| 2003/0050781 A1 | 3/2003 | Tamura et al. |
| 2003/0051136 A1 | 3/2003 | Curtis et al. |
| 2003/0055537 A1 | 3/2003 | Odinak et al. |
| 2003/0055623 A1 | 3/2003 | Epstein et al. |
| 2003/0061317 A1 | 3/2003 | Brown et al. |
| 2003/0061570 A1 | 3/2003 | Hatori et al. |
| 2003/0063073 A1 | 4/2003 | Geaghan et al. |
| 2003/0069893 A1 | 4/2003 | Kanai et al. |
| 2003/0074195 A1 | 4/2003 | Bartosik et al. |
| 2003/0074198 A1 | 4/2003 | Sussman |
| 2003/0074457 A1 | 4/2003 | Kluth |
| 2003/0076301 A1 | 4/2003 | Tsuk et al. |
| 2003/0078766 A1 | 4/2003 | Appelt et al. |
| 2003/0078779 A1 | 4/2003 | Desai et al. |
| 2003/0078780 A1 | 4/2003 | Kochanski et al. |
| 2003/0078969 A1 | 4/2003 | Sprague et al. |
| 2003/0079024 A1 | 4/2003 | Hough et al. |
| 2003/0079038 A1 | 4/2003 | Robbin et al. |
| 2003/0080991 A1 | 5/2003 | Crow et al. |
| 2003/0083113 A1 | 5/2003 | Chua et al. |
| 2003/0083878 A1 | 5/2003 | Lee et al. |
| 2003/0083884 A1 | 5/2003 | Odinak et al. |
| 2003/0084350 A1 | 5/2003 | Eibach et al. |
| 2003/0085870 A1 | 5/2003 | Hinckley |
| 2003/0086699 A1 | 5/2003 | Benyamin et al. |
| 2003/0088414 A1 | 5/2003 | Huang et al. |
| 2003/0088421 A1 | 5/2003 | Maes et al. |
| 2003/0090467 A1 | 5/2003 | Hohl et al. |
| 2003/0090474 A1 | 5/2003 | Schaefer |
| 2003/0095096 A1 | 5/2003 | Robbin et al. |
| 2003/0097210 A1 | 5/2003 | Horst et al. |
| 2003/0097379 A1 | 5/2003 | Ireton |
| 2003/0097407 A1 | 5/2003 | Litwin et al. |
| 2003/0097408 A1 | 5/2003 | Kageyama et al. |
| 2003/0098892 A1 | 5/2003 | Hiipakka |
| 2003/0099335 A1 | 5/2003 | Tanaka et al. |
| 2003/0101045 A1 | 5/2003 | Moffatt et al. |
| 2003/0101054 A1 | 5/2003 | Davis et al. |
| 2003/0115060 A1 | 6/2003 | Junqua et al. |
| 2003/0115064 A1 | 6/2003 | Gusler et al. |
| 2003/0115186 A1 | 6/2003 | Wilkinson et al. |
| 2003/0115289 A1 | 6/2003 | Chinn et al. |
| 2003/0115552 A1 | 6/2003 | Jahnke et al. |
| 2003/0117365 A1 | 6/2003 | Shteyn |
| 2003/0120494 A1 | 6/2003 | Jost et al. |
| 2003/0122652 A1 | 7/2003 | Himmelstein |
| 2003/0122787 A1 | 7/2003 | Zimmerman et al. |
| 2003/0125927 A1 | 7/2003 | Seme |
| 2003/0125945 A1 | 7/2003 | Doyle |
| 2003/0125955 A1 | 7/2003 | Arnold et al. |
| 2003/0126559 A1 | 7/2003 | Fuhrmann |
| 2003/0128819 A1 | 7/2003 | Lee et al. |
| 2003/0130847 A1 | 7/2003 | Case et al. |
| 2003/0131320 A1 | 7/2003 | Kumhyr et al. |
| 2003/0133694 A1 | 7/2003 | Yeo |
| 2003/0134678 A1 | 7/2003 | Tanaka |
| 2003/0135501 A1 | 7/2003 | Frerebeau et al. |
| 2003/0135740 A1 | 7/2003 | Talmor et al. |
| 2003/0140088 A1 | 7/2003 | Robinson et al. |
| 2003/0144846 A1 | 7/2003 | Denenberg et al. |
| 2003/0145285 A1 | 7/2003 | Miyahira et al. |
| 2003/0147512 A1 | 8/2003 | Abburi |
| 2003/0149557 A1 | 8/2003 | Cox et al. |
| 2003/0149567 A1 | 8/2003 | Schmitz et al. |
| 2003/0149978 A1 | 8/2003 | Plotnick |
| 2003/0152203 A1 | 8/2003 | Berger et al. |
| 2003/0152894 A1 | 8/2003 | Townshend |
| 2003/0154079 A1 | 8/2003 | Ota et al. |
| 2003/0154081 A1 | 8/2003 | Chu et al. |
| 2003/0157968 A1 | 8/2003 | Boman et al. |
| 2003/0158732 A1 | 8/2003 | Pi et al. |
| 2003/0158735 A1 | 8/2003 | Yamada et al. |
| 2003/0158737 A1 | 8/2003 | Csicsatka |
| 2003/0160702 A1 | 8/2003 | Tanaka |
| 2003/0160830 A1 | 8/2003 | Degross |
| 2003/0163316 A1 | 8/2003 | Addison et al. |
| 2003/0164848 A1 | 9/2003 | Dutta et al. |
| 2003/0167167 A1* | 9/2003 | Gong .................. G10L 13/033 704/250 |
| 2003/0167318 A1 | 9/2003 | Robbin et al. |
| 2003/0167335 A1 | 9/2003 | Alexander |
| 2003/0171928 A1 | 9/2003 | Falcon et al. |
| 2003/0171936 A1 | 9/2003 | Sall et al. |
| 2003/0174830 A1 | 9/2003 | Boyer et al. |
| 2003/0177046 A1 | 9/2003 | Socha-Leialoha et al. |
| 2003/0179222 A1 | 9/2003 | Noma et al. |
| 2003/0182115 A1 | 9/2003 | Malayath et al. |
| 2003/0182131 A1 | 9/2003 | Arnold et al. |
| 2003/0187655 A1 | 10/2003 | Dunsmuir |
| 2003/0187659 A1 | 10/2003 | Cho et al. |
| 2003/0187775 A1 | 10/2003 | Du et al. |
| 2003/0187844 A1 | 10/2003 | Li et al. |
| 2003/0187925 A1 | 10/2003 | Inala et al. |
| 2003/0188005 A1 | 10/2003 | Yoneda et al. |
| 2003/0188192 A1 | 10/2003 | Tang et al. |
| 2003/0190074 A1 | 10/2003 | Loudon et al. |
| 2003/0191625 A1 | 10/2003 | Garin et al. |
| 2003/0191645 A1 | 10/2003 | Zhou |
| 2003/0193481 A1 | 10/2003 | Sokolsky |
| 2003/0194080 A1 | 10/2003 | Michaelis et al. |
| 2003/0195741 A1 | 10/2003 | Mani et al. |
| 2003/0197736 A1 | 10/2003 | Murphy |
| 2003/0197744 A1 | 10/2003 | Irvine |
| 2003/0200085 A1 | 10/2003 | Nguyen et al. |
| 2003/0200452 A1 | 10/2003 | Tagawa et al. |
| 2003/0200858 A1 | 10/2003 | Xie |
| 2003/0202697 A1 | 10/2003 | Simard et al. |
| 2003/0204392 A1 | 10/2003 | Finnigan et al. |
| 2003/0204492 A1 | 10/2003 | Wolf et al. |
| 2003/0206199 A1 | 11/2003 | Pusa et al. |
| 2003/0208756 A1 | 11/2003 | Macrae et al. |
| 2003/0210266 A1 | 11/2003 | Cragun et al. |
| 2003/0212543 A1 | 11/2003 | Epstein et al. |
| 2003/0212961 A1 | 11/2003 | Soin et al. |
| 2003/0214519 A1 | 11/2003 | Smith et al. |
| 2003/0216919 A1 | 11/2003 | Roushar |
| 2003/0221198 A1 | 11/2003 | Sloo et al. |
| 2003/0224760 A1 | 12/2003 | Day |
| 2003/0228863 A1 | 12/2003 | Vander Veen et al. |
| 2003/0228909 A1 | 12/2003 | Tanaka et al. |
| 2003/0229490 A1 | 12/2003 | Etter |
| 2003/0229616 A1 | 12/2003 | Wong |
| 2003/0233230 A1 | 12/2003 | Ammicht et al. |
| 2003/0233237 A1 | 12/2003 | Garside et al. |
| 2003/0233240 A1 | 12/2003 | Kaatrasalo |
| 2003/0234824 A1 | 12/2003 | Litwiller |
| 2003/0236663 A1 | 12/2003 | Dimitrova et al. |
| 2004/0001396 A1 | 1/2004 | Keller et al. |
| 2004/0006467 A1 | 1/2004 | Anisimovich et al. |
| 2004/0008277 A1 | 1/2004 | Nagaishi et al. |
| 2004/0010484 A1 | 1/2004 | Foulger et al. |
| 2004/0012556 A1 | 1/2004 | Yong et al. |
| 2004/0013252 A1 | 1/2004 | Craner |
| 2004/0015342 A1 | 1/2004 | Garst et al. |
| 2004/0021676 A1 | 2/2004 | Chen et al. |
| 2004/0022369 A1 | 2/2004 | Vitikainen et al. |
| 2004/0022373 A1 | 2/2004 | Suder et al. |
| 2004/0023643 A1 | 2/2004 | Vander Veen et al. |
| 2004/0030551 A1 | 2/2004 | Marcu et al. |
| 2004/0030554 A1 | 2/2004 | Boxberger-Oberoi et al. |
| 2004/0030556 A1 | 2/2004 | Bennett |
| 2004/0030559 A1 | 2/2004 | Payne et al. |
| 2004/0030996 A1 | 2/2004 | Van Liempd et al. |
| 2004/0036715 A1 | 2/2004 | Warren |

(56) References Cited

U.S. PATENT DOCUMENTS

| | | |
|---|---|---|
| 2004/0048627 A1 | 3/2004 | Olvera-Hernandez |
| 2004/0049388 A1 | 3/2004 | Roth et al. |
| 2004/0049391 A1 | 3/2004 | Polanyi et al. |
| 2004/0051729 A1 | 3/2004 | Borden, IV |
| 2004/0052338 A1 | 3/2004 | Celi, Jr. et al. |
| 2004/0054530 A1 | 3/2004 | Davis et al. |
| 2004/0054533 A1 | 3/2004 | Bellegarda |
| 2004/0054534 A1 | 3/2004 | Junqua |
| 2004/0054535 A1 | 3/2004 | Mackie et al. |
| 2004/0054541 A1 | 3/2004 | Kryze et al. |
| 2004/0054690 A1 | 3/2004 | Hilierbrand et al. |
| 2004/0055446 A1 | 3/2004 | Robbin et al. |
| 2004/0056899 A1 | 3/2004 | Sinclair, II et al. |
| 2004/0059577 A1 | 3/2004 | Pickering |
| 2004/0059790 A1 | 3/2004 | Austin-Lane et al. |
| 2004/0061717 A1 | 4/2004 | Menon et al. |
| 2004/0062367 A1 | 4/2004 | Fellenstein et al. |
| 2004/0064593 A1 | 4/2004 | Sinclair et al. |
| 2004/0069122 A1 | 4/2004 | Wilson |
| 2004/0070567 A1 | 4/2004 | Longe et al. |
| 2004/0070612 A1 | 4/2004 | Sinclair et al. |
| 2004/0073427 A1 | 4/2004 | Moore |
| 2004/0073428 A1 | 4/2004 | Zlokarnik et al. |
| 2004/0076086 A1 | 4/2004 | Keller et al. |
| 2004/0078382 A1 | 4/2004 | Mercer et al. |
| 2004/0085162 A1 | 5/2004 | Agarwal et al. |
| 2004/0085368 A1 | 5/2004 | Johnson, Jr. et al. |
| 2004/0086120 A1 | 5/2004 | Akins, III et al. |
| 2004/0093213 A1 | 5/2004 | Conkie |
| 2004/0093215 A1 | 5/2004 | Gupta et al. |
| 2004/0093328 A1 | 5/2004 | Damle |
| 2004/0094018 A1 | 5/2004 | Ueshima et al. |
| 2004/0096105 A1 | 5/2004 | Holtsberg |
| 2004/0098250 A1 | 5/2004 | Kimchi et al. |
| 2004/0100479 A1 | 5/2004 | Nakano et al. |
| 2004/0106432 A1 | 6/2004 | Kanamori et al. |
| 2004/0107169 A1 | 6/2004 | Lowe |
| 2004/0111266 A1 | 6/2004 | Coorman et al. |
| 2004/0111332 A1 | 6/2004 | Baar et al. |
| 2004/0114731 A1 | 6/2004 | Gillett et al. |
| 2004/0120476 A1 | 6/2004 | Harrison et al. |
| 2004/0122656 A1 | 6/2004 | Abir |
| 2004/0122664 A1 | 6/2004 | Lorenzo et al. |
| 2004/0122673 A1 | 6/2004 | Park et al. |
| 2004/0124583 A1 | 7/2004 | Landis |
| 2004/0125088 A1 | 7/2004 | Zimmerman et al. |
| 2004/0125922 A1 | 7/2004 | Specht |
| 2004/0127198 A1 | 7/2004 | Roskind et al. |
| 2004/0127241 A1 | 7/2004 | Shostak |
| 2004/0128137 A1 | 7/2004 | Bush et al. |
| 2004/0128614 A1 | 7/2004 | Andrews et al. |
| 2004/0133817 A1 | 7/2004 | Choi |
| 2004/0135701 A1 | 7/2004 | Yasuda et al. |
| 2004/0135774 A1 | 7/2004 | La Monica |
| 2004/0136510 A1 | 7/2004 | Vander Veen |
| 2004/0138869 A1 | 7/2004 | Heinecke |
| 2004/0145607 A1 | 7/2004 | Alderson |
| 2004/0148154 A1 | 7/2004 | Acero et al. |
| 2004/0152054 A1 | 8/2004 | Gleissner et al. |
| 2004/0153306 A1 | 8/2004 | Tanner et al. |
| 2004/0155869 A1 | 8/2004 | Robinson et al. |
| 2004/0160419 A1 | 8/2004 | Padgitt |
| 2004/0162741 A1 | 8/2004 | Flaxer et al. |
| 2004/0170379 A1 | 9/2004 | Yao et al. |
| 2004/0174399 A1 | 9/2004 | Wu et al. |
| 2004/0174434 A1 | 9/2004 | Walker et al. |
| 2004/0176958 A1 | 9/2004 | Salmenkaita et al. |
| 2004/0177319 A1 | 9/2004 | Horn |
| 2004/0178994 A1 | 9/2004 | Kairls, Jr. |
| 2004/0181392 A1 | 9/2004 | Parikh et al. |
| 2004/0183833 A1 | 9/2004 | Chua |
| 2004/0186713 A1 | 9/2004 | Gomas et al. |
| 2004/0186714 A1 | 9/2004 | Baker |
| 2004/0186777 A1 | 9/2004 | Margiloff et al. |
| 2004/0186857 A1 | 9/2004 | Serlet et al. |
| 2004/0193398 A1 | 9/2004 | Chu et al. |
| 2004/0193420 A1 | 9/2004 | Kennewick et al. |
| 2004/0193421 A1 | 9/2004 | Blass |
| 2004/0193426 A1 | 9/2004 | Maddux et al. |
| 2004/0196256 A1 | 10/2004 | Wobbrock et al. |
| 2004/0198436 A1 | 10/2004 | Alden |
| 2004/0199375 A1 | 10/2004 | Ehsani et al. |
| 2004/0199387 A1 | 10/2004 | Wang et al. |
| 2004/0199663 A1 | 10/2004 | Horvitz et al. |
| 2004/0203520 A1 | 10/2004 | Schirtzinger et al. |
| 2004/0205151 A1 | 10/2004 | Sprigg et al. |
| 2004/0205671 A1 | 10/2004 | Sukehiro et al. |
| 2004/0208302 A1 | 10/2004 | Urban et al. |
| 2004/0210442 A1 | 10/2004 | Glynn et al. |
| 2004/0210634 A1 | 10/2004 | Ferrer et al. |
| 2004/0213419 A1 | 10/2004 | Varma et al. |
| 2004/0215731 A1 | 10/2004 | Tzann-en Szeto |
| 2004/0216049 A1 | 10/2004 | Lewis et al. |
| 2004/0218451 A1 | 11/2004 | Said et al. |
| 2004/0220798 A1 | 11/2004 | Chi et al. |
| 2004/0220809 A1 | 11/2004 | Wang et al. |
| 2004/0221235 A1 | 11/2004 | Marchisio et al. |
| 2004/0223485 A1 | 11/2004 | Arellano et al. |
| 2004/0223599 A1 | 11/2004 | Bear et al. |
| 2004/0224638 A1 | 11/2004 | Fadell et al. |
| 2004/0225501 A1 | 11/2004 | Cutaia et al. |
| 2004/0225504 A1 | 11/2004 | Junqua et al. |
| 2004/0225650 A1 | 11/2004 | Cooper et al. |
| 2004/0225746 A1 | 11/2004 | Niell et al. |
| 2004/0230420 A1 | 11/2004 | Kadambe et al. |
| 2004/0230637 A1 | 11/2004 | Lecoueche et al. |
| 2004/0236778 A1 | 11/2004 | Junqua et al. |
| 2004/0242286 A1 | 12/2004 | Benco et al. |
| 2004/0243412 A1 | 12/2004 | Gupta et al. |
| 2004/0243419 A1 | 12/2004 | Wang |
| 2004/0249629 A1 | 12/2004 | Webster |
| 2004/0249637 A1 | 12/2004 | Baker et al. |
| 2004/0249667 A1 | 12/2004 | Oon |
| 2004/0252119 A1 | 12/2004 | Hunleth et al. |
| 2004/0252604 A1 | 12/2004 | Johnson et al. |
| 2004/0252966 A1 | 12/2004 | Holloway et al. |
| 2004/0254791 A1 | 12/2004 | Coifman et al. |
| 2004/0254792 A1 | 12/2004 | Busayapongchai et al. |
| 2004/0257432 A1 | 12/2004 | Girish et al. |
| 2004/0259536 A1 | 12/2004 | Keskar et al. |
| 2004/0260438 A1 | 12/2004 | Chernetsky et al. |
| 2004/0260547 A1 | 12/2004 | Cohen et al. |
| 2004/0260718 A1 | 12/2004 | Fedorov et al. |
| 2004/0261023 A1 | 12/2004 | Bier |
| 2004/0262051 A1 | 12/2004 | Carro |
| 2004/0263636 A1 | 12/2004 | Cutler et al. |
| 2004/0267825 A1 | 12/2004 | Novak et al. |
| 2004/0268253 A1 | 12/2004 | Demello et al. |
| 2004/0268262 A1 | 12/2004 | Gupta et al. |
| 2005/0002507 A1 | 1/2005 | Timmins et al. |
| 2005/0010409 A1 | 1/2005 | Hull et al. |
| 2005/0012723 A1 | 1/2005 | Pallakoff |
| 2005/0015254 A1 | 1/2005 | Beaman |
| 2005/0015751 A1 | 1/2005 | Grassens |
| 2005/0015772 A1 | 1/2005 | Saare et al. |
| 2005/0021330 A1 | 1/2005 | Mano et al. |
| 2005/0022114 A1 | 1/2005 | Shanahan et al. |
| 2005/0024341 A1 | 2/2005 | Gillespie et al. |
| 2005/0024345 A1 | 2/2005 | Eastty et al. |
| 2005/0027385 A1 | 2/2005 | Yueh |
| 2005/0030175 A1 | 2/2005 | Wolfe |
| 2005/0031106 A1 | 2/2005 | Henderson |
| 2005/0033582 A1 | 2/2005 | Gadd et al. |
| 2005/0033771 A1 | 2/2005 | Schmitter et al. |
| 2005/0034164 A1 | 2/2005 | Sano et al. |
| 2005/0038657 A1 | 2/2005 | Roth et al. |
| 2005/0039141 A1 | 2/2005 | Burke et al. |
| 2005/0042591 A1 | 2/2005 | Bloom et al. |
| 2005/0043946 A1 | 2/2005 | Ueyama et al. |
| 2005/0043949 A1 | 2/2005 | Roth et al. |
| 2005/0044569 A1 | 2/2005 | Marcus |
| 2005/0045373 A1 | 3/2005 | Born |
| 2005/0049862 A1 | 3/2005 | Choi et al. |
| 2005/0049870 A1 | 3/2005 | Zhang et al. |

(56) References Cited

U.S. PATENT DOCUMENTS

| | | |
|---|---|---|
| 2005/0049880 A1 | 3/2005 | Roth et al. |
| 2005/0055212 A1 | 3/2005 | Nagao |
| 2005/0055403 A1 | 3/2005 | Brittan |
| 2005/0058438 A1 | 3/2005 | Hayashi |
| 2005/0060155 A1 | 3/2005 | Chu et al. |
| 2005/0071165 A1 | 3/2005 | Hofstader et al. |
| 2005/0071332 A1 | 3/2005 | Ortega et al. |
| 2005/0071437 A1 | 3/2005 | Bear et al. |
| 2005/0074113 A1 | 4/2005 | Mathew et al. |
| 2005/0075881 A1 | 4/2005 | Rigazio et al. |
| 2005/0080613 A1 | 4/2005 | Colledge et al. |
| 2005/0080620 A1 | 4/2005 | Rao et al. |
| 2005/0080625 A1 | 4/2005 | Bennett et al. |
| 2005/0080632 A1 | 4/2005 | Endo et al. |
| 2005/0080780 A1 | 4/2005 | Colledge et al. |
| 2005/0086059 A1 | 4/2005 | Bennett |
| 2005/0086255 A1 | 4/2005 | Schran et al. |
| 2005/0086605 A1 | 4/2005 | Ferrer et al. |
| 2005/0091118 A1 | 4/2005 | Fano |
| 2005/0094475 A1 | 5/2005 | Naoi |
| 2005/0099398 A1 | 5/2005 | Garside et al. |
| 2005/0100214 A1 | 5/2005 | Zhang et al. |
| 2005/0102144 A1 | 5/2005 | Rapoport |
| 2005/0102614 A1 | 5/2005 | Brockett et al. |
| 2005/0102625 A1 | 5/2005 | Lee et al. |
| 2005/0105712 A1 | 5/2005 | Williams et al. |
| 2005/0108001 A1 | 5/2005 | Aarskog |
| 2005/0108017 A1 | 5/2005 | Esser et al. |
| 2005/0108074 A1 | 5/2005 | Bloechl et al. |
| 2005/0108338 A1 | 5/2005 | Simske et al. |
| 2005/0108344 A1 | 5/2005 | Tafoya et al. |
| 2005/0108642 A1 | 5/2005 | Sinclair et al. |
| 2005/0114124 A1 | 5/2005 | Liu et al. |
| 2005/0114140 A1 | 5/2005 | Brackett et al. |
| 2005/0114306 A1 | 5/2005 | Shu et al. |
| 2005/0114791 A1 | 5/2005 | Bollenbacher et al. |
| 2005/0119890 A1 | 6/2005 | Hirose |
| 2005/0119897 A1 | 6/2005 | Bennett et al. |
| 2005/0125216 A1 | 6/2005 | Chitrapura et al. |
| 2005/0125226 A1 | 6/2005 | Magee |
| 2005/0125235 A1 | 6/2005 | Lazay et al. |
| 2005/0131951 A1 | 6/2005 | Zhang et al. |
| 2005/0132301 A1 | 6/2005 | Ikeda |
| 2005/0136949 A1 | 6/2005 | Barnes, Jr. |
| 2005/0138305 A1 | 6/2005 | Zellner |
| 2005/0140504 A1 | 6/2005 | Marshall et al. |
| 2005/0143972 A1 | 6/2005 | Gopalakrishnan et al. |
| 2005/0144003 A1 | 6/2005 | Iso-Sipila |
| 2005/0144070 A1 | 6/2005 | Cheshire |
| 2005/0144568 A1 | 6/2005 | Gruen et al. |
| 2005/0148356 A1 | 7/2005 | Ferguson et al. |
| 2005/0149214 A1 | 7/2005 | Yoo et al. |
| 2005/0149330 A1 | 7/2005 | Katae |
| 2005/0149332 A1 | 7/2005 | Kuzunuki et al. |
| 2005/0149510 A1 | 7/2005 | Shafrir |
| 2005/0152558 A1 | 7/2005 | Van Tassel |
| 2005/0152602 A1 | 7/2005 | Chen et al. |
| 2005/0154578 A1 | 7/2005 | Tong et al. |
| 2005/0154580 A1 | 7/2005 | Horowitz et al. |
| 2005/0154591 A1 | 7/2005 | Lecoeuche |
| 2005/0159939 A1 | 7/2005 | Mohler et al. |
| 2005/0159957 A1 | 7/2005 | Roth et al. |
| 2005/0162395 A1 | 7/2005 | Unruh |
| 2005/0165015 A1 | 7/2005 | Ncube et al. |
| 2005/0165607 A1 | 7/2005 | Di Fabbrizio et al. |
| 2005/0166153 A1 | 7/2005 | Eytchison et al. |
| 2005/0177445 A1 | 8/2005 | Church |
| 2005/0181770 A1 | 8/2005 | Helferich |
| 2005/0182616 A1 | 8/2005 | Kotipalli |
| 2005/0182627 A1 | 8/2005 | Tanaka et al. |
| 2005/0182628 A1 | 8/2005 | Choi |
| 2005/0182629 A1 | 8/2005 | Coorman et al. |
| 2005/0182630 A1 | 8/2005 | Miro et al. |
| 2005/0182765 A1 | 8/2005 | Liddy |
| 2005/0184958 A1 | 8/2005 | Gnanamgari et al. |
| 2005/0187770 A1 | 8/2005 | Kompe et al. |
| 2005/0187773 A1 | 8/2005 | Filoche et al. |
| 2005/0190970 A1 | 9/2005 | Griffin |
| 2005/0192801 A1 | 9/2005 | Lewis et al. |
| 2005/0192812 A1 | 9/2005 | Buchholz et al. |
| 2005/0195077 A1 | 9/2005 | Mcculloch et al. |
| 2005/0195429 A1 | 9/2005 | Archbold |
| 2005/0196733 A1 | 9/2005 | Budra et al. |
| 2005/0201572 A1 | 9/2005 | Lindahl et al. |
| 2005/0202854 A1 | 9/2005 | Kortum et al. |
| 2005/0203738 A1 | 9/2005 | Hwang |
| 2005/0203747 A1 | 9/2005 | Lecoeuche |
| 2005/0203991 A1 | 9/2005 | Kawamura et al. |
| 2005/0209848 A1 | 9/2005 | Ishii |
| 2005/0210394 A1 | 9/2005 | Crandall et al. |
| 2005/0216331 A1 | 9/2005 | Ahrens et al. |
| 2005/0222843 A1 | 10/2005 | Kahn et al. |
| 2005/0222973 A1 | 10/2005 | Kaiser |
| 2005/0228665 A1 | 10/2005 | Kobayashi et al. |
| 2005/0245243 A1 | 11/2005 | Zuniga |
| 2005/0246350 A1 | 11/2005 | Canaran |
| 2005/0246365 A1 | 11/2005 | Lowes et al. |
| 2005/0246686 A1 | 11/2005 | Seshadri et al. |
| 2005/0246726 A1 | 11/2005 | Labrou et al. |
| 2005/0251572 A1 | 11/2005 | McMahan et al. |
| 2005/0254481 A1 | 11/2005 | Vishik et al. |
| 2005/0261901 A1 | 11/2005 | Davis et al. |
| 2005/0262440 A1 | 11/2005 | Stanciu et al. |
| 2005/0267738 A1 | 12/2005 | Wilkinson et al. |
| 2005/0267757 A1 | 12/2005 | Iso-Sipila et al. |
| 2005/0268247 A1 | 12/2005 | Baneth |
| 2005/0271216 A1 | 12/2005 | Lashkari |
| 2005/0273332 A1 | 12/2005 | Scott et al. |
| 2005/0273337 A1 | 12/2005 | Erell et al. |
| 2005/0273626 A1 | 12/2005 | Pearson et al. |
| 2005/0278297 A1 | 12/2005 | Nelson |
| 2005/0278643 A1 | 12/2005 | Ukai et al. |
| 2005/0278647 A1 | 12/2005 | Leavitt et al. |
| 2005/0283363 A1 | 12/2005 | Weng et al. |
| 2005/0283364 A1 | 12/2005 | Longe et al. |
| 2005/0283726 A1 | 12/2005 | Lunati |
| 2005/0283729 A1 | 12/2005 | Morris et al. |
| 2005/0288934 A1 | 12/2005 | Omi |
| 2005/0288936 A1 | 12/2005 | Busayapongchai |
| 2005/0289458 A1 | 12/2005 | Kylmanen |
| 2005/0289463 A1 | 12/2005 | Wu et al. |
| 2006/0001652 A1 | 1/2006 | Chiu et al. |
| 2006/0004570 A1 | 1/2006 | Ju et al. |
| 2006/0004640 A1 | 1/2006 | Swierczek |
| 2006/0004744 A1 | 1/2006 | Nevidomski et al. |
| 2006/0007174 A1 | 1/2006 | Shen |
| 2006/0009973 A1 | 1/2006 | Nguyen et al. |
| 2006/0013414 A1 | 1/2006 | Shih |
| 2006/0013446 A1 | 1/2006 | Stephens |
| 2006/0015326 A1 | 1/2006 | Mori et al. |
| 2006/0015341 A1 | 1/2006 | Baker |
| 2006/0015484 A1 | 1/2006 | Weng et al. |
| 2006/0015819 A1 | 1/2006 | Hawkins et al. |
| 2006/0018446 A1 | 1/2006 | Schmandt et al. |
| 2006/0018492 A1 | 1/2006 | Chiu et al. |
| 2006/0020890 A1 | 1/2006 | Kroll et al. |
| 2006/0025999 A1 | 2/2006 | Feng et al. |
| 2006/0026233 A1 | 2/2006 | Tenembaum et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0035632 A1 | 2/2006 | Sorvari et al. |
| 2006/0036946 A1 | 2/2006 | Radtke et al. |
| 2006/0041424 A1 | 2/2006 | Todhunter et al. |
| 2006/0041431 A1 | 2/2006 | Maes |
| 2006/0041590 A1 | 2/2006 | King et al. |
| 2006/0047632 A1 | 3/2006 | Zhang |
| 2006/0050865 A1 | 3/2006 | Kortum et al. |
| 2006/0052141 A1 | 3/2006 | Suzuki |
| 2006/0053007 A1 | 3/2006 | Niemisto et al. |
| 2006/0053365 A1 | 3/2006 | Hollander et al. |
| 2006/0053379 A1 | 3/2006 | Henderson et al. |
| 2006/0053387 A1 | 3/2006 | Ording |

(56) References Cited

U.S. PATENT DOCUMENTS

| | | |
|---|---|---|
| 2006/0058999 A1 | 3/2006 | Barker et al. |
| 2006/0059424 A1 | 3/2006 | Petri et al. |
| 2006/0059437 A1 | 3/2006 | Conklin |
| 2006/0060762 A1 | 3/2006 | Chan et al. |
| 2006/0061488 A1 | 3/2006 | Dunton |
| 2006/0064693 A1 | 3/2006 | Messer et al. |
| 2006/0067535 A1 | 3/2006 | Culbert et al. |
| 2006/0067536 A1 | 3/2006 | Culbert et al. |
| 2006/0069567 A1 | 3/2006 | Tischer et al. |
| 2006/0069664 A1 | 3/2006 | Ling et al. |
| 2006/0072248 A1 | 4/2006 | Watanabe et al. |
| 2006/0072716 A1 | 4/2006 | Pham |
| 2006/0074628 A1 | 4/2006 | Elbaz et al. |
| 2006/0074651 A1 | 4/2006 | Arun et al. |
| 2006/0074660 A1 | 4/2006 | Waters |
| 2006/0074674 A1 | 4/2006 | Zhang et al. |
| 2006/0074750 A1 | 4/2006 | Clark et al. |
| 2006/0074898 A1 | 4/2006 | Gavalda et al. |
| 2006/0075429 A1 | 4/2006 | Istvan et al. |
| 2006/0077055 A1 | 4/2006 | Basir |
| 2006/0080098 A1 | 4/2006 | Campbell |
| 2006/0085187 A1 | 4/2006 | Barquilla |
| 2006/0085465 A1 | 4/2006 | Nori et al. |
| 2006/0085757 A1 | 4/2006 | Andre et al. |
| 2006/0093998 A1 | 5/2006 | Vertegaal |
| 2006/0095265 A1 | 5/2006 | Chu et al. |
| 2006/0095790 A1 | 5/2006 | Nguyen et al. |
| 2006/0095846 A1 | 5/2006 | Nurmi |
| 2006/0095848 A1 | 5/2006 | Naik |
| 2006/0097991 A1 | 5/2006 | Hotelling et al. |
| 2006/0100848 A1 | 5/2006 | Cozzi et al. |
| 2006/0100849 A1 | 5/2006 | Chan |
| 2006/0101354 A1 | 5/2006 | Hashimoto et al. |
| 2006/0103633 A1 | 5/2006 | Gioeli |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0111906 A1 | 5/2006 | Cross et al. |
| 2006/0111909 A1 | 5/2006 | Maes et al. |
| 2006/0116874 A1 | 6/2006 | Samuelsson et al. |
| 2006/0116877 A1 | 6/2006 | Pickering et al. |
| 2006/0117002 A1 | 6/2006 | Swen |
| 2006/0119582 A1 | 6/2006 | Ng et al. |
| 2006/0122834 A1 | 6/2006 | Bennett |
| 2006/0122836 A1 | 6/2006 | Cross et al. |
| 2006/0129379 A1 | 6/2006 | Ramsey et al. |
| 2006/0129929 A1 | 6/2006 | Weber et al. |
| 2006/0130006 A1 | 6/2006 | Chitale |
| 2006/0132812 A1 | 6/2006 | Barnes et al. |
| 2006/0135214 A1 | 6/2006 | Zhang et al. |
| 2006/0136213 A1 | 6/2006 | Hirose et al. |
| 2006/0136280 A1 | 6/2006 | Cho et al. |
| 2006/0136352 A1 | 6/2006 | Brun et al. |
| 2006/0141990 A1 | 6/2006 | Zak et al. |
| 2006/0142576 A1 | 6/2006 | Meng et al. |
| 2006/0142993 A1 | 6/2006 | Menendez-Pidal et al. |
| 2006/0143007 A1 | 6/2006 | Koh et al. |
| 2006/0143559 A1 | 6/2006 | Spielberg et al. |
| 2006/0143576 A1 | 6/2006 | Gupta et al. |
| 2006/0148520 A1 | 7/2006 | Baker et al. |
| 2006/0149557 A1 | 7/2006 | Kaneko et al. |
| 2006/0149558 A1 | 7/2006 | Kahn et al. |
| 2006/0150087 A1 | 7/2006 | Cronenberger et al. |
| 2006/0152496 A1 | 7/2006 | Knaven |
| 2006/0153040 A1 | 7/2006 | Girish et al. |
| 2006/0156252 A1 | 7/2006 | Sheshagiri et al. |
| 2006/0156307 A1 | 7/2006 | Kunjithapatham et al. |
| 2006/0161870 A1 | 7/2006 | Hotelling et al. |
| 2006/0161871 A1 | 7/2006 | Hotelling et al. |
| 2006/0161872 A1 | 7/2006 | Rytivaara et al. |
| 2006/0165105 A1 | 7/2006 | Shenfield et al. |
| 2006/0167676 A1 | 7/2006 | Plumb |
| 2006/0168150 A1 | 7/2006 | Naik et al. |
| 2006/0168507 A1 | 7/2006 | Hansen |
| 2006/0168539 A1 | 7/2006 | Hawkins et al. |
| 2006/0172720 A1 | 8/2006 | Islam et al. |
| 2006/0173683 A1 | 8/2006 | Roth et al. |
| 2006/0173684 A1 | 8/2006 | Fischer et al. |
| 2006/0174207 A1 | 8/2006 | Deshpande |
| 2006/0178868 A1 | 8/2006 | Billerey-Mosier |
| 2006/0181519 A1 | 8/2006 | Vernier et al. |
| 2006/0183466 A1 | 8/2006 | Lee et al. |
| 2006/0184886 A1 | 8/2006 | Chung et al. |
| 2006/0187073 A1 | 8/2006 | Lin et al. |
| 2006/0190269 A1 | 8/2006 | Tessel et al. |
| 2006/0190436 A1 | 8/2006 | Richardson et al. |
| 2006/0190577 A1 | 8/2006 | Yamada |
| 2006/0193518 A1 | 8/2006 | Dong |
| 2006/0194181 A1 | 8/2006 | Rosenberg |
| 2006/0195206 A1 | 8/2006 | Moon et al. |
| 2006/0195323 A1 | 8/2006 | Monne et al. |
| 2006/0197753 A1 | 9/2006 | Hotelling |
| 2006/0197755 A1 | 9/2006 | Bawany |
| 2006/0200253 A1 | 9/2006 | Hoffberg et al. |
| 2006/0200342 A1 | 9/2006 | Corston-Oliver et al. |
| 2006/0200347 A1 | 9/2006 | Kim et al. |
| 2006/0205432 A1 | 9/2006 | Hawkins et al. |
| 2006/0206313 A1 | 9/2006 | Xu et al. |
| 2006/0206454 A1 | 9/2006 | Forstall et al. |
| 2006/0206724 A1 | 9/2006 | Schaufele et al. |
| 2006/0212415 A1 | 9/2006 | Backer et al. |
| 2006/0217967 A1 | 9/2006 | Goertzen et al. |
| 2006/0218244 A1 | 9/2006 | Rasmussen et al. |
| 2006/0221738 A1 | 10/2006 | Park et al. |
| 2006/0221788 A1 | 10/2006 | Lindahl et al. |
| 2006/0224570 A1 | 10/2006 | Quiroga et al. |
| 2006/0229802 A1 | 10/2006 | Vertelney et al. |
| 2006/0229870 A1 | 10/2006 | Kobal |
| 2006/0229876 A1 | 10/2006 | Aaron et al. |
| 2006/0230350 A1 | 10/2006 | Baluja |
| 2006/0230410 A1 | 10/2006 | Kurganov et al. |
| 2006/0234680 A1 | 10/2006 | Doulton |
| 2006/0235550 A1 | 10/2006 | Csicsatka et al. |
| 2006/0235700 A1 | 10/2006 | Wong et al. |
| 2006/0235841 A1 | 10/2006 | Betz et al. |
| 2006/0236262 A1 | 10/2006 | Bathiche et al. |
| 2006/0239419 A1 | 10/2006 | Joseph et al. |
| 2006/0239471 A1 | 10/2006 | Mao et al. |
| 2006/0240866 A1 | 10/2006 | Eilts et al. |
| 2006/0241948 A1 | 10/2006 | Abrash et al. |
| 2006/0242190 A1 | 10/2006 | Wnek |
| 2006/0246955 A1 | 11/2006 | Nirhamo et al. |
| 2006/0247931 A1 | 11/2006 | Caskey et al. |
| 2006/0252457 A1 | 11/2006 | Schrager |
| 2006/0253210 A1 | 11/2006 | Rosenberg |
| 2006/0253787 A1 | 11/2006 | Fogg |
| 2006/0256934 A1 | 11/2006 | Mazor |
| 2006/0258376 A1 | 11/2006 | Ewell et al. |
| 2006/0262876 A1 | 11/2006 | LaDue |
| 2006/0265208 A1 | 11/2006 | Assadollahi |
| 2006/0265503 A1 | 11/2006 | Jones et al. |
| 2006/0265648 A1 | 11/2006 | Rainisto et al. |
| 2006/0271627 A1 | 11/2006 | Szczepanek |
| 2006/0274051 A1 | 12/2006 | Longe et al. |
| 2006/0274905 A1 | 12/2006 | Lindahl et al. |
| 2006/0277031 A1 | 12/2006 | Ramsey et al. |
| 2006/0277058 A1 | 12/2006 | J''maev et al. |
| 2006/0282264 A1 | 12/2006 | Denny et al. |
| 2006/0282415 A1 | 12/2006 | Shibata et al. |
| 2006/0282455 A1 | 12/2006 | Lee et al. |
| 2006/0286527 A1 | 12/2006 | Morel |
| 2006/0287864 A1 | 12/2006 | Pusa et al. |
| 2006/0288024 A1 | 12/2006 | Braica |
| 2006/0291666 A1 | 12/2006 | Ball et al. |
| 2006/0293876 A1 | 12/2006 | Kamatani et al. |
| 2006/0293880 A1 | 12/2006 | Elshishiny et al. |
| 2006/0293886 A1 | 12/2006 | Odell et al. |
| 2006/0293889 A1 | 12/2006 | Kiss et al. |
| 2007/0003026 A1 | 1/2007 | Hodge et al. |
| 2007/0004451 A1 | 1/2007 | Anderson |
| 2007/0005849 A1 | 1/2007 | Oliver |
| 2007/0006098 A1 | 1/2007 | Krumm et al. |
| 2007/0011154 A1 | 1/2007 | Musgrove et al. |
| 2007/0014280 A1 | 1/2007 | Cormier et al. |

(56) References Cited

U.S. PATENT DOCUMENTS

| | | |
|---|---|---|
| 2007/0016563 A1 | 1/2007 | Omoigui |
| 2007/0016865 A1 | 1/2007 | Johnson et al. |
| 2007/0021956 A1 | 1/2007 | Qu et al. |
| 2007/0022380 A1 | 1/2007 | Swartz et al. |
| 2007/0025704 A1 | 2/2007 | Tsukazaki et al. |
| 2007/0026852 A1 | 2/2007 | Logan et al. |
| 2007/0027732 A1 | 2/2007 | Hudgens |
| 2007/0028009 A1 | 2/2007 | Robbin et al. |
| 2007/0030824 A1 | 2/2007 | Ribaudo et al. |
| 2007/0032247 A1 | 2/2007 | Shaffer et al. |
| 2007/0033003 A1 | 2/2007 | Morris |
| 2007/0033005 A1 | 2/2007 | Cristo et al. |
| 2007/0033026 A1 | 2/2007 | Bartosik et al. |
| 2007/0033054 A1 | 2/2007 | Snitkovskiy et al. |
| 2007/0036117 A1 | 2/2007 | Taube et al. |
| 2007/0036286 A1 | 2/2007 | Champlin et al. |
| 2007/0036294 A1 | 2/2007 | Chaudhuri et al. |
| 2007/0038436 A1 | 2/2007 | Cristoe et al. |
| 2007/0038609 A1 | 2/2007 | Wu |
| 2007/0040813 A1 | 2/2007 | Kushler et al. |
| 2007/0041361 A1 | 2/2007 | Iso-Sipila |
| 2007/0042812 A1 | 2/2007 | Basir et al. |
| 2007/0043568 A1 | 2/2007 | Dhanakshirur et al. |
| 2007/0043687 A1 | 2/2007 | Bodart et al. |
| 2007/0043820 A1 | 2/2007 | George et al. |
| 2007/0044038 A1 | 2/2007 | Horentrup et al. |
| 2007/0046641 A1 | 3/2007 | Lim |
| 2007/0047719 A1 | 3/2007 | Dhawan |
| 2007/0050184 A1 | 3/2007 | Drucker et al. |
| 2007/0050191 A1 | 3/2007 | Weider et al. |
| 2007/0050393 A1 | 3/2007 | Vogel et al. |
| 2007/0050712 A1 | 3/2007 | Hull et al. |
| 2007/0052586 A1 | 3/2007 | Horstemeyer |
| 2007/0055493 A1 | 3/2007 | Lee |
| 2007/0055508 A1 | 3/2007 | Zhao et al. |
| 2007/0055514 A1 | 3/2007 | Beattie et al. |
| 2007/0055525 A1 | 3/2007 | Kennewick et al. |
| 2007/0055529 A1 | 3/2007 | Kanevsky et al. |
| 2007/0058832 A1 | 3/2007 | Hug et al. |
| 2007/0060107 A1 | 3/2007 | Day |
| 2007/0060118 A1 | 3/2007 | Guyette |
| 2007/0061487 A1 | 3/2007 | Moore et al. |
| 2007/0061712 A1 | 3/2007 | Bodin et al. |
| 2007/0061754 A1 | 3/2007 | Ardhanari et al. |
| 2007/0067173 A1 | 3/2007 | Bellegarda |
| 2007/0067272 A1 | 3/2007 | Flynt et al. |
| 2007/0073540 A1 | 3/2007 | Hirakawa et al. |
| 2007/0073541 A1 | 3/2007 | Tian |
| 2007/0073745 A1 | 3/2007 | Scott et al. |
| 2007/0074131 A1 | 3/2007 | Assadollahi et al. |
| 2007/0075965 A1 | 4/2007 | Huppi et al. |
| 2007/0079027 A1 | 4/2007 | Marriott et al. |
| 2007/0080936 A1 | 4/2007 | Tsuk et al. |
| 2007/0083467 A1 | 4/2007 | Lindahl et al. |
| 2007/0083623 A1 | 4/2007 | Nishimura et al. |
| 2007/0088556 A1 | 4/2007 | Andrew |
| 2007/0088687 A1* | 4/2007 | Bromm ............. G06F 17/30663 |
| 2007/0089132 A1 | 4/2007 | Qureshey et al. |
| 2007/0089135 A1 | 4/2007 | Qureshey et al. |
| 2007/0093277 A1 | 4/2007 | Cavacuiti et al. |
| 2007/0094026 A1 | 4/2007 | Ativanichayaphong et al. |
| 2007/0098195 A1 | 5/2007 | Holmes |
| 2007/0100206 A1 | 5/2007 | Lin et al. |
| 2007/0100602 A1 | 5/2007 | Kim |
| 2007/0100619 A1 | 5/2007 | Purho et al. |
| 2007/0100624 A1 | 5/2007 | Weng et al. |
| 2007/0100635 A1 | 5/2007 | Mahajan et al. |
| 2007/0100709 A1 | 5/2007 | Lee et al. |
| 2007/0100790 A1 | 5/2007 | Cheyer et al. |
| 2007/0100814 A1 | 5/2007 | Lee et al. |
| 2007/0100883 A1 | 5/2007 | Rose et al. |
| 2007/0106491 A1 | 5/2007 | Carter et al. |
| 2007/0106497 A1 | 5/2007 | Ramsey et al. |
| 2007/0106512 A1 | 5/2007 | Acero et al. |
| 2007/0106513 A1 | 5/2007 | Boillot et al. |
| 2007/0106657 A1 | 5/2007 | Brzeski et al. |
| 2007/0106674 A1 | 5/2007 | Agrawal et al. |
| 2007/0106685 A1 | 5/2007 | Houh et al. |
| 2007/0112562 A1 | 5/2007 | Vainio et al. |
| 2007/0116195 A1 | 5/2007 | Thompson et al. |
| 2007/0118351 A1 | 5/2007 | Sumita |
| 2007/0118377 A1 | 5/2007 | Badino et al. |
| 2007/0118378 A1 | 5/2007 | Skuratovsky |
| 2007/0121846 A1 | 5/2007 | Altberg et al. |
| 2007/0124131 A1 | 5/2007 | Chino et al. |
| 2007/0124132 A1 | 5/2007 | Takeuchi et al. |
| 2007/0124149 A1 | 5/2007 | Shen et al. |
| 2007/0124291 A1 | 5/2007 | Hassan et al. |
| 2007/0124676 A1 | 5/2007 | Amundsen et al. |
| 2007/0127888 A1 | 6/2007 | Hayashi et al. |
| 2007/0128777 A1 | 6/2007 | Yin et al. |
| 2007/0129059 A1 | 6/2007 | Nadarajah et al. |
| 2007/0130014 A1 | 6/2007 | Altberg et al. |
| 2007/0130128 A1 | 6/2007 | Garg et al. |
| 2007/0132738 A1 | 6/2007 | Lowles et al. |
| 2007/0133771 A1 | 6/2007 | Stifelman et al. |
| 2007/0135187 A1 | 6/2007 | Kreiner et al. |
| 2007/0135949 A1 | 6/2007 | Snover et al. |
| 2007/0136064 A1 | 6/2007 | Carroll |
| 2007/0136778 A1 | 6/2007 | Birger et al. |
| 2007/0143163 A1 | 6/2007 | Weiss et al. |
| 2007/0149252 A1 | 6/2007 | Jobs et al. |
| 2007/0150403 A1 | 6/2007 | Mock et al. |
| 2007/0150444 A1 | 6/2007 | Chesnais et al. |
| 2007/0150842 A1 | 6/2007 | Chaudhri et al. |
| 2007/0152978 A1 | 7/2007 | Kocienda et al. |
| 2007/0152980 A1 | 7/2007 | Kocienda et al. |
| 2007/0155346 A1 | 7/2007 | Mijatovic et al. |
| 2007/0156410 A1 | 7/2007 | Stohr et al. |
| 2007/0156627 A1 | 7/2007 | D'Alicandro |
| 2007/0157089 A1 | 7/2007 | Van Os et al. |
| 2007/0157268 A1 | 7/2007 | Girish et al. |
| 2007/0162274 A1 | 7/2007 | Ruiz et al. |
| 2007/0162296 A1 | 7/2007 | Altberg et al. |
| 2007/0162414 A1 | 7/2007 | Horowitz et al. |
| 2007/0165003 A1 | 7/2007 | Fux et al. |
| 2007/0167136 A1 | 7/2007 | Groth |
| 2007/0168922 A1 | 7/2007 | Kaiser et al. |
| 2007/0173233 A1 | 7/2007 | Vander Veen et al. |
| 2007/0173267 A1 | 7/2007 | Klassen et al. |
| 2007/0174057 A1 | 7/2007 | Genly |
| 2007/0174188 A1 | 7/2007 | Fish |
| 2007/0174350 A1 | 7/2007 | Pell et al. |
| 2007/0174396 A1 | 7/2007 | Kumar et al. |
| 2007/0179776 A1 | 8/2007 | Segond et al. |
| 2007/0179778 A1 | 8/2007 | Gong et al. |
| 2007/0180383 A1 | 8/2007 | Naik |
| 2007/0182595 A1 | 8/2007 | Ghasabian |
| 2007/0185551 A1 | 8/2007 | Meadows et al. |
| 2007/0185754 A1 | 8/2007 | Schmidt |
| 2007/0185831 A1 | 8/2007 | Churcher |
| 2007/0185917 A1 | 8/2007 | Prahlad et al. |
| 2007/0188901 A1 | 8/2007 | Heckerman et al. |
| 2007/0192026 A1 | 8/2007 | Lee et al. |
| 2007/0192027 A1 | 8/2007 | Lee et al. |
| 2007/0192105 A1 | 8/2007 | Neeracher et al. |
| 2007/0192179 A1 | 8/2007 | Van et al. |
| 2007/0192293 A1 | 8/2007 | Swen |
| 2007/0192403 A1 | 8/2007 | Heine et al. |
| 2007/0192744 A1 | 8/2007 | Reponen |
| 2007/0198267 A1 | 8/2007 | Jones et al. |
| 2007/0198269 A1 | 8/2007 | Braho et al. |
| 2007/0198273 A1 | 8/2007 | Hennecke |
| 2007/0198566 A1 | 8/2007 | Sustik |
| 2007/0203955 A1 | 8/2007 | Pomerantz |
| 2007/0207785 A1 | 9/2007 | Chatterjee et al. |
| 2007/0208555 A1 | 9/2007 | Blass et al. |
| 2007/0208569 A1 | 9/2007 | Subramanian et al. |
| 2007/0208579 A1 | 9/2007 | Peterson |
| 2007/0208726 A1 | 9/2007 | Krishnaprasad et al. |
| 2007/0211071 A1 | 9/2007 | Slotznick et al. |
| 2007/0213099 A1 | 9/2007 | Bast |
| 2007/0213857 A1 | 9/2007 | Bodin et al. |
| 2007/0213984 A1 | 9/2007 | Ativanichayaphong et al. |

(56) References Cited

U.S. PATENT DOCUMENTS

| | | |
|---|---|---|
| 2007/0213986 A1 | 9/2007 | Bodin et al. |
| 2007/0217693 A1 | 9/2007 | Kretzschmar, Jr. |
| 2007/0219645 A1 | 9/2007 | Thomas et al. |
| 2007/0219777 A1 | 9/2007 | Chu et al. |
| 2007/0219801 A1 | 9/2007 | Sundaram et al. |
| 2007/0219803 A1 | 9/2007 | Chiu et al. |
| 2007/0219983 A1 | 9/2007 | Fish |
| 2007/0225980 A1 | 9/2007 | Sumita |
| 2007/0225984 A1 | 9/2007 | Milstein et al. |
| 2007/0226652 A1 | 9/2007 | Kikuchi et al. |
| 2007/0229323 A1 | 10/2007 | Plachta et al. |
| 2007/0230729 A1 | 10/2007 | Naylor et al. |
| 2007/0233484 A1 | 10/2007 | Coelho et al. |
| 2007/0233487 A1 | 10/2007 | Cohen et al. |
| 2007/0233490 A1 | 10/2007 | Yao |
| 2007/0233497 A1 | 10/2007 | Paek et al. |
| 2007/0233692 A1 | 10/2007 | Lisa et al. |
| 2007/0233725 A1 | 10/2007 | Michmerhuizen et al. |
| 2007/0238488 A1 | 10/2007 | Scott |
| 2007/0238489 A1 | 10/2007 | Scott |
| 2007/0238520 A1 | 10/2007 | Kacmarcik |
| 2007/0239429 A1 | 10/2007 | Johnson et al. |
| 2007/0239453 A1 | 10/2007 | Paek et al. |
| 2007/0240043 A1 | 10/2007 | Fux et al. |
| 2007/0240044 A1 | 10/2007 | Fux et al. |
| 2007/0240045 A1 | 10/2007 | Fux et al. |
| 2007/0241885 A1 | 10/2007 | Clipsham et al. |
| 2007/0244702 A1 | 10/2007 | Kahn et al. |
| 2007/0244976 A1 | 10/2007 | Carroll et al. |
| 2007/0247441 A1 | 10/2007 | Kim et al. |
| 2007/0255435 A1 | 11/2007 | Cohen et al. |
| 2007/0255979 A1 | 11/2007 | Deily et al. |
| 2007/0257890 A1 | 11/2007 | Hotelling et al. |
| 2007/0258642 A1 | 11/2007 | Thota |
| 2007/0260460 A1 | 11/2007 | Hyatt |
| 2007/0260595 A1 | 11/2007 | Beatty et al. |
| 2007/0260822 A1 | 11/2007 | Adams |
| 2007/0261080 A1 | 11/2007 | Saetti |
| 2007/0265831 A1 | 11/2007 | Dinur et al. |
| 2007/0265850 A1 | 11/2007 | Kennewick et al. |
| 2007/0271104 A1 | 11/2007 | McKay |
| 2007/0271510 A1 | 11/2007 | Grigoriu et al. |
| 2007/0274468 A1 | 11/2007 | Cai |
| 2007/0274496 A1* | 11/2007 | Singh .............. H04M 3/382 379/210.02 |
| 2007/0276651 A1 | 11/2007 | Bliss et al. |
| 2007/0276714 A1 | 11/2007 | Beringer |
| 2007/0276810 A1 | 11/2007 | Rosen |
| 2007/0277088 A1 | 11/2007 | Bodin et al. |
| 2007/0282595 A1 | 12/2007 | Tunning et al. |
| 2007/0285958 A1 | 12/2007 | Platchta et al. |
| 2007/0286363 A1 | 12/2007 | Burg et al. |
| 2007/0286399 A1 | 12/2007 | Ramamoorthy et al. |
| 2007/0288238 A1 | 12/2007 | Hetherington et al. |
| 2007/0288241 A1 | 12/2007 | Cross et al. |
| 2007/0288449 A1 | 12/2007 | Datta et al. |
| 2007/0291108 A1 | 12/2007 | Huber et al. |
| 2007/0294077 A1 | 12/2007 | Narayanan et al. |
| 2007/0294083 A1 | 12/2007 | Bellegarda et al. |
| 2007/0294199 A1 | 12/2007 | Nelken et al. |
| 2007/0294263 A1 | 12/2007 | Punj et al. |
| 2007/0299664 A1 | 12/2007 | Peters et al. |
| 2007/0299831 A1 | 12/2007 | Williams et al. |
| 2007/0300140 A1 | 12/2007 | Makela et al. |
| 2008/0001785 A1 | 1/2008 | Elizarov et al. |
| 2008/0010355 A1 | 1/2008 | Vieri et al. |
| 2008/0010605 A1 | 1/2008 | Frank et al. |
| 2008/0012950 A1 | 1/2008 | Lee et al. |
| 2008/0013751 A1 | 1/2008 | Hiselius |
| 2008/0015863 A1 | 1/2008 | Agapi et al. |
| 2008/0015864 A1 | 1/2008 | Ross et al. |
| 2008/0016575 A1 | 1/2008 | Vincent et al. |
| 2008/0021708 A1 | 1/2008 | Bennett et al. |
| 2008/0021886 A1 | 1/2008 | Wang-Aryattanwanich et al. |
| 2008/0022208 A1 | 1/2008 | Morse |
| 2008/0027726 A1 | 1/2008 | Hansen et al. |
| 2008/0031475 A1 | 2/2008 | Goldstein |
| 2008/0033719 A1 | 2/2008 | Hall et al. |
| 2008/0034032 A1 | 2/2008 | Healey et al. |
| 2008/0034044 A1 | 2/2008 | Bhakta et al. |
| 2008/0036743 A1 | 2/2008 | Westerman et al. |
| 2008/0040339 A1 | 2/2008 | Zhou et al. |
| 2008/0042970 A1 | 2/2008 | Liang et al. |
| 2008/0043936 A1 | 2/2008 | Liebermann |
| 2008/0043943 A1 | 2/2008 | Sipher et al. |
| 2008/0046239 A1 | 2/2008 | Boo |
| 2008/0046250 A1 | 2/2008 | Agapi et al. |
| 2008/0046422 A1 | 2/2008 | Lee et al. |
| 2008/0046820 A1 | 2/2008 | Lee et al. |
| 2008/0046948 A1 | 2/2008 | Verosub |
| 2008/0048908 A1 | 2/2008 | Sato |
| 2008/0052063 A1 | 2/2008 | Bennett et al. |
| 2008/0052073 A1 | 2/2008 | Goto et al. |
| 2008/0052077 A1 | 2/2008 | Bennett et al. |
| 2008/0052080 A1 | 2/2008 | Narayanan et al. |
| 2008/0052262 A1 | 2/2008 | Kosinov et al. |
| 2008/0055194 A1 | 3/2008 | Baudino et al. |
| 2008/0056459 A1 | 3/2008 | Vallier et al. |
| 2008/0056579 A1 | 3/2008 | Guha |
| 2008/0059190 A1 | 3/2008 | Chu et al. |
| 2008/0059200 A1 | 3/2008 | Puli |
| 2008/0059876 A1 | 3/2008 | Hantler et al. |
| 2008/0062141 A1 | 3/2008 | Chaudhri |
| 2008/0065382 A1 | 3/2008 | Gerl et al. |
| 2008/0065387 A1 | 3/2008 | Cross et al. |
| 2008/0071529 A1 | 3/2008 | Silverman et al. |
| 2008/0071544 A1 | 3/2008 | Beaufays et al. |
| 2008/0075296 A1 | 3/2008 | Lindahl et al. |
| 2008/0076972 A1 | 3/2008 | Dorogusker et al. |
| 2008/0077310 A1 | 3/2008 | Murlidar et al. |
| 2008/0077384 A1 | 3/2008 | Agapi et al. |
| 2008/0077386 A1 | 3/2008 | Gao et al. |
| 2008/0077391 A1 | 3/2008 | Chino et al. |
| 2008/0077393 A1 | 3/2008 | Gao et al. |
| 2008/0077406 A1 | 3/2008 | Ganong, III |
| 2008/0077859 A1 | 3/2008 | Schabes et al. |
| 2008/0079566 A1 | 4/2008 | Singh et al. |
| 2008/0080411 A1 | 4/2008 | Cole |
| 2008/0082332 A1 | 4/2008 | Mallett |
| 2008/0082338 A1 | 4/2008 | O'Neil et al. |
| 2008/0082390 A1 | 4/2008 | Hawkins et al. |
| 2008/0082576 A1 | 4/2008 | Bodin et al. |
| 2008/0082651 A1 | 4/2008 | Singh et al. |
| 2008/0084974 A1 | 4/2008 | Dhanakshirur |
| 2008/0091406 A1 | 4/2008 | Baldwin et al. |
| 2008/0091426 A1 | 4/2008 | Rempel et al. |
| 2008/0091443 A1 | 4/2008 | Strope et al. |
| 2008/0096531 A1 | 4/2008 | Mcquaide et al. |
| 2008/0096726 A1 | 4/2008 | Riley et al. |
| 2008/0097937 A1 | 4/2008 | Hadjarian |
| 2008/0098302 A1 | 4/2008 | Roose |
| 2008/0098480 A1 | 4/2008 | Henry et al. |
| 2008/0057922 A1 | 5/2008 | Kokes et al. |
| 2008/0100579 A1 | 5/2008 | Robinson et al. |
| 2008/0101584 A1 | 5/2008 | Gray et al. |
| 2008/0103774 A1 | 5/2008 | White |
| 2008/0109222 A1 | 5/2008 | Liu |
| 2008/0109402 A1 | 5/2008 | Wang et al. |
| 2008/0114480 A1 | 5/2008 | Harb |
| 2008/0114598 A1 | 5/2008 | Prieto et al. |
| 2008/0114604 A1 | 5/2008 | Wei et al. |
| 2008/0114841 A1 | 5/2008 | Lambert |
| 2008/0115084 A1 | 5/2008 | Scott et al. |
| 2008/0118143 A1 | 5/2008 | Gordon et al. |
| 2008/0119953 A1 | 5/2008 | Reed |
| 2008/0120102 A1 | 5/2008 | Rao |
| 2008/0120112 A1 | 5/2008 | Jordan et al. |
| 2008/0120196 A1 | 5/2008 | Reed et al. |
| 2008/0120311 A1 | 5/2008 | Reed |
| 2008/0120312 A1 | 5/2008 | Reed |
| 2008/0120330 A1 | 5/2008 | Reed |
| 2008/0120342 A1 | 5/2008 | Reed et al. |
| 2008/0122796 A1 | 5/2008 | Jobs et al. |
| 2008/0124695 A1 | 5/2008 | Myers et al. |

(56) References Cited

U.S. PATENT DOCUMENTS

| | | |
|---|---|---|
| 2008/0126075 A1 | 5/2008 | Thorn et al. |
| 2008/0126077 A1 | 5/2008 | Thorn |
| 2008/0126091 A1 | 5/2008 | Clark et al. |
| 2008/0126093 A1 | 5/2008 | Sivadas |
| 2008/0126100 A1 | 5/2008 | Grost et al. |
| 2008/0126491 A1 | 5/2008 | Portele et al. |
| 2008/0129520 A1 | 6/2008 | Lee |
| 2008/0130867 A1 | 6/2008 | Bowen |
| 2008/0131006 A1 | 6/2008 | Oliver |
| 2008/0132221 A1 | 6/2008 | Willey et al. |
| 2008/0133215 A1 | 6/2008 | Sarukkai |
| 2008/0133228 A1 | 6/2008 | Rao |
| 2008/0133230 A1 | 6/2008 | Herforth et al. |
| 2008/0133241 A1 | 6/2008 | Baker et al. |
| 2008/0133956 A1 | 6/2008 | Fadell |
| 2008/0140413 A1 | 6/2008 | Millman et al. |
| 2008/0140416 A1 | 6/2008 | Shostak |
| 2008/0140652 A1 | 6/2008 | Millman et al. |
| 2008/0140657 A1 | 6/2008 | Azvine et al. |
| 2008/0140702 A1 | 6/2008 | Reed et al. |
| 2008/0141125 A1 | 6/2008 | Ghassabian et al. |
| 2008/0141180 A1 | 6/2008 | Reed et al. |
| 2008/0141182 A1 | 6/2008 | Barsness et al. |
| 2008/0146245 A1 | 6/2008 | Appaji |
| 2008/0146290 A1 | 6/2008 | Sreeram et al. |
| 2008/0147408 A1 | 6/2008 | Da Palma et al. |
| 2008/0147411 A1 | 6/2008 | Dames et al. |
| 2008/0147874 A1 | 6/2008 | Yoneda et al. |
| 2008/0150900 A1 | 6/2008 | Han |
| 2008/0154577 A1 | 6/2008 | Kim et al. |
| 2008/0154600 A1 | 6/2008 | Tian et al. |
| 2008/0154612 A1 | 6/2008 | Evermann et al. |
| 2008/0154828 A1 | 6/2008 | Antebi et al. |
| 2008/0157867 A1 | 7/2008 | Krah |
| 2008/0161113 A1 | 7/2008 | Hansen et al. |
| 2008/0162120 A1 | 7/2008 | Mactavish et al. |
| 2008/0163119 A1 | 7/2008 | Kim et al. |
| 2008/0163131 A1 | 7/2008 | Hirai et al. |
| 2008/0165144 A1 | 7/2008 | Forstall et al. |
| 2008/0165980 A1 | 7/2008 | Pavlovic et al. |
| 2008/0165998 A1 | 7/2008 | Caren et al. |
| 2008/0167013 A1 | 7/2008 | Novick et al. |
| 2008/0167858 A1 | 7/2008 | Christie et al. |
| 2008/0168052 A1 | 7/2008 | Ott et al. |
| 2008/0168366 A1 | 7/2008 | Kocienda et al. |
| 2008/0183473 A1 | 7/2008 | Nagano et al. |
| 2008/0186960 A1 | 8/2008 | Kocheisen et al. |
| 2008/0189099 A1 | 8/2008 | Friedman et al. |
| 2008/0189106 A1 | 8/2008 | Low et al. |
| 2008/0189110 A1 | 8/2008 | Freeman et al. |
| 2008/0189114 A1 | 8/2008 | Fail et al. |
| 2008/0189606 A1 | 8/2008 | Rybak |
| 2008/0195312 A1 | 8/2008 | Aaron et al. |
| 2008/0195388 A1 | 8/2008 | Bower et al. |
| 2008/0195391 A1 | 8/2008 | Marple et al. |
| 2008/0195601 A1 | 8/2008 | Ntoulas et al. |
| 2008/0195630 A1 | 8/2008 | Exartier et al. |
| 2008/0195940 A1 | 8/2008 | Gail et al. |
| 2008/0200142 A1 | 8/2008 | Abdel-Kader et al. |
| 2008/0201306 A1 | 8/2008 | Cooper et al. |
| 2008/0201375 A1 | 8/2008 | Khedouri et al. |
| 2008/0204379 A1 | 8/2008 | Perez-Noguera |
| 2008/0207176 A1 | 8/2008 | Brackbill et al. |
| 2008/0208585 A1 | 8/2008 | Ativanichayaphong et al. |
| 2008/0208587 A1 | 8/2008 | Ben-David et al. |
| 2008/0208864 A1 | 8/2008 | Cucerzan et al. |
| 2008/0212796 A1 | 9/2008 | Denda |
| 2008/0219641 A1 | 9/2008 | Sandrew et al. |
| 2008/0221866 A1 | 9/2008 | Katragadda et al. |
| 2008/0221879 A1 | 9/2008 | Cerra et al. |
| 2008/0221880 A1 | 9/2008 | Cerra et al. |
| 2008/0221887 A1 | 9/2008 | Rose et al. |
| 2008/0221889 A1 | 9/2008 | Cerra et al. |
| 2008/0221903 A1 | 9/2008 | Kanevsky et al. |
| 2008/0222118 A1 | 9/2008 | Scian et al. |
| 2008/0226130 A1 | 9/2008 | Kansal et al. |
| 2008/0228463 A1 | 9/2008 | Mori et al. |
| 2008/0228485 A1 | 9/2008 | Owen |
| 2008/0228490 A1 | 9/2008 | Fischer et al. |
| 2008/0228495 A1 | 9/2008 | Cross et al. |
| 2008/0228496 A1 | 9/2008 | Yu et al. |
| 2008/0228928 A1 | 9/2008 | Donelli et al. |
| 2008/0229185 A1 | 9/2008 | Lynch |
| 2008/0229218 A1 | 9/2008 | Maeng |
| 2008/0235017 A1 | 9/2008 | Satomura et al. |
| 2008/0235024 A1 | 9/2008 | Goldberg et al. |
| 2008/0235027 A1 | 9/2008 | Cross |
| 2008/0240569 A1 | 10/2008 | Tonouchi |
| 2008/0242280 A1 | 10/2008 | Shapiro et al. |
| 2008/0244390 A1 | 10/2008 | Fux et al. |
| 2008/0244446 A1 | 10/2008 | Lefevre et al. |
| 2008/0247519 A1 | 10/2008 | Abella et al. |
| 2008/0247529 A1 | 10/2008 | Barton et al. |
| 2008/0248797 A1 | 10/2008 | Freeman et al. |
| 2008/0249770 A1 | 10/2008 | Kim et al. |
| 2008/0249778 A1 | 10/2008 | Barton et al. |
| 2008/0253577 A1 | 10/2008 | Eppolito |
| 2008/0254425 A1 | 10/2008 | Cohen et al. |
| 2008/0255837 A1 | 10/2008 | Kahn et al. |
| 2008/0255842 A1 | 10/2008 | Simhi et al. |
| 2008/0255845 A1 | 10/2008 | Bennett |
| 2008/0256613 A1 | 10/2008 | Grover |
| 2008/0259022 A1 | 10/2008 | Mansfield et al. |
| 2008/0262828 A1 | 10/2008 | Och et al. |
| 2008/0262838 A1 | 10/2008 | Nurminen et al. |
| 2008/0262846 A1 | 10/2008 | Burns et al. |
| 2008/0263139 A1 | 10/2008 | Martin |
| 2008/0270118 A1 | 10/2008 | Kuo et al. |
| 2008/0270138 A1 | 10/2008 | Knight et al. |
| 2008/0270139 A1 | 10/2008 | Shi et al. |
| 2008/0270140 A1 | 10/2008 | Hertz et al. |
| 2008/0270151 A1 | 10/2008 | Mahoney et al. |
| 2008/0277473 A1 | 11/2008 | Kotlarsky et al. |
| 2008/0281510 A1 | 11/2008 | Shahine |
| 2008/0288259 A1 | 11/2008 | Chambers et al. |
| 2008/0288460 A1 | 11/2008 | Poniatowski et al. |
| 2008/0292112 A1 | 11/2008 | Valenzuela et al. |
| 2008/0294418 A1 | 11/2008 | Cleary et al. |
| 2008/0294651 A1 | 11/2008 | Masuyama et al. |
| 2008/0294981 A1 | 11/2008 | Balzano et al. |
| 2008/0298563 A1 | 12/2008 | Rondeau et al. |
| 2008/0298766 A1 | 12/2008 | Wen et al. |
| 2008/0299523 A1 | 12/2008 | Chai et al. |
| 2008/0300871 A1 | 12/2008 | Gilbert |
| 2008/0300878 A1 | 12/2008 | Bennett |
| 2008/0303645 A1 | 12/2008 | Seymour et al. |
| 2008/0306727 A1 | 12/2008 | Thurmair et al. |
| 2008/0312909 A1 | 12/2008 | Hermansen et al. |
| 2008/0312928 A1 | 12/2008 | Goebel et al. |
| 2008/0313335 A1 | 12/2008 | Jung et al. |
| 2008/0316183 A1 | 12/2008 | Westerman et al. |
| 2008/0319738 A1 | 12/2008 | Liu et al. |
| 2008/0319753 A1 | 12/2008 | Hancock |
| 2008/0319763 A1 | 12/2008 | Di Fabbrizio et al. |
| 2008/0319783 A1 | 12/2008 | Yao et al. |
| 2009/0003115 A1 | 1/2009 | Lindahl et al. |
| 2009/0005012 A1 | 1/2009 | Van Heugten |
| 2009/0005891 A1 | 1/2009 | Batson et al. |
| 2009/0006097 A1 | 1/2009 | Etezadi et al. |
| 2009/0006099 A1 | 1/2009 | Sharpe et al. |
| 2009/0006100 A1 | 1/2009 | Badger et al. |
| 2009/0006343 A1 | 1/2009 | Platt et al. |
| 2009/0006345 A1 | 1/2009 | Platt et al. |
| 2009/0006488 A1 | 1/2009 | Lindahl et al. |
| 2009/0006671 A1 | 1/2009 | Batson et al. |
| 2009/0007001 A1 | 1/2009 | Morin et al. |
| 2009/0011709 A1 | 1/2009 | Akasaka et al. |
| 2009/0012748 A1 | 1/2009 | Beish et al. |
| 2009/0012775 A1 | 1/2009 | El Hady et al. |
| 2009/0018828 A1 | 1/2009 | Nakadai et al. |
| 2009/0018829 A1 | 1/2009 | Kuperstein |
| 2009/0018834 A1 | 1/2009 | Cooper et al. |
| 2009/0018835 A1 | 1/2009 | Cooper et al. |
| 2009/0018839 A1 | 1/2009 | Cooper et al. |

(56) References Cited

U.S. PATENT DOCUMENTS

| | | |
|---|---|---|
| 2009/0018840 A1 | 1/2009 | Lutz et al. |
| 2009/0022329 A1 | 1/2009 | Mahowald |
| 2009/0024595 A1 | 1/2009 | Chen |
| 2009/0028435 A1 | 1/2009 | Wu et al. |
| 2009/0030800 A1 | 1/2009 | Grois |
| 2009/0030978 A1 | 1/2009 | Johnson et al. |
| 2009/0043580 A1 | 2/2009 | Mozer et al. |
| 2009/0043583 A1 | 2/2009 | Agapi et al. |
| 2009/0043763 A1 | 2/2009 | Peng |
| 2009/0044094 A1 | 2/2009 | Rapp et al. |
| 2009/0048821 A1 | 2/2009 | Yam et al. |
| 2009/0048845 A1 | 2/2009 | Burckart et al. |
| 2009/0049067 A1 | 2/2009 | Murray |
| 2009/0055168 A1 | 2/2009 | Wu et al. |
| 2009/0055175 A1 | 2/2009 | Terrell et al. |
| 2009/0055179 A1 | 2/2009 | Cho et al. |
| 2009/0055186 A1 | 2/2009 | Lance et al. |
| 2009/0055381 A1 | 2/2009 | Wu et al. |
| 2009/0058823 A1 | 3/2009 | Kocienda |
| 2009/0058860 A1 | 3/2009 | Fong et al. |
| 2009/0060351 A1 | 3/2009 | Li et al. |
| 2009/0060472 A1 | 3/2009 | Bull et al. |
| 2009/0063974 A1 | 3/2009 | Bull et al. |
| 2009/0064031 A1 | 3/2009 | Bull et al. |
| 2009/0070097 A1 | 3/2009 | Wu et al. |
| 2009/0070102 A1 | 3/2009 | Maegawa |
| 2009/0070109 A1 | 3/2009 | Didcock et al. |
| 2009/0070114 A1 | 3/2009 | Staszak |
| 2009/0074214 A1 | 3/2009 | Bradford et al. |
| 2009/0076792 A1 | 3/2009 | Lawson-Tancred |
| 2009/0076796 A1 | 3/2009 | Daraselia |
| 2009/0076819 A1 | 3/2009 | Wouters et al. |
| 2009/0076821 A1 | 3/2009 | Brenner et al. |
| 2009/0076825 A1 | 3/2009 | Bradford et al. |
| 2009/0077165 A1 | 3/2009 | Rhodes et al. |
| 2009/0079622 A1 | 3/2009 | Seshadri et al. |
| 2009/0083034 A1 | 3/2009 | Hernandez et al. |
| 2009/0083035 A1 | 3/2009 | Huang et al. |
| 2009/0083036 A1 | 3/2009 | Zhao et al. |
| 2009/0083037 A1 | 3/2009 | Gleason et al. |
| 2009/0083047 A1 | 3/2009 | Lindahl et al. |
| 2009/0089058 A1 | 4/2009 | Bellegarda |
| 2009/0092239 A1 | 4/2009 | Macwan et al. |
| 2009/0092260 A1 | 4/2009 | Powers |
| 2009/0092261 A1 | 4/2009 | Bard |
| 2009/0092262 A1 | 4/2009 | Costa et al. |
| 2009/0094029 A1 | 4/2009 | Koch et al. |
| 2009/0094033 A1 | 4/2009 | Mozer et al. |
| 2009/0097634 A1 | 4/2009 | Nambiar et al. |
| 2009/0097637 A1 | 4/2009 | Boscher et al. |
| 2009/0100049 A1 | 4/2009 | Cao |
| 2009/0100454 A1 | 4/2009 | Weber |
| 2009/0104898 A1 | 4/2009 | Harris |
| 2009/0106026 A1 | 4/2009 | Ferrieux |
| 2009/0106376 A1 | 4/2009 | Tom et al. |
| 2009/0106397 A1 | 4/2009 | O'Keefe |
| 2009/0112572 A1 | 4/2009 | Thorn |
| 2009/0112576 A1 | 4/2009 | Jackson et al. |
| 2009/0112592 A1 | 4/2009 | Candelore et al. |
| 2009/0112677 A1 | 4/2009 | Rhett |
| 2009/0112892 A1 | 4/2009 | Cardie et al. |
| 2009/0119587 A1 | 5/2009 | Allen et al. |
| 2009/0123021 A1 | 5/2009 | Jung et al. |
| 2009/0123071 A1 | 5/2009 | Iwasaki |
| 2009/0125477 A1 | 5/2009 | Lu et al. |
| 2009/0128505 A1 | 5/2009 | Partridge et al. |
| 2009/0132253 A1 | 5/2009 | Bellegarda |
| 2009/0132255 A1 | 5/2009 | Lu |
| 2009/0137286 A1 | 5/2009 | Luke et al. |
| 2009/0138736 A1 | 5/2009 | Chin |
| 2009/0138828 A1 | 5/2009 | Schultz et al. |
| 2009/0144049 A1 | 6/2009 | Haddad et al. |
| 2009/0144428 A1 | 6/2009 | Bowater et al. |
| 2009/0144609 A1 | 6/2009 | Liang et al. |
| 2009/0146848 A1 | 6/2009 | Ghassabian |
| 2009/0150147 A1 | 6/2009 | Jacoby et al. |
| 2009/0150156 A1 | 6/2009 | Kennewick et al. |
| 2009/0152349 A1 | 6/2009 | Bonev et al. |
| 2009/0153288 A1 | 6/2009 | Hope et al. |
| 2009/0154669 A1 | 6/2009 | Wood et al. |
| 2009/0157382 A1 | 6/2009 | Bar |
| 2009/0157384 A1 | 6/2009 | Toutanova et al. |
| 2009/0157401 A1 | 6/2009 | Bennett |
| 2009/0158200 A1 | 6/2009 | Palahnuk et al. |
| 2009/0158323 A1 | 6/2009 | Bober et al. |
| 2009/0158423 A1 | 6/2009 | Orlassino et al. |
| 2009/0160803 A1 | 6/2009 | Hashimoto |
| 2009/0164301 A1 | 6/2009 | O'Sullivan et al. |
| 2009/0164441 A1 | 6/2009 | Cheyer |
| 2009/0164655 A1 | 6/2009 | Pettersson et al. |
| 2009/0164937 A1 | 6/2009 | Alviar et al. |
| 2009/0167508 A1 | 7/2009 | Fadell et al. |
| 2009/0167509 A1 | 7/2009 | Fadell et al. |
| 2009/0171578 A1 | 7/2009 | Kim et al. |
| 2009/0171662 A1 | 7/2009 | Huang et al. |
| 2009/0171664 A1 | 7/2009 | Kennewick et al. |
| 2009/0172108 A1 | 7/2009 | Singh |
| 2009/0172542 A1 | 7/2009 | Girish et al. |
| 2009/0174667 A1 | 7/2009 | Kocienda et al. |
| 2009/0174677 A1 | 7/2009 | Gehani et al. |
| 2009/0177300 A1 | 7/2009 | Lee |
| 2009/0177461 A1 | 7/2009 | Ehsani et al. |
| 2009/0177966 A1 | 7/2009 | Chaudhri |
| 2009/0182445 A1 | 7/2009 | Girish et al. |
| 2009/0187402 A1 | 7/2009 | Scholl |
| 2009/0187577 A1 | 7/2009 | Reznik et al. |
| 2009/0187950 A1 | 7/2009 | Nicas et al. |
| 2009/0191895 A1 | 7/2009 | Singh et al. |
| 2009/0192782 A1 | 7/2009 | Drewes |
| 2009/0192787 A1 | 7/2009 | Roon |
| 2009/0198497 A1 | 8/2009 | Kwon |
| 2009/0204409 A1 | 8/2009 | Mozer et al. |
| 2009/0204478 A1 | 8/2009 | Kaib et al. |
| 2009/0204596 A1 | 8/2009 | Brun et al. |
| 2009/0204601 A1 | 8/2009 | Grasset |
| 2009/0204620 A1 | 8/2009 | Thione et al. |
| 2009/0210230 A1 | 8/2009 | Schwarz et al. |
| 2009/0210232 A1 | 8/2009 | Sanchez et al. |
| 2009/0213134 A1 | 8/2009 | Stephanick et al. |
| 2009/0215503 A1 | 8/2009 | Zhang et al. |
| 2009/0216396 A1 | 8/2009 | Yamagata |
| 2009/0216540 A1 | 8/2009 | Tessel et al. |
| 2009/0216704 A1 | 8/2009 | Zheng et al. |
| 2009/0221274 A1 | 9/2009 | Venkatakrishnan et al. |
| 2009/0222257 A1 | 9/2009 | Sumita et al. |
| 2009/0222270 A2 | 9/2009 | Likens et al. |
| 2009/0222488 A1 | 9/2009 | Boerries et al. |
| 2009/0228126 A1 | 9/2009 | Spielberg et al. |
| 2009/0228273 A1 | 9/2009 | Wang et al. |
| 2009/0228277 A1 | 9/2009 | Bonforte et al. |
| 2009/0228281 A1 | 9/2009 | Singleton et al. |
| 2009/0228439 A1 | 9/2009 | Manolescu et al. |
| 2009/0228792 A1 | 9/2009 | Van Os et al. |
| 2009/0228842 A1 | 9/2009 | Westerman et al. |
| 2009/0234638 A1 | 9/2009 | Ranjan et al. |
| 2009/0234655 A1 | 9/2009 | Kwon |
| 2009/0235280 A1 | 9/2009 | Tannier et al. |
| 2009/0239202 A1 | 9/2009 | Stone |
| 2009/0239552 A1 | 9/2009 | Churchill et al. |
| 2009/0240485 A1 | 9/2009 | Dalal et al. |
| 2009/0241054 A1 | 9/2009 | Hendricks |
| 2009/0241760 A1 | 10/2009 | Georges |
| 2009/0247237 A1 | 10/2009 | Mittleman et al. |
| 2009/0248182 A1 | 10/2009 | Logan et al. |
| 2009/0248395 A1 | 10/2009 | Alewine et al. |
| 2009/0248402 A1 | 10/2009 | Ito et al. |
| 2009/0248420 A1 | 10/2009 | Basir et al. |
| 2009/0248422 A1 | 10/2009 | Li et al. |
| 2009/0249198 A1 | 10/2009 | Davis et al. |
| 2009/0249247 A1 | 10/2009 | Tseng et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |

(56) References Cited

U.S. PATENT DOCUMENTS

| | | |
|---|---|---|
| 2009/0254345 A1 | 10/2009 | Fleizach et al. |
| 2009/0254819 A1 | 10/2009 | Song et al. |
| 2009/0254823 A1 | 10/2009 | Barrett |
| 2009/0259969 A1 | 10/2009 | Pallakoff |
| 2009/0265368 A1 | 10/2009 | Crider et al. |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0271188 A1 | 10/2009 | Agapi et al. |
| 2009/0271189 A1 | 10/2009 | Agapi et al. |
| 2009/0274315 A1 | 11/2009 | Carnes et al. |
| 2009/0281789 A1 | 11/2009 | Waibel et al. |
| 2009/0284482 A1 | 11/2009 | Chin |
| 2009/0286514 A1 | 11/2009 | Lichorowic et al. |
| 2009/0287583 A1 | 11/2009 | Holmes |
| 2009/0290718 A1 | 11/2009 | Kahn et al. |
| 2009/0292987 A1 | 11/2009 | Sorenson |
| 2009/0296552 A1 | 12/2009 | Hicks et al. |
| 2009/0298474 A1 | 12/2009 | George |
| 2009/0298529 A1 | 12/2009 | Mahajan |
| 2009/0299745 A1 | 12/2009 | Kennewick et al. |
| 2009/0299849 A1 | 12/2009 | Cao et al. |
| 2009/0300391 A1 | 12/2009 | Jessup et al. |
| 2009/0300488 A1 | 12/2009 | Salamon et al. |
| 2009/0304198 A1 | 12/2009 | Herre et al. |
| 2009/0306967 A1 | 12/2009 | Nicolov et al. |
| 2009/0306969 A1 | 12/2009 | Goud et al. |
| 2009/0306979 A1 | 12/2009 | Jaiswal et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306988 A1 | 12/2009 | Chen et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0307584 A1 | 12/2009 | Davidson et al. |
| 2009/0313014 A1 | 12/2009 | Shin et al. |
| 2009/0313023 A1 | 12/2009 | Jones |
| 2009/0313026 A1 | 12/2009 | Coffman et al. |
| 2009/0313544 A1 | 12/2009 | Wood et al. |
| 2009/0313564 A1 | 12/2009 | Rottler et al. |
| 2009/0316943 A1 | 12/2009 | Frigola Munoz et al. |
| 2009/0318119 A1 | 12/2009 | Basir et al. |
| 2009/0318198 A1 | 12/2009 | Carroll |
| 2009/0319266 A1 | 12/2009 | Brown et al. |
| 2009/0326923 A1 | 12/2009 | Yan et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004918 A1 | 1/2010 | Lee et al. |
| 2010/0004931 A1 | 1/2010 | Ma et al. |
| 2010/0005081 A1 | 1/2010 | Bennett |
| 2010/0010803 A1 | 1/2010 | Ishikawa et al. |
| 2010/0010814 A1 | 1/2010 | Patel |
| 2010/0013760 A1 | 1/2010 | Hirai et al. |
| 2010/0013796 A1 | 1/2010 | Abileah et al. |
| 2010/0017212 A1 | 1/2010 | Attwater et al. |
| 2010/0017382 A1 | 1/2010 | Katragadda et al. |
| 2010/0019834 A1 | 1/2010 | Zerbe et al. |
| 2010/0023318 A1 | 1/2010 | Lemoine |
| 2010/0023320 A1 | 1/2010 | Di Cristo et al. |
| 2010/0026526 A1 | 2/2010 | Yokota |
| 2010/0030549 A1 | 2/2010 | Lee et al. |
| 2010/0030928 A1 | 2/2010 | Conroy et al. |
| 2010/0031143 A1 | 2/2010 | Rao et al. |
| 2010/0036653 A1 | 2/2010 | Kim et al. |
| 2010/0036655 A1 | 2/2010 | Cecil et al. |
| 2010/0036660 A1 | 2/2010 | Bennett |
| 2010/0037183 A1 | 2/2010 | Miyashita et al. |
| 2010/0042400 A1 | 2/2010 | Block et al. |
| 2010/0042576 A1 | 2/2010 | Roettger et al. |
| 2010/0046842 A1 | 2/2010 | Conwell et al. |
| 2010/0049498 A1 | 2/2010 | Cao et al. |
| 2010/0049514 A1 | 2/2010 | Kennewick et al. |
| 2010/0050064 A1 | 2/2010 | Liu et al. |
| 2010/0054512 A1 | 3/2010 | Solum |
| 2010/0057457 A1 | 3/2010 | Ogata et al. |
| 2010/0057461 A1 | 3/2010 | Neubacher et al. |
| 2010/0057643 A1 | 3/2010 | Yang |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |
| 2010/0064113 A1 | 3/2010 | Lindahl et al. |
| 2010/0064218 A1 | 3/2010 | Bull et al. |
| 2010/0064226 A1 | 3/2010 | Stefaniak et al. |
| 2010/0067723 A1 | 3/2010 | Bergmann et al. |
| 2010/0067867 A1 | 3/2010 | Lin et al. |
| 2010/0070281 A1 | 3/2010 | Conkie et al. |
| 2010/0070899 A1 | 3/2010 | Hunt et al. |
| 2010/0071003 A1 | 3/2010 | Bychkov et al. |
| 2010/0076760 A1 | 3/2010 | Kraenzel et al. |
| 2010/0076993 A1 | 3/2010 | Klawitter et al. |
| 2010/0077350 A1 | 3/2010 | Lim et al. |
| 2010/0079501 A1 | 4/2010 | Ikeda et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082286 A1 | 4/2010 | Leung |
| 2010/0082327 A1 | 4/2010 | Rogers et al. |
| 2010/0082328 A1 | 4/2010 | Rogers et al. |
| 2010/0082329 A1 | 4/2010 | Silverman et al. |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1* | 4/2010 | Lindahl ............... G10L 15/30 704/270.1 |
| 2010/0098231 A1 | 4/2010 | Wohlert et al. |
| 2010/0100212 A1 | 4/2010 | Lindahl et al. |
| 2010/0100384 A1 | 4/2010 | Ju et al. |
| 2010/0100816 A1 | 4/2010 | Mccloskey et al. |
| 2010/0103776 A1 | 4/2010 | Chan |
| 2010/0106486 A1 | 4/2010 | Hua et al. |
| 2010/0106498 A1 | 4/2010 | Morrison et al. |
| 2010/0106500 A1 | 4/2010 | McKee et al. |
| 2010/0106503 A1 | 4/2010 | Farrell et al. |
| 2010/0114856 A1 | 5/2010 | Kuboyama |
| 2010/0121637 A1 | 5/2010 | Roy et al. |
| 2010/0125456 A1 | 5/2010 | Weng et al. |
| 2010/0125458 A1 | 5/2010 | Franco et al. |
| 2010/0125460 A1 | 5/2010 | Mellott et al. |
| 2010/0125811 A1 | 5/2010 | Moore et al. |
| 2010/0131269 A1 | 5/2010 | Park et al. |
| 2010/0131273 A1 | 5/2010 | Aley-Raz et al. |
| 2010/0131498 A1 | 5/2010 | Linthicum et al. |
| 2010/0131899 A1 | 5/2010 | Hubert |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0138680 A1 | 6/2010 | Brisebois et al. |
| 2010/0138759 A1 | 6/2010 | Roy |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0146442 A1 | 6/2010 | Nagasaka et al. |
| 2010/0150321 A1 | 6/2010 | Harris et al. |
| 2010/0153115 A1 | 6/2010 | Klee et al. |
| 2010/0153448 A1 | 6/2010 | Harpur et al. |
| 2010/0161313 A1 | 6/2010 | Karttunen |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169097 A1 | 7/2010 | Nachman et al. |
| 2010/0169098 A1 | 7/2010 | Patch |

(56) References Cited

U.S. PATENT DOCUMENTS

| | | |
|---|---|---|
| 2010/0171713 A1 | 7/2010 | Kwok et al. |
| 2010/0174544 A1 | 7/2010 | Heifets |
| 2010/0175066 A1 | 7/2010 | Paik |
| 2010/0179932 A1 | 7/2010 | Yoon et al. |
| 2010/0179991 A1 | 7/2010 | Lorch et al. |
| 2010/0180218 A1 | 7/2010 | Boston et al. |
| 2010/0185448 A1 | 7/2010 | Meisel |
| 2010/0185949 A1 | 7/2010 | Jaeger |
| 2010/0191520 A1 | 7/2010 | Gruhn et al. |
| 2010/0197359 A1 | 8/2010 | Harris |
| 2010/0199180 A1 | 8/2010 | Brichter et al. |
| 2010/0199215 A1 | 8/2010 | Seymour et al. |
| 2010/0204986 A1 | 8/2010 | Kennewick et al. |
| 2010/0211199 A1 | 8/2010 | Naik et al. |
| 2010/0216509 A1 | 8/2010 | Riemer et al. |
| 2010/0217604 A1 | 8/2010 | Baldwin et al. |
| 2010/0222033 A1 | 9/2010 | Scott et al. |
| 2010/0222098 A1 | 9/2010 | Garg |
| 2010/0223055 A1 | 9/2010 | Mclean |
| 2010/0223056 A1 | 9/2010 | Kadirkamanathan et al. |
| 2010/0223131 A1 | 9/2010 | Scott et al. |
| 2010/0225809 A1 | 9/2010 | Connors et al. |
| 2010/0228540 A1 | 9/2010 | Bennett |
| 2010/0228549 A1 | 9/2010 | Herman et al. |
| 2010/0228691 A1 | 9/2010 | Yang et al. |
| 2010/0229082 A1 | 9/2010 | Karmarkar et al. |
| 2010/0229100 A1 | 9/2010 | Miller et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0235729 A1 | 9/2010 | Kocienda et al. |
| 2010/0235732 A1 | 9/2010 | Bergman |
| 2010/0235770 A1 | 9/2010 | Ording et al. |
| 2010/0241418 A1 | 9/2010 | Maeda et al. |
| 2010/0250542 A1 | 9/2010 | Fujimaki |
| 2010/0250599 A1 | 9/2010 | Schmidt et al. |
| 2010/0255858 A1 | 10/2010 | Juhasz |
| 2010/0257160 A1 | 10/2010 | Cao |
| 2010/0257478 A1 | 10/2010 | Longe et al. |
| 2010/0262599 A1 | 10/2010 | Nitz |
| 2010/0268539 A1 | 10/2010 | Xu et al. |
| 2010/0269040 A1 | 10/2010 | Lee |
| 2010/0274753 A1 | 10/2010 | Liberty et al. |
| 2010/0277579 A1 | 11/2010 | Cho et al. |
| 2010/0278320 A1 | 11/2010 | Arsenault et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286985 A1 | 11/2010 | Kennewick et al. |
| 2010/0287514 A1 | 11/2010 | Cragun et al. |
| 2010/0293460 A1 | 11/2010 | Budelli |
| 2010/0295645 A1 | 11/2010 | Falldin et al. |
| 2010/0299133 A1 | 11/2010 | Kopparapu et al. |
| 2010/0299138 A1 | 11/2010 | Kim |
| 2010/0299142 A1 | 11/2010 | Freeman et al. |
| 2010/0302056 A1 | 12/2010 | Dutton et al. |
| 2010/0304342 A1 | 12/2010 | Zilber |
| 2010/0304705 A1 | 12/2010 | Hursey et al. |
| 2010/0305807 A1 | 12/2010 | Basir et al. |
| 2010/0305947 A1 | 12/2010 | Schwarz et al. |
| 2010/0312547 A1 | 12/2010 | Van Os et al. |
| 2010/0312566 A1 | 12/2010 | Odinak et al. |
| 2010/0318576 A1 | 12/2010 | Kim |
| 2010/0322438 A1 | 12/2010 | Siotis |
| 2010/0324709 A1 | 12/2010 | Starmen |
| 2010/0324895 A1 | 12/2010 | Kurzweil et al. |
| 2010/0324896 A1 | 12/2010 | Attwater et al. |
| 2010/0324905 A1 | 12/2010 | Kurzweil et al. |
| 2010/0325158 A1 | 12/2010 | Oral et al. |
| 2010/0325573 A1 | 12/2010 | Estrada et al. |
| 2010/0325588 A1 | 12/2010 | Reddy et al. |
| 2010/0332220 A1 | 12/2010 | Hursey et al. |
| 2010/0332224 A1 | 12/2010 | Mäkelä et al. |
| 2010/0332235 A1 | 12/2010 | David |
| 2010/0332236 A1 | 12/2010 | Tan |
| 2010/0332280 A1 | 12/2010 | Bradley et al. |
| 2010/0332348 A1 | 12/2010 | Cao |
| 2010/0332428 A1 | 12/2010 | Mchenry et al. |
| 2010/0332976 A1 | 12/2010 | Fux et al. |
| 2010/0333030 A1 | 12/2010 | Johns |
| 2010/0333163 A1 | 12/2010 | Daly |
| 2011/0002487 A1 | 1/2011 | Panther et al. |
| 2011/0004475 A1 | 1/2011 | Bellegarda |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0016150 A1 | 1/2011 | Engstrom et al. |
| 2011/0018695 A1 | 1/2011 | Bells et al. |
| 2011/0021211 A1 | 1/2011 | Ohki |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Waller et al. |
| 2011/0022394 A1 | 1/2011 | Wide et al. |
| 2011/0022472 A1 | 1/2011 | Zon et al. |
| 2011/0022952 A1 | 1/2011 | Wu et al. |
| 2011/0029616 A1 | 2/2011 | Wang et al. |
| 2011/0033064 A1 | 2/2011 | Johnson et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg et al. |
| 2011/0060807 A1 | 3/2011 | Martin et al. |
| 2011/0064387 A1 | 3/2011 | Mendeloff et al. |
| 2011/0065456 A1 | 3/2011 | Brennan et al. |
| 2011/0066366 A1 | 3/2011 | Ellanti et al. |
| 2011/0066468 A1 | 3/2011 | Huang et al. |
| 2011/0066634 A1 | 3/2011 | Phillips et al. |
| 2011/0072492 A1 | 3/2011 | Mohler et al. |
| 2011/0076994 A1 | 3/2011 | Kim et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0090078 A1 | 4/2011 | Kim et al. |
| 2011/0093261 A1 | 4/2011 | Angott |
| 2011/0093265 A1 | 4/2011 | Stent et al. |
| 2011/0093271 A1 | 4/2011 | Bernard et al. |
| 2011/0099000 A1 | 4/2011 | Rai et al. |
| 2011/0103682 A1 | 5/2011 | Chidlovskii et al. |
| 2011/0106736 A1 | 5/2011 | Aharonson et al. |
| 2011/0106892 A1 | 5/2011 | Nelson et al. |
| 2011/0110502 A1 | 5/2011 | Daye et al. |
| 2011/0112827 A1 | 5/2011 | Kennewick et al. |
| 2011/0112837 A1 | 5/2011 | Kurki-Suonio et al. |
| 2011/0112921 A1 | 5/2011 | Kennewick et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119715 A1 | 5/2011 | Chang et al. |
| 2011/0123004 A1 | 5/2011 | Chang et al. |
| 2011/0125498 A1 | 5/2011 | Pickering et al. |
| 2011/0125540 A1 | 5/2011 | Jang et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0141141 A1 | 6/2011 | Kankainen |
| 2011/0143811 A1 | 6/2011 | Rodriguez |
| 2011/0144857 A1 | 6/2011 | Wingrove et al. |
| 2011/0144901 A1 | 6/2011 | Wang |

(56) References Cited

U.S. PATENT DOCUMENTS

| | | |
|---|---|---|
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151830 A1 | 6/2011 | Blanda et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153330 A1 | 6/2011 | Yazdani et al. |
| 2011/0153373 A1 | 6/2011 | Dantzig et al. |
| 2011/0154193 A1 | 6/2011 | Creutz et al. |
| 2011/0157029 A1 | 6/2011 | Tseng |
| 2011/0161072 A1 | 6/2011 | Terao et al. |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0167350 A1 | 7/2011 | Hoellwarth |
| 2011/0175810 A1 | 7/2011 | Markovic et al. |
| 2011/0179002 A1 | 7/2011 | Dumitru et al. |
| 2011/0179372 A1 | 7/2011 | Moore et al. |
| 2011/0183650 A1 | 7/2011 | Mckee et al. |
| 2011/0184721 A1 | 7/2011 | Subramanian et al. |
| 2011/0184730 A1 | 7/2011 | LeBeau et al. |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0197128 A1 | 8/2011 | Assadollahi et al. |
| 2011/0201385 A1 | 8/2011 | Higginbotham et al. |
| 2011/0201387 A1 | 8/2011 | Paek et al. |
| 2011/0202526 A1 | 8/2011 | Lee et al. |
| 2011/0205149 A1 | 8/2011 | Tom et al. |
| 2011/0208511 A1 | 8/2011 | Sikstrom et al. |
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231432 A1 | 9/2011 | Sata et al. |
| 2011/0231474 A1 | 9/2011 | Locker et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |
| 2011/0242007 A1 | 10/2011 | Gray et al. |
| 2011/0244888 A1* | 10/2011 | Ohki .............. G01C 21/362 455/456.2 |
| 2011/0246471 A1 | 10/2011 | Rakib et al. |
| 2011/0249144 A1 | 10/2011 | Chang |
| 2011/0250570 A1 | 10/2011 | Mack et al. |
| 2011/0258188 A1 | 10/2011 | Abdalmageed et al. |
| 2011/0260861 A1 | 10/2011 | Singh et al. |
| 2011/0264643 A1 | 10/2011 | Cao |
| 2011/0274303 A1 | 11/2011 | Filson et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0282888 A1 | 11/2011 | Koperski et al. |
| 2011/0282906 A1 | 11/2011 | Wong |
| 2011/0288861 A1 | 11/2011 | Kurzweil et al. |
| 2011/0298585 A1 | 12/2011 | Barry |
| 2011/0301943 A1 | 12/2011 | Patch |
| 2011/0302162 A1 | 12/2011 | Xiao et al. |
| 2011/0306426 A1 | 12/2011 | Novak et al. |
| 2011/0307241 A1 | 12/2011 | Waibel et al. |
| 2011/0307491 A1 | 12/2011 | Fisk et al. |
| 2011/0307810 A1 | 12/2011 | Hilerio et al. |
| 2011/0313775 A1 | 12/2011 | Laligand et al. |
| 2011/0314032 A1 | 12/2011 | Bennett et al. |
| 2011/0314404 A1 | 12/2011 | Kotler et al. |
| 2011/0320187 A1 | 12/2011 | Motik et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0036556 A1 | 2/2012 | LeBeau et al. |
| 2012/0039539 A1 | 2/2012 | Boiman et al. |
| 2012/0041752 A1 | 2/2012 | Wang et al. |
| 2012/0042014 A1 | 2/2012 | Desai et al. |
| 2012/0042343 A1 | 2/2012 | Laligand et al. |
| 2012/0053815 A1 | 3/2012 | Montanari et al. |
| 2012/0053945 A1 | 3/2012 | Gupta et al. |
| 2012/0056815 A1 | 3/2012 | Mehra |
| 2012/0059655 A1 | 3/2012 | Cartales |
| 2012/0066581 A1 | 3/2012 | Spalink |
| 2012/0078624 A1 | 3/2012 | Yook et al. |
| 2012/0078627 A1 | 3/2012 | Wagner |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0108221 A1 | 5/2012 | Thomas et al. |
| 2012/0116770 A1 | 5/2012 | Chen et al. |
| 2012/0117499 A1 | 5/2012 | Mori et al. |
| 2012/0124126 A1 | 5/2012 | Alcazar et al. |
| 2012/0128322 A1 | 5/2012 | Shaffer et al. |
| 2012/0136572 A1 | 5/2012 | Norton |
| 2012/0136985 A1 | 5/2012 | Popescu et al. |
| 2012/0137367 A1 | 5/2012 | Dupont et al. |
| 2012/0149394 A1 | 6/2012 | Singh et al. |
| 2012/0150580 A1 | 6/2012 | Norton |
| 2012/0158293 A1 | 6/2012 | Burnham |
| 2012/0158422 A1 | 6/2012 | Burnham et al. |
| 2012/0159380 A1 | 6/2012 | Kocienda et al. |
| 2012/0163710 A1 | 6/2012 | Skaff et al. |
| 2012/0166196 A1 | 6/2012 | Ju et al. |
| 2012/0173464 A1 | 7/2012 | Tur et al. |
| 2012/0174121 A1 | 7/2012 | Treat et al. |
| 2012/0179457 A1 | 7/2012 | Newman et al. |
| 2012/0185237 A1 | 7/2012 | Gajic et al. |
| 2012/0185781 A1 | 7/2012 | Guzman et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197995 A1 | 8/2012 | Caruso |
| 2012/0197998 A1 | 8/2012 | Kessel et al. |
| 2012/0201362 A1 | 8/2012 | Crosson et al. |

(56) References Cited

U.S. PATENT DOCUMENTS

| | | |
|---|---|---|
| 2012/0209853 A1 | 8/2012 | Desai et al. |
| 2012/0209874 A1 | 8/2012 | Wong et al. |
| 2012/0214141 A1 | 8/2012 | Raya et al. |
| 2012/0214517 A1 | 8/2012 | Singh et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0254143 A1 | 10/2012 | Varma et al. |
| 2012/0254152 A1 | 10/2012 | Park et al. |
| 2012/0254290 A1 | 10/2012 | Naaman |
| 2012/0265528 A1 | 10/2012 | Gruber et al. |
| 2012/0265535 A1 | 10/2012 | Bryant-Rich et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0284027 A1 | 11/2012 | Mallett et al. |
| 2012/0290300 A1 | 11/2012 | Lee et al. |
| 2012/0295708 A1 | 11/2012 | Hernandez-Abrego et al. |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316878 A1 | 12/2012 | Singleton et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0324391 A1 | 12/2012 | Tocci et al. |
| 2012/0327009 A1 | 12/2012 | Fleizach |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007648 A1 | 1/2013 | Gamon et al. |
| 2013/0013313 A1 | 1/2013 | Shechtman et al. |
| 2013/0027875 A1 | 1/2013 | Zhu et al. |
| 2013/0030804 A1 | 1/2013 | Zavaliagko et al. |
| 2013/0030815 A1 | 1/2013 | Madhvanath et al. |
| 2013/0035942 A1 | 2/2013 | Kim et al. |
| 2013/0035961 A1 | 2/2013 | Yegnanarayanan |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041968 A1 | 2/2013 | Cohen et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054706 A1 | 2/2013 | Graham et al. |
| 2013/0055099 A1 | 2/2013 | Yao et al. |
| 2013/0055147 A1 | 2/2013 | Vasudev et al. |
| 2013/0066832 A1 | 3/2013 | Sheehan et al. |
| 2013/0067307 A1 | 3/2013 | Tian et al. |
| 2013/0073286 A1 | 3/2013 | Bastea-Forte et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0085755 A1 | 4/2013 | Bringert et al. |
| 2013/0085761 A1 | 4/2013 | Bringert et al. |
| 2013/0090921 A1 | 4/2013 | Liu et al. |
| 2013/0091090 A1 | 4/2013 | Spivack et al. |
| 2013/0095805 A1 | 4/2013 | Lebeau et al. |
| 2013/0097566 A1 | 4/2013 | Berglund |
| 2013/0103391 A1 | 4/2013 | Millmore et al. |
| 2013/0106742 A1 | 5/2013 | Lee et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1* | 5/2013 | Cheyer ............... G06F 17/3087 704/275 |
| 2013/0110520 A1 | 5/2013 | Cheyer et al. |
| 2013/0111348 A1 | 5/2013 | Gruber et al. |
| 2013/0111487 A1 | 5/2013 | Cheyer et al. |
| 2013/0115927 A1 | 5/2013 | Gruber et al. |
| 2013/0117022 A1 | 5/2013 | Chen et al. |
| 2013/0124189 A1 | 5/2013 | Baldwin et al. |
| 2013/0132089 A1 | 5/2013 | Fanty et al. |
| 2013/0132871 A1 | 5/2013 | Zeng et al. |
| 2013/0144594 A1 | 6/2013 | Bangalore et al. |
| 2013/0144616 A1 | 6/2013 | Bangalore et al. |
| 2013/0151339 A1 | 6/2013 | Kim et al. |
| 2013/0152092 A1 | 6/2013 | Yadgar et al. |
| 2013/0158977 A1 | 6/2013 | Senior |
| 2013/0165232 A1 | 6/2013 | Nelson et al. |
| 2013/0166442 A1 | 6/2013 | Nakajima et al. |
| 2013/0170738 A1 | 7/2013 | Capuozzo et al. |
| 2013/0172022 A1 | 7/2013 | Seymour et al. |
| 2013/0176592 A1 | 7/2013 | Sasaki |
| 2013/0179440 A1 | 7/2013 | Gordon |
| 2013/0185059 A1 | 7/2013 | Riccardi et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0191117 A1 | 7/2013 | Atti et al. |
| 2013/0197911 A1 | 8/2013 | Wei et al. |
| 2013/0218553 A1 | 8/2013 | Fujii et al. |
| 2013/0218560 A1 | 8/2013 | Hsiao et al. |
| 2013/0225128 A1 | 8/2013 | Gomar |
| 2013/0231917 A1 | 9/2013 | Naik |
| 2013/0235987 A1 | 9/2013 | Arroniz-Escobar et al. |
| 2013/0238647 A1 | 9/2013 | Thompson |
| 2013/0244615 A1 | 9/2013 | Miller et al. |
| 2013/0246048 A1 | 9/2013 | Nagase et al. |
| 2013/0253911 A1 | 9/2013 | Petri et al. |
| 2013/0253912 A1 | 9/2013 | Medlock et al. |
| 2013/0275117 A1 | 10/2013 | Winer |
| 2013/0275138 A1 | 10/2013 | Gruber et al. |
| 2013/0275164 A1 | 10/2013 | Gruber et al. |
| 2013/0275875 A1 | 10/2013 | Gruber et al. |
| 2013/0275899 A1* | 10/2013 | Schubert ............... G06F 3/0481 715/765 |
| 2013/0283168 A1 | 10/2013 | Brown et al. |
| 2013/0289991 A1 | 10/2013 | Eshwar et al. |
| 2013/0289993 A1 | 10/2013 | Rao et al. |
| 2013/0289994 A1 | 10/2013 | Newman et al. |
| 2013/0297319 A1 | 11/2013 | Kim |
| 2013/0297348 A1 | 11/2013 | Cardoza et al. |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |

(56) References Cited

U.S. PATENT DOCUMENTS

| | | |
|---|---|---|
| 2013/0311997 A1 | 11/2013 | Gruber et al. |
| 2013/0322634 A1 | 12/2013 | Bennett et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325481 A1 | 12/2013 | Van Os et al. |
| 2013/0325484 A1 | 12/2013 | Chakladar et al. |
| 2013/0325979 A1 | 12/2013 | Mansfield et al. |
| 2013/0329023 A1 | 12/2013 | Suplee, III et al. |
| 2013/0332164 A1 | 12/2013 | Nalk |
| 2013/0332168 A1 | 12/2013 | Kim et al. |
| 2013/0332400 A1 | 12/2013 | González |
| 2013/0346068 A1 | 12/2013 | Solem et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006030 A1 | 1/2014 | Fleizach et al. |
| 2014/0006153 A1 | 1/2014 | Thangam et al. |
| 2014/0012580 A1 | 1/2014 | Ganong et al. |
| 2014/0019116 A1 | 1/2014 | Lundberg et al. |
| 2014/0019133 A1 | 1/2014 | Bao et al. |
| 2014/0028735 A1 | 1/2014 | Williams et al. |
| 2014/0033071 A1 | 1/2014 | Gruber et al. |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040918 A1 | 2/2014 | Li et al. |
| 2014/0046934 A1 | 2/2014 | Zhou et al. |
| 2014/0052791 A1 | 2/2014 | Chakra et al. |
| 2014/0053082 A1 | 2/2014 | Park et al. |
| 2014/0059030 A1 | 2/2014 | Hakkani-Tur et al. |
| 2014/0067371 A1 | 3/2014 | Liensberger |
| 2014/0068751 A1 | 3/2014 | Last et al. |
| 2014/0074470 A1 | 3/2014 | Jansche et al. |
| 2014/0074472 A1 | 3/2014 | Lin et al. |
| 2014/0074815 A1 | 3/2014 | Plimton |
| 2014/0078065 A1 | 3/2014 | Akkok et al. |
| 2014/0080428 A1 | 3/2014 | Rhoads et al. |
| 2014/0081633 A1 | 3/2014 | Badaskar et al. |
| 2014/0082501 A1 | 3/2014 | Bae et al. |
| 2014/0086458 A1 | 3/2014 | Rogers et al. |
| 2014/0087711 A1 | 3/2014 | Geyer et al. |
| 2014/0095171 A1 | 4/2014 | Lynch et al. |
| 2014/0098247 A1 | 4/2014 | Rao et al. |
| 2014/0108017 A1 | 4/2014 | Mason et al. |
| 2014/0114554 A1 | 4/2014 | Lagassey |
| 2014/0118155 A1 | 5/2014 | Bowers et al. |
| 2014/0122086 A1 | 5/2014 | Kapur et al. |
| 2014/0135036 A1 | 5/2014 | Bonanni et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0142923 A1 | 5/2014 | Jones et al. |
| 2014/0143550 A1 | 5/2014 | Ganong, III et al. |
| 2014/0143721 A1 | 5/2014 | Suzuki et al. |
| 2014/0146200 A1 | 5/2014 | Scott et al. |
| 2014/0152577 A1 | 6/2014 | Yuen et al. |
| 2014/0155031 A1 | 6/2014 | Lee et al. |
| 2014/0157422 A1 | 6/2014 | Livshits et al. |
| 2014/0163951 A1 | 6/2014 | Nikoulina et al. |
| 2014/0164532 A1 | 6/2014 | Lynch et al. |
| 2014/0173460 A1 | 6/2014 | Kim |
| 2014/0180689 A1 | 6/2014 | Kim et al. |
| 2014/0188477 A1 | 7/2014 | Zhang |
| 2014/0195251 A1 | 7/2014 | Zeinstra et al. |
| 2014/0195252 A1 | 7/2014 | Gruber et al. |
| 2014/0203939 A1 | 7/2014 | Harrington et al. |
| 2014/0207582 A1 | 7/2014 | Flinn et al. |
| 2014/0218372 A1 | 8/2014 | Missig et al. |
| 2014/0222436 A1 | 8/2014 | Binder et al. |
| 2014/0223377 A1 | 8/2014 | Shaw et al. |
| 2014/0223481 A1 | 8/2014 | Fundament |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0244257 A1 | 8/2014 | Colibro et al. |
| 2014/0244258 A1 | 8/2014 | Song et al. |
| 2014/0244268 A1* | 8/2014 | Abdelsamie ............ G10L 21/00 704/275 |
| 2014/0244271 A1 | 8/2014 | Lindahl |
| 2014/0247383 A1 | 9/2014 | Dave et al. |
| 2014/0247926 A1 | 9/2014 | Gainsboro et al. |
| 2014/0249817 A1 | 9/2014 | Hart et al. |
| 2014/0250046 A1 | 9/2014 | Winn et al. |
| 2014/0267022 A1 | 9/2014 | Kim |
| 2014/0267599 A1 | 9/2014 | Drouin et al. |
| 2014/0274203 A1 | 9/2014 | Ganong et al. |
| 2014/0274211 A1 | 9/2014 | Sejnoha et al. |
| 2014/0278391 A1 | 9/2014 | Braho et al. |
| 2014/0278406 A1 | 9/2014 | Tsumura et al. |
| 2014/0278413 A1 | 9/2014 | Pitschel et al. |
| 2014/0278435 A1 | 9/2014 | Ganong et al. |
| 2014/0278443 A1 | 9/2014 | Gunn et al. |
| 2014/0278513 A1 | 9/2014 | Prakash et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0281983 A1 | 9/2014 | Xian et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0297281 A1 | 10/2014 | Togawa et al. |
| 2014/0297284 A1 | 10/2014 | Gruber et al. |
| 2014/0304605 A1 | 10/2014 | Ohmura et al. |
| 2014/0316585 A1 | 10/2014 | Boesveld et al. |
| 2014/0317502 A1 | 10/2014 | Brown et al. |
| 2014/0337048 A1 | 11/2014 | Brown et al. |
| 2014/0337266 A1 | 11/2014 | Wolverton et al. |
| 2014/0337751 A1 | 11/2014 | Lim et al. |
| 2014/0337814 A1 | 11/2014 | Kalns et al. |
| 2014/0351760 A1 | 11/2014 | Skory et al. |
| 2014/0358519 A1 | 12/2014 | Mirkin et al. |
| 2014/0365209 A1 | 12/2014 | Evermann |
| 2014/0365227 A1 | 12/2014 | Cash et al. |
| 2014/0365880 A1 | 12/2014 | Bellegarda |
| 2014/0365885 A1 | 12/2014 | Carson et al. |
| 2014/0365895 A1 | 12/2014 | Paulson et al. |
| 2015/0003797 A1 | 1/2015 | Schmidt |
| 2015/0006148 A1 | 1/2015 | Goldszmit et al. |
| 2015/0006178 A1 | 1/2015 | Peng et al. |
| 2015/0006199 A1 | 1/2015 | Snider et al. |
| 2015/0012271 A1 | 1/2015 | Peng et al. |
| 2015/0019221 A1 | 1/2015 | Lee et al. |
| 2015/0033219 A1 | 1/2015 | Breiner et al. |
| 2015/0039292 A1 | 2/2015 | Suleman et al. |
| 2015/0039305 A1 | 2/2015 | Huang |
| 2015/0045003 A1 | 2/2015 | Vora et al. |
| 2015/0045068 A1 | 2/2015 | Soffer et al. |
| 2015/0046537 A1 | 2/2015 | Rakib |
| 2015/0050633 A1 | 2/2015 | Christmas et al. |
| 2015/0058013 A1 | 2/2015 | Pakhomov et al. |
| 2015/0065200 A1 | 3/2015 | Namgung et al. |
| 2015/0066506 A1 | 3/2015 | Romano et al. |
| 2015/0066516 A1 | 3/2015 | Nishikawa et al. |
| 2015/0067485 A1 | 3/2015 | Kim et al. |
| 2015/0073804 A1 | 3/2015 | Senior et al. |
| 2015/0074524 A1 | 3/2015 | Nicholson et al. |
| 2015/0088511 A1 | 3/2015 | Bharadwaj et al. |
| 2015/0088523 A1 | 3/2015 | Schuster |
| 2015/0095031 A1 | 4/2015 | Conkie et al. |
| 2015/0100316 A1 | 4/2015 | Williams et al. |
| 2015/0113407 A1 | 4/2015 | Hoffert et al. |
| 2015/0120723 A1 | 4/2015 | Deshmukh et al. |
| 2015/0127350 A1 | 5/2015 | Agiomyrgiannakis |
| 2015/0133109 A1 | 5/2015 | Freeman et al. |
| 2015/0135085 A1 | 5/2015 | Shoham et al. |
| 2015/0142420 A1 | 5/2015 | Sarikaya et al. |
| 2015/0142447 A1 | 5/2015 | Kennewick et al. |
| 2015/0148013 A1 | 5/2015 | Baldwin et al. |
| 2015/0149354 A1 | 5/2015 | Mccoy |
| 2015/0149469 A1 | 5/2015 | Xu et al. |

(56) References Cited

U.S. PATENT DOCUMENTS

| | | |
|---|---|---|
| 2015/0161370 A1 | 6/2015 | North et al. |
| 2015/0170664 A1 | 6/2015 | Doherty et al. |
| 2015/0172463 A1 | 6/2015 | Quast et al. |
| 2015/0178388 A1 | 6/2015 | Winnemoeller et al. |
| 2015/0186012 A1 | 7/2015 | Coleman et al. |
| 2015/0186110 A1 | 7/2015 | Kannan |
| 2015/0186155 A1 | 7/2015 | Brown et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0195379 A1 | 7/2015 | Zhang et al. |
| 2015/0195606 A1 | 7/2015 | McDevitt |
| 2015/0199960 A1 | 7/2015 | Huo et al. |
| 2015/0205858 A1 | 7/2015 | Xie et al. |
| 2015/0220507 A1* | 8/2015 | Mohajer ............... G06F 17/27 704/9 |
| 2015/0227633 A1 | 8/2015 | Shapira |
| 2015/0228281 A1 | 8/2015 | Raniere |
| 2015/0234636 A1 | 8/2015 | Barnes, Jr. |
| 2015/0234800 A1 | 8/2015 | Patrick et al. |
| 2015/0243278 A1 | 8/2015 | Kibre et al. |
| 2015/0245154 A1 | 8/2015 | Dadu et al. |
| 2015/0248651 A1 | 9/2015 | Akutagawa et al. |
| 2015/0255071 A1 | 9/2015 | Chiba |
| 2015/0256873 A1 | 9/2015 | Klein et al. |
| 2015/0261496 A1 | 9/2015 | Faaborg et al. |
| 2015/0278370 A1 | 10/2015 | Stratvert et al. |
| 2015/0279360 A1 | 10/2015 | Mengibar et al. |
| 2015/0287409 A1 | 10/2015 | Jang |
| 2015/0288629 A1* | 10/2015 | Choi ............... H04L 51/32 709/206 |
| 2015/0294516 A1 | 10/2015 | Chiang |
| 2015/0309997 A1 | 10/2015 | Lee et al. |
| 2015/0324041 A1 | 11/2015 | Varley et al. |
| 2015/0324334 A1 | 11/2015 | Lee et al. |
| 2015/0331664 A1* | 11/2015 | Osawa ............... G01C 21/3608 704/275 |
| 2015/0331711 A1 | 11/2015 | Huang et al. |
| 2015/0339049 A1 | 11/2015 | Kasemset et al. |
| 2015/0339391 A1 | 11/2015 | Kang et al. |
| 2015/0340040 A1 | 11/2015 | Mun et al. |
| 2015/0340042 A1 | 11/2015 | Sejnoha et al. |
| 2015/0347382 A1 | 12/2015 | Dolfing et al. |
| 2015/0347393 A1 | 12/2015 | Futrell et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0370531 A1 | 12/2015 | Faaborg |
| 2015/0370780 A1 | 12/2015 | Wang et al. |
| 2015/0373183 A1* | 12/2015 | Woolsey ............... G06F 17/289 348/14.08 |
| 2016/0027431 A1 | 1/2016 | Kurzweil et al. |
| 2016/0028666 A1 | 1/2016 | Li |
| 2016/0034811 A1 | 2/2016 | Paulik et al. |
| 2016/0042735 A1 | 2/2016 | Vibbert et al. |
| 2016/0042748 A1 | 2/2016 | Jain et al. |
| 2016/0062605 A1* | 3/2016 | Agarwal ............... G06F 17/241 715/752 |
| 2016/0063998 A1 | 3/2016 | Krishnamoorthy et al. |
| 2016/0077794 A1 | 3/2016 | Kim et al. |
| 2016/0080165 A1 | 3/2016 | Ehsani et al. |
| 2016/0086116 A1 | 3/2016 | Rao et al. |
| 2016/0091967 A1 | 3/2016 | Prokofieva et al. |
| 2016/0092447 A1 | 3/2016 | Venkataraman et al. |
| 2016/0093291 A1 | 3/2016 | Kim |
| 2016/0093298 A1 | 3/2016 | Naik et al. |
| 2016/0093304 A1 | 3/2016 | Kim et al. |
| 2016/0094979 A1 | 3/2016 | Naik et al. |
| 2016/0119338 A1 | 4/2016 | Cheyer |
| 2016/0147725 A1 | 5/2016 | Patten et al. |
| 2016/0155442 A1 | 6/2016 | Kannan et al. |
| 2016/0180844 A1 | 6/2016 | Vanblon et al. |
| 2016/0189717 A1 | 6/2016 | Kannan et al. |
| 2016/0212488 A1 | 7/2016 | Os et al. |
| 2016/0217784 A1* | 7/2016 | Gelfenbeyn ............ G10L 15/22 |
| 2016/0225372 A1 | 8/2016 | Cheung et al. |
| 2016/0240187 A1 | 8/2016 | Fleizach et al. |
| 2016/0260436 A1 | 9/2016 | Lemay et al. |
| 2016/0275941 A1 | 9/2016 | Bellegarda et al. |
| 2016/0336024 A1 | 11/2016 | Choi et al. |
| 2016/0337299 A1* | 11/2016 | Lane .................. H04L 51/26 |
| 2017/0004824 A1* | 1/2017 | Yoo .................. G06F 17/2818 |
| 2017/0180499 A1* | 6/2017 | Gelfenbeyn ............ H04L 51/02 |
| 2017/0316775 A1* | 11/2017 | Le ................... G10L 15/16 |

FOREIGN PATENT DOCUMENTS

| | | |
|---|---|---|
| CN | 1407795 A | 4/2003 |
| CN | 1125436 C | 10/2003 |
| CN | 1471098 A | 1/2004 |
| CN | 1494695 A | 5/2004 |
| CN | 1535519 A | 10/2004 |
| CN | 1640191 A | 7/2005 |
| CN | 1673939 A | 9/2005 |
| CN | 1864204 A | 11/2006 |
| CN | 1898721 A | 1/2007 |
| CN | 2865153 Y | 1/2007 |
| CN | 1959628 A | 5/2007 |
| CN | 1975715 A | 6/2007 |
| CN | 1995917 A | 7/2007 |
| CN | 101008942 A | 8/2007 |
| CN | 101162153 A | 4/2008 |
| CN | 101179754 A | 5/2008 |
| CN | 101183525 A | 5/2008 |
| CN | 101188644 A | 5/2008 |
| CN | 101228503 A | 7/2008 |
| CN | 101233741 A | 7/2008 |
| CN | 101246020 A | 8/2008 |
| CN | 101271689 A | 9/2008 |
| CN | 101297541 A | 10/2008 |
| CN | 101427244 A | 5/2009 |
| CN | 101535983 A | 9/2009 |
| CN | 101632316 A | 1/2010 |
| CN | 101636736 A | 1/2010 |
| CN | 101673544 A | 3/2010 |
| CN | 101847405 A | 9/2010 |
| CN | 101894547 A | 11/2010 |
| CN | 101939740 A | 1/2011 |
| CN | 101951553 A | 1/2011 |
| CN | 102160043 A | 8/2011 |
| CN | 102246136 A | 11/2011 |
| CN | 202035047 U | 11/2011 |
| CN | 202092650 U | 12/2011 |
| CN | 102801853 A | 11/2012 |
| CN | 103135916 A | 6/2013 |
| CN | 103744761 A | 4/2014 |
| DE | 3837590 A1 | 5/1990 |
| DE | 4126902 A1 | 2/1992 |
| DE | 4334773 A1 | 4/1994 |
| DE | 4445023 A1 | 6/1996 |
| DE | 102004029203 A1 | 12/2005 |
| DE | 19841541 B4 | 12/2007 |
| DE | 102008024258 A1 | 11/2009 |
| EP | 30390 A1 | 6/1981 |
| EP | 57514 A1 | 8/1982 |
| EP | 59880 A1 | 9/1982 |
| EP | 138061 A1 | 4/1985 |
| EP | 140777 A1 | 5/1985 |
| EP | 218859 A2 | 4/1987 |
| EP | 262938 A1 | 4/1988 |
| EP | 138061 B1 | 6/1988 |
| EP | 283995 A2 | 9/1988 |
| EP | 293259 A2 | 11/1988 |
| EP | 299572 A2 | 1/1989 |
| EP | 313975 A2 | 5/1989 |
| EP | 314908 A2 | 5/1989 |
| EP | 327408 A2 | 8/1989 |
| EP | 389271 A2 | 9/1990 |
| EP | 411675 A2 | 2/1991 |
| EP | 441089 A2 | 8/1991 |
| EP | 464712 A2 | 1/1992 |

(56) References Cited

FOREIGN PATENT DOCUMENTS

| | | |
|---|---|---|
| EP | 476972 A2 | 3/1992 |
| EP | 534410 A2 | 3/1993 |
| EP | 558312 A1 | 9/1993 |
| EP | 559349 A1 | 9/1993 |
| EP | 570660 A1 | 11/1993 |
| EP | 575146 A2 | 12/1993 |
| EP | 578604 A1 | 1/1994 |
| EP | 586996 A2 | 3/1994 |
| EP | 609030 A1 | 8/1994 |
| EP | 651543 A2 | 5/1995 |
| EP | 679005 A1 | 10/1995 |
| EP | 795811 A1 | 9/1997 |
| EP | 476972 B1 | 5/1998 |
| EP | 845894 A2 | 6/1998 |
| EP | 852052 A1 | 7/1998 |
| EP | 863453 A1 | 9/1998 |
| EP | 863469 A2 | 9/1998 |
| EP | 867860 A2 | 9/1998 |
| EP | 869697 A2 | 10/1998 |
| EP | 559349 B1 | 1/1999 |
| EP | 889626 A1 | 1/1999 |
| EP | 917077 A2 | 5/1999 |
| EP | 691023 B1 | 9/1999 |
| EP | 946032 A2 | 9/1999 |
| EP | 981236 A1 | 2/2000 |
| EP | 982732 A1 | 3/2000 |
| EP | 984430 A2 | 3/2000 |
| EP | 1001588 A2 | 5/2000 |
| EP | 1014277 A1 | 6/2000 |
| EP | 1028425 A2 | 8/2000 |
| EP | 1028426 A2 | 8/2000 |
| EP | 1047251 A2 | 10/2000 |
| EP | 1052566 A1 | 11/2000 |
| EP | 1076302 A1 | 2/2001 |
| EP | 1091615 A1 | 4/2001 |
| EP | 1094406 A2 | 4/2001 |
| EP | 1107229 A2 | 6/2001 |
| EP | 1229496 A2 | 8/2002 |
| EP | 1233600 A2 | 8/2002 |
| EP | 1245023 A1 | 10/2002 |
| EP | 1246075 A2 | 10/2002 |
| EP | 1280326 A1 | 1/2003 |
| EP | 1291848 A2 | 3/2003 |
| EP | 1311102 A1 | 5/2003 |
| EP | 1315084 A1 | 5/2003 |
| EP | 1315086 A1 | 5/2003 |
| EP | 1345360 A2 | 9/2003 |
| EP | 1347361 A1 | 9/2003 |
| EP | 1368961 A2 | 12/2003 |
| EP | 1379061 A2 | 1/2004 |
| EP | 1432219 A1 | 6/2004 |
| EP | 1435620 A1 | 7/2004 |
| EP | 1480421 A1 | 11/2004 |
| EP | 1517228 A2 | 3/2005 |
| EP | 1536612 A1 | 6/2005 |
| EP | 1566948 A1 | 8/2005 |
| EP | 1650938 A1 | 4/2006 |
| EP | 1675025 A2 | 6/2006 |
| EP | 1693829 A1 | 8/2006 |
| EP | 1699042 A1 | 9/2006 |
| EP | 1739546 A2 | 1/2007 |
| EP | 1181802 B1 | 2/2007 |
| EP | 1818786 A1 | 8/2007 |
| EP | 1892700 A1 | 2/2008 |
| EP | 1912205 A2 | 4/2008 |
| EP | 1939860 A1 | 7/2008 |
| EP | 651543 B1 | 9/2008 |
| EP | 1909263 B1 | 1/2009 |
| EP | 1335620 B1 | 3/2009 |
| EP | 2069895 A1 | 6/2009 |
| EP | 2094032 A1 | 8/2009 |
| EP | 2107553 A1 | 10/2009 |
| EP | 2109295 A1 | 10/2009 |
| EP | 1720375 B1 | 7/2010 |
| EP | 2205010 A1 | 7/2010 |
| EP | 2309491 A1 | 4/2011 |
| EP | 2400373 A1 | 12/2011 |
| EP | 2431842 A2 | 3/2012 |
| EP | 2551784 A1 | 1/2013 |
| EP | 2555536 A1 | 2/2013 |
| EP | 2575128 A2 | 4/2013 |
| EP | 2733598 A1 | 5/2014 |
| EP | 2801890 A1 | 11/2014 |
| EP | 2801972 A1 | 11/2014 |
| EP | 2938022 A1 | 10/2015 |
| EP | 2940556 A1 | 11/2015 |
| FR | 2911201 A1 | 7/2008 |
| GB | 2293667 A | 4/1996 |
| GB | 2310559 A | 8/1997 |
| GB | 2323694 A | 9/1998 |
| GB | 2342802 A | 4/2000 |
| GB | 2343285 A | 5/2000 |
| GB | 2346500 A | 8/2000 |
| GB | 2352377 A | 1/2001 |
| GB | 2367399 A | 4/2002 |
| GB | 2384399 A | 7/2003 |
| GB | 2402855 A | 12/2004 |
| GB | 2445436 A | 7/2008 |
| GB | 2445667 A | 7/2008 |
| IT | FI20010199 A1 | 4/2003 |
| JP | 55-80084 A | 6/1980 |
| JP | 57-41731 A | 3/1982 |
| JP | 59-57336 A | 4/1984 |
| JP | 62-153326 A | 7/1987 |
| JP | 1-500631 A | 3/1989 |
| JP | 1-254742 A | 10/1989 |
| JP | 2-86397 A | 3/1990 |
| JP | 2-153415 A | 6/1990 |
| JP | 2-502149 A | 7/1990 |
| JP | 3-113578 A | 5/1991 |
| JP | 4-236624 A | 8/1992 |
| JP | 5-79951 A | 3/1993 |
| JP | 5-165459 A | 7/1993 |
| JP | 5-293126 A | 11/1993 |
| JP | 6-19965 A | 1/1994 |
| JP | 6-69954 A | 3/1994 |
| JP | 6-274586 A | 9/1994 |
| JP | 6-332617 A | 12/1994 |
| JP | 7-199379 A | 8/1995 |
| JP | 7-219961 A | 8/1995 |
| JP | 7-320051 A | 12/1995 |
| JP | 7-320079 A | 12/1995 |
| JP | 8-63330 A | 3/1996 |
| JP | 8-185265 A | 7/1996 |
| JP | 8-223281 A | 8/1996 |
| JP | 8227341 A | 9/1996 |
| JP | 9-18585 A | 1/1997 |
| JP | 9-27000 A | 1/1997 |
| JP | 9-55792 A | 2/1997 |
| JP | 9-259063 A | 10/1997 |
| JP | 9-265457 A | 10/1997 |
| JP | 10-31497 A | 2/1998 |
| JP | 10-69578 A | 3/1998 |
| JP | 10-78952 A | 3/1998 |
| JP | 10-105324 A | 4/1998 |
| JP | 10-274997 A | 10/1998 |
| JP | 10-320169 A | 12/1998 |
| JP | 11-06743 A | 1/1999 |
| JP | 11-45241 A | 2/1999 |
| JP | 11-136278 A | 5/1999 |
| JP | 11-231886 A | 8/1999 |
| JP | 11-265400 A | 9/1999 |
| JP | 2000-32140 A | 1/2000 |
| JP | 2000-90119 A | 3/2000 |
| JP | 2000-99225 A | 4/2000 |
| JP | 2000-134407 A | 5/2000 |
| JP | 2000-163031 A | 6/2000 |
| JP | 2000-207167 A | 7/2000 |
| JP | 2000-216910 A | 8/2000 |
| JP | 2000-224663 A | 8/2000 |
| JP | 2000-272349 A | 10/2000 |
| JP | 2000-276471 A | 10/2000 |
| JP | 2000-331004 A | 11/2000 |
| JP | 2000-339137 A | 12/2000 |

(56) References Cited

FOREIGN PATENT DOCUMENTS

| | | |
|---|---|---|
| JP | 2000-352988 A | 12/2000 |
| JP | 2000-352989 A | 12/2000 |
| JP | 2001-13978 A | 1/2001 |
| JP | 2001-14319 A | 1/2001 |
| JP | 2001-22498 A | 1/2001 |
| JP | 2001-34289 A | 2/2001 |
| JP | 2001-34290 A | 2/2001 |
| JP | 2001-56233 A | 2/2001 |
| JP | 2001-109493 A | 4/2001 |
| JP | 2001-125896 A | 5/2001 |
| JP | 2001-148899 A | 5/2001 |
| JP | 2001-273283 A | 10/2001 |
| JP | 2001-282813 A | 10/2001 |
| JP | 2001-285564 A | 10/2001 |
| JP | 2001-296880 A | 10/2001 |
| JP | 2002-14954 A | 1/2002 |
| JP | 2002-24212 A | 1/2002 |
| JP | 2002-30676 A | 1/2002 |
| JP | 2002-41276 A | 2/2002 |
| JP | 2002-41624 A | 2/2002 |
| JP | 2002-82748 A | 3/2002 |
| JP | 2002-82893 A | 3/2002 |
| JP | 2002-123295 A | 4/2002 |
| JP | 2002-132804 A | 5/2002 |
| JP | 2002-169588 A | 6/2002 |
| JP | 2002-182679 A | 6/2002 |
| JP | 2002-182680 A | 6/2002 |
| JP | 2002-230021 A | 8/2002 |
| JP | 2002-524806 A | 8/2002 |
| JP | 2002-281562 A | 9/2002 |
| JP | 2002-534716 A | 10/2002 |
| JP | 2002-342033 A | 11/2002 |
| JP | 2002-342212 A | 11/2002 |
| JP | 2002-344880 A | 11/2002 |
| JP | 2002-542501 A | 12/2002 |
| JP | 2003-15682 A | 1/2003 |
| JP | 2003-44091 A | 2/2003 |
| JP | 2003-84877 A | 3/2003 |
| JP | 2003-517158 A | 5/2003 |
| JP | 2003-202897 A | 7/2003 |
| JP | 2003-233568 A | 8/2003 |
| JP | 2003-244317 A | 8/2003 |
| JP | 2003-527656 A | 9/2003 |
| JP | 2003-288356 A | 10/2003 |
| JP | 2003-308079 A | 10/2003 |
| JP | 2003-533909 A | 11/2003 |
| JP | 2004-48804 A | 2/2004 |
| JP | 2004-54080 A | 2/2004 |
| JP | 2004-505322 A | 2/2004 |
| JP | 2004-505525 A | 2/2004 |
| JP | 2004-86356 A | 3/2004 |
| JP | 2004-94936 A | 3/2004 |
| JP | 2004-117905 A | 4/2004 |
| JP | 2004-152063 A | 5/2004 |
| JP | 2004-523004 A | 7/2004 |
| JP | 2004-295837 A | 10/2004 |
| JP | 2004-534268 A | 11/2004 |
| JP | 2004-347786 A | 12/2004 |
| JP | 2005-55782 A | 3/2005 |
| JP | 2005-63257 A | 3/2005 |
| JP | 2005-70645 A | 3/2005 |
| JP | 2005-80094 A | 3/2005 |
| JP | 2005-86624 A | 3/2005 |
| JP | 2005-506602 A | 3/2005 |
| JP | 2005-92441 A | 4/2005 |
| JP | 2005-149481 A | 6/2005 |
| JP | 2005-181386 A | 7/2005 |
| JP | 2005-189454 A | 7/2005 |
| JP | 2005-221678 A | 8/2005 |
| JP | 2005-283843 A | 10/2005 |
| JP | 2005-311864 A | 11/2005 |
| JP | 2005-332212 A | 12/2005 |
| JP | 2006-4274 A | 1/2006 |
| JP | 2006-23860 A | 1/2006 |
| JP | 2006-30447 A | 2/2006 |
| JP | 2006-31092 A | 2/2006 |
| JP | 2006-59094 A | 3/2006 |
| JP | 2006-80617 A | 3/2006 |
| JP | 2006-107438 A | 4/2006 |
| JP | 2006-146008 A | 6/2006 |
| JP | 2006-146182 A | 6/2006 |
| JP | 2006-155368 A | 6/2006 |
| JP | 2006-189394 A | 7/2006 |
| JP | 2006-195637 A | 7/2006 |
| JP | 2006-201870 A | 8/2006 |
| JP | 2006-208696 A | 8/2006 |
| JP | 2006-244296 A | 9/2006 |
| JP | 2006-267328 A1 | 10/2006 |
| JP | 2006-302091 A | 11/2006 |
| JP | 2006-526185 A | 11/2006 |
| JP | 2007-4633 A | 1/2007 |
| JP | 2007-17990 A | 1/2007 |
| JP | 2007-500903 A | 1/2007 |
| JP | 2007-53796 A | 3/2007 |
| JP | 2007-79690 A | 3/2007 |
| JP | 2007-171534 A | 7/2007 |
| JP | 2007-193794 A | 8/2007 |
| JP | 2007-206317 A | 8/2007 |
| JP | 2007-264471 A | 10/2007 |
| JP | 2007-264792 A | 10/2007 |
| JP | 2007-264892 A | 10/2007 |
| JP | 2007-299352 A | 11/2007 |
| JP | 2007-325089 A | 12/2007 |
| JP | 2008-21002 A | 1/2008 |
| JP | 2008-26381 A | 2/2008 |
| JP | 2008-39928 A | 2/2008 |
| JP | 2008-58813 A | 3/2008 |
| JP | 2008-90545 A | 4/2008 |
| JP | 2008-97003 A | 4/2008 |
| JP | 2008-134949 A | 6/2008 |
| JP | 2008-526101 A | 7/2008 |
| JP | 2008-185693 A | 8/2008 |
| JP | 2008-198022 A | 8/2008 |
| JP | 2008-217468 A | 9/2008 |
| JP | 2008-228129 A | 9/2008 |
| JP | 2008-233678 A | 10/2008 |
| JP | 2008-236448 A | 10/2008 |
| JP | 2008-252161 A | 10/2008 |
| JP | 2008-268684 A | 11/2008 |
| JP | 2008-271481 A | 11/2008 |
| JP | 2008-299221 A | 12/2008 |
| JP | 2009-503623 A | 1/2009 |
| JP | 2009-36999 A | 2/2009 |
| JP | 2009-47920 A | 3/2009 |
| JP | 2009-98490 A | 5/2009 |
| JP | 2009-140444 A | 6/2009 |
| JP | 2009-186989 A | 8/2009 |
| JP | 2009-193448 A | 8/2009 |
| JP | 2009-193457 A | 8/2009 |
| JP | 2009-193532 A | 8/2009 |
| JP | 2009-205367 A | 9/2009 |
| JP | 2009-294913 A | 12/2009 |
| JP | 2009-294946 A | 12/2009 |
| JP | 2010-66519 A | 3/2010 |
| JP | 2010-78979 A | 4/2010 |
| JP | 2010-108378 A | 5/2010 |
| JP | 2010-518526 A | 5/2010 |
| JP | 2010-157207 A | 7/2010 |
| JP | 2010-224236 A | 10/2010 |
| JP | 4563106 B2 | 10/2010 |
| JP | 2010-535377 A | 11/2010 |
| JP | 2010-287063 A | 12/2010 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2012-014394 A | 1/2012 |
| JP | 2013-511214 A | 3/2013 |
| JP | 2013-80476 A | 5/2013 |
| JP | 2013-517566 A | 5/2013 |
| JP | 2013-527947 A | 7/2013 |
| JP | 2013-528012 A | 7/2013 |
| JP | 2014-077969 A | 5/2014 |

(56) References Cited

FOREIGN PATENT DOCUMENTS

| | | |
|---|---|---|
| JP | 2015-519675 A | 7/2015 |
| JP | 2015-528140 A | 9/2015 |
| JP | 2015-528918 A | 10/2015 |
| KR | 10-1999-0073234 | 10/1999 |
| KR | 2001-0093654 A | 10/2001 |
| KR | 10-2001-0102132 A | 11/2001 |
| KR | 2002-0013984 A | 2/2002 |
| KR | 2002-0057262 A | 7/2002 |
| KR | 2002-0064149 A | 8/2002 |
| KR | 2002-0069952 A | 9/2002 |
| KR | 2003-0016993 A | 3/2003 |
| KR | 10-2004-0014835 A | 2/2004 |
| KR | 10-2004-0044632 A | 5/2004 |
| KR | 10-2005-0083561 A | 8/2005 |
| KR | 10-2005-0090568 A | 9/2005 |
| KR | 10-2006-0011603 A | 2/2006 |
| KR | 10-2006-0012730 A | 2/2006 |
| KR | 10-2006-0055313 A | 5/2006 |
| KR | 10-2006-0073574 A | 6/2006 |
| KR | 10-2006-0091469 A | 8/2006 |
| KR | 10-2007-0024262 A | 3/2007 |
| KR | 10-2007-0071675 A | 7/2007 |
| KR | 10-2007-0094767 A | 9/2007 |
| KR | 10-0757496 B1 | 9/2007 |
| KR | 10-2007-0100837 A | 10/2007 |
| KR | 10-0776800 B1 | 11/2007 |
| KR | 10-0801227 B1 | 2/2008 |
| KR | 10-0810500 B1 | 3/2008 |
| KR | 10-2008-0033070 A | 4/2008 |
| KR | 10-0819928 B1 | 4/2008 |
| KR | 10-2008-0049647 A | 6/2008 |
| KR | 10-2008-0059332 A | 6/2008 |
| KR | 10-2008-0109322 A | 12/2008 |
| KR | 10-2009-0001716 A | 1/2009 |
| KR | 10-2009-0028464 A | 3/2009 |
| KR | 10-2009-0030117 A | 3/2009 |
| KR | 10-2009-0086805 A | 8/2009 |
| KR | 10-0920267 B1 | 10/2009 |
| KR | 10-2009-0122944 A | 12/2009 |
| KR | 10-2009-0127961 A | 12/2009 |
| KR | 10-2009-0129192 A | 12/2009 |
| KR | 10-2010-0015958 A | 2/2010 |
| KR | 10-2010-0048571 A | 5/2010 |
| KR | 10-2010-0119519 A | 11/2010 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |
| KR | 10-2011-0113414 A | 10/2011 |
| KR | 10-2011-0115134 A | 10/2011 |
| KR | 10-2012-0020164 A | 3/2012 |
| KR | 10-2012-0031722 A | 4/2012 |
| KR | 10-2012-0120316 A | 11/2012 |
| KR | 10-2012-0137435 A | 12/2012 |
| KR | 10-2012-0138826 A | 12/2012 |
| KR | 10-1193668 B1 | 12/2012 |
| NL | 1014847 C | 10/2001 |
| RU | 2273106 C2 | 3/2006 |
| RU | 2349970 C2 | 3/2009 |
| RU | 2353068 C2 | 4/2009 |
| RU | 2364917 C2 | 8/2009 |
| TW | 468323 B | 12/2001 |
| TW | 200601264 A | 1/2006 |
| TW | 200638337 A | 11/2006 |
| TW | 200643744 A | 12/2006 |
| TW | 200801988 A | 1/2008 |
| TW | I301373 B | 9/2008 |
| TW | M348993 U | 1/2009 |
| TW | 200943903 A | 10/2009 |
| TW | 201018258 A | 5/2010 |
| TW | 201027515 A1 | 7/2010 |
| TW | 201028996 A1 | 8/2010 |
| TW | 201110108 A1 | 3/2011 |
| TW | 201227715 A1 | 7/2012 |
| TW | 201245989 A1 | 11/2012 |
| TW | 201312548 A1 | 3/2013 |
| WO | 89/03139 A1 | 4/1989 |
| WO | 1993/020640 A1 | 10/1993 |
| WO | 1994/016434 A1 | 7/1994 |
| WO | 1994/029788 A1 | 12/1994 |
| WO | 1995/002221 A1 | 1/1995 |
| WO | 1995/016950 A1 | 6/1995 |
| WO | 1995/017746 A1 | 6/1995 |
| WO | 1997/010586 A1 | 3/1997 |
| WO | 1997/026612 A1 | 7/1997 |
| WO | 1997/029614 A1 | 8/1997 |
| WO | 1997/038488 A1 | 10/1997 |
| WO | 1997/049044 A1 | 12/1997 |
| WO | 1998/009270 A1 | 3/1998 |
| WO | 1998/033111 A1 | 7/1998 |
| WO | 1998/041956 A1 | 9/1998 |
| WO | 1999/001834 A1 | 1/1999 |
| WO | 1999/008238 A1 | 2/1999 |
| WO | 1999/016181 A1 | 4/1999 |
| WO | 1999/056227 A1 | 11/1999 |
| WO | 2000/014727 A1 | 3/2000 |
| WO | 2000/014728 A1 | 3/2000 |
| WO | 2000/019697 A1 | 4/2000 |
| WO | 2000/022820 A1 | 4/2000 |
| WO | 2000/029964 A1 | 5/2000 |
| WO | 2000/030070 A2 | 5/2000 |
| WO | 2000/038041 A1 | 6/2000 |
| WO | 2000/041065 A1 | 7/2000 |
| WO | 2000/044173 A1 | 7/2000 |
| WO | 2000/060435 A2 | 10/2000 |
| WO | 2000/060435 A3 | 10/2000 |
| WO | 2000/063766 A1 | 10/2000 |
| WO | 2000/068936 A1 | 11/2000 |
| WO | 2001/006489 A1 | 1/2001 |
| WO | 2001/030046 A2 | 4/2001 |
| WO | 2001/030047 A2 | 4/2001 |
| WO | 2001/033569 A1 | 5/2001 |
| WO | 2001/035391 A1 | 5/2001 |
| WO | 2001/044912 A2 | 6/2001 |
| WO | 2001/046946 A1 | 6/2001 |
| WO | 2001/065413 A1 | 9/2001 |
| WO | 2001/067753 A1 | 9/2001 |
| WO | 2001/071480 A2 | 9/2001 |
| WO | 2002/010900 A2 | 2/2002 |
| WO | 2002/025610 A1 | 3/2002 |
| WO | 2002/031814 A1 | 4/2002 |
| WO | 2002/037469 A2 | 5/2002 |
| WO | 2002/049253 A2 | 6/2002 |
| WO | 2002/071259 A1 | 9/2002 |
| WO | 2002/073603 A1 | 9/2002 |
| WO | 2003/003152 A2 | 1/2003 |
| WO | 2003/003765 A1 | 1/2003 |
| WO | 2003/023786 A2 | 3/2003 |
| WO | 2003/036457 A2 | 5/2003 |
| WO | 2003/041364 A2 | 5/2003 |
| WO | 2003/049494 A1 | 6/2003 |
| WO | 2003/056789 A1 | 7/2003 |
| WO | 2003/067202 A2 | 8/2003 |
| WO | 2003/084196 A1 | 10/2003 |
| WO | 2003/094489 A1 | 11/2003 |
| WO | 2003/105125 A1 | 12/2003 |
| WO | 2003/107179 A1 | 12/2003 |
| WO | 2004/008801 A1 | 1/2004 |
| WO | 2004/025938 A1 | 3/2004 |
| WO | 2004/047415 A1 | 6/2004 |
| WO | 2004/055637 A2 | 7/2004 |
| WO | 2004/057486 A1 | 7/2004 |
| WO | 2004/061850 A1 | 7/2004 |
| WO | 2004/084413 A2 | 9/2004 |
| WO | 2005/003920 A2 | 1/2005 |
| WO | 2005/008505 A1 | 1/2005 |
| WO | 2005/008899 A1 | 1/2005 |
| WO | 2005/010725 A2 | 2/2005 |
| WO | 2005/027472 A2 | 3/2005 |
| WO | 2005/027485 A1 | 3/2005 |
| WO | 2005/031737 A1 | 4/2005 |
| WO | 2005/034082 A1 | 4/2005 |
| WO | 2005/034085 A1 | 4/2005 |
| WO | 2005/041455 A1 | 5/2005 |

(56) References Cited

FOREIGN PATENT DOCUMENTS

| | | | |
|---|---|---|---|
| WO | 2005/059895 | A1 | 6/2005 |
| WO | 2005/064592 | A1 | 7/2005 |
| WO | 2005/069171 | A1 | 7/2005 |
| WO | 2005/101176 | A2 | 10/2005 |
| WO | 2006/020305 | A2 | 2/2006 |
| WO | 2006/037545 | A2 | 4/2006 |
| WO | 2006/054724 | A1 | 5/2006 |
| WO | 2006/056822 | A1 | 6/2006 |
| WO | 2006/078246 | A1 | 7/2006 |
| WO | 2006/084144 | A2 | 8/2006 |
| WO | 2006/101649 | A2 | 9/2006 |
| WO | 2006/129967 | A1 | 12/2006 |
| WO | 2006/133571 | A1 | 12/2006 |
| WO | 2007/002753 | A2 | 1/2007 |
| WO | 2007/036762 | A1 | 4/2007 |
| WO | 2007/080559 | A2 | 7/2007 |
| WO | 2007/083894 | A1 | 7/2007 |
| WO | 2008/030970 | A2 | 3/2008 |
| WO | 2008/071231 | A1 | 6/2008 |
| WO | 2008/085742 | A2 | 7/2008 |
| WO | 2008/098900 | A2 | 8/2008 |
| WO | 2008/109835 | A2 | 8/2008 |
| WO | 2008/120036 | A1 | 10/2008 |
| WO | 2008/130095 | A1 | 10/2008 |
| WO | 2008/140236 | A1 | 11/2008 |
| WO | 2008/142472 | A1 | 11/2008 |
| WO | 2008/153639 | A1 | 12/2008 |
| WO | 2009/009240 | A2 | 1/2009 |
| WO | 2009/016631 | A2 | 2/2009 |
| WO | 2009/017280 | A1 | 2/2009 |
| WO | 2009/075912 | A1 | 6/2009 |
| WO | 2009/104126 | A1 | 8/2009 |
| WO | 2009/156438 | A1 | 12/2009 |
| WO | 2009/156978 | A1 | 12/2009 |
| WO | 2010/075623 | A1 | 7/2010 |
| WO | 2010/141802 | A1 | 12/2010 |
| WO | 2011/057346 | A1 | 5/2011 |
| WO | 2011/060106 | A1 | 5/2011 |
| WO | 2011/088053 | A2 | 7/2011 |
| WO | 2011/093025 | A1 | 8/2011 |
| WO | 2011/116309 | A1 | 9/2011 |
| WO | 2011/133543 | A1 | 10/2011 |
| WO | 2011/150730 | A1 | 12/2011 |
| WO | 2011/163350 | A1 | 12/2011 |
| WO | 2012/135157 | A2 | 10/2012 |
| WO | 2012/154317 | A1 | 11/2012 |
| WO | 2012/155079 | A2 | 11/2012 |
| WO | 2012/167168 | A2 | 12/2012 |
| WO | 2013/022135 | A1 | 2/2013 |
| WO | 2013/048880 | A1 | 4/2013 |
| WO | 2013/169842 | A2 | 11/2013 |
| WO | 2013/173511 | A2 | 11/2013 |
| WO | 2013/184953 | A1 | 12/2013 |
| WO | 2014/028797 | A1 | 2/2014 |
| WO | 2014/031505 | A1 | 2/2014 |
| WO | 2014/066352 | A1 | 5/2014 |
| WO | 2014/078965 | A1 | 5/2014 |
| WO | 2014/143959 | A2 | 9/2014 |
| WO | 2014/144579 | A1 | 9/2014 |
| WO | 2014/197336 | A1 | 12/2014 |
| WO | 2014/204659 | A2 | 12/2014 |
| WO | 2015/030796 | A1 | 3/2015 |
| WO | 2015/084659 | A1 | 6/2015 |
| WO | 2015-183401 | A1 | 12/2015 |

OTHER PUBLICATIONS

2007 Lexus GS 450h 4dr Sedan (3.5L 6cyl Gas/Electric Hybrid CVT), available at <http://review.cnet.com/4505-10865_16-31833144.html>, retrieved on Aug. 3, 2006, 10 pages.
Abcom Pty. Ltd. "12.1" 925 Candela Mobile PC", LCDHardware.com, available at <http://www.lcdhardware.com/panel/12_1_panel/default.asp.>, retrieved on Dec. 19, 2002, 2 pages.
ABF Software, "Lens—Magnifying Glass 1.5", available at <http://download.com/3000-2437-10262078.html?tag=1st-0-1>, retrieved on Feb. 11, 2004, 1 page.
Abut et al., "Low-Rate Speech Encoding Using Vector Quantization and Subband Coding", (Proceedings of the IEEE International Acoustics, Speech and Signal Processing Conference, Apr. 1986), as reprinted in Vector Quantization IEEE Press, 1990, pp. 312-315.
Abut et al., "Vector Quantization of Speech and Speech-Like Waveforms", (IEEE Transactions on Acoustics, Speech, and Signal Processing, Jun. 1982), as reprinted in Vector Quantization (IEEE Press, 1990), 1990, pp. 258-270.
Acero et al., "Environmental Robustness in Automatic Speech Recognition", International Conference on Acoustics, Speech and Signal Processing (ICASSP'90), Apr. 1990, 4 pages.
Acero el al., "Robust Speech Recognition by Normalization of the Acoustic Space", International Conference on Acoustics, Speech and Signal Processing, 1991, 4 pages.
Adium, "AboutAdium—Adium X—Trac", available at <http://web.archive.org/web/20070819113247/http://trac.adiumx.com/wiki/AboutAdium>, retrieved on Nov. 25, 2011, 2 pages.
adobe.com, "Reading PDF Documents with Adobe Reader 6.0—A Guide for People with Disabilities", Available online at "https://www.adobe.com/enterprise/accessibility/pdfs/acro6_cg_ue.pdf", Jan. 2004, 76 pages.
Agnas et al., "Spoken Language Translator: First-Year Report", SICS (ISSN 0283-3638), SRI and Telia Research AB, Jan. 1994, 161 pages.
Ahlberg et al., "The Alphaslider: A Compact and Rapid Selector", CHI '94 Proceedings of the SIGCHI Conference on Human Factors in Computing Systems, Apr. 1994, pp. 365-371.
Ahlberg et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.
Ahlbom et al., Modeling Spectral Speech Transitions Using Temporal Decomposition Techniques, IEEE International Conference of Acoustics, Speech and Signal Processing (ICASSP'87), vol. 12, Apr. 1987, 4 pages.
Ahlstrom et al., "Overcoming Touchscreen User Fatigue by Workplace Design", CHI '92 Posters and Short Talks of the 1992 SIGCHI Conference on Human Factors in Computing Systems, 1992, pp. 101-102.
Ahmed et al, "Intelligent Natural Language Query Processor", TENCON '89, Fourth IEEE Region 10 International Conference, Nov. 22-24, 1989, pp. 47-49.
Ahuja et al., "A Comparison of Application Sharing Mechanisms in Real-Time Desktop Conferencing Systems", At&T Bell Laboratories, 1990, pp. 238-248.
Aikawa et al., "Generation for Multilingual MT", available at <http://mtarchive.info/MTS-2001-Aikawa.pdf>, retrieved on Sep. 18, 2001, 6 pages.
Aikawa et al., "Speech Recognition Using Time-Warping Neural Networks", Proceedings of the 1991, IEEE Workshop on Neural Networks for Signal Processing, 1991, 10 pages.
Aikawa, K. "Time-Warping Neural Network for Phoneme Recognition", IEEE International Joint Conference on Neural Networks, vol. 3, Nov. 18-21, 1991, pp. 2122-2127.
Alfred App, "Alfred", available at <http://www.alfredapp.com/>, retrieved on Feb. 8, 2012, 5 pages.
All Music Website, available at <http://www.allmusic.com/>, retrieved on Mar. 19, 2007, 2 pages.
Allen et al., "Automated Natural Spoken Dialog", Computer, vol. 35, No. 4, Apr. 2002, pp. 51-56.
Allen, J., "Natural Language Understanding", 2nd Edition, The Benjamin/Cummings Publishing Company, Inc., 1995, 671 pages.
Alleva et al., "Applying Sphinx-II to DARPA Wall Street Journal CSR Task", Proceedings of Speech and Natural Language Workshop, Feb. 1992, pp. 393-398.
Alshawi et al., "CLARE: A Contextual Reasoning and Co-operative Response Framework for the Core Language Engine", SRI International, Cambridge Computer Science Research Centre, Cambridge, Dec. 1992, 273 pages.

(56) References Cited

OTHER PUBLICATIONS

Alshawi et al., "Declarative Derivation of Database Queries from Meaning Representations", Proceedings of the BANKAI Workshop on Intelligent Information Access, Oct. 1991, 12 pages.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems, Tokyo, Sep. 1988, 13 pages.
Alshawi, H., "Translation and Monotonic Interpretation/Generation", SRI International, Cambridge Computer Science Research Centre, Cambridge, available at <http://www.cam.sri.com/tr/crc024/paper.ps.Z1992>, Jul. 1992, 18 pages.
Amano et al., "A User-friendly Multimedia Book Authoring System", The Institute of Electronics, Information and Communication Engineers Technical Report, vol. 103, No. 416, Nov. 2003, pp. 33-40.
Amano, Junko, "A User-Friendly Authoring System for Digital Talking Books", IEICE Technical Report, The Institute of Electronics, Information and Communication Engineers, vol. 103 No. 418, Nov. 6, 2003, pp. 33-40.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, Databases and Applications of Semantics (ODBASE), 2005, 18 pages.
Amrel Corporation, "Rocky Matrix BackLit Keyboard", available at <http://www.amrel.com/asi_matrixkeyboard.html>, retrieved on Dec. 19, 2002, 1 page.
Anastasakos et al., "Duration Modeling in Large Vocabulary Speech Recognition", International Conference on Acoustics, Speech and Signal Processing (ICASSP'95), May 1995, pp. 628-631.
Anderson et al., "Syntax-Directed Recognition of Hand-Printed Two-Dimensional Mathematics", Proceedings of Symposium on Interactive Systems for Experimental Applied Mathematics: Proceedings of the Association for Computing Machinery Inc. Symposium, 1967, 12 pages.
Anhui USTC IFL YTEK Co. Ltd., "Flytek Research Center Information Datasheet", available at <http://www.iflttek.com/englishiResearch.htm , retrieved on Oct. 15, 2004, 3 pages.
Ansari et al., "Pitch Modification of Speech using a Low-Sensitivity Inverse Filter Approach", IEEE Signal Processing Letters, vol. 5, No. 3, Mar. 1998, pp. 60-62.
Anthony et al., "Supervised Adaption for Signature Verification System", IBM Technical Disclosure, Jun. 1, 1978, 3 pages.
api.ai, "Android App Review—Speaktoit Assistant", Available at <https://www.youtube.com/watch?v=myE498nyfGw>, Mar. 30, 2011, 3 pages.
Appelt et al., "Fastus: A Finite-State Processor for Information Extraction from Real-world Text", Proceedings of IJCAI, 1993, 8 pages.
Appelt et al., "SRI International Fastus System MUC-6 Test Results and Analysis", SRI International, Menlo Park, California, 1995, 12 pages.
Appelt et al., "SRI: Description of the JV-FASTUS System used for MUC-5", SRI International, Artificial Intelligence Center, 1993, 19 pages.
Apple Computer, "Guide Maker User's Guide", Apple Computer, Inc., Apr. 27, 1994, 8 pages.
Apple Computer, "Introduction to Apple Guide", Apple Computer, Inc., Apr. 28, 1994, 20 pages.
Apple Computer, "Knowledge Navigator", published by Apple Computer no later than 2008, as depicted in Exemplary Screenshots from video entitled 'Knowledge Navigator', 2008, 7 pages.
Apple Computer, Inc., "Apple—iPod—Technical Specifications, iPod 20GB and 60GB Mac + PC", available at <http://www.apple.com/ipod/color/specs.html>, 2005, 3 pages.
Apple Computer, Inc., "Apple Announces iTunes 2", Press Release, Oct. 23, 2001, 2 pages.
Apple Computer, Inc., "Apple Introduces iTunes—World's Best and Easiest to Use Jukebox Software", Macworld Expo, Jan. 9, 2001, 2 pages.
Apple Computer, Inc., "Apple's iPod Available in Stores Tomorrow", Press Release, Nov. 9, 2001, 1 page.
Apple Computer, Inc., "Inside Macintosh", vol. VI, 1985.
Apple Computer, Inc., "iTunes 2, Playlist Related Help Screens", iTunes v2.0, 2000-2001, 8 pages.
Apple Computer, Inc., "iTunes 2: Specification Sheet", 2001, 2 pages.
Apple Computer, Inc., "iTunes, Playlist Related Help Screens", iTunes v1.0, 2000-2001, 8 pages.
Apple Computer, Inc., "QuickTime Movie Playback Programming Guide", Aug. 11, 2005, pp. 1-58.
Apple Computer, Inc., "QuickTime Overview", Aug. 11, 2005, pp. 1-34.
Apple Computer, Inc., "Welcome to Tiger", available at <http://www.maths.dundee.ac.uk/software/Welcome_to_Mac_OS_X_v10.4_Tiger.pdf>, 2005, pp. 1-32.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Apple, "VoiceOver", available at <http://www.apple.com/accessibility/voiceover'>, Feb. 2009, 5 pages.
Applebaum et al., "Enhancing the Discrimination of Speaker Independent Hidden Markov Models with Corrective Training", International Conference on Acoustics, Speech, and Signal Processing, May 23, 1989, pp. 302-305.
AppleEvent Manager, which is described in the publication Inside Macintosh vol. VI, available from Addison-Wesley Publishing Company, 1985.
Arango et al., "Touring Machine: A Software Platform for Distributed Multimedia Applications", 1992 IFIP International Conference on Upper Layer Protocols, Architectures, and Applications, May 1992, pp. 1-11.
Archbold et al., "A Team User's Guide", SRI International, Dec. 21, 1981, 70 pages.
Arons, Barry M., "The Audio-Graphical Interface to a Personal Integrated Telecommunications System", Thesis Submitted to the Department of Architecture at the Massachusetts Institute of Technology, Jun. 1984, 88 pages.
Asanovic et al., "Experimental Determination of Precision Requirements for Back-Propagation Training of Artificial Neural Networks", Proceedings of the 2nd International Conference of Microelectronics for Neural Networks, 1991, www.ICSI.Berkelev.Edu, 1991, 7 pages.
Atal et al., "Efficient Coding of LPC Parameters by Temporal Decomposition", IEEE International Conference on Acoustics, Speech and Signal Processing (ICASSP'83), Apr. 1983, 4 pages.
Badino et al., "Language Independent Phoneme Mapping for Foreign TTS", 5th ISCA Speech Synthesis Workshop, Pittsburgh, PA, Jun. 14-16, 2004, 2 pages.
Baechtle et al., "Adjustable Audio Indicator", IBM Technical Disclosure Bulletin, Jul. 1, 1984, 2 pages.
Baeza-Yates, Ricardo, "Visualization of Large Answers in Text Databases", AVI '96 Proceedings of the Workshop on Advanced Visual Interfaces, 1996, pp. 101-107.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No. 7, Jul. 1989, 8 pages.
Bahl et al., "Acoustic Markov Models Used in the Tangora Speech Recognition System", Proceeding of International Conference on Acoustics, Speech and Signal Processing (ICASSP'88), vol. 1, Apr. 1988, 4 pages.
Bahl et al., "Large Vocabulary Natural Language Continuous Speech Recognition", Proceedings of 1989 International Conference on Acoustics, Speech and Signal Processing, vol. 1, May 1989, 6 pages.

(56) References Cited

OTHER PUBLICATIONS

Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Recognition of a Continuously Read Natural Corpus", IEEE International Conference on Acoustics, Speech, and Signal Processing, vol. 3, Apr. 1978, pp. 422-424.
Bahl et al., "Speech Recognition with Continuous-Parameter Hidden Markov Models", Proceeding of International Conference on Acoustics, Speech and Signal Processing (ICASSP'88), vol. 1, Apr. 1988, 8 pages.
Bajarin, Tim, "With Low End Launched, Apple Turns to Portable Future", PC Week, vol. 7, Oct. 1990, p. 153(1).
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Barrett et al, "How to Personalize the Web", 1997 in proceddings of the ACM SIGCHI Conference on Human Factors in Computer Systems, Mar. 22-27, 1997, pp. 75-82.
Barthel, B., "Information Access for Visually Impaired Persons: Do We Still Keep a "Document" in "Documentation"?", Professional Communication Conference, Sep. 1995, pp. 62-66.
Baudel et al., "2 Techniques for Improved HC Interaction: Toolglass & Magic Lenses: The See-Through Interface", Apple Inc., Video Clip, CHI'94 Video Program on a CD, 1994.
Bear et al., "A System for Labeling Self-Repairs in Speech", SRI International, Feb. 22, 1993, 9 pages.
Bear et al., "Detection and Correction of Repairs in Human-Computer Dialog", SRI International, May 1992, 11 pages.
Bear et al., "Integrating Multiple Knowledge Sources for Detection and Correction of Repairs in Human-Computer Dialog", Proceedings of the 30th Annual Meeting on Association for Computational Linguistics (ACL), 1992, 8 pages.
Bear et al., "Using Information Extraction to Improve Document Retrieval", SRI International, Menlo Park, California, 1998, 11 pages.
Beck et al., "Integrating Natural Language, Query Processing, and Semantic Data Models", COMCON Spring '90. IEEE Computer Society International Conference, 1990, Feb. 26-Mar. 2, 1990, pp. 538-543.
Bederson et al., "Pad++: A Zooming Graphical Interface for Exploring Alternate Interface Physics", UIST'94 Proceedings of the 7th Annual ACM symposium on User Interface Software and Technology, Nov. 1994, pp. 17-26.
Bederson et al., "The Craft of Information Visualization", Elsevier Science, Inc., 2003, 435 pages.
Belaid et al, "A Syntactic Approach for Handwritten Mathematical Formula Recognition", IEEE Transactions on Pattern Analysis and Machine Intelligence, vol. PAMI-6, No. 1, Jan. 1984, 7 pages.
Bellegarda et al., "A Latent Semantic Analysis Framework for Large-Span Language Modeling", 5th European Conference on Speech, Communication and Technology (EUROSPEECH'97), Sep. 1997, 4 pages.
Bellegarda et al., "A Multispan Language Modeling Framework for Large Vocabulary Speech Recognition", IEEE Transactions on Speech and Audio Processing, vol. 6, No. 5, Sep. 1998, 12 pages.
Bellegarda et al., "A Novel Word Clustering Algorithm Based on Latent Semantic Analysis", Proceedings of the IEEE International Conference on Acoustics, Speech and Signal Processing (ICASSP'96), vol. 1, 1996, 4 pages.
Bellegarda et al., "Experiments Using Data Augmentation for Speaker Adaptation", International Conference on Acoustics, Speech and Signal Processing (ICASSP'95), May 1995, 4 pages.
Bellegarda et al., "On-Line Handwriting Recognition using Statistical Mixtures", Advances in Handwriting and Drawings: A Multidisciplinary Approach, Europia, 6th International IGS Conference on Handwriting and Drawing, Paris, France, Jul. 1993, 11 pages.
Bellegarda et al., "Performance of the IBM Large Vocabulary Continuous Speech Recognition System on the ARPA Wall Street Journal Task", Signal Processing VII: Theories and Applications, European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.
Bellegarda, Jerome R. "Latent Semantic Mapping", IEEE Signal Processing Magazine, vol. 22, No. 5, Sep. 2005, pp. 70-80.
Bellegarda, Jerome R., "Exploiting both Local and Global Constraints for Multi-Span Statistical Language Modeling", Proceeding of the 1998 IEEE International Conference on Acoustics, Speech and Signal Processing (ICASSP'98), vol. 2, May 1998, 5 pages.
Bellegarda, Jerome R., "Exploiting Latent Semantic Information in Statistical Language Modeling", Proceedings of the IEEE, vol. 88, No. 8, Aug. 2000, 18 pages.
Bellegarda, Jerome R., "Interaction-Driven Speech Input—A Data-Driven Approach to the Capture of both Local and Global Language Constraints", available at <http://old.sig.chi.ora/bulletin/1998.2/bellegarda.html>, 1992, 7 pages.
Bellegarda, Jerome R., "Large Vocabulary Speech Recognition with Multispan Statistical Language Models", IEEE Transactions on Speech and Audio Processing, vol. 8, No. 1, Jan. 2000, 9 pages.
Belvin et al, "Development of the HRL Route Navigation Dialogue System", Proceedings of the First International Conference on Human Language Technology Research, Paper, 2001, 5 pages.
Benel et al., "Optimal Size and Spacing of Touchscreen Input Areas", Human-Computer Interaction—Interact, 1987, pp. 581-585.
Bergmann et al., "An adaptable man-machine interface using connected-word recognition", 2nd European Conference on Speech Communication and Technology (Eurospeech 91), vol. 2, XP002176387, Sep. 24-26, 1991, pp. 467-470.
Beringer et al., "Operator Behavioral Biases Using High-Resolution Touch Input Devices", Proceedings of the Human Factors and Ergonomics Society 33rd Annual Meeting, 1989, 3 pages.
Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.
Bernabei et al., "Graphical I/O Devices for Medical Users", 14th Annual International Conference of the IEEE on Engineering in Medicine and Biology Society, vol. 3, 1992, pp. 834-836.
Bernstein, Macrophone, "Speech Corpus", IEEE/ICASSP, Apr. 22, 1994, pp. 1-81 to 1-84.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Symantec", New version of more.tm, Apr. 10, 1990, 1 page.
Berry et al., "Task Management under Change and Uncertainty Constraint Solving Experience with the CALO Project", Proceedings of CP'05 Workshop on Constraint Solving under Change, 2005, 5 pages.
Bertulucci, Jeff, "Google Adds Voice Search to Chrome Browser", PC World, Jun. 14, 2011.
Best Buy, "When it Comes to Selecting a Projection TV, Toshiba Makes Everything Perfectly Clear", Previews of New Releases, available at <http://www.bestbuy.com/HomeAudioVideo/Specials/ToshibaTVFeatures.asp>, retrieved on Jan. 23, 2003, 5 pages.
Betts et al., "Goals and Objectives for User Interface Software", Computer Graphics, vol. 21, No. 2, Apr. 1987, pp. 73-78.
Biemann et al., "Disentangling from Babylonian Confusion—Unsupervised Language Identification", CICLing'05 Proceedings of the 6th international conference on Computational Linguistics and Intelligent Text Processing, vol. 3406, Feb. 2005, pp. 773-784.
Biemann, Chris, "Unsupervised Part-of-Speech Tagging Employing Efficient Graph Clustering", Proceeding COLING ACL '06 Proceedings of the 21st International Conference on computational Linguistics and 44th Annual Meeting of the Association for Computational Linguistics: Student Research Workshop, 2006, pp. 7-12.

(56) References Cited

OTHER PUBLICATIONS

Bier et al., "Toolglass and Magic Lenses: The See-Through Interface", Computer Graphics (SIGGRAPH '93 Proceedings), vol. 27, 1993, pp. 73-80.
Birrell, Andrew, "Personal Jukebox (PJB)", available at <http://birrell.org/andrew/talks/pjb-overview.ppt>, Oct. 13, 2000, 6 pages.
Black et al., "Automatically Clustering Similar Units for Unit Selection in Speech Synthesis", Proceedings of Eurospeech, vol. 2, 1997, 4 pages.
Black et al., "Multilingual Text-to-Speech Synthesis", Acoustics, Speech and Signal Processing (ICRASSP'04), Proceedings of the IEEE International Conference, vol. 3, May 17-21, 2004, pp. 761-764.
Blair et al., "An Evaluation of Retrieval Effectiveness for a Full-Text Document-Retrieval System", Communications of the ACM, vol. 28, No. 3, Mar. 1985, 11 pages.
Bleher et al., "A Graphic Interactive Application Monitor", IBM Systems Journal, vol. 19, No. 3, Sep. 1980, pp. 382-402.
BluePhoneElite: About, available at <http://www.reelintelligence.com/BluePhoneElite>, retrieved on Sep. 25, 2006, 2 pages.
BluePhoneElite: Features, available at <http://www.reelintelligence.com/BluePhoneElite/features.shtml,>, retrieved on Sep. 25, 2006, 2 pages.
Bluetooth PC Headsets, "'Connecting' Your Bluetooth Headset with Your Computer", Enjoy Wireless VoIP Conversations, available at <http://www.bluetoothpcheadsets.com/connect.htm>, retrieved on Apr. 29, 2006, 4 pages.
Bobrow et al., "Knowledge Representation for Syntactic/Semantic Processing", From: AAA-80 Proceedings, Copyright 1980, AAAI, 1980, 8 pages.
Bocchieri et al., "Use of Geographical Meta-Data in ASR Language and Acoustic Models", IEEE International Conference on Acoustics Speech and Signal Processing, 2010, pp. 5118-5121.
Bociurkiw, Michael, "Product Guide: Vanessa Matz", available at <http://www.forbes.com/asap/2000/1127/vmartz_print.html>, retrieved on Jan. 23, 2003, 2 pages.
Borden IV, G.R., "An Aural User Interface for Ubiquitous Computing", Proceedings of the 6th International Symposium on Wearable Computers, IEEE, 2002, 2 pages.
Borenstein, Nathaniel S., "Cooperative Work in the Andrew Message System", Information Technology Center and Computer Science Department, Carnegie Mellon University; Thyberg, Chris A. Academic Computing, Carnegie Mellon University, 1988, pp. 306-323.
Bouchou et al., "Using Transducers in Natural Language Database Query", Proceedings of 4th International Conference on Applications of Natural Language to Information Systems, Austria, Jun. 1999, 17 pages.
Boy, Guy A., "Intelligent Assistant Systems", Harcourt Brace Jovanovicy, 1991, 1 page.
Boyer et al., "A Fast String Searching Algorithm", Communications of the ACM, vol. 20, 1977, pp. 762-772.
Brain, Marshall, "How MP3 Files Work", available at <http://www.howstuffworks.com>, retrieved on Mar. 19, 2007 4 pages.
Bratt et al., "The SRI Telephone-Based ATIS System", Proceedings of ARPA Workshop on Spoken Language Technology, 1995, 3 pages.
Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.
Brown et al., "Browing Graphs Using a Fisheye View", Apple Inc., Video Clip, Systems Research Center, CHI '92 Continued Proceedings on a CD, 1992.
Brown et al., "Browsing Graphs Using a Fisheye View", CHI '93 Proceedings of the INTERACT '93 and CHI '93 Conference on Human Factors in Computing Systems, 1993, p. 516.
Bulyko et al., "Error-Correction Detection and Response Generation in a Spoken Dialogue System", Speech Communication, vol. 45, 2005, pp. 271-288.
Bulyko et al., "Joint Prosody Prediction and Unit Selection for Concatenative Speech Synthesis", Electrical Engineering Department, University of Washington, Seattle, 2001, 4 pages.
Burger, D., "Improved Access to Computers for the Visually Handicapped: New Prospects and Principles", IEEE Transactions on Rehabilitation Engineering, vol. 2, No. 3, Sep. 1994, pp. 111-118.
Burke et al, "Question Answering from Frequently Asked Question Files", AI Magazine, vol. 18, No. 2, 1997, 10 pages.
Burns et al., "Development of a Web-Based Intelligent Agent for the Fashion Selection and Purchasing Process via Electronic Commerce", Proceedings of the Americas Conference on Information System (AMCIS), Dec. 31, 1998, 4 pages.
Busemann et al., "Natural Language Diaglogue Service for Appointment Scheduling Agents", Technical Report RR-97-02, Deutsches Forschungszentrum fur Kunstliche Intelligenz GmbH, 1997, 8 pages.
Bussey, et al, "Service Architecture, Prototype Description and Network Implications of a Personalized Information Grazing Service", INFOCOM'90, Ninth Annual Joint Conference of the IEEE Computer and Communication Societies, Available at <http://slrohall.com/oublications/>, Jun. 1990, 8 pages.
Bussler et al., "Web Service Execution Environment (WSMX)", retrieved from Internet on Sep. 17, 2012, available at <http://www.w3.org/Submission/WSMX>, Jun. 3, 2005, 29 pages.
Butcher, Mike, "EVI Arrives in Town to go Toe-to-Toe with Siri", TechCrunch, Jan. 23, 2012, 2 pages.
Butler, Travis, "Archon Jukebox 6000 Challenges Nomad Jukebox", available at <http://tidbits.com/article/6521>, Aug. 13, 2001, 5 pages.
Butler, Travis, "Portable MP3: The Nomad Jukebox", available at <http://tidbits.com/article/6261>, Jan. 8, 2001, 4 pages.
Buxton et al, "EuroPARC's integrated Interactive Intermedia Facility (IIIF): Early Experiences", Proceedings of the IFIP WG 8.4 Conference on Multi-User Interfaces and Applications, 1990, pp. 11-34.
Buzo et al., "Speech Coding Based Upon Vector Quantization", IEEE Transactions on Acoustics, Speech and Signal Processing, vol. Assp-28, No. 5, Oct. 1980, 13 pages.
Call Centre, "Word Prediction", The Call Centre & Scottish Executive Education Dept., 1999, pp. 63-73.
Caminero-Gil et al., "Data-Driven Discourse Modeling for Semantic Interpretation", Proceedings of the IEEE International Conference on Acoustics, Speech and Signal Processing, May 1996, 6 pages.
Campbell et al., "An Expandable Error-Protected 4800 BPS CELP Coder (U.S. Federal Standard 4800 BPS Voice Coder)", (Proceedings of IEEE Int'l Acoustics, Speech, and Signal Processing Conference, May 1983), as reprinted in Vector Quantization (IEEE Press, 1990), 1990, pp. 328-330.
Cao et al, "Adapting Ranking SVM to Document Retrieval", SIGIR '06, Seattle, WA, Aug. 6-11, 2006, 8 pages.
Car Working Group, "Hands-Free Profile 1.5 HFP1.5_SPEC", Bluetooth Doc, available at <www.bluetooth.org>, Nov. 25, 2005, 93 pages.
Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.
Card et al., "Readings in Information Visualization Using Vision to Think", Interactive Technologies, 1999, 712 pages.
Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.
Carpendale et al., "Extending Distortion Viewing from 2D to 3D", IEEE Computer Graphics and Applications, Jul./Aug. 1997, pp. 42-51.
Carpendale et al., "Making Distortions Comprehensible", IEEE Proceedings of Symposium on Visual Languages, 1997, 10 pages.
Carter et al., "The Speech-Language Interface in the Spoken Language Translator", SRI International, Nov. 23, 1994, 9 pages.
Carter, D., "Lexical Acquisition in the Core Language Engine", Proceedings of the Fourth Conference of the European Chapter of the Association for Computational Linguistics, 1989, 8 pages.

(56) References Cited

OTHER PUBLICATIONS

Casner et al., "N-Way Conferencing with Packet Video", The Third International Workshop on Packet Video, Mar. 22-23, 1990, pp. 1-6.
Castleos, "Whole House Voice Control Demonstration", available online at : https://www.youtube.com./watch?v=9SRCoxrZ_W4, June 2, 2012, 26 pages.
Cawley, Gavin C. "The Application of Neural Networks to Phonetic Modelling", PhD. Thesis, University of Essex, Mar. 1996, 13 pages.
Chai et al., "Comparative Evaluation of a Natural Language Dialog Based System and a Menu Driven System for information Access: A Case Study", Proceedings of the International Conference on Multimedia Information Retrieval (RIAO), Paris, Apr. 2000, 11 pages.
Chakarova et al., "Digital Still Cameras—Downloading Images to a Computer", Multimedia Reporting and Convergence, available at <http://journalism.berkeley.edu/multimedia/tutorials/stillcams/downloading.html>, retrieved on May 9, 2005, 2 pages.
Chamberlain, Kim, "Quick Start Guide Natural Reader", available online at <http://atrc.colostate.edu/files/quickstarts/Natural_Reader_Quick_Start_Guide.>, Apr. 2008, 5 pages.
Chang et al., "A Segment-Based Speech Recognition System for Isolated Mandarin Syllables", Proceedings TEN CON '93, IEEE Region 10 Conference on Computer, Communication, Control and Power Engineering, vol. 3, Oct. 1993, 6 pages.
Chang et al., "Discriminative Training of Dynamic Programming based Speech Recognizers", IEEE Transactions on Speech and Audio Processing, vol. 1, No. 2, Apr. 1993, pp. 135-143.
Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.
Chelba et al., "Structured Language Modeling for Speech Recognition", Available online at : http://arxiv.org/pdf/cs/0001023.pdf, Jan. 25, 2000, 7 pages.
Chen et al., "An Improved Method for Image Retrieval Using Speech Annotation", The 9th International Conference on Multi-Media Modeling, Jan. 2003, pp. 1-17.
Chen, Yi, "Multimedia Siri Finds and Plays Whatever You Ask for", PSFK Report, Feb. 9, 2012, 9 pages.
Cheyer et al, "Demonstration Video of Multimodal Maps Using an Agent Architecture", published by SRI International no later than 1996, as depicted in Exemplary Screenshots from video entitled Demonstration Video of Multimodal Maps Using an Agent Architecture, 1996, 5 pages.
Cheyer et al, "Demonstration Video of Multimodal Maps Using an Open-Agent Architecture", published by SRI International no later than 1996, as depicted in Exemplary Screenshots from video entitled Demonstration Video of Multimodal Maps Using an Open-Agent Architecture, 6 pages.
Cheyer et al., "Multimodal Maps: An Agent-Based Approach", International Conference on Co-operative Multimodal Communication, 1995, 15 pages.
Cheyer et al., "Spoken Language and Multimodal Applications for Electronic Realties", Virtual Reality, vol. 3, 1999, pp. 1-15.
Cheyer et al., "The Open Agent Architecture", Autonomous Agents and Multi-Agent Systems, vol. 4, Mar. 1, 2001, 6 pages.
Cheyer et al., "The Open Agent Architecture: Building Communities of Distributed Software Agents", Artificial Intelligence Center, SRI International, Power Point Presentation, Available online at <http://www.ai.sri.com/-oaa/>, retrieved on Feb. 21, 1998, 25 pages.
Cheyer, A., "Demonstration Video of Vanguard Mobile Portal", published by SRI International no later than 2004, as depicted in 'Exemplary Screenshots from video entitled Demonstration Video of Vanguard Mobile Portal', 2004, 10 pages.
Cheyer, Adam, "A Perspective on AI & Agent Technologies for SCM", VerticalNet Presentation, 2001, 22 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Chomsky et al., "The Sound Pattern of English", New York, Harper and Row, 1968, 242 pages.
Choularton et al., "User Responses to Speech Recognition Errors: Consistency of Behaviour Across Domains", Proceedings of the 10th Australian International Conference on Speech Science & Technology, Dec. 8-10, 2004, pp. 457-462.
Church, Kenneth W., "Phonological Parsing in Speech Recognition", Kluwer Academic Publishers, 1987.
Cisco Systems, Inc., "Cisco Unity Unified Messaging User Guide", Release 4.0(5), Apr. 14, 2005, 152 pages.
Cisco Systems, Inc., "Installation Guide for Cisco Unity Unified Messaging with Microsoft Exchange 2003/2000 (With Fallover Configured)", Release 4.0(5), Apr. 14, 2005, 152 pages.
Cisco Systems, Inc., "Operations Manager Tutorial, Cisco's IPC Management Solution", 2006, 256 pages.
Codd, E. F., "Databases: Improving Usability and Responsiveness—How About Recently", Copyright 1978, Academic Press, Inc., 1978, 28 pages.
Cohen et al., "An Open Agent Architecture", available at <http://citeseerx.ist.psu.edu/viewdoc/summary?doi=1 0.1.1.30.480>, 1994, 8 pages.
Cohen et al., "Voice User Interface Design,", Excerpts from Chapter 1 and Chapter 10, 2004, 36 pages.
Coleman, David W., "Meridian Mail Voice Mail System Integrates Voice Processing and Personal Computing", Speech Technology, vol. 4, No. 2, Mar./Apr. 1988, pp. 84-87.
Coles et al., "Chemistry Question-Answering", SRI International, Jun. 1969, 15 pages.
Coles et al., "Techniques for Information Retrieval Using an Inferential Question-Answering System with Natural-Language Input", SRI International, Nov. 1972, 198 pages.
Coles et al., "The Application of Theorem Proving to Information Retrieval", SRI International, Jan. 1971, 21 pages.
Colt, Sam, "Here's One Way Apple's Smartwatch Could Be Better Than Anything Else", Business Insider, Aug. 21, 2014, pp. 1-4.
Combined Search Report and Examination Report under Sections 17 and 18(3) received for GB Patent Application No. 10093183, dated Oct. 8, 2010, 5 pages.
Combined Search Report and Examination Report under Sections 17 and 18(3) received for GB Patent Application No. 1217449.6, dated Jan. 17, 2013, 6 pages.
Compaq Inspiration Technology, "Personal Jukebox (PJB)—Systems Research Center and PAAD", Oct. 13, 2000, 25 pages.
Compaq, "Personal Jukebox", available at <http://research.compaq.com/SRC/pjbh, 2001, 3 pages.
Conkie et al., "Preselection of Candidate Units in a Unit Selection-Based Text-to-Speech Synthesis System", ISCA, 2000, 4 pages.
Conklin, Jeff, "Hypertext: An Introduction and Survey", Computer Magazine, Sep. 1987, 25 pages.
Conklin, Jeffrey, "A Survey of Hypertext", MCC Software Technology Program, Dec. 1987, 40 pages.
Connolly et al., "Fast Algorithms for Complex Matrix Multiplication Using Surrogates", IEEE Transactions on Acoustics, Speech and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.
Copperi et al, "CELP Coding for High Quality Speech at 8 kbits/s", Proceedings of IEEE International Acoustics, Speech and Signal Processing Conference, Apr. 1986), as reprinted in Vector Quantization (IEEE Press), 1990, pp. 324-327.
Corporate Ladder, BLOC Publishing Corporation, 1991, 1 page.
Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.
Cox et al., "Speech and Language Processing for Next-Millennium Communications Services", Proceedings of the IEEE, vol. 88, No. 8, Aug. 2000, 24 pages.

(56) References Cited

OTHER PUBLICATIONS

Craig et al., "Deacon: Direct English Access and Control", AFIPS Conference Proceedings, vol. 19, San Francisco, Nov. 1966, 18 pages.
Creative Technology Ltd., "Creative NOMAD® II: Getting Started—User Guide (on Line Version)", available at <http://ec1.images-amazon.com/media/i3d/01/A/man-migrate/MANUAL000026434.pdf>, Apr. 2000, 46 pages.
Creative Technology Ltd., "Creative NOMAD®: Digital Audio Player: User Guide (On-Line Version)", available at <http://ec1.images-amazon.com/media/i3d/01/a/man-migrate/MANUAL000010757.pdf>, Jun. 1999, 40 pages.
Creative Technology Ltd., "NOMAD Jukebox", User Guide, Version 1.0, Aug. 2000, 52 pages.
Creative, "Creative NOMAD MuVo TX", available at.<http://web.archive.org/web/20041024175952/www.creative.com/products/pfriendly.asp?product=9672>, retrieved on Jun. 6, 2006, 1 page.
Creative, "Creative NOMAD MuVo", available at <http://web.archive.org/web/20041024075901/www.creative.com/products/product.asp?category=213&subcategory=216&product=4983>, retrieved on Jun. 7, 2006, 1 page.
Creative, "Digital MP3 Player", available at <http://web.archive.org/web/20041024074823/www.creative.com/products/product.asp?category=213&subcategory=216&product=4983, 2004, 1 page.
Croft et al., "Task Support in an Office System", Proceedings of the Second ACM-SIGOA Conference on Office Information Systems, 1984, pp. 22-24.
Crowley et al., "MMConf: An Infrastructure for Building Shared Multimedia Applications", CSCW 90 Proceedings, Oct. 1990, pp. 329-342.
Cucerzan et al., "Bootstrapping a Multilingual Part-of-Speech Tagger in One Person-Day", In Proceedings of the 6th Conference on Natural Language Learning, vol. 20, 2002, pp. 1-7.
Cuperman et al., "Vector Predictive Coding of Speech at 16 kbit s/s", (IEEE Transactions on Communications, Jul. 1985), as reprinted in Vector Quantization (IEEE Press, 1990), 1990, pp. 300-311.
Cutkosky et al., "PACT: An Experiment in Integrating Concurrent Engineering Systems", Journal & Magazines, Computer, vol. 26, No. 1, Jan. 1993, 14 pages.
Dar et al., "DTL's DataSpot: Database Exploration Using Plain Language", Proceedings of the 24th VLDB Conference, New York, 1998, 5 pages.
Database WPI Section Ch, Week 8733, Derwent Publications Ltd., London, GB; Class A17, AN 87-230826 & JP, A, 62 153 326 (Sanwa Kako KK (Sans) Sanwa Kako CO), Jul. 8, 1987.
Database WPI Section Ch, Week 8947, Derwent Publications Ltd., London, GB; Class A17, AN 89-343299 & JP, A, 1 254 742 (Sekisui Plastics KK), Oct. 11, 1989.
Davis et al., "A Personal Handheld Multi-Modal Shopping Assistant", International Conference on Networking and Services, IEEE, 2006, 9 pages.
Davis et al., "Stone Soup Translation", Department of Linguistics, Ohio State University, 2001, 11 pages.
De Herrera, Chris, "Microsoft ActiveSync 3.1", Version 1.02, available at <http://www.cewindows.net/wce/activesync3.1.htm>, Oct. 13, 2000, 8 pages.
Decker et al., "Designing Behaviors for Information Agents", The Robotics Institute, Carnegie-Mellon University, Paper, Jul. 1996, 15 pages.
Decker et al., "Matchmaking and Brokering", The Robotics Institute, Carnegie-Mellon University, Paper, May 1996, 19 pages.
Deerwester et al., "Indexing by Latent Semantic Analysis", Journal of the American Society for Information Science, vol. 41, No. 6, Sep. 1990, 19 pages.
Degani et al., "'Soft'Controls for Hard Displays: Still a Challenge", Proceedings of the 36th Annual Meeting of the Human Factors Society, 1992, pp. 52-56.
Del Strother, Jonathan, "Coverflow", available at <http://www.steelskies.com/coverflow>, retrieved on Jun. 15, 2006, 14 pages.

Deller, Jr. et al., "Discrete-Time Processing of Speech Signals", Prentice Hall, ISBN: 0-02-328301-7, 1987, 14 pages.
Diagrammaker, Action Software, 1989.
Diagram-Master, Ashton-Tate, 1989.
Diamond Multimedia Systems, Inc., "Rio PMP300: User's Guide", available at <http://ec1.images-amazon.com/media/i3d/01/A/man-migrate/MANUAL000022854.pdf>, 1998, 28 pages.
Dickinson et al., "Palmtips: Tiny Containers for All Your Data", PC Magazine, vol. 9, Mar. 1990, p. 218(3).
Digital Audio in the New Era, Electronic Design and Application, No. 6, Jun. 30, 2003, 3 pages.
Digital Equipment Corporation, "Open VMS Software Overview", Software Manual, Dec. 1995, 159 pages.
Digital Equipment Corporation, "OpenVMS RTL DECtalk (Dtk$) Manual", May 1993, 56 pages.
Dittenbach et al, "A Natural Language Query Interface for Tourism Information", In: Information and Communication Technologies in Tourism 2003, XP055114393, Feb. 14, 2003, pp. 152-162.
Dobrisek et al., "Evolution of the Information-Retrieval System for Blind and Visually-Impaired People", International Journal of Speech Technology, Kluwer Academic Publishers, Bo, vol. 6, No. 3, pp. 301-309.
Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.
Donahue et al., "Whiteboards: A Graphical Database Tool", ACM Transactions on Office Information Systems, vol. 4, No. 1, Jan. 1986, pp. 24-41.
Donovan, R. E., "A New Distance Measure for Costing Spectral Discontinuities in Concatenative Speech Synthesisers", available at <http://citeseerx.ist.osu.edu/viewdoc/summarv?doi:=1 0.1.1.21.6398>, 2001, 4 pages.
Dourish et al., "Portholes: Supporting Awareness in a Distributed Work Group", CHI 1992, May 1992, pp. 541-547.
Dowding et al., "Gemini: A Natural Language System for Spoken-Language Understanding", Proceedings of the Thirty-First Annual Meeting of the Association for Computational Linguistics, 1993, 8 pages.
Dowding et al., "Interleaving Syntax and Semantics in an Efficient Bottom-Up Parser", Proceedings of the 32nd Annual Meeting of the Association for Computational Linguistics, 1994, 7 pages.
Dragon Naturally Speaking Version 11 Users Guide, Nuance Communications, Inc., Copyright @ 2002-2010, 132 pages.
Dual Rate Speech Coder for Multimedia Communications Transmitting at 5.3 and 6.3 kbit/s, International Telecommunication Union Recommendation G.723, 7 pages.
Dusan et al., "Multimodal Interaction on PDA's Integrating Speech and Pen Inputs", Eurospeech Geneva, 2003, 4 pages.
dyslexic.com, "AlphaSmart 3000 with CoWriter SmartApplet: Don Johnston Special Needs", available at <http://www.dyslexic.com/procuts.php?catid-2&pid=465&PHPSESSID:2511b800000f7da>, retrieved on Dec. 6, 2005, 13 pages.
Eagle et al., "Social Serendipity: Proximity Sensing and Cueing", MIT Media Laboratory Technical Note 580, May 2004, 18 pages.
Edwards, John R., "Q&A: Integrated Software with Macros and an Intelligent Assistant", Byte Magazine, vol. 11, No. 1, Jan. 1986, pp. 120-122.
Egido, Carmen, "Video Conferencing as a Technology to Support Group Work: A Review of its Failures", Bell Communications Research, 1988, pp. 13-24.
Elio et al., "On Abstract Task Models and Conversation Policies", Proc. Workshop on Specifying and Implementing Conversation Policies, Autonomous Agents'99 Conference, 1999, pp. 1-10.
Elliot, Chip, "High-Quality Multimedia Conferencing Through a Long-Haul Packet Network", BBN Systems and Technologies, 1993, pp. 91-98.
Elliott et al., "Annotation Suggestion and Search for Personal Multimedia Objects on the Web", CIVR, Jul. 7-9, 2008, pp. 75-84.
Elofson et al., "Delegation Technologies: Environmental Scanning with Intelligent Agents", Jour. of Management Info. Systems, Summer 1991, vol. 8, No. 1, 1991, pp. 37-62.

(56) References Cited

OTHER PUBLICATIONS

Eluminx, "Illuminated Keyboard", available at <http://www.elumix.com/>, retrieved on Dec. 19, 2002, 1 page.
Engst, Adam C., "SoundJam Keeps on Jammin", available at <http://db.tidbits.com/getbits.acgi?tbart=05988>, Jun. 19, 2000, 3 pages.
Epstein et al., "Natural Language Access to a Melanoma Data Base", SRI International, Sep. 1978, 7 pages.
Ericsson et al., "Software Illustrating a Unified Approach to Multimodality and Multilinguality in the In-Home Domain", Talk and Look: Took for Ambient Linguistic Knowledge, Dec. 2006, 127 pages.
Ericsson Inc., "Cellular Phone with Integrated MP3 Player", Research Disclosure Journal No. 41815, Feb. 1999, 2 pages.
Erol et al., "Multimedia Clip Generation From Documents for Browsing on Mobile Devices", IEEE Transactions on Multimedia, vol. 10, No. 5, Aug. 2008, 13 pages.
Eslambolchilar et al., "Making Sense of Fisheye Views", Second Dynamics and Interaction Workshop at University of Glasgow, Aug. 2005, 6 pages.
Eslambolchilar et al., "Multimodal Feedback for Tilt Controlled Speed Dependent Automatic Zooming", UIST'04, Oct. 24-27, 2004, 2 pages.
European Search Report received for European Patent Application No. 01201774.5, dated Sep. 14, 2001, 3 pages.
European Search Report received for European Patent Application No. 99107544.1, dated Jul. 8, 1999, 4 pages.
European Search Report received for European Patent Application No. 99107545.8, dated Jul. 1, 1999, 3 pages.
Evermann et al., "Posterior Probability Decoding, Confidence Estimation and System Combination", Proceedings Speech Transcription Workshop, 2000, 4 pages.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Extended European Search Report (includes European Search Report and European Search Opinion) received for European Patent Application No. 06256215.2, dated Feb. 20, 2007, 6 pages.
Extended European Search Report (includes European Search Report and European Search Opinion) received for European Patent Application No. 12186113.2, dated Apr. 28, 2014, 14 pages.
Extended European Search Report (includes Partial European Search Report and European Search Opinion) received for European Patent Application No. 13169672.6, dated Aug. 14, 2013, 11 pages.
Extended European Search Report (includes Partial European Search Report and European Search Opinion) received for European Patent Application No. 15169349.6, dated Jul. 28, 2015, 8 pages.
Extended European Search Report (includes Partial European Search Report and European Search Opinion) received for European Patent Application No. 15196748.6, dated Apr. 4, 2016.
Extended European Search Report (includes Partial European Search Report and European Search Opinion) received for European Patent Application No. 16150079.8, dated Feb. 18, 2016, 7 pages.
Extended European Search Report (includes Supplementary European Search Report and Search Opinion) received for European Patent Application No. 07863218.9, dated Dec. 9, 2010, 7 pages.
Extended European Search Report (includes Supplementary European Search Report and Search Opinion) received for European Patent Application No. 12727027.0, dated Sep. 26, 2014, 7 pages.
Extended European Search Report (inclusive of the Partial European Search Report and European Search Opinion) received for European Patent Application No. 12729332.2, dated Oct. 31, 2014, 6 pages.
Extended European Search Report and Search Opinion received for European Patent Application No. 12185276.8, dated Dec. 18, 2012, 4 pages.
Extended European Search Report received for European Patent Application No. 11159884.3, dated May 20, 2011, 8 pages.
Extended European Search Report received for European Patent Application No. 12186663.6, dated Jul. 16, 2013, 6 pages.
Extended European Search Report received for European Patent Application No. 13726938.7, dated Dec. 14, 2015, 8 pages.
Extended European Search Report received for European Patent Application No. 13770552.1, dated Jan. 7, 2016, 5 pages.
Extended European Search Report received for European Patent Application No. 14719914.5, dated Oct. 10, 2016, 7 pages.
Extended European Search Report received for European Patent Application No. 14737370.8, dated May 19, 2016, 12 pages.
Fanty et al., "A Comparison of DFT, PLP and Cochleagram for Alphabet Recognition", IEEE, Nov. 1991.
Feigenbaum et al., "Computer-Assisted Semantic Annotation of Scientific Life Works", Oct. 15, 2007, 22 pages.
Ferguson et al., "Trips: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98) 1998, 7 pages.
Fikes et al., "A Network-Based Knowledge Representation and its Natural Deduction System", SRI International, Jul. 1977, 43 pages.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Fiscus, J. G., "A Post-Processing System to Yield Reduced Word Error Rates: Recognizer Output Voting Error Reduction (ROVER)", IEEE Proceedings, Automatic Speech Recognition and Understanding, Dec. 14-17, 1997, pp. 347-354.
Fisher et al., "Virtual Environment Display System", Interactive 3D Graphics, Oct. 23-24, 1986, pp. 77-87.
Forsdick, Harry, "Explorations into Real-Time Multimedia Conferencing", Proceedings of the Ifip Tc 6 International Symposium on Computer Message Systems, 1986, 331 pages.
Frisse, M. E., "Searching for Information in a Hypertext Medical Handbook", Communications of the ACM, vol. 31, No. 7, Jul. 1988, 8 pages.
Furnas et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHI Conference on Human Factors in Computing Systems, vol. 17, No. 4, Apr. 1986, pp. 16-23.
Furnas, George W., "The Fisheye Calendar System", Bellcore Technical Memorandum, Nov. 19, 1991.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gardner, Jr., P. C., "A System for the Automated Office Environment", IBM Systems Journal, vol. 20, No. 3, 1981, pp. 321-345.
Garretson, R., "IBM Adds 'Drawing Assistant' Design Tool to Graphic Series", PC Week, vol. 2, No. 32, Aug. 13, 1985, 1 page.
Gautier et al., "Generating Explanations of Device Behavior Using Compositional Modeling and Causal Ordering", CiteSeerx, 1993, pp. 89-97.
Gaver et al., "One Is Not Enough: Multiple Views in a Media Space", INTERCHI, Apr. 24-29, 1993, pp. 335-341.
Gaver et al., "Realizing a Video Environment: EuroPARC's Rave System", Rank Xerox Cambridge EuroPARC, 1992, pp. 27-35.
Gervasio et al., "Active Preference Learning for Personalized Calendar Scheduling Assistance", CiteSeerx, Proceedings of IUI'05, Jan. 2005, pp. 90-97.
Giachin et al, "Word Juncture Modeling Using Inter-Word Context-Dependent Phone-Like Units", Cselt Technical Reports, vol. 20, No. 1, Mar. 1992, pp. 43-47.
Gillespie, Kelly, "Adventures in Integration", Data Based Advisor, vol. 9, No. 9, Sep. 1991, pp. 90-92.
Gillespie, Kelly, "Internationalize Your Applications with Unicode", Data Based Advisor, vol. 10, No. 10, Oct. 1992, pp. 136-137.

(56) References Cited

OTHER PUBLICATIONS

Gilloire et al, "Innovative Speech Processing for Mobile Terminals: An Annotated Bibliography", Signal Processing, vol. 80, No. 7, Jul. 2000, pp. 1149-1166.
Glass et al., "Multilingual Language Generation Across Multiple Domains", International Conference on Spoken Language Processing, Japan, Sep. 1994, 5 pages.
Glass et al,, "Multilingual Spoken-Language Understanding in the Mit Voyager System", Available online at <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Glinert-Stevens, Susan, "Microsoft Publisher: Desktop Wizardry", PC Sources, vol. 3, No. 2, Feb. 1992, 1 page.
Glossary of Adaptive Technologies: Word Prediction, available at <http://www.utoronto.ca/atrc/reference/techwordpred.html>, retrieved on Dec. 6, 2005, 5 pages.
Gmail, "About Group Chat", available at <http://mail.google.com/support/bin/answer.py?answer=81090>, Nov. 26, 2007, 2 pages.
Goddeau et al., "A Form-Based Dialogue Manager for Spoken Language Applications", Available online at <http://phasedance.com/pdf/icslp96.pdf>, Oct. 1996, 4 pages.
Goddeau et al., "Galaxy: A Human-Language Interface to On-Line Travel Information", International Conference on Spoken Language Processing, Yokohama, 1994, pp. 707-710.
Goldberg et al., "Using Collaborative Filtering to Weave an Information Tapestry", Communications of the ACM, vol. 35, No. 12, Dec. 1992, 10 pages.
Goldberg, Cheryl, "IBM Drawing Assistant: Graphics for the EGA", PC Magazine, vol. 4, No. 26, Dec. 24, 1985, 1 pages.
Gomez et al., "Mouth Gesture and Voice Command Based Robot Command Interface", IEEE International Conference on Robotics and Automation, May 12-17, 2009, pp. 333-338.
Gong et al,, "Guidelines for Handheld Mobile Device Interface Design", Proceedings of DSI 2004 Annual Meeting, 2004, pp. 3751-3756.
Gonnet et al., "Handbook of Algorithms and Data Structures: in Pascal and C. (2nd ed.)", Addison-Wesley Longman Publishing Co., 1991, 17 pages.
Good et al., "Building a User-Derived Interface", Communications of the ACM; (Oct. 1984) vol. 27, No. 10, Oct. 1984, pp. 1032-1043.
Gorin et al., "On Adaptive Acquisition of Language", International Conference on Acoustics, Speech and Signal Processing (ICASSP'90), vol. 1, Apr. 1990, 5 pages.
Gotoh et al, "Document Space Models Using Latent Semantic Analysis", In Proceedings of Eurospeech, 1997, 4 pages.
Gray et al., "Rate Distortion Speech Coding with a Minimum Discrimination Information Distortion Measure", (IEEE Transactions an Information Theory, Nov. 1981), as reprinted in Vector Quantization (IEEE Press), 1990, pp. 208-221.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Greenberg, Saul, "A Fisheye Text Editor for Relaxed-WYSWIS Groupware", CHI '96 Companion, Vancouver, Canada, Apr. 13-18, 1996, 2 pages.
Gregg et al., "DSS Access on the WWW: An Intelligent Agent Prototype", Proceedings of the Americas Conference on Information Systems, Association for Information Systems, 1998, 3 pages.
Griffin et al., "Signal Estimation From Modified Short-Time Fourier Transform", IEEE Transactions on Acoustics, Speech and Signal Processing, vol. ASSP-32, No. 2, Apr. 1984, pp. 236-243.
Grishman et al., "Computational Linguistics: An Introduction", Cambridge University Press, 1986, 172 pages.
Grosz et al., "Dialogic: A Core Natural-Language Processing System", SRI International, Nov. 1982, 17 pages.
Grosz et al., "Research on Natural-Language Processing at SRI", SRI International, Nov. 1981, 21 pages.
Grosz et al., "Team: An Experiment in the Design of Transportable Natural-Language Interfaces", Artificial Intelligence, vol. 32, 1987, 71 pages.
Grosz, B., "Team: A Transportable Natural-Language Interface System", Proceedings of the First Conference on Applied Natural Language Processing, 1983, 7 pages.
Gruber et al., "An Ontology for Engineering Mathematics", Fourth International Conference on Principles of Knowledge Representation and Reasoning, Available online at <http://www-ksl.stanford.edu/knowledge-sharing/papers/engmath.html>, 1994, pp. 1-22.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber et al., "Machine-Generated Explanations of Engineering Models: A Compositional Modeling Approach", Proceedings of International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber et al., "Toward a Knowledge Medium for Collaborative Product Development", Proceedings of the Second International Conference on Artificial Intelligence in Design, Jun. 1992, pp. 1-19.
Gruber, Thomas R., "A Translation Approach to Portable Ontology Specifications", Knowledge Acquisition, vol. 5, No. 2, Jun. 1993, pp. 199-220.
Gruber, Thomas R., "Automated Knowledge Acquisition for Strategic Knowledge", Machine Learning, vol. 4, 1989, pp. 293-336.
Gruber, Thomas R., "Interactive Acquisition of Justifications: Learning "Why" by Being Told "What"", Knowledge Systems Laboratory, Technical Report KSL 91-17, Original Oct. 1990, Revised Feb. 1991, 24 pages.
Gruber, Thomas R., "Toward Principles for the Design of Ontologies used for Knowledge Sharing", International Journal of Human-Computer Studies, vol. 43, No, 5-6, Nov. 1995, pp. 907-928.
Gruber, Thomas R., et al., U.S. Appl. No. 61/186,414, filed Jun. 12, 2009 titled "System and Method for Semantic Auto-Completion" 13 pages.
Gruber, Thomas R., et al., U.S. Appl. No. 61/493,201, filed Jun. 3, 2011 titled "Generating and Processing Data Items That Represent Tasks to Perform", 68 pages.
Gruber, Thomas R., et al., U.S. Appl. No. 61/657,744, filed Jun. 9, 2012 titled "Automatically Adapting User Interfaces for Hands-Free Interaction", 40 pages.
Gruber, Thomas R., et al., U.S. Appl. No. 07/976,970, filed Nov. 16, 1992 titled "Status Bar for Application Windows".
Gruber, Tom, "(Avoiding) The Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6, Available online at <http://tomgruber.org/writing/tnty2001.html>, Aug. 2001, 5 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Collaborating Around Shared Content on the WWW, W3C Workshop on WWW and Collaboration", available at <http://www.w3.org/Collaboration/Workshop/Proceedings/P9.html>, Sep. 1995, 1 page.
Gruber, Tom, "Collective Knowledge Systems: Where the Social Web Meets the Semantic Web", Web Semantics: Science, Services and Agents on the World Wide Web, 2007, pp. 1-19.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement—Among People with Some Common Motive in Sharing", Official

(56) References Cited

OTHER PUBLICATIONS

Quarterly Bulletin of AIS Special Interest Group on Semantic Web and Information Systems, vol. 1, No. 3, 2004, pp. 1-5.
Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "It Is What It Does: The Pragmatics of Ontology for Knowledge Sharing", Proceedings of the International CIDOC CRM Symposium, Available online at <http://tamgruber.org/writing/cidoc-ontology.htm>, Mar. 26, 2003, 21 pages.
Gruber, Tom, "Ontologies, Web 2.0 and Beyond", Ontology Summit, Available online at <http://tomgruber.org/writing/ontolog-social-web-keynote.htm>, Apr. 2007, 17 pages.
Gruber, Tom, "Ontology of Folksonomy: A Mash-Up of Apples and Oranges", Int'l Journal on Semantic Web & Information Systems, vol. 3, No. 2, 2007, 7 pages.
Gruber, Tom, "Siri, A Virtual Personal Assistant—Bringing Intelligence to the Interface", Semantic Technologies Conference, Jun. 16, 2009, 21 pages.
Gruber, Tom, "TagOntology", Presentation to Tag Camp, Oct. 29, 2005, 20 pages.
Gruber, Tom, "Where the Social Web Meets the Semantic Web", Presentation at the 5th International Web Conference, Nov. 2006, 38 pages.
Gruhn et al., "A Research Perspective on Computer-Assisted Office Work", IBM Systems Journal, vol. 18, No. 3, 1979, pp. 432-456.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guida et al., "NLI: A Robust Interface for Natural Language Person-Machine Communication", International Journal of Man-Machine Studies, vol. 17, 1982, 17 pages.
Guim, Mark, "How to Set a Person-Based Reminder with Cortana", available at <http://www.wpcentral.com/how-to-person-based-reminder-cortana>, Apr. 26, 2014, 15 pages.
Gurevych et al., "Semantic Coherence Scoring Using an Ontology", North American Chapter of the Association for Computational Linguistics Archive, Proceedings of the 2003 Conference of the North American Chapter of the Association for Computational Linguistics on Human Language Technology, May 27, 2003, 8 pages.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al, "Active, A Platform for Building Intelligent Operating Rooms", Surgetica 2007 Computer-Aided Medical Interventions: Tools and Applications, 2007, pp. 191-198.
Guzzoni et al, "Active, A platform for Building Intelligent Software", Computational Intelligence, available at <http://www.informatik.uni-trier.del-ley/pers/hd/g/Guzzoni:Didier>, 2006, 5 pages.
Guzzoni et al., "Active, A Tool for Building Intelligent User Interfaces", ASC 2007, Palma de Mallorca, Aug. 2007, 6 pages.
Guzzoni et al., "Many Robots Make Short Work", AAAI Robot Contest, SRI International, 1996, 9 pages.
Guzzoni et al, "Modeling Human-Agent Interaction with Active Ontologies", AAAI Spring Symposium, Interaction Challenges for Intelligent Assistants, Stanford University, Palo Alto, California, 2007, 8 pages.
Guzzoni, D., "Active: A Unified Platform for Building Intelligent Assistant Applications", Oct. 25, 2007, 262 pages.
Haas et al., "An Approach to Acquiring and Applying Knowledge", SRI international, Nov. 1980, 22 pages.
Hadidi et al., "Student's Acceptance of Web-Based Course Offerings: An Empirical Assessment", Proceedings of the Americas Conference on Information Systems(AMCIS) 1998, 4 pages.
Haga et al., "A Usability Survey of a Contents-Based Video Retrieval System by Combining Digital Video and an Electronic Bulletin Board", The Internet and Higher Education, vol. 8, No. 3, 2005, pp. 251-262.
Hain et al., "The Papageno TTS System", Siemens AG, Corporate Technology, Munich, Germany TC-STAR Workshop, 2006, 6 pages.
Haitsma et al., "A Highly Robust Audio Fingerprinting System", In Proceedings of the International Symposium on Music Information Retrieval (ISMIR), 2002, 9 pages.
Halbert, D. C., "Programming by Example", Dept. Electrical Engineering and Comp. Sciences, University of California, Berkley, Nov. 1984, pp. 1-76.
Hall, William S., "Adapt Your Program for Worldwide Use with Windows.TM. Internationalization Support", Microsoft Systems Journal, vol. 6, No. 6, Nov./Dec. 1991, pp. 29-58.
Haoui et al., "Embedded Coding of Speech: A Vector Quantization Approach", (Proceedings of the IEEE International Acoustics, Speech and Signal Processing Conference, Mar. 1985), as reprinted in Vector Quantization (IEEE Press, 1990), 1990, pp. 297-299.
Hardwar, Devindra, "Driving App Wane Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hartson et al., "Advances in Human-Computer Interaction", Chapters 1, 5, and 6, vol. 3, 1992, 121 pages.
Hashimoto, Yoshiyuki , "Simple Guide for iPhone Siri, Which Can Be Operated with Your Voice", Shuwa System Co., Ltd., vol. 1, Jul. 5, 2012, pp. 8, 130, 131.
Hawkins et al., "Hierarchical Temporal Memory: Concepts, Theory and Terminology", Nurmenta, Inc, Mar. 27, 2007, 20 pages.
He et al., "Personal Security Agent: KQML-Based PKI", The Robotics Institute, Carnegie-Mellon University, Paper, 1997, 14 pages.
Headset Button Controller v7.3 APK Full App Donload for Android, Blackberry, iPhone, 11 pages.
Hear voice from Google translate, Available on URL:https://www.youtub.com/watch?v=18AvMhFqD28, Jan. 28, 2011.
Heger et al., "Knowbot: An Adaptive Data Base Interface", Nuclear Science and Engineering, V. 107, No. 2, Feb. 1991, pp. 142-157.
Helm et al., "Budding Visual Language Parsers", Proceedings of CHI'91, Proceedings of the SIGCHI Conference on Human Factors in Computing Systems, 1991, 8 pages.
Hendrickson, Bruce, "Latent Semantic Analysis and Fiedler Retrieval", Discrete Algorithms and Mathematics Department, Sandia National Labs, Albuquerque, NM, Sep. 21, 2006, 12 pages.
Hendrix et al., "Developing a Natural Language Interface to Complex Data", ACM Transactions on Database Systems, vol. 3, No. 2, Jun. 1978, pp. 105-147.
Hendrix et al, "The Intelligent Assistant: Technical Considerations Involved in Designing Q&A's Natural-Language Interface", Byte Magazine, Issue 14, Dec. 1987, 1 pages.
Hendrix et al., "Transportable Natural-Language Interfaces to Databases", SRI International, Technical Note 228, Apr. 30, 1981, 18 pages.
Hendrix, Gary G., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1975, 9 pages.
Hendrix, Gary G., "Natural-Language Interface", American Journal of Computational Linguistics, vol. 8, No. 2, Apr.-Jun. 1982, pp. 56-61.

(56) References Cited

OTHER PUBLICATIONS

Hendrix, Gary G., "The Lifer Manual: A Guide to Building Practical Natural Language Interfaces", SRI International, Technical Note 138, Feb. 1977, 76 pages.
Henrich et al., "Language Identification for the Automatic Grapheme-To-Phoneme Conversion of Foreign Words in a German Text-To-Speech System", Proceedings of the European Conference on Speech Communication and Technology, vol. 2, Sep. 1989, pp. 220-223.
Hermansky, H., "Perceptual Linear Predictive (PLP) Analysis of Speech", Journal of the Acoustical Society of America, vol. 87, No. 4, Apr. 1990, 15 pages.
Hermansky, H., "Recognition of Speech in Additive and Convolutional Noise Based on Rasta Spectral Processing", Proceedings of IEEE International Conference on Acoustics, Speech and Signal Processing (ICASSP'93), Apr. 1993, 4 pages.
Heyer et al., "Exploring Expression Data: Identification and Analysis of Coexpressed Genes", Genome Research, vol. 9, 1999, pp. 1106-1115.
Hill, R. D., "Some Important Features and Issues in User Interface Management System", Dynamic Graphics Project, University of Toronto, CSRI, vol. 21, No. 2, Apr. 1987, pp. 116-120.
Hinckley et al., "A Survey of Design Issues in Spatial Input", UIST '94 Proceedings of the 7th Annual ACM Symposium on User Interface Software and Technology, 1994, pp. 213-222.
Hiroshi, "TeamWork Station: Towards a Seamless Shared Workspace", NTT Human Interface Laboratories, CSCW 90 Proceedings, Oct. 1990, pp. 13-26.
Hirschman et al., "Multi-Site Data Collection and Evaluation in Spoken Language Understanding", Proceedings of the Workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for use with an Agent-Oriented Natural Language Interface", Proceedings of HCI International, vol. 4, 2003, pp. 1422-1426.
Hoehfeld et al, "Learning with Limited Numerical Precision Using the Cascade-Correlation Algorithm", IEEE Transactions on Neural Networks, vol. 3, No. 4, Jul. 1992, 18 pages.
Holmes, "Speech System and Research", 1955, pp. 129-135, 152-153.
Holmes, J. N., "Speech Synthesis and Recognition-Stochastic Models for Word Recognition", Published by Chapman & Hall, London, ISBN 0 412 534304, 1998, 7 pages.
Hon et al, "CMU Robust Vocabulary-Independent Speech Recognition System", IEEE International Conference on Acoustics, Speech and Signal Processing (ICASSP-91), Apr. 1991, 4 pages.
Hon et al., "Towards Large Vocabulary Mandarin Chinese Speech Recognition", Conference on Acoustics, Speech, and Signal Processing, ICASSP-94, IEEE International, vol. 1, Apr. 1994, pp. 545-548.
Hopper, Andy, "Pandora—an Experimental System for Multimedia Applications", Olivetti Research Laboratory, Apr. 1990, pp. 19-34.
Horvitz et al., "Handsfree Decision Support: Toward a Non-invasive Human-Computer Interface", Proceedings of the Symposium on Computer Applications in Medical Care, IEEE Computer Society Press, 1995, p. 955.
Horvitz et al, "In Pursuit of Effective Handsfree Decision Support: Coupling Bayesian Inference, Speech Understanding, and User Models", 1995, 8 pages.
Howard, John H., "(Abstract) An Overview of the Andrew File System", Information Technology Center, Carnegie Mellon University; (CMU-ITC-88-062) to Appear in a future issue of the ACM Transactions on Computer Systems, 1988, pp. 1-6.
Huang et al., "A Novel Approach to Robust Speech Endpoint Detection in Car Environments", Acoustics, Speech, and Signal Processing 2000, ICASSP '00, Proceeding S. 2000 IEEE International Conference on Jun. 5-9, 2000, vol. 3, Jun. 5, 2000, pp. 1751-1754.
Huang et al., "Real-Time Software-Based Video Coder for Multimedia Communication Systems", Department of Computer Science and Information Engineering, 1993, 10 pages.
Huang et al., "The SPHINX-II Speech Recognition System: An Overview", Computer, Speech and Language, vol. 7, No. 2, 1993, 14 pages.
Hukin, R. W., "Testing an Auditory Model by Resynthesis", European Conference on Speech Communication and Technology, Sep. 26-29, 1989, pp. 243-246.
Hunt, "Unit Selection in A Concatenative Speech Synthesis System Using a Large Speech Database", Copyright 1996 IEEE. "To appear in Proc. ICASSP-96, May 7-10, Atlanta, GA" ATR Interpreting Telecommunications Research Labs, Kyoto Japan, 1996, pp. 373-376.
IAP Sports Lingo 0x09 Protocol V1.00, May 1, 2006, 17 pages.
IBM Corporation, "Simon Says Here's How", Users Manual, 1994, 3 pages.
IBM, "Integrated Audio-Graphics User Interface", IBM Technical Disclosure Bulletin, vol. 33, No. 11, Apr. 1991, 4 pages.
IBM, "Speech Editor", IBM Technical Disclosure Bulletin, vol. 29, No. 10, Mar. 10, 1987, 3 pages.
IBM, "Speech Recognition with Hidden Markov Models of Speech Waveforms", IBM Technical Disclosure Bulletin, vol. 34, No. 1, Jun. 1991, 10 pages.
IBM, "Why Buy: ThinkPad", available at <http://www.pc.ibm.com/us/thinkpad/easeofuse.html>, retrieved on Dec. 19, 2002, 2 pages.
IChat AV, "Video Conferencing for the Rest of Us", Apple—Mac OS X—iChat AV, available at <http://www.apple.com/macosx/features/ichat/>, retrieved on Apr. 13, 2006, 3 pages.
id3.org, "id3v2.4.0-Frames", available at <http://id3.org/id3v2.4.0-frames?action=print>, retrieved on Jan. 22, 2015, 41 pages.
IEEE 1394 (Redirected from Firewire, Wikipedia, The Free Encyclopedia, available at <http://www.wikipedia.org/wiki/Firewire>, retrieved on Jun. 8, 2003, 2 pages.
Interactive Voice, available at <http://www.helloivee.cam/company/>, retrieved on Feb. 10, 2014, 2 pages.
International Preliminary Report on Patentability received for PCT Patent Application No. PCT/GB2009/051684, dated Jun. 23, 2011, 10 pages.
International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Preliminary Report on Patentability received for PCT Patent Application No. PCT/US1994/011011, dated Feb. 28, 1996, 4 pages.
International Preliminary Report on Patentability received for PCT Patent Application No. PCT/US1995/008369, dated Oct. 9, 1996, 4 pages.
International Preliminary Report on Patentability received for PCT Patent Application No. PCT/US2004/002873, dated Feb. 1, 2006, 5 pages.
International Preliminary report on Patentability received for PCT Patent Application No. PCT/US2004/016519, dated Jan. 23, 2006, 12 pages.
International Preliminary Report on Patentability received for PCT Patent Application No. PCT/US2005/030234, dated Mar. 20, 2007, 9 pages.
International Preliminary Report on Patentability received for PCT Patent Application No. PCT/US2008/000042, dated Jul. 7, 2009, 6 pages.
International Preliminary Report on Patentability received for PCT Patent Application No. PCT/US2008/000043, dated Jul. 7, 2009, 8 pages.

(56) References Cited

OTHER PUBLICATIONS

International Preliminary Report on Patentability received for PCT Patent Application No. PCT/US2008/000047, dated Jul. 7, 2009, 8 pages.
International Preliminary Report on Patentability received for PCT Patent Application No. PCT/US2009/051954, dated Mar. 24, 2011, 8 pages.
International Preliminary Report on Patentability received for PCT Patent Application No. PCT/US2009/055577, completed on Aug. 6, 2010, 12 pages.
International Preliminary Report on Patentability received for PCT Patent Application No. PCT/US2010/037378, dated Dec. 6, 2011, 9 pages.
International Preliminary Report on Patentability received for PCT Patent Application No. PCT/US2011/020350, dated Jul. 17, 2012, 12 pages.
International Preliminary Report on Patentability received for PCT Patent Application No. PCT/US2011/020825, dated Jan. 13, 2012, 17 pages.
International Preliminary Report on Patentability received for PCT Patent Application No. PCT/US2011/020861, dated Aug. 2, 2012, 11 pages.
International Preliminary Report on Patentability received for PCT Patent Application No. PCT/US2011/037014, dated Dec. 13, 2012, 10 pages.
International Preliminary Report on Patentability received for PCT Patent Application No. PCT/US2012/029810, dated Oct. 3, 2013, 9 pages.
International Preliminary Report on Patentability received for PCT Patent Application No. PCT/US2012/034028, dated Oct. 31, 2013, 7 pages.
International Preliminary Report on Patentability received for PCT Patent Application No. PCT/US2012/040571, dated Dec. 19, 2013, 10 pages.
International Preliminary Report on Patentability received for PCT Patent Application No. PCT/US2012/040801, dated Dec. 19, 2013, 16 pages.
International Preliminary Report on Patentability received for PCT Patent Application No. PCT/US2012/040931, dated Dec. 18, 2014, 9 pages.
International Preliminary Report on Patentability received for PCT Patent Application No. PCT/US2012/043098, dated Jan. 9, 2014, 8 pages.
international Preliminary Report on Patentability received for PCT Patent Application No. PCT/US2012/043100, dated Jan. 9, 2014, 7 pages.
International Preliminary Report on Patentability received for PCT Patent Application No. PCT/US2012/056382, dated Apr. 10, 2014, 9 pages.
International Preliminary Report on Patentability received for PCT Patent Application No. PCT/US2013/028412, dated Sep. 12, 2014, 12 pages.
International Preliminary Report on Patentability received for PCT Patent Application No. PCT/US2013/028920, dated Sep. 18, 2014, 11 pages.
International Preliminary Report on Patentability received for PCT Patent Application No. PCT/US2013/029156, dated Sep. 9, 2014, 7 pages.
International Preliminary Report on Patentability received for PCT Patent Application No. PCT/US2013/041225, dated Nov. 27, 2014, 9 pages.
International Preliminary Report on Patentability received for PCT Patent Application No. PCT/US2013/041233, dated Nov. 18, 2014, 8 pages.
International Preliminary Report on Patentability received for PCT Patent Application No. PCT/US2013/044574, dated Dec. 9, 2014, 8 pages.
International Preliminary Report on Patentability received for PCT Patent Application No. PCT/US2013/044834, dated Dec. 9, 2014, 9 pages.
International Preliminary Report on Patentability received for PCT Patent Application No. PCT/US2013/047659, dated Dec. 31, 2014, 15 pages.
International Preliminary Report on Patentability received for PCT Patent Application No. PCT/US2013/047668, dated Jan. 8, 2015, 13 pages.
International Preliminary Report on Patentability received for PCT Patent Application No. PCT/US2013/052558, dated Feb. 12, 2015, 12 pages.
International Preliminary Report on Patentability received for PCT Patent Application No. PCT/US2013/058916, dated Mar. 19, 2015, 8 pages.
International Preliminary Report on Patentability received for PCT Patent Application No. PCT/US2013/060121, dated Apr. 2, 2015, 6 pages.
International Preliminary Report on Patentability received for PCT Patent Application No. PCT/US2014/015418, dated Aug. 20, 2015, 12 pages.
International Preliminary Report on Patentability received for PCT Patent Application No. PCT/US2014/016988, dated Sep. 3, 2015, 8 pages.
International Preliminary Report on Patentability received for PCT Patent Application No. PCT/US2014/023822, dated Sep. 24, 2015, 12 pages.
International Preliminary Report on Patentability received for PCT Patent Application No. PCT/US2014/023826, dated Sep. 24, 2015, 9 pages.
International Preliminary Report on Patentability received for PCT Patent Application No. PCT/US2014/026871, dated Sep. 24, 2015, 7 pages.
International Preliminary Report on Patentability received for PCT Patent Application No. PCT/US2014/026873, dated Sep. 24, 2015, 9 pages.
International Preliminary Report on Patentability received for PCT Patent Application No. PCT/US2014/028785, dated Sep. 24, 2015, 15 pages.
International Preliminary Report on Patentability received for PCT Patent Application No. PCT/US2014/028950, dated Sep. 24, 2015, 8 pages.
International Preliminary Report on Patentability received for PCT Patent Application No. PCT/US2014/029050, dated Sep. 24, 2015, 7 pages.
International Preliminary Report on Patentability received for PCT Patent Application No. PCT/US2014/029562, dated Sep. 24, 2015, 16 pages.
International Preliminary Report on Patentability received for PCT Patent Application No. PCT/US2014/040393, dated Dec. 8, 2015, 15 pages.
International Preliminary Report on Patentability received for PCT Patent Application No. PCT/US2014/040394, dated Dec. 23, 2015, 7 pages.
International Preliminary Report on Patentability received for PCT Patent Application No. PCT/US2014/040397, dated Dec. 17, 2015, 8 pages.
International Preliminary Report on Patentability received for PCT Patent Application No. PCT/US2014/040401, dated Dec. 8, 2015, 6 pages.
International Preliminary Report on Patentability received for PCT Patent Application No. PCT/US2014/040403 dated Dec. 23, 2015, 7 pages.
International Preliminary Report on Patentability received for PCT Patent Application No. PCT/US2014/040961, dated Dec. 17, 2015, 20 pages.
International Preliminary Report on Patentability received for PCT Patent Application No. PCT/US2014/041159, dated Dec. 17, 2015, 8 pages.
International Preliminary Report on Patentability received for PCT Patent Application No. PCT/US2014/041173, dated Dec. 17, 2015, 9 pages.
International Preliminary Report on Patentability received for PCT Patent Application No. PCT/US2014/049568, dated Feb. 18, 2016, 10 pages.

(56) References Cited

OTHER PUBLICATIONS

International Search Report & Written Opinion received for PCT Patent Application No. PCT/US2016/021410, dated Jul. 26, 2016, 19 pages.
International Search Report and Written Opinion received for PCT Patent Application No. PCT/US16/23312, dated Jun. 27, 2016, 7 pages.
International Search Report and Written Opinion received for PCT Patent Application No. PCT/US1994/011011, dated Feb. 8, 1995, 3 pages (International Search Report only).
International Search Report and Written Opinion received for PCT Patent Application No. PCT/US2004/002873, dated Oct. 13, 2005, 7 pages.
International Search Report and Written Opinion received for PCT Patent Application No. PCT/US2004/016519, dated Nov. 3, 2005, 6 pages.
International Search Report and Written Opinion received for PCT Patent Application No. PCT/US2005/030234, dated Mar. 17, 2006, 11 pages.
International Search Report and Written Opinion received for PCT Patent Application No. PCT/US2005/038819, dated Apr. 5, 2006, 12 pages.
International Search Report and Written Opinion received for PCT Patent Application No. PCT/US2006/048669, dated Jul. 2, 2007, 12 pages.
International Search Report and Written Opinion received for PCT Patent Application No. PCT/US2006/048670, dated May 21, 2007, 11 pages.
International Search Report and Written Opinion received for PCT Patent Application No. PCT/US2006/048753, dated Jun. 19, 2007, 15 pages.
International Search Report and Written Opinion received for PCT Patent Application No. PCT/US2007/026243, dated Mar. 31, 2008, 10 pages.
International Search Report and Written Opinion received for PCT Patent Application No. PCT/US2007/088872, dated May 8, 2008, 8 pages.
International Search Report and Written Opinion received for PCT Patent Application No. PCT/US2007/088873, dated May 8, 2008, 7 pages.
International Search Report and Written Opinion received for PCT Patent Application No. PCT/US2008/000032, dated Jun. 12, 2008, 7 pages.
International Search Report and Written Opinion received for PCT Patent Application No. PCT/US2008/000042, dated May 21, 2008, 7 pages.
International Search Report and Written Opinion received for PCT Patent Application No. PCT/US2008/000043, dated Oct. 10, 2008, 12 pages.
International Search Report and Written Opinion received for PCT Patent Application No. PCT/US2008/000045, dated Jun. 12, 2008, 7 pages.
International Search Report and Written Opinion received for PCT Patent Application No. PCT/US2008/000047, dated Sep. 11, 2008, 12 pages.
International Search Report and Written Opinion received for PCT Patent Application No. PCT/US2008/000059, dated Sep. 19, 2008, 18 pages.
International Search Report and Written Opinion received for PCT Patent Application No. PCT/US2008/000061, dated Jul. 1, 2008, 13 pages.
International Search Report and Written Opinion received for PCT Patent Application No. PCT/US2009/051954, dated Oct. 30, 2009, 10 pages.
International Search Report and Written Opinion received for PCT Patent Application No. PCT/US2009/055577, dated Jan. 26, 2010, 9 pages.
International Search Report and Written Opinion received for PCT Patent Application No. PCT/US2010/037378, dated Aug. 25, 2010, 14 pages.
International Search Report and Written Opinion received for PCT Patent Application No. PCT/US2011/020350, dated Jun. 30, 2011, 17 pages.
International Search Report and Written Opinion received for PCT Patent Application No. PCT/US2011/020825, dated Mar. 18, 2011, 9 pages.
International Search Report and Written Opinion received for PCT Patent Application No. PCT/US2011/020861, dated Nov. 29, 2011, 12 pages.
International Search Report and Written Opinion received for PCT Patent Application No. PCT/US2012/029810, dated Aug. 17, 2012, 11 pages.
International Search Report and Written Opinion received for PCT Patent Application No. PCT/US2012/034028, dated Jun. 11, 2012, 9 pages.
International Search Report and Written Opinion received for PCT Patent Application No. PCT/US2012/040571, dated Nov. 16, 2012, 14 pages.
International Search Report and Written Opinion received for PCT Patent Application No. PCT/US2012/040801, dated Oct. 22, 2012, 20 pages.
International Search Report and Written Opinion received for PCT Patent Application No. PCl/US2012/040931, dated Feb. 1, 2013, 4 pages (International Search Report only).
International Search Report and Written Opinion received for PCT Patent Application No. PCT/US2012/043098, dated Nov. 14, 2012, 9 pages.
International Search Report and Written Opinion received for PCT Patent Application No. PCT/US2012/043100, dated Nov. 15, 2012, 8 pages.
International Search Report and Written Opinion received for PCT Patent Application No. PCT/US2012/056382, dated Dec. 20, 2012, 11 pages.
International Search Report and Written Opinion received for PCT Patent Application No. PCT/US2013/028412, dated Sep. 26, 2013, 17 pages.
International Search Report and Written Opinion received for PCT Patent Application No. PCT/US2013/028920, dated Jun. 27, 2013, 14 pages.
International Search Report and Written Opinion received for PCT Patent Application No. PCT/US2013/029156, dated Jul. 15, 2013, 9 pages.
International Search Report and Written Opinion received for PCT Patent Application No. PCT/US2013/040971, dated Nov. 12, 2013, 11 pages.
International Search Report and Written Opinion received for PCT Patent Application No. PCT/US2013/041225, dated Aug. 23, 2013, 3 pages (International Search Report only).
International Search Report and Written Opinion received for PCT Patent Application No. PCT/US2013/044574, dated Sep. 27, 2013, 12 pages.
International Search Report and Written Opinion received for PCT Patent Application No. PCT/US2013/044834, dated Dec. 20, 2013, 13 pages.
International Search Report and Written Opinion received for PCT Patent Application No. PCT/US2013/047659, dated Jul. 7, 2014, 25 pages.
International Search Report and Written Opinion received for PCT Patent Application No. PCT/US2013/047668, dated Feb. 13, 2014, 17 pages.
International Search Report and Written Opinion received for PCT Patent Application No. PCT/US2013/052558, dated Jan. 30, 2014, 15 pages.
International Search Report and Written Opinion received for PCT Patent Application No. PCT/US2013/058916, dated Sep. 8, 2014, 10 pages.
International Search Report and Written Opinion received for PCT Patent Application No. PCT/US2013/060121, dated Dec. 6, 2013, 8 pages.
International Search Report and Written Opinion received for PCT Patent Application No. PCT/US2014/015418, dated Aug. 26, 2014, 17 pages.

(56) References Cited

OTHER PUBLICATIONS

International Search Report and Written Opinion received for PCT Patent Application No. PCT/US2014/016988, dated Apr. 29, 2014, 10 pages.
International Search Report and Written Opinion received for PCT Patent Application No. PCT/US2014/023822, dated Sep. 25, 2014, 14 pages.
International Search Report and Written Opinion received for PCT Patent Application No. PCT/US2014/023826, dated Oct. 9, 2014, 13 pages.
International Search Report and Written Opinion received for PCT Patent Application No. PCT/US2014/026871, dated Jul. 23, 2014, 9 pages.
International Search Report and Written Opinion received for PCT Patent Application No. PCT/US2014/026873, dated Jan. 5, 2015, 11 pages.
International Search Report and Written Opinion received for PCT Patent Application No. PCT/US2014/028785, dated Oct. 17, 2014, 23 pages.
International Search Report and Written Opinion received for PCT Patent Application No. PCT/US2014/028950, dated Nov. 25, 2014, 10 pages.
International Search Report and Written Opinion received for PCT Patent Application No. PCT/US2014/029050, dated Jul. 31, 2014, 9 pages.
International Search Report and Written Opinion received for PCT Patent Application No. PCT/US2014/029562, dated Sep. 18, 2014, 21 pages.
International Search Report and Written Opinion received for PCT Patent Application No. PCT/US2014/040393, dated Dec. 8, 2014, 23 pages.
International Search Report and Written Opinion received for PCT Patent Application No. PCT/US2014/040394, dated Aug. 8, 2014, 11 pages.
International Search Report and Written Opinion received for PCT Patent Application No. PCT/US2014/040397, dated Aug. 27, 2014, 12 pages.
International Search Report and Written Opinion received for PCT Patent Application No. PCT/US2014/040401, dated Sep. 4, 2014, 10 pages.
International Search Report and Written Opinion received for PCT Patent Application No. PCT/US2014/040403, dated Sep. 23, 2014, 9 pages.
International Search Report and Written Opinion received for PCT Patent Application No. PCT/US2014/040961, dated Mar. 10, 2015, 5 pages.
International Search Report and Written Opinion received for PCT Patent Application No. PCT/US2014/041159, dated Sep. 26, 2014, 10 pages.
International Search Report and Written Opinion received for PCT Patent Application No. PCT/US2014/041173, dated Sep. 10, 2014, 11 pages.
International Search Report and Written Opinion received for PCT Patent Application No. PCT/US2014/049568, dated Nov. 14, 2014, 12 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/019321, dated Jun. 3, 2015, 11 pages.
International Search Report and Written Opinion received for PCT Patent Application No. PCT/US2015/019322, dated Jun. 18, 2015, 16 pages.
International Search Report and Written Opinion received for PCT Patent Application No. PCT/US2015/023089, dated Aug. 20, 2015. 16 pages.
International Search Report and Written Opinion received for PCT Patent Application No. PCT/US2015/023097, dated Jul. 7, 2015, 15 pages.
International Search Report and Written Opinion received for PCT Patent Application No. PCT/US2015/023593, dated Aug. 14, 2015, 16 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/029554, dated Jul. 16, 2015, 11 pages.
International Search Report and Written Opinion received for PCT Patent Application No. PCT/US2015/032470, dated Oct. 1, 2015, 13 pages.
International Search Report and Written Opinion received for PCT Patent Application No. PCT/US2015/032724, dated Jul. 27, 2015, 11 pages.
International Search Report and Written Opinion received for PCT Patent Application No. PCT/US2015/033051, dated Aug. 5, 2015, 14 pages.
International Search Report and Written Opinion received for PCT Patent Application No. PCT/US2015/047062, dated Jan. 13, 2016, 25 pages.
International Search Report and Written Opinion received for PCT Patent Application No. PCT/US2015/047064, dated Nov. 13, 2015, 13 pages.
International Search Report and Written Opinion received for PCT Patent Application No. PCT/US2015/047281, dated Dec. 17, 2015, 19 pages.
International Search Report and Written Opinion received for PCT Patent Application No. PCT/US2015/047553, dated Jan. 5, 2016, 10 pages.
International Search Report and Written opinion received for PCT Patent Application No. PCT/US2015/047583, dated Feb. 3, 2016, 11 pages.
International Search Report and Written Opinion received for PCT Patent Application No. PCT/US2015/047584, dated Nov. 9, 2015, 10 pages.
International Search Report and Written Opinion received for PCT Patent Application No. PCT/US2015/053365, dated Mar. 10, 2016, 20 pages.
International Search Report and Written Opinion received for PCT Patent Application No. PCT/US2015/053366, dated Apr. 26, 2016, 16 pages.
International Search Report and Written Opinion received for PCT Patent Application No. PCT/US2016/021103, dated Jun. 8, 2016, 15 pages.
International Search Report and Written Opinion received for PCT Patent Application No. PCT/US2016/021104, dated Jun. 8, 2016, 15 pages.
International Search Report and Written opinion received for PCT Patent Application No. PCT/US2016/021409, dated May 26, 2016, 22 pages.
International Search report and Written Opinion received for PCT Patent Application No. PCT/US2016/024666, dated Jun. 10, 2016, 13 pages.
International Search Report and Written Opinion received for PCT Patent Application No. PCT/US2016/025404, dated Jun. 24, 2016, 21 pages.
International Search Report and Written Opinion received for PCT Patent Application No. PCT/US2016/025407, dated Jun. 23, 2016, 18 pages.
International Search Report and Written Opinion received for PCT Patent Application No. PCT/US2016/025408, dated Aug. 11, 2016, 19 pages.

(56) References Cited

OTHER PUBLICATIONS

International Search Report and Written Opinion received for PCT Patent Application No. PCT/US2016/031059, dated Aug. 8, 2016, 11 pages.
International Search Report and Written Opinion received for PCT Patent Application No. PCT/US2016/031549, dated Aug. 5, 2016, 35 pages.
International Search Report and Written Opinion received for PCT Patent Application No. PCT/US2016/031550, dated Aug. 4, 2016, 13 pages.
International Search Report and Written Opinion received for PCT Patent Application No. PCT/US2016/035105, dated Aug. 29, 2016, 25 pages.
International Search Report and Written Opinion received for PCT Patent Application No. PCT/US2016/035107, dated Aug. 31, 2016, 26 pages.
International Search Report and Written Opinion received for PCT Patent Application No. PCT/US2016/043005, dated Oct. 7, 2015, 17 pages.
International Search Report and Written Opinion received for PCT Patent Application No. PCT/US2016/035112, dated Aug. 22, 2016, 21 pages.
International Search Report received for PCT Patent Application No. PCT/GB2009/051684, dated Mar. 12, 2010, 4 pages.
International Search Report received for PCT Patent Application No. PCT/US1993/012666, dated Nov. 9, 1994, 8 pages.
International Search Report received for PCT Patent Application No. PCT/US1994/000687, dated Jun. 3, 1994, 1 page.
International Search Report received for PCT Patent Application No. PCT/US1994/00077, dated May 25, 1994, 2 pages.
International Search Report received for PCT Patent Application No. PCT/US1995/008369, dated Nov. 8, 1995, 6 pages.
International Search Report received for PCT Patent Application No. PCT/US1995/013076, dated Feb. 2, 1996, 1 page.
International Search Report received for PCT Patent Application No. PCT/US1996/01002, dated Oct. 30, 1996, 4 pages.
International Search Report received for PCT Patent Application No. PCT/US2002/024669, dated Nov. 5, 2002, 3 pages.
International Search Report received for PCT Patent Application No. PCT/US2002/024670, dated Sep. 26, 2002, 3 pages.
International Search Report received for PCT Patent Application No. PCT/US2002/033330, dated Feb. 4, 2003, 6 pages.
International Search Report received for PCT Patent Application No. PCT/US2005/046797, dated Nov. 24, 2006, 6 pages.
International Search Report received for PCT Patent Application No. PCT/US2011/037014, dated Oct. 4, 2011, 6 pages.
International Search Report received for PCT Patent Application No. PCT/US2013/041233, dated Nov. 22, 2013, 3 pages.
Intraspect Software, "The Intraspect Knowledge Management Solution: Technical Overview", available at <http://tomgruber.org/writing/intraspect-whitepaper-1998.pdf>, 1998, 18 pages.
Invitation to Pay Additional Fees and Partial International Search Report received for PCT Patent Application No. PCT/US2004/016519, dated Aug. 4, 2005, 6 pages.
Invitation to Pay Additional Fees and Partial International Search Report received for PCT Patent Application No. PCT/US2005/046797, dated Jul. 3, 2006, 6 pages.
Invitation to Pay Additional Fees and Partial International Search Report received for PCT Patent Application No. PCT/US2006/048738, dated Jul. 10, 2007, 4 pages.
Invitation to Pay Additional Fees and Partial International Search Report received for PCT Patent Application No. PCT/US2011/020350, dated Apr. 14, 2011, 5 pages.
Invitation to Pay Additional Fees and Partial International Search Report received for PCT Patent Application No. PCT/US2015/023089, dated Jun. 17, 2015, 7 pages.
Invitation to Pay Additional Fees received for PCT Application No. PCT/US2016/021410, dated Apr. 28, 2016, 2 pages.
Invitation to Pay Additional Fees received for PCT Patent Application No. PCT/US2008/000043, dated Jun. 27, 2008, 4 pages.
Invitation to Pay Additional Fees received for PCT Patent Application No. PCT/US2008/000047, dated Jul. 4, 2008, 4 pages.
Invitation to Pay Additional Fees received for PCT Patent Application No. PCT/US2011/037014, dated Aug. 2, 2011, 6 pages.
Invitation to Pay Additional Fees received for PCT Patent Application No. PCT/US2012/040801, dated Aug. 8, 2012, 2 pages.
Invitation to Pay Additional Fees received for PCT Patent Application No. PCT/US2013/047659, dated Feb. 27, 2014, 7 pages.
Invitation to Pay Additional Fees received for PCT Patent Application No. PCT/US2013/052558, dated Nov. 7, 2013, 6 pages.
Invitation to pay additional fees received for PCT Patent Application No. PCT/US2014/029562, dated Jul. 4, 2014, 7 pages.
Invitation to Pay Additional Fees received for PCT Patent Application No. PCT/US2014/040393, dated Sep. 17, 2014, 7 pages.
Invitation to Pay Additional Fees received for PCT Patent Application No. PCT/US2014/040961, dated Jan. 14, 2015, 3 pages.
Invitation to Pay Additional Fees received for PCT Patent Application No. PCT/US2015/047281, dated Oct. 8, 2015, 6 pages.
Invitation to Pay Additional Fees received for PCT Patent Application No. PCT/US2015/053366, dated Feb. 19, 2016, 8 pages.
Invitation to Pay Additional Fees received for PCT Patent Application No. PCT/US2016/025408, dated May 13, 2016, 2 pages.
Invitation to Pay Additional Fees received for PCT Patent Application no. PCT/US2014/028785, dated Jul. 4, 2014, 7 pages.
Invitation to pay additional fees received for the PCT Patent Application No. PCT/US2014/015418, dated May 26, 2014, 5 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
IPhone Hacks, "Native iPhone MMS Application Released", available at <http://www.iphonehacks.com/2007/12/iphone-mms-app.html>, retrieved on Dec. 25, 2007, 5 pages.
IPhoneChat, "iChat for iPhone in JavaScript", available at <http://www.publictivity.com/iPhoneChat/>, retrieved on Dec. 25, 2007, 2 pages.
Iso-Sipila et al., "Multi-Lingual Speaker-Independent Voice User Interface for Mobile Devices", ICASSP 2006 Proceedings, IEEE International Conference on Acoustics, Speech and Signal Processing May 14, 2006, pp. 1-1081.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 1996, 4 pages.
Jabra Corporation, "FreeSpeak: BT200 User Manual", 2002, 42 pages.
Jabra, "Bluetooth Headset: User Manual", 2005, 17 pages.
Jabra, "Bluetooth Introduction", 2004, 15 pages.
Jacobs et al., "Scisor: Extracting Information from On-Line News", Communications of the ACM, vol. 33, No. 11, Nov. 1990, 10 pages.
Janas, Jurgen M., "The Semantics-Based Natural Language Interface to Relational Databases", Chapter 6, Cooperative Interfaces to Information Systems, 1986, pp. 143-188.
Jawaid et al., "Machine Translation with Significant Word Reordering and Rich Target-Side Morphology", WDS'11 Proceedings of Contributed Papers, Part I, 2011, pp. 161-166.
Jaybird, "Everything Wrong with AIM: Because We've All Thought About It", available at <http://www.psychonoble.com/archives/articles/82.html>, May 24, 2006, 3 pages.
Jeffay et al., "Kernel Support for Live Digital Audio and Video", In Proc. of the Second Intl. Workshop on Network and Operating System Support for Digital Audio and Video, vol. 614, Nov. 1991, pp. 10-21.
Jelinek et al., "Interpolated Estimation of Markov Source Parameters from Sparse Data", In Proceedings of the Workshop on Pattern Recognition in Practice,, May 1980, pp. 381-397.
Jelinek, F., "Self-Organized Language Modeling for Speech Recognition", Readings in Speech Recognition, Edited by Alex Waibel and Kai-Fu Lee, Morgan Kaufmann Publishers, Inc., ISBN: 1-55860-124-4, 1990, 63 pages.

(56) References Cited

OTHER PUBLICATIONS

Jennings et al., "A Personal News Service Based on a User Model Neural Network", IEICE Transactions on Information and Systems, vol. E75-D, No. 2, Mar. 1992, 12 pages.
Ji et al., "A Method for Chinese Syllables Recognition Based upon Sub-syllable Hidden Markov Model", 1994 International Symposium on Speech, Image Processing and Neural Networks, Hong Kong, Apr. 1994, 4 pages.
Jiang et al., "A Syllable-based Name Transliteration System", Proc. of the 2009 Named Entities Workshop, Aug. 7 2009, pp. 96-99.
Johnson, Jeff A., "A Comparison of User Interfaces for Panning on a Touch-Controlled Display", CHI '95 Proceedings, 1995, 8 pages.
Johnson, Julia Ann., "A Data Management Strategy for Transportable Natural Language Interfaces", Doctoral Thesis Submitted to the Department of Computer Science, University of British Columbia, Canada, Jun. 1989, 285 pages.
Jones, J., "Speech Recognition for Cyclone", Apple Computer, Inc., E.R.S. Revision 2.9, Sep. 10, 1992, 93 pages.
Jouvet et al., "Evaluating Grapheme-to-phoneme Converters in Automatic Speech Recognition Context", IEEE, 2012 pp. 4821-4824.
Julia et al., "http://www.speech.sri.com/demos/atis.html", Proceedings of AAAI, Spring Symposium, 1997, 5 pages.
Julia et al., "Un Editeur Interactif De Tableaux Dessines a Main Levee (An Interactive Editor for Hand-Sketched Tables)", Traitement du Signal, vol. 12, No. 6, 1995, pp. 619-626.
Kaeppner et al., "Architecture of HeiPhone: A Testbed for Audio/Video Teleconferencing", IBM European Networking Center, 1993.
Kahn et al., "CoABS Grid Scalability Experiments", Autonomous Agents and Mufti-Agent Systems, vol. 7, 2003, pp. 171-178.
Kamba et al., "Using Small Screen Space More Efficiently", CHI '96 Proceedings of the SIGCHI Conference on Human Factors in Computing Systems, Apr. 13-18, 1996, pp. 383-390.
Kamel et al., "A Graph Based Knowledge Retrieval System", IEEE International Conference on Systems, Man and Cybernetics, 1990, pp. 269-275.
Kanda et al., "Robust Domain Selection Using Dialogue History in Multi-domain Spoken Dialogue Systems", Journal of Information Processing Society, vol. 48, No. 5, May 15, 2007, pp. 1980-1989. (English Abstract Submitted).
Kanda et al., "Spoken Language Understanding Using Dialogue Context in Database Search Task", Journal of Information Processing Society of Japan, vol. 47, No. 6, Jun. 15, 2016, pp. 1802-1811. (English Abstract Submitted).
Kane et al., "Slide Rule: Making Mobile Touch Screens Accessible to Blind People Using Multi-Touch Interaction Techniques", Assets, Oct. 13-15, 2008, pp. 73-80.
Kang et al., "Quality Improvement of LPC-Processed Noisy Speech by Using Spectral Subtraction", IEEE Transactions on Acoustics, Speech and Signal Processing, vol. 37, No. 6, Jun. 1989, pp. 939-942.
Karp, P. D., "A Generic Knowledge-Base Access Protocol", Available online at <http://lecture.cs.buu.ac.th/-f50353/Document/gfp.pdf>, May 12, 1994, 66 pages.
Katz et al., "Exploiting Lexical Regularities in Designing Natural Language Systems", Proceedings of the 12th International Conference on Computational Linguistics, 1988, pp. 1-22.
Katz et al., "REXTOR: A System for Generating Relations from Natural Language", Proceedings of the ACL Workshop on Natural Language Processing and Information Retrieval (NLP&IR), Oct. 2000, 11 pages.
Katz, Boris, "A Three-Step Procedure for Language Generation", Massachusetts Institute of Technology, A.I. Memo No. 599, Dec. 1980, pp. 1-40.
Katz, Boris, "Annotating the World Wide Web Using Natural Language", Proceedings of the 5th RIAO Conference on Computer Assisted Information Searching on the Internet, 1997, 7 pages.
Katz, Boris, "Using English for Indexing and Retrieving", Proceedings of the 1st RIAO Conference on User-Oriented Content-Based Text and Image Handling, 1988, pp. 314-332.
Katz, S. M., "Estimation of Probabilities from Sparse Data for the Language Model Component of a Speech Recognizer", IEEE Transactions on Acoustics, Speech and Signal Processing, vol. ASSP-35, No. 3, Mar. 1987, 3 pages.
Katzenmaier et al., "Identifying the Addressee in Human-Human-Robot Interactions based on Head Pose and Speech", Proc. ICMI' 04, ACM, 2004, pp. 144-151.
Kazemzadeh et al., "Acoustic Correlates of User Response to Error in Human-Computer Dialogues", Automatic Speech Recognition and Understanding, 2003, pp. 215-220.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Keahey et al., "Non-Linear Image Magnification", Apr. 24, 1996, 11 pages.
Keahey et al., "Nonlinear Magnification Fields", Proceedings of the 1997 IEEE Symposium on Information Visualization, 1997, 12 pages.
Keahey et al., "Techniques for Non-Linear Magnification Transformations", IEEE Proceedings of Symposium on Information Visualization, Oct. 1996, pp. 38-45.
Keahey et al., "Viewing Text With Non-Linear Magnification: An Experimental Study", Department of Computer Science, Indiana University, Apr. 24, 1996, pp. 1-9.
Kennedy, P J., "Digital Data Storage Using Video Disc", IBM Technical Disclosure Bulletin, vol. 24, No. 2, Jul. 1981, p. 1171.
Kerr, "An Incremental String Search in C: This Data Matching Algorithm Narrows the Search Space with each Keystroke", Computer Language, vol. 6, No. 12, Dec. 1989, pp. 35-39.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Kikui, Gen-Itiro, "Identifying the Coding System and Language of On-Line Documents on the Internet", International Conference on Computational, Aug. 1996, pp. 652-657.
Kim, E.A. S., "The Structure and Processing of Fundamental Frequency Contours", University of Cambridge, Doctoral Thesis, Apr. 1987, 378 pages.
Kirstein et al., "Piloting of Multimedia Integrated Communications for European Researchers", Proc. INET '93, 1993, pp. 1-12.
Kitano, H., "PhiDM-Dialog, An Experimental Speech-to-Speech Dialog Translation System", Computer, vol. 24, No. 6, Jun. 1991, 13 pages.
Kitaoka et al., "Detection and Recognition of Correction Utterances on Misrecognition of Spoken Dialog System", Systems and Computers in Japan, vol. 36, No. 11 Oct. 2005, pp. 24-33.
Kjelldahl et al., "Multimedia—Principles, Systems, and Applications", Proceedings of the 1991 Eurographics Workshop on Multimedia Systems, Applications, and Interaction, Apr. 1991.
Klabbers et al., "Reducing Audible Spectral Discontinuities", IEEE Transactions on Speech and Audio Processing, vol. 9, No. 1, Jan. 2001, 13 pages.
Klatt et al., "Linguistic Uses of Segmental Duration in English: Acoustic and Perpetual Evidence", Journal of the Acoustical Society of America, vol. 59, No. 5, May 1976, 16 pages.
Kline et al., "Improving GUI Accessibility for People with Low Vision", CHI '95 Proceedings of the SIGCHI Conference on Human Factors in Computing Systems, May 7-11, 1995, pp. 114-121.
Kline et al., "UnWindows 1.0: X Windows Tools for Low Vision Users", ACM SIGCAPH Computers and the Physically Handicapped, No. 49, Mar. 1994, pp. 1-5.
Knight et al., "Heuristic Search", Production Systems, Artificial Intelligence, 2nd ed., McGraw-Hill, Inc., 1983-1991.
Knownav, "Knowledge Navigator", YouTube Video available at <http://www.youtube.com/watch?v=QRH8eimU_20>, Apr. 29, 2008, 1 page.
Kohler, Joachim, "Multilingual Phone Models far Vocabulary-Independent Speech Recognition Tasks", Speech Communication, vol. 35, No. 1-2, Aug. 2001, pp. 21-30.
Kominek et al., "Impact of Durational Outlier Removal from Unit Selection Catalogs", 5th ISCA Speech Synthesis Workshop, Jun. 14-16, 2004, 6 pages.

(56) References Cited

OTHER PUBLICATIONS

Konolige, Kurt, "A Framework for a Portable Natural-Language Interface to Large Data Bases", SRI International, Technical Note 197, Oct. 12, 1979, 54 pages.
Kroon et al., "Pitch Predictors with High Temporal Resolution", IEEE, vol. 2, 1990, pp. 661-664.
Kroon et al., "Quantization Procedures for the Excitation in CELP Coders", (Proceedings of IEEE International Acoustics, Speech, and Signal Processing Conference, Apr. 1987), as reprinted in Vector Quantization (IEEE Press, 1990), 1990, pp. 320-323.
Kubala et al., "Speaker Adaptation from a Speaker-Independent Training Corpus", International Conference on Acoustics, Speech and Signal Processing (ICASSP'90), Apr. 1990, 4 pages.
Kubala et al., "The Hub and Spoke Paradigm for CSR Evaluation", Proceedings of the Spoken Language Technology Workshop, Mar. 1994, 9 pages.
Kuo et al., "A Radical-Partitioned coded Block Adaptive Neural Network Structure for Large-Volume Chinese Characters Recognition", International Joint Conference on Neural Networks, vol. 3, Jun. 1992, pp. 597-601.
Kuo et al., "A Radical-Partitioned Neural Network System Using a Modified Sigmoid Function and a Weight-Dotted Radical Selector for Large-Volume Chinese Character Recognition VLSI", IEEE Int. Symp. Circuits and Systems, Jun. 1994, pp. 3862-3865.
Kurlander et al., "Comic Chat", [Online], 1996 [Retrieved on: Feb. 4, 2013], SIGGRAPH '96 Proceedings of the 23rd annual conference on Computer graphics and interactive techniques, [Retrieved from: http://delivery.acm.org/10.1145/240000/237260/p225-kuriander.pdf], 1996, pp. 225-236.
Ladefoged, Peter, "A Course in Phonetics", New York, Harcourt, Brace, Jovanovich, Second Edition, 1982.
Laface et al., "A Fast Segmental Viterbi Algorithm for Large Vocabulary Recognition", International Conference on Acoustics, Speech, and Signal Processing, vol. 1, May 1995, pp. 560-563.
Lafferty et al., "Conditional Random Fields: Probabilistic Models for Segmenting and Labeling Sequence Data", Proceedings of the 18th International Conference on Machine Learning, 2001, 9 pages.
Laird et al., "SOAR: An Architecture for General Intelligence", Artificial Intelligence, vol. 33, 1987, pp. 1-64.
Lamel et al., "Generation and synthesis of Broadcast Messages", Proceedings of ESCA-NATO Workshop: Applications of Speech Technology, Sep. 1, 1993, 4 pages.
Lamping et al., "Laying Out and Visualizing Large Trees Using a Hyperbolic Space", Proceedings of the ACM Symposium on User Interface Software and Technology, Nov. 1994, pp. 13-14.
Lamping et al., "Visualizing Large Trees Using the Hyperbolic Browser", Apple Inc., Video Clip, MIT Media Library, on a CD, 1995.
Langley et al., "A Design for the ICARUS Architechture", SIGART Bulletin, vol. 2, No. 4, 1991, pp. 104-109.
Lantz et al., "Towards a Universal Directory Service", Departments of Computer Science and Electrical Engineering, Stanford University, 1985, pp. 250-260.
Lantz, Keith, "An Experiment in Integrated Multimedia Conferencing", 1986, pp. 267-275.
Larks, "Intelligent Software Agents", available at <http://www.cs.cmu.edu/~softagents/larks.html> retrieved on Mar. 15, 2013, 2 pages.
Lau et al., "Trigger-Based Language Models: A Maximum Entropy Approach", ICASSP'93 Proceedings of the 1993 IEEE international conference on Acoustics, speech, and signal processing: speech processing—vol. II, 1993, pp. 45-48.
Lauwers et al, "Collaboration Awareness in Support of Collaboration Transparency: Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and IEEE CS TC-OA conference on Office information systems, ACM SIGOIS Bulletin, 1990, pp. 249-260.
Lazzaro, Joseph J., "Adapting Desktop Computers to Meet the Needs of Disabled Workers is Easier Than You Might Think", Computers for the Disabled, BYTE Magazine, Jun. 1993, 4 pages.
Leahy et al., "Effect of Touch Screen Target Location on User Accuracy", Proceedings of the Human Factors Society 34th Annual Meeting, 1990, 5 pages.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
Lee et al., "A Real-Time Mandarin Dictation Machine for Chinese Language with Unlimited Texts and Very Large Vocabulary", International Conference on Acoustics, Speech and Signal Processing, vol. 1, Apr. 1990, 5 pages.
Lee et al., "Golden Mandarin (II)—An Improved Single-Chip Real-Time Mandarin Dictation Machine for Chinese Language with Very Large Vocabulary", IEEE International Conference of Acoustics, Speech and Signal Processing, vol. 2, 1993, 4 pages.
Lee et al., "Golden Mandarin (II)—An Intelligent Mandarin Dictation Machine for Chinese Character Input with Adaptation/Learning Functions", International Symposium on Speech, Image Processing and Neural Networks, Hong Kong, Apr. 1994, 5 pages.
Lee et al., "On URL Normalization", Proceedings of the International Conference on Computational Science and its Applications, ICCSA 2005, pp. 1076-1085.
Lee et al., "System Description of Golden Mandarin (I) Voice Input for Unlimited Chinese Characters", International Conference on Computer Processing of Chinese & Oriental Languages, vol. 5, No. 3 & 4, Nov. 1991, 16 pages.
Lee, K. F., "Large-Vocabulary Speaker-Independent Continuous Speech Recognition: The SPHINX System", Partial Fulfillment of the Requirements for the Degree of Doctorof Philosophy, Computer Science Department, Carnegie Mellon University, Apr. 1988, 195 pages.
Lee, Kai-Fu, "Automatic Speech Recognition", 1989, 14 pages (Table of Contents).
Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.
Leong et al. "CASIS: A Context-Aware Speech Interface System", Proceedings of the 10th International Conference on Intelligent User Interfaces, Jan. 2005, pp. 231-238.
Leung et al., "A Review and Taxonomy of Distortion-Oriented Presentation Techniques", ACM Transactions on Computer-Human Interaction (TOCHI), vol. 1, No. 2, Jun. 1994, pp. 126-160.
Leveseque et al., "A Fundamental Tradeoff in Knowledge Representation and Reasoning", Readings in Knowledge Representation, 1985, 30 pages.
Levinson et al., "Speech synthesis in telecommunications", IEEE Communications Magazine, vol. 31, No. 11, Nov. 1993, pp. 46-53.
Lewis, "Speech synthesis in a computer aided learning environment", UK IT, Mar. 19-22, 1990, pp. 294-298.
Lewis, Cameron, "Task Ave for iPhone Review", Mac Life, Available at <http://www.maclife.com/article/reviews/task_ave_iphone_review>, Mar. 3, 2011, 5 pages.
Lewis, Peter, "Two New Ways to Buy Your Bits", CNN Money, available at <http://money.cnn.com/2003/12/30/commentary/ontechnology/download/>,, Dec. 31, 2003, 4 pages.
Li et al., "A Phonotactic Language model for Spoken Language Identification", Proceedings of the 43rd Annual Meeting of the ACL, Jun. 25, 2005, pp. 515-522.
Lieberman et al, "Out of Context: Computer Systems that Adapt to, and Learn from, Context", IBM Systems Journal, vol. 39, No. 3 & 4, 2000, pp. 617-632.
Lieberman, Henry, "A Multi-Scale, Multi-Layer, Translucent Virtual Space", Proceedings of IEEE Conference on Information Visualization, Aug. 1997, pp. 124-131.
Lieberman, Henry, "Powers of Ten Thousand: Navigating in Large Information Spaces", Proceedings of the ACM Symposium on User Interface Software and Technology, Nov. 1994, pp. 1-2.

(56) References Cited

OTHER PUBLICATIONS

Lin et al., "A Distributed Architecture for Cooperative Spoken Dialogue Agents with Coherent Dialogue State and History", Available on line at <http://citeseerx.ist.psu.edu/viewdoc/summary?doi=10.1.1.42.272>, 1999, 4 pages.

Lin et al., "A New Framework for Recognition of Mandarin Syllables with Tones Using Sub-syllabic Unites", IEEE International Conference on Acoustics, Speech and Signal Processing (ICASSP-93), Apr. 1993, 4 pages.

Linde et al., "An Algorithm for Vector Quantizer Design", IEEE Transactions on Communications, vol. 28, No. 1, Jan. 1980, 12 pages.

Liu et al., "Efficient Joint Compensation of Speech for the Effects of Additive Noise and Linear Filtering", IEEE International Conference of Acoustics, Speech and Signal Processing, ICASSP-92, Mar. 1992, 4 pages.

Logan et al., "Mel Frequency Cepstral Co-efficients for Music Modeling", International Symposium on Music Information Retrieval, 2000, 2 pages.

Lowerre, B. T., "The-Harpy Speech Recognition System", Doctoral Dissertation, Department of Computer Science, Carnegie Mellon University, Apr. 1976, 20 pages.

Lyon, R., "A Computational Model of Binaural Localization and Separation", Proceedings of IEEE International Conference on Acoustics, Speech and Signal Processing, Apr. 1983, pp. 1148-1151.

Lyons et al., "Augmenting Conversations Using Dual-Purpose Speech", Proceedings of the 17th Annual ACM Symposium on User interface Software and Technology, 2004, 10 pages.

Lyons, Richard F., "CCD Correlators for Auditory Models", Proceedings of the Twenty-Fifth Asilomar Conference on Signals, Systems and Computers, Nov. 4-6, 1991, pp. 785-789.

Macchi, Marian, "Issues in Text-to-Speech Synthesis" Proceedings of IEEE International Joint Symposia on Intelligence and Systems, May 21, 1998, pp. 318-325.

Mackenzie et al., "Alphanumeric Entry on Pen-Based Computers", International Journal of Human-Computer Studies, vol. 41, 1994, pp. 775-792.

MacKinlay et al., "The Perspective Wall: Detail and Context Smoothly Integrated", ACM, 1991, pp. 173-179.

Macsimum News, "Apple Files Patent for an Audio Interface for the iPod", available at <http://www.macsimumnews.com/index.php/archive/apple_files_patent_for_an_audio_interface_for_the_ipod>, retrieved on Jul. 13, 2006, 8 pages.

Mactech, "KeyStrokes 3.5 for Mac OS X Boosts Word Prediction", available at <http://www.mactech.com/news/?p=1007129>, retrieved on Jan. 7, 2008, 3 pages.

Maghbouleh, Arman, "An Empirical Comparison of Automatic Decision Tree and Linear Regression Models for Vowel Durations", Revised Version of a Paper Presented at the Computational Phonology in Speech Technology Workshop, 1996 Annual Meeting of the Association for Computational Linguistics in Santa Cruz, California, 7 pages.

Mahedero et al,, "Natural Language Processing of Lyrics", In Proceedings of the 13th Annual ACM International Conference on Multimedia, ACM, Nov. 6-11, 2005, 4 pages.

Mangu et al., "Finding Consensus in Speech Recognition: Word Error Minimization and Other Applications of Confusion Networks", Computer Speech and Language, vol. 14, No. 4, 2000, pp. 291-294.

Manning etal, "Foundations of Statistical Natural Language Processing", The MIT Press, Cambridge Massachusetts, 1999, pp. 10-11.

Marcus et al., "Building a Large Annotated Corpus of English: The Penn Treebank", Computational Linguistics, vol. 19, No. 2, 1993, pp. 313-330.

Markel et al., "Linear Prediction of Speech", Springer-Verlag, Berlin, Heidelberg, New York, 1976, 12 pages.

Markel et al., "Linear Production of Speech", Reviews, 1976, pp. xii, 288.

Martin et al., "Building and Using Practical Agent Applications", SRI International, PAAM Tutorial, 1998, 78 pages.

Martin et al., "Building Distributed Software Systems with the Open Agent Architecture", Proceedings of the Third International Conference on the Practical Application of Intelligent Agents and Multi-Agent Technology, Mar. 1998, pp. 355-376.

Martin et al., "Development Tools for the Open Agent Architecture", Proceedings of the International Conference on the Practical Application of Intelligent Agents and Multi-Agent Technology, Apr. 1996, pp. 1-17.

Martin et al., "Information Brokering in an Agent Architecture", Proceedings of the Second International Conference on the Practical Application of Intelligent Agents and Multi-Agent Technology, Apr. 1997, pp. 1-20.

Martin et al., "The Open Agent Architecture: A Framework for Building Distributed Software Systems", Applied Artificial Intelligence: An International Journal, vol. 13, No. 1-2, available at <http://adam.cheyer.com/papers/oaa.pdf>>, retrieved from Internet on Jan.-Mar. 1999.

Martin et al., "Transportability and Generality in a Natural-Language Interface System", Proceedings of the Eighth International Joint Conference on Artificial Intelligence, Technical Note 293, Aug. 1983, 21 pages.

Martins et al., "Extracting and Exploring the Geo-Temporal Semantics of Textual Resources", Semantic Computing, IEEE International Conference, 2008, pp. 1-9.

Masui, Toshiyuki, "POBox: An Efficient Text Input Method for Handheld and Ubiquitous Computers", Proceedings of the 1st International Symposium on Handheld and Ubiquitous Computing, 1999, 12 pages.

Matiasek et al., "Tamic-P: A System for NL Access to Social Insurance Database", 4th International Conference on Applications of Natural Language to Information Systems, Jun. 1999, 7 pages.

Matsui et al., "Speaker Adaptation of Tied-Mixture-Based Phoneme Models for Text-Prompted Speaker Recognition", 1994 IEEE International Conference on Acoustics, Speech and Signal Processing, Apr. 19-22, 1994, 1-125-1-128.

Matsuzawa, A, "Low-Voltage and Low-Power Circuit Design for Mixed Analog/Digital Systems in Portable Equipment", IEEE Journal of Solid-State Circuits, vol. 29, No. 4, 1994, pp. 470-480.

McGuire et al., "Shade: Technology for Knowledge-Based Collaborative Engineering", Journal of Concurrent Engineering Applications and Research (CERA), 1993, 18 pages.

Meet Ivee, Your Wi-Fi Voice Activated Assistant, available at <http://www.helloivee.com/>, retrieved on Feb. 10, 2014, 8 pages.

Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.

Mellinger, David K., "Feature-Map Methods for Extracting Sound Frequency Modulation", IEEE Computer Society Press, 1991, pp. 795-799.

Meng et al, "Generating Phonetic Cognates to Handle Named Entities in English-Chinese Cross-Language Spoken Document Retrieval", Automatic Speech Recognition and Understanding, Dec. 2001, pp. 311-314.

Meng et al, "Wheels: A Conversational System in the Automobile Classified Domain", Proceedings of Fourth International Conference on Spoken Language, ICSLP 96, vol. 1, Oct. 1996, 4 pages.

Menico, Costas, "Faster String Searches", Dr. Dobb's Journal, vol. 14, No. 7, Jul. 1989, pp. 74-77.

Menta, Richard, "1200 Song MP3 Portable is a Milestone Player", available at <http://www.mp3newswire.net/staries/personaljuke.html>, Jan. 11, 2000, 4 pages.

Merlin et al., "Non Directly Acoustic Process for Costless Speaker Recognition and Indexation", International Workshop on Intelligent Communication Technologies and Applications, Jan. 1, 1999, 5 pages.

Meyer, Mike, "A Shell for Modern Personal Computers", University of California, Aug. 1987, pp. 13-19.

Meyrowitz et al., "Bruwin: An Adaptable Design Strategy for Window Manager/Virtual Terminal Systems", Department of Computer Science, Brown University, 1981, pp. 180-189.

(56) References Cited

OTHER PUBLICATIONS

Miastkowski, Stan, "paperWorks Makes Paper Intelligent", Byte Magazine, Jun. 1992.
Michos et al., "Towards an Adaptive Natural Language Interface to Command Languages", Natural Language Engineering, vol. 2, No. 3, 1996, pp. 191-209.
Microsoft Corporation, "Microsoft MS-DOS Operating System User's Guide", Microsoft Corporation, 1982, pp. 4-1 to 4-16, 5-1 to 5-19.
Microsoft Corporation, Microsoft Office Word 2003 (SP2), Microsoft Corporation, SP3 as of 2005, pp. MSWord 2003 Figures 1-5, 1983-2003.
Microsoft Press, "Microsoft Windows User's Guide for the Windows Graphical Environment", version 3.0, 1985-1990, pp. 33-41 & 70-74.
Microsoft Windows XP, "Magnifier Utility", Oct. 25, 2001, 2 pages.
Microsoft Word 2000 Microsoft Corporation, pp. MSWord Figures 1-5, 1999.
Microsoft, "Turn on and Use Magnifier", available at <http://www.microsoft.com/windowsxp/using/accessibility/magnifierturnon.mspx>, retrieved on Jun. 6, 2009.
Microsoft/Ford, "Basic Sync Commands", www.SyncMyRide.com, Sep. 14, 2007, 1 page.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Milner, N. P., "A Review of Human Performance and Preferences with Different Input Devices to Computer Systems", Proceedings of the Fourth Conference of the British Computer Society on People and Computers, Sep. 5-9, 1988, pp. 341-352.
Milstead et al., "Metadata: Cataloging by Any Other Name", available at <http://www.iicm.tugraz.at/thesis/cguetl_diss/lteratur/Kapitel06/References/Milstead_et_al._1999/metadata.html>, Jan. 1999, 18 pages.
Milward et al., "D2.2: Dynamic Multimodal Interface Reconfiguration, Talk and Look: Tools for Ambient Linguistic Knowledge", available at <http://www.ihmc.us/users/nblaylock!Pubs/Files/talk d2.2.pdf>, Aug. 8, 2006, 69 pages.
Miniman, Jared, "Applian Software's Replay Radio and Player v1.02", pocketnow.com—Review, available at <http://www.pocketnow.com/reviews/replay/replay.htm>, Jul. 31, 2001, 16 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Minker et al., "Hidden Understanding Models for Machine Translation", Proceedings of ETRW on Interactive Dialogue in Multi-Modal Systems, Jun. 1999, pp. 1-4.
Mitra et al., "A Graph-Oriented Model for Articulation of Ontology Interdependencies", Advances in Database Technology, Lecture Notes in Computer Science, vol. 1777, 2000, pp. 1-15.
Moberg et al., "Cross-Lingual Phoneme Mapping for Multilingual Synthesis Systems", Proceedings of the 8th International Conference on Spoken Language Processing, Jeju Island, Korea, Interspeech 2004, Oct. 4-8, 2004, 4 pages.
Moberg, M., "Contributions to Multilingual Low-Footprint TTS System for Hand-Held Devices", Doctoral Thesis, Tampere University of Technology, Aug. 17, 2007, 82 pages.
Mobile Speech Solutions, Mobile Accessibility, SVOX AG Product Information Sheet, available at <http://www.svox.com/site/bra840604/con782768/mob965831936.aSQ?osLang=1, Sep. 27, 2012, 1 page.
Mobile Tech News, "T9 Text Input Software Updated", available at <http://www.mobiletechnews.com/info/2004/11/23/122155,html>, Nov. 23, 2004, 4 pages.
Modi et al., "CMRadar: A Personal Assistant Agent for Calendar Management", AAAI, Intelligent Systems Demonstrations, 2004, pp. 1020-1021.
Mok et al., "Media Searching on Mobile Devices", IEEE EIT 2007 Proceedings, 2007, pp. 126-129.
Moore et al., "Combining Linguistic and Statistical Knowledge Sources in Natural-Language Processing for ATIS", SRI International, Artificial Intelligence Center, 1995, 4 pages.
Moore et al., "SRI's Experience with the ATIS Evaluation", Proceedings of the Workshop on Speech and Natural Language, Jun. 1990, pp. 147-148.
Moore et al., "The Information Warfare Advisor: An Architecture for Interacting with Intelligent Agents Across the Web", Proceedings of Americas Conference on Information Systems (AMCIS), Dec. 31, 1998, pp. 186-188.
Moore, Robert C,, "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-Based User Interfaces", Proceedings of International Workshop an Human Interface Technology, Oct. 1995, pp. 1-4.
Moran et al., "Multimodal User Interfaces in the Open Agent Architecture", International Conference on Intelligent User Interfaces (IUI97), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Morland, D. V., "Human Factors Guidelines for Terminal Interface Design", Communications ofthe ACM vol. 26, No. 7, Jul. 1983, pp. 484-494.
Morris et al., "Andrew: A Distributed Personal Computing Environment", Communications of the ACM, (Mar. 1986); vol. 29 No. 3,, Mar. 1986, pp. 184-201.
Morton, Philip, "Checking If an Element Is Hidden", StackOverflow, Available at <http://stackoverflow.com/questions/178325/checking-if-an-element-is-hidden>, Oct. 7, 2008, 12 pages.
Motro, Amihai, "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Apple Computer, Inc., Addison-Wesley Publishing Company, Inc., 1990, 17 pages.
Mozer, Michael C., "An Intelligent Environment must be Adaptive", IEEE Intelligent Systems, 1999, pp. 11-13.
Muller et al., "CSCW'92 Demonstrations", 1992, pp. 11-14.
Murty et al., "Combining Evidence from Residual Phase and MFCC Features for Speaker Recognition", IEEE Signal Processing Letters, vol. 13, No. 1, Jan. 2006, 4 pages.
Murveit et al., "Integrating Natural Language Constraints into HMM-Based Speech Recognition", International Conference on Acoustics, Speech and Signal Processing, Apr. 1990, 5 pages.
Murveit et al., "Speech Recognition in SRI's Resource Management and ATIS Systems", Proceedings of the Workshop on Speech and Natural Language, 1991, pp. 94-100.
Musicmatch, "Musicmatch and Xing Technology Introduce Musicmatch Jukebox", Press Releases, available at <http://www.musicmatch.com/info/company/press/releases?year=1998&release=2>, May 18, 1998, 2 pages.
Muthesamy et al., "Speaker-Independent Vowel Recognition: Spectograms versus Cochleagrams", IEEE, Apr. 1990.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
N200 Hands-Free Bluetooth Car Kit, available at <www.wirelessground.com>, retrieved on Mar. 19, 2007, 3 pages.

(56) References Cited

OTHER PUBLICATIONS

Nadoli et al., "Intelligent Agents in the Simulation of Manufacturing Systems", Proceedings of the SCS Multiconference on AI and Simulation, 1989, 1 page.
Nakagawa et al., "Speaker Recognition by Combining MFCC and Phase Information", IEEE International Conference on Acoustics, Speech and Signal Processing (ICASSP), Mar. 2010, 4 pages.
Nakagawa et al., "Unknown Word Guessing and Part-of-Speech Tagging Using Support Vector Machines", Proceedings of the 6th NLPRS, 2001, pp. 325-331.
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 70 pages.
NCIP Staff, "Magnification Technology", available at <http://www2.edc.org/ncip/library/vi/magnifi.htm>, 1994, 6 pages.
NCIP, "NCIP Library: Word Prediction Collection", available at <http://www2.edc.org/ncip/library/wp/toc.htm>, 1998, 4 pages.
NCIP, "What is Word Prediction?", available at <http://www2.edc.org/NCIP/library/wp/what_is.htm>, 1998, 2 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Neches et al., "Enabling Technology for Knowledge Sharing", Fall, 1991, pp. 37-56.
Newton, Harry, "Newton's Telecom Dictionary", Mar. 1998, pp. 62, 155, 610-611, 771.
Ng, Simon, "Google's Task List Now Comes to Iphone", SimonBlog, Available at <http://www.simonblog.com/2009/02/04/googles-task-list-now-comes-to-iphone/>, Feb. 4, 2009, 33 pages.
Nguyen et al., "Generic Manager for Spoken Dialogue Systems", In DiaBruck: 7th Workshop on the Semantics and Pragmatics of Dialogue, Proceedings, 2003, 2 pages.
Niesler et al., "A Variable-Length Category-Based N-Gram Language Model", IEEE International Conference on Acoustics, Speech and Signal Processing (ICASSP'96), vol. 1, May 1996, 6 pages.
Nilsson, B. A., "Microsoft Publisher is an Honorable Start for DTP Beginners", Computer Shopper, Feb. 1, 1992, 2 pages.
Noik, Emanuel G., "Layout-Independent Fisheye Views of Nested Graphs", IEEE Proceedings of Symposium on Visual Languages, 1993, 6 pages.
Nonhoff-Arps et al., "StraBenmusik: Portable MP3-Spieler mit USB Anschluss", CT Magazin Fuer Computer Technik, Verlag Heinz Heise GMBH, Hannover DE, No. 25, 2000, pp. 166-175.
Northern Telecom, "Meridian Mail PC User Guide", 1988, 17 Pages.
Notenboom, Leo A., "Can I Retrieve Old MSN Messenger Conversations?", available at <http://ask-leo.com/can_i_retrieve_old_msn_messenger_conversations.html>, Mar. 11, 2004, 23 pages.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
O'Connor, Rory J., "Apple Banking on Newton's Brain", San Jose Mercury News, Apr. 22, 1991.
Odubiyi et al., "SAIRE—A Scalable Agent-Based Information Retrieval Engine", Proceedings of the First International Conference on Autonomous Agents, 1997, 12 pages.
Ohsawa et al., "A computational Model of an Intelligent Agent Who Talks with a Person", Research Reports on Information Sciences, Series C, No. 92, Apr. 1989, pp. 1-18.
Ohtomo et al., "Two-Stage Recognition Method of Hand-Written Chinese Characters Using an Integrated Neural Network Model", Denshi Jaahoo Tsuushin Gakkai Ronbunshi, D-II, vol. J74, Feb. 1991, pp. 158-165.
Okazaki et al., "Multi-Fisheye Transformation Method for Large-Scale Network Maps", IEEE Japan, vol. 44, No. 6, 1995, pp. 495-500.
Omologo et al., "Microphone Array Based Speech Recognition with Different Talker-Array Positions", IEEE International Conference on Acoustics, Speech, and Signal Processing, vol. 1, Apr. 21-24, 1997, pp. 227-230.
Oregon Scientific, "512MB Waterproof MP3 Player with FM Radio & Built-in Pedometer", available at <http://www2.oregonscientific.com/shop/product.asp?cid:=4&scid=11&pid=581>, retrieved on Jul. 31, 2006, 2 pages.
Oregon Scientific, "Waterproof Music Player with FM Radio and Pedometer (MP121)—User Manual", 2005, 24 pages.
Osxdaily, "Get a List of Siri Commands Directly from Siri", Available at <http://osxdaily.com/2013/02/05/list-siri-commands/>, Feb. 5, 2013, 15 pages.
Owei et al., "Natural Language Query Filtration in the Conceptual Query Language", IEEE, 1997, pp. 539-549.
Padilla, Alfredo, "Palm Treo 750 Cell Phone Review—Messaging", available at <http://www.wirelessinfo.com/content/palm-Treo-750-Cell-Phone-Review/Messaging,htm>, Mar. 17, 2007, 6 pages.
Palay et al., "The Andrew Toolkit: An Overview", Information Technology Center, Carnegie-Mellon University, 1988, pp. 1-15.
Palm, Inc., "User Guide: Your Palm® Treo.TM 755p Smartphone", 2005-2007, 304 pages.
Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010.
Panasonic, "Toughbook 28: Powerful, Rugged and Wireless", Panasonic: Toughbook Models, available at <http://www.panasonic.com/computer/notebook/html/01a_s8.htm>, retrieved on Dec. 19, 2002, 3 pages.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", Available online at <http://citeseerx.ist.psu.edu/messages/downloadsexceeded.html>, Nov. 14, 1997, 21 pages.
Parks et al., "Classification of Whale and Ice Sounds with a cochlear Model", IEEE, Mar. 1992.
Parson, T. W., "Voice and Speech Processing", Pitch and Formant Estimation, McGraw-Hill, Inc., ISBN: 0-07-0485541-0, 1987, 15 pages.
Parsons, T. W., "Voice and Speech Processing", Linguistics and Technical Fundamentals, Articulatory Phonetics and Phonemics, McGraw-Hill, Inc, ISBN: 0-07-0485541-0, 1987, 5 pages.
Patent Abstracts of Japan, vol. 014, No. 273 (E-0940) Jun. 13, 1990 (Jun. 13, 1990)—& JP 02 086057 A (Japan Storage Battery Co Ltd), Mar. 27, 1990 (Mar. 27, 1990).
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
Patterson et al., "Rendezvous: An Architecture for Synchronous Multi-User Applications", CSCW '90 Proceedings, 1990, pp. 317-328.
Pearl, Amy, "System Support for Integrated Desktop Video Conferencing", Sunmicrosystems Laboratories, Dec. 1992, pp. 1-15.
Penn et al, "Ale for Speech: A Translation Prototype", Bell Laboratories, 1999, 4 pages.
Pereira, Fernando, "Logic for Natural Language Analysis", SRI International, Technical Note 275, Jan. 1983, 194 pages.
Perrault et al., "Natural-Language Interfaces", SRI International, Technical Note 393, Aug. 22, 1986, 48 pages.
PhatNoise, Voice Index on Tap, Kenwood Music Keg, available at <http://www.phatnoise.com/kenwood/kenwoodssamail.html>, retrieved on Jul. 13, 2006, 1 page.
Phillipps, Ben, "Touchscreens are Changing the Face of Computers—Today's Users Have Five Types of Touchscreens to Choose from, Each with its Own Unique Characteristics", Electronic Products, Nov. 1994, pp. 63-70.
Phillips, Dick, "The Multi-Media Workstation", SIGGRAPH '89 Panel Proceedings, 1989, pp. 93-109.

(56) References Cited

OTHER PUBLICATIONS

Phoenix Solutions, Inc., "Declaration of Christopher Schmandt Regarding the MIT Galaxy System", West Interactive Corp., A Delaware Corporation, Document 40, Jul. 2, 2010, 162 pages.
Pickering, J. A., "Touch-Sensitive Screens: The Technologies and Their Application", International Journal of Man-Machine Studies, vol. 25, No. 3, Sep. 1986, pp. 249-269.
Picone, J., "Continuous Speech Recognition using Hidden Markov Models", IEEE ASSP Magazine, vol. 7, No. 3, Jul. 1990, 16 pages.
Pingali et al., "Audio-Visual Tracking for Natural Interactivity", ACM Multimedia, Oct. 1999, pp. 373-382.
Plaisant et al., "Touchscreen Interfaces for Alphanumeric Data Entry", Proceedings of the Human Factors and Ergonomics Society 36th Annual Meeting, 1992, pp. 293-297.
Plaisant et al., "Touchscreen Toggle Design", CHI'92, May 3-7, 1992, pp. 667-668.
Pollock, Stephen, "A Rule-Based Message Filtering System", Published in: Journal, ACM Transactions an Information Systems (TOIS), vol. 6, Issue 3, Jul. 1988, pp. 232-254.
Poly-Optical Products, Inc., "Poly-Optical Fiber Optic Membrane Switch Backlighting", available at <http://www.poly-optical.com/membrane_switches.html>, retrieved on Dec. 19, 2002, 3 pages.
Poor, Alfred, "Microsoft Publisher", PC Magazine, vol. 10, No. 20, Nov. 26, 1991, 1 page.
Potter et al., "An Experimental Evaluation of Three Touch Screen Strategies within a Hypertext Database", International Journal of Human-Computer Interaction, vol. 1, No. 1, 1989, pp. 41-52.
Potter et al., "Improving the Accuracy of Touch Screens: An Experimental Evaluation of Three Strategies", CHI '88 ACM, 1988, pp. 27-32.
Powell, Josh, "Now You See Me . . . Show/Hide Performance", available at http://www.learningjquery.com/2010/05/now-you-see-me-showhide-performance, May 4, 2010.
Public Safety Technologies, "Tracer 2000 Computer", available at <http://www.pst911.com/tracer.html>, retrieved on Dec. 19, 2002, 3 pages.
Pulman et al., "Clare: A Combined Language and Reasoning Engine", Proceedings of JFIT Conference, available at <http://www.cam.sri.com/tr/crc042/paper.ps.Z>, 1993, 8 pages.
Quazza et al., "Actor: A Multilingual Unit-Selection Speech Synthesis System", Proceedings of 4th ISCA Tutorial and Research Workshop on Speech Synthesis, Jan. 1, 2001, 6 pages.
Quick Search Algorithm, Communications of the ACM, 33(8), 1990, pp. 132-142.
Rabiner et al, "Digital Processing of Speech Signals", Prentice Hall, 1978, pp. 274-277.
Rabiner et al, "Fundamental of Speech Recognition", AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62, No. 8, Oct. 1983, 9 pages.
Rampe et al., "SmartForm Designer and SmartForm Assistant", News release, Claris Corp., Jan. 9, 1989, 1 page.
Rao et al., "Exploring Large Tables with the Table Lens", Apple Inc., Video Cop, Xerox Corp., on a CD, 1994.
Rao et al., "Exploring Large Tables with the Table Lens", CHI'95 Mosaic of Creativity, ACM, May 7-11, 1995, pp. 403-404.
Rao et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.
Raper, Larry K.,"The C-MU PC Server Project", (CMU-ITC-86-051), Dec. 1986, pp. 1-30.
Ratcliffe et al., "Intelligent Agents Take U.S. Bows", MacWeek, vol. 6, No. 9, Mar. 2, 1992, 1 page.
Ratcliffe, M., "ClearAccess 2.0 Allows SQL Searches Off-Line (Structured Query Language) (ClearAccess Corp. Preparing New Version of Data-Access Application with Simplified User Interface, New Features) (Product Announcement)", MacWeek, vol. 6, No. 41, Nov. 16, 1992, 2 pages.
Ravishankar, Mosur K., "Efficient Algorithms for Speech Recognition", Doctoral Thesis Submitted to School of Computer Science, Computer Science Division, Carnegie Mellon University, Pittsburgh, May 15, 1996, 146 pages.
Rayner et al., "Adapting the Core Language Engine to French and Spanish", Cornell University Library, available at <http:l/arxiv.org/abs/cmp-lg/9605015>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner et al., "Spoken Language Translation with Mid-90's Technology: A Case Study", Eurospeech, ISCA, Available online at <http://citeseerx.ist.psu.edu/viewdoc/summary?doi=10.1.1.54.8608>, 1993, 4 pages.
Rayner, M., "Abductive Equivalential Translation and its Application to Natural Language Database Interfacing", Dissertation Paper, SRI International, Sep. 1993, 162 pages.
Rayner, Manny, "Linguistic Domain Theories: Natural-Language Database Interfacing from First Principles", SRI International, Cambridge, 1993, 11 pages.
Reddi, "The Parser".
Reddy, D. R., "Speech Recognition by Machine: A Review", Proceedings of the IEEE, Apr. 1976, pp. 501-531.
Reininger et al., "Speech and Speaker Independent Codebook Design in VQ Coding Schemes", (Proceedings of the IEEE International Acoustics, Speech and Signal Processing Conference, Mar. 1985), as reprinted in Vector Quantization (IEEE Press, 1990), 1990, pp. 271-273.
Remde et al., "SuperBook: An Automatic Tool for Information Exploration—Hypertext?", In Proceedings of Hypertext, 87 Papers, Nov. 1987, 14 pages.
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren et al., "improving Selection Performance on Pen-Based Systems: A Study of Pen-Based Interaction for Selection Tasks", ACM Transactions on Computer-Human Interaction, vol. 7, No. 3, Sep. 2000, pp. 384-416.
Ren et al, "The Best among Six Strategies for Selecting a Minute Target and the Determination of the Minute Maximum Size of the Targets on a Pen-Based Computer", Human-Computer Interaction Interact, 1997, pp. 85-92.
Reynolds, C. F., "On-Line Reviews: A New Application of the HICOM Conferencing System", IEEE Colloquium on Human Factors in Electronic Mail and Conferencing Systems, Feb. 3, 1989, 4 pages.
Rice et al., "Monthly Program: Nov. 1.4, 1995", The San Francisco Bay Area Chapter of ACM SIGCHI, available at.<http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Ricker, Thomas, "Apple Patents Audio User Interface", Engadget, available at <http://www.engadget.com/2006/05/04/apple-patents-audio-user-interface/>, May 4, 2006, 6 pages.
Riecken, R D., "Adaptive Direct Manipulation", IEEE Xplore, 1991, pp. 1115-1120.
Rigoll, G., "Speaker Adaptation for Large Vocabulary Speech Recognition Systems Using Speaker Markov Models", International Conference on Acoustics, Speech and Signal Processing (ICASSP'89), May 1989, 4 pages.
Riley, M D., "Tree-Based Modelling of Segmental Durations", Talking Machines Theories, Models and Designs, Elsevier Science Publishers B.V., North-Holland, ISBN: 08-444-89115.3, 1992, 15 pages.
Rioport, "Rio 500: Getting Started Guide", available at <http://ec1.images-amazon.com/media/i3d/01/A/man-migrate/MANUAL000023453.pdf>, 1999, 2 pages.
Rivlin et al., "Maestro: Conductor of Multimedia Analysis Technologies", SRI International, 1999, 7 pages.

(56) References Cited

OTHER PUBLICATIONS

Rivoira et al., "Syntax and Semantics in a Word-Sequence Recognition System", IEEE International Conference on Acoustics, Speech and Signal Processing (ICASSP'79), Apr. 1979, 5 pages.
Robbin et al., "MP3 Player and Encoder for Macintosh!", SoundJam MP Plus, Version 2.0, 2000, 76 pages.
Robertson et al., "Information Visualization Using 3D Interactive Animation", Communications of the ACM, vol. 36, No. 4, Apr. 1993, pp. 57-71.
Robertson et al., "The Document Lens", UIST '93, Nov. 3-5, 1993, pp. 101-108.
Roddy et al., "Communication and Collaboration in a Landscape of B2B eMarketplaces", VerticalNet Solutions, White Paper, Jun. 15, 2000, 23 pages.
Roddy et al., "Interface Issues in Text Based Chat Rooms", SIGCHI Bulletin, vol. 30, No. 2, Apr. 1998, pp. 119-123.
Root, Robert, "Design of a Multi-Media Vehicle for Social Browsing", Bell Communications Research, 1988, pp. 25-38.
Rose et al., "Inside Macintosh", vols. I, II, and III, Addison-Wesley Publishing Company, Inc., Jul. 1988, 1284 pages.
Roseberry, Catherine, "How to Pair a Bluetooth Headset & Cell Phone", available at <http://mobileoffice.about.com/od/usingyourphone/ht/blueheadset_p.htm>, retrieved on Apr. 29, 2006, 2 pages.
Rosenberg et al., "An Overview of the Andrew Message System", Information Technology Center Carnegie-Mellon University, Jul. 1987, pp. 99-108.
Rosenfeld, R., "A Maximum Entropy Approach to Adaptive Statistical Language Modelling", Computer Speech and Language, vol. 10, No. 3, Jul. 1996, 25 pages.
Rosner et al., "In Touch: A Graphical User interface Development Tool", IEEE Colloquium on Software Tools for Interface Design, Nov. 8, 1990, pp. 12/1-12/7.
Rossfrank, "Konstenlose Sprachmitteilungins Festnetz", XP002234425, Dec. 10, 2000, pp. 1-4.
Roszkiewicz, A., "Extending your Apple", Back Talk-Lip Service, A+ Magazine, The Independent Guide for Apple Computing, vol. 2, No. 2, Feb. 1984, 5 pages.
Roucos et al, "A Segment Vocoder at 150 B/S", (Proceedings of the IEEE International Acoustics, Speech and Signal Processing Conference, Apr. 1983), as reprinted in Vector Quantization (IEEE Press, 1990), 1990, pp. 246-249.
Roucos et al, "High Quality Time-Scale Modification for Speech", Proceedings of the 1985 IEEE Conference on Acoustics, Speech and Signal Processing, 1985, pp. 493-496.
Rubine, Dean Harris, "Combining Gestures and Direct Manipulation", CHI '92, May 3-7, 1992, pp. 659-660.
Rubine, Dean Harris, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Ruch et al., "Using Lexical Disambiguation and Named-Entity Recognition to Improve Spelling Correction in the Electronic Patient Record", Artificial Intelligence in Medicine, Sep. 2003, pp. 169-184.
Rudnicky el al., "Creating Natural Dialogs in the Carnegie Mellon Communicator System", Proceedings of Eurospeech, vol. 4, 1999, pp. 1531-1534.
Russell et al, "Artificial Intelligence, A Modern Approach", Prentice Hall, Inc., 1995, 121 pages.
Russo et al., "Urgency is a Non-Monotonic Function of Pulse Rate", Journal of the Acoustical Society of America, vol. 122, No. 5, 2007, 6 pages.
Sabin et al., "Product Code Vector Quantizers for Waveform and Voice Coding"(IEEE Transactions on Acoustics, Speech and Signal Processing, Jun. 1984), as reprinted in Vector Quantization (IEEE Press, 1990), 1990, pp. 274-288.
Sacerdoti et al., "A Ladder User's Guide (Revised)", SRI International Artificial Intelligence Center, Mar. 1980, 39 pages.
Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech and Signal Processing, vol. ASSP-26, No. 1, Feb. 1978, 8 pages.
Salton et al, "On the Application of Syntactic Methodologies in Automatic Text Analysis", Information Processing and Management, vol. 26, No. 1, Great Britain, 1990, 22 pages.
Sameshima et al., "Authorization with Security Attributes and Privilege Delegation Access control beyond the ACL", Computer Communications, vol. 20, 1997, 9 pages.
Sankar, Ananth, "Bayesian Model Combination (BAYCOM) for Improved Recognition", IEEE International Conference on Acoustics, Speech, and Signal Processing (ICASSP), Mar. 18-23, 2005, pp. 845-848.
San-Segundo et al, "Confidence Measures for Dialogue Management in the CU Communicator System", Proceedings of Acoustics, Speech and Signal Processing (ICASSP'00), Jun. 2000, 4 pages.
Santaholma, Marianne E., "Grammar Sharing Techniques for Rule-based Multilingual NLP Systems", Proceedings of the 16th Nordic Conference of Computational Linguistics, NODALIDA 2007, May 25, 2007, 8 pages.
Santen, Jan P., "Assignment of Segmental Duration in Text-to-Speech Synthesis", Computer Speech and Language, vol. 8, No. 2, Apr. 1994, pp. 95-128.
Sarawagi, Sunita, "CRF Package Page", available at <http://crf.sourceforge.net/>, retrieved on Apr. 6, 2011, 2 pages.
Sarkar et al., "Graphical Fisheye Views of Graphs", CHI '92 Proceedings of the SIGCHI Conference on Human Factors in Computing Systems, May 3-7, 1992, pp. 83-91.
Sarkar et al., "Graphical Fisheye Views of Graphs", Systems Research Center, Digital Equipment Corporation,, Mar. 17, 1992, 31 pages.
Sarkar et al., "Graphical Fisheye Views", Communications of the ACM, vol. 37, No. 12, Dec. 1994, pp. 73-83.
Sarkar et al., "Stretching the Rubber Sheet: A Metaphor for Viewing Large Layouts on Small Screens", UIST'93, ACM, Nov. 3-5, 1993, pp. 81-91.
Sarvas et al., "Metadata Creation System for Mobile Images", Conference Proceedings, The Second International Conference on Mobile Systems, Applications and Services, Jun. 6, 2004, pp. 36-48.
Sastry, Ravindra W., "A Need for Speed: A New Speedometer for Runners", submitted to the Department of Electrical Engineering and Computer Science at the Massachusetts Institute of Technology, 1999, pp. 1-42.
Sato, H., "A Data Model, Knowledge Base and Natural Language Processing for Sharing a Large Statistical Database", Statistical and Scientific Database Management, Lecture Notes in Computer Science, vol. 339, 1989, 20 pages.
Savoy, J., "Searching Information in Hypertext Systems Using Multiple Sources of Evidence", International Journal of Man-Machine Studies, vol. 38, No. 6, Jun. 1996, 15 pages.
Scagliola, C., "Language Models and Search Algorithms for Real-Time Speech Recognition", International Journal of Man-Machine Studies, vol. 22, No. 5, 1985, 25 pages.
Schafer et al., "Digital Representations of Speech Signals", Proceedings of the IEEE, vol. 63, No. 4, Apr. 1975, pp. 662-677.
Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.
Scheifler, R. W., "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.
Schluter et al, "Using Phase Spectrum Information for Improved Speech Recognition Performance", IEEE International Conference on Acoustics, Speech, and Signal Processing, 2001, pp. 133-136.
Schmandt et al., "A Conversational Telephone Messaging System", IEEE Transactions on Consumer Electronics, vol. CE-30, Aug. 1984, pp. xxi-xxiv.
Schmandt et al., "Augmenting a Window System with Speech Input", IEEE Computer Society, Computer, vol. 23, No. 8, Aug. 1990, 8 pages.
Schmandt et al., "Phone Slave: A Graphical Telecommunications Interface", Proceedings of the SID, vol. 26, No. 1, 1985, pp. 79-82.

(56) References Cited

OTHER PUBLICATIONS

Schmandt et al., "Phone Slave: A Graphical Telecommunications Interface", Society for Information Display, International Symposium Digest of Technical Papers, Jun. 1984, 4 pages.
Schmid, H., "Part-of-speech tagging with neural networks", COLING '94 Proceedings of the 15th conference on Computational linguistics—vol. 1, 1994, pp. 172-176.
Schnelle, Dirk, "Context Aware Voice User Interfaces for Workflow Support", Dissertation paper, Aug. 27, 2007, 254 pages.
Schone et al., "Knowledge-Free Induction of Morphology Using Latent Semantic Analysis", Proceedings of the 2nd Workshop on Learning Language in Logic and the 4th Conference on Computational Natural Language Learning, vol. 7, 2000, pp. 67-72.
Schooler et al., "A Packet-switched Multimedia Conferencing System", by Eve Schooler, et al; ACM SIGOIS Bulletin, vol. 1, No. 1, Jan. 1989, pp. 12-22.
Schooler et al., "An Architecture for Multimedia Connection Management", Proceedings IEEE 4th Comsoc International Workshop on Multimedia Communications, Apr. 1992, pp. 271-274.
Schooler et al., "Multimedia Conferencing: Has it Come of Age?", Proceedings 24th Hawaii International Conference on System Sciences, vol. 3, Jan. 1991, pp. 707-716.
Schooler et al., "The Connection Control Protocol: Architecture Overview", USC/Information Sciences Institute, Jan. 28, 1992, pp. 1-6.
Schooler, Eve M., "Case Study: Multimedia Conference Control in a Packet-Switched Teleconferencing System", Journal of Internetworking: Research and Experience, vol. 4, No. 2, Jun. 1993, pp. 99-120.
Schooler, Eve M., "The Impact of Scaling on a Multimedia Connection Architecture", Multimedia Systems, vol. 1, No. 1, 1993, pp. 2-9.
Schooler, Eve, "A Distributed Architecture for Multimedia Conference Control", ISI Research Report, Nov. 1991, pp. 1-18.
Schultz, Tanja, "Speaker Characteristics", In: Speaker Classification I, retrieved from <http://ccc.inaoep.mx/~villasen/bib/Speaker%20Characteristics.pdf>, 2007, pp. 47-74.
Schütze, H., "Dimensions of Meaning", Proceedings of Supercomputing'92 Conference, Nov. 1992, 10 pages.
Schütze, H., "Distributional part-of-speech tagging", EACL '95 Proceedings of the seventh conference on European chapter of the Association for Computational Linguistics, 1995, pp. 141-148.
Schütze, Hinrich, "Part-of-speech induction from scratch", ACL '93 Proceedings of the 31st annual meeting on Association for Computational Linguistics, 1993, pp. 251-258.
Schwartz et al., "Context-Dependent Modeling for Acoustic-Phonetic Recognition of Continuous Speech", IEEE International Conference on Acoustics, Speech, and Signal Processing, vol. 10, Apr. 1985, pp. 1205-1208.
Schwartz et al., "Improved Hidden Markov Modeling of Phonemes for Continuous Speech Recognition", IEEE International Conference on Acoustics, Speech, and Signal Processing, vol. 9, 1984, pp. 21-24.
Schwartz et al., "The N-Best Algorithm: An Efficient and Exact Procedure for Finding the N Most Likely Sentence Hypotheses", IEEE, 1990, pp. 81-84.
Scott et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.
Seagrave, Jim, "A Faster Way to Search Text", EXE, vol. 5, No. 3, Aug. 1990, pp. 50-52.
Sears et al., "High Precision Touchscreens: Design Strategies and Comparisons with a Mouse", International Journal of Man-Machine Studies, vol. 34, No. 4, Apr. 1991, pp. 593-613.
Sears et al., "Investigating Touchscreen Typing: The Effect of Keyboard Size on Typing Speed", Behavior & Information Technology, vol. 12, No. 1, 1993, pp. 17-22.
Sears et al., "Touchscreen Keyboards", Apple Inc., Video Clip, Human-Computer Interaction Laboratory, on a CD, Apr. 1991.

Seide et al., "Improving Speech Understanding by Incorporating Database Constraints and Dialogue History", Proceedings of Fourth International Conference on Philadelphia,, 1996, pp. 1017-1020.
Sen et al., "Indian Accent Text-to-Speech System for Web Browsing", Sadhana, vol. 27, No. 1, Feb. 2002, pp. 113-126.
Seneff et al., "A New Restaurant Guide Conversational System: Issues in Rapid Prototyping for Specialized Domains", Proceedings of Fourth International Conference on Spoken Language, vol. 2, 1996, 4 pages.
Sethy et al., "A Syllable Based Approach for Improved Recognition of Spoken Names", ITRW on Pronunciation Modeling and Lexicon Adaptation for Spoken language Technology (PMLA2002), Sep. 14-15, 2002, pp. 30-35.
Sharoff et al., "Register-Domain Separation as a Methodology for Development of Natural Language Interfaces to Databases", Proceedings of Human-Computer Interaction (INTERACT'99) 1999, 7 pages.
Sheth et al., "Evolving Agents for Personalized Information Filtering", Proceedings of the Ninth Conference on Artificial Intelligence for Applications, Mar. 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation through Vector Quantization", IEEE International Conference on Acoustics, Speech and Signal Processing (ICASSP'86), vol. 11, Apr. 1986, 4 pages.
Shimazu et al., "CAPIT: Natural Language Interface Design Tool with Keyword Analyzer and Case-Based Parser", NEG Research & Development, vol. 33, No. 4, Oct. 1992, 11 pages.
Shinkle, L., "Team User's Guide", SRI International, Artificial Intelligence Center, Nov. 1984, 78 pages.
Shiraki et al., "LPC Speech Coding Based on Variable-Length Segment Quantization", (IEEE Transactions on Acoustics, Speech and Signal Processing, Sep. 1988), as reprinted in Vector Quantization (IEEE Press, 1990), 1990, pp. 250-257.
Shklar et al., "InfoHarness: Use of Automatically Generated Metadata for Search and Retrieval of Heterogeneous Information", Proceedings of CAiSE'95, Finland, 1995, 14 pages.
Shneiderman, Ben, "Designing the User Interface: Strategies for Effective Human-Computer Interaction", Second Edition, 1992, 599 pages.
Shneiderman, Ben, "Designing the User Interface: Strategies for Effective Human-Computer Interaction", Third Edition, 1998, 669 pages.
Shneiderman, Ben, "Direct Manipulation for Comprehensible, Predictable and Controllable User Interfaces", Proceedings of the 2nd International Conference on Intelligent User Interfaces, 1997, pp. 33-39.
Shneiderman, Ben, "Sparks of Innovation in Human-Computer Interaction", 1993, (Table of Contents, Title Page, Ch. 4, Ch. 6 and List of References).
Shneiderman, Ben, "The Eyes Have it: A Task by Data Type Taxonomy for Information Visualizations", IEEE Proceedings of Symposium on Visual Languages, 1996, pp. 336-343.
Shneiderman, Ben, "Touch Screens Now Offer Compelling Uses", IEEE Software, Mar. 1991, pp. 93-94.
Shoham et al., "Efficient Bit and Allocation for an Arbitrary Set of Quantizers", (IEEE Transactions on Acoustics, Speech, and Signal Processing, Sep. 1988) as reprinted in Vector Quantization (IEEE Press, 1990), 1990, pp. 289-296.
Sigurdsson et al., "Mel Frequency Cepstral Co-efficients: An Evaluation of Robustness of MP3 Encoded Music", Proceedings of the 7th International Conference on Music Information Retrieval, 2006, 4 pages.
Silverman et al., "Using a Sigmoid Transformation for Improved Modeling of Phoneme Duration", Proceedings of the IEEE International Conference on Acoustics, Speech and Signal Processing, Mar. 1999, 5 pages.
Simkovitz, Daniel, "LP-DOS Magnifies the PC Screen", IEEE, 1992, pp. 203-204.
Simonite, Tom, "One Easy Way to Make Siri Smarter", Technology Review, Oct. 18, 2011, 2 pages.

(56) References Cited

OTHER PUBLICATIONS

Singh et al., "Automatic Generation of Phone Sets and Lexical Transcriptions", Acoustics, Speech and Signal Processing (ICASSP'00), 2000, 1 pages.
Singh, N., "Unifying Heterogeneous Information Models", Communications of the ACM, 1998, 13 pages.
Sinitsyn, Alexander, "A Synchronization Framework for Personal Mobile Servers", Proceedings of the Second IEEE Annual Conference on Pervasive Computing and Communications Workshops, Piscataway, 2004, pp. 1, 3 and 5.
Slaney et al, "On the Importance of Time—A Temporal Representation of Sound", Visual Representation of Speech Signals, 1993, pp. 95-116.
Smeaton, Alan F., "Natural Language Processing and Information Retrieval", Information Processing and Management, vol. 26, No. 1, 1990, pp. 19-20.
Smith et al., "Guidelines for Designing User Interface Software", User Lab, Inc., Aug. 1986, pp. 1-384.
Smith et al., "Relating Distortion to Performance in Distortion Oriented Displays", Proceedings of Sixth Australian Conference on Computer-Human Interaction, Nov. 1996, pp. 6-11.
Sony Eiicsson Corporate, "Sony Ericsson to introduce Auto pairing. TM. to Improve Bluetooth.TM. Connectivity Between Headsets and Phones", Press Release, available at <http://www.sonyericsson.com/spg.jsp?cc=global&lc=en&ver=4001&template=pc3_1_1&z . . . >, Sep. 28, 2005, 2 pages.
Soong et al., "A High Quality Subband Speech Coder with Backward Adaptive Predictor and Optimal Time-Frequency Bit Assignment", (Proceedings of the IEEE International Acoustics, Speech, and Signal Processing Conference, Apr. 1986), as reprinted in Vector Quantization (IEEE Press, 1990), 1990, pp. 316-319.
Speaker Recognition, Wikipedia, The Free Enclyclopedia, Nov. 2, 2010, 4 pages.
Spiller, Karen, "Low-Decibel Earbuds Keep Noise at a Reasonable Level", available at <http://www.nashuatelegraph.com/apps/pbcs.dll/article?Date=20060813&Cate . . . >, Aug. 13, 2006, 3 pages.
SRI International, "The Open Agent Architecture TM 1.0 Distribution", Open Agent Architecture (OAA), 1999, 2 pages.
Sri, "Sri Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Srihari, R. K.., "Use of Multimedia Input in Automated Image Annotation and Content-based Retrieval", Proceedings of Spie, International Society for Optical Engineering, vol. 2420, Feb. 9, 1995., pp. 249-260.
Srinivas et al., "Monet: A Multi-Media System for Conferencing and Application Sharing in Distributed Systems", CERC Technical Report Series Research Note, Feb. 1992.
Starr et al., "Knowledge-Intensive Query Processing", Proceedings of the 5th KRDB Workshop, Seattle, May 31, 1998, 6 pages.
Stealth Computer Corporation, "Peripherals for Industrial Keyboards & Pointing Devices", available at <http://www.stealthcomputer.com/peripherals_oem.htm>, retrieved on Dec. 19, 2002, 6 pages.
Steinberg, Gene, "Sonicblue Rio Car (10 GB, Reviewed: 6 GB)", available at <http://electronics.cnet.com/electronics/0-6342420-1304-4098389.htrnl>, Dec. 12, 2000, 2 pages.
Stent et al., "Geo-Centric Language Models for Local Business Voice Search", AT&T Labs—Research, 2009, pp. 389-396.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, Mark E., "A Nonclausal Connection-Graph Resolution Theorem-Proving Program", Proceedings of AAAI'82, 1982, 5 pages.
Stifleman, L., "Not Just Another Voice Mail System", Proceedings of 1991 Conference, American Voice, Atlanta GA, Sep. 24-26, 1991, pp. 21-26.
Stone et al., "The Movable Filter as a User Interface Tool", CHI '94 Human Factors in Computing Systems, 1994, pp. 306-312.
Strom et al., "Intelligent Barge-In in Conversational Systems", MIT laboratory for Computer Science, 2000, 4 pages.
Stuker et al., "Cross-System Adaptation and Combination for Continuous Speech Recognition: The Influence of Phoneme Set and Acoustic Front-End", Influence of Phoneme Set and Acoustic Front-End, Interspeech, Sep. 17-21, 2006, pp. 521-524.
Su et al., "A Review of ZoomText Xtra Screen Magnification Program for Windows 95", Journal of Visual Impairment & Blindness, Feb. 1998, pp. 116-119.
Su, Joseph C., "A Review of Telesensory's Vista PCI Screen Magnification System", Journal of Visual Impairment & Blindness, Oct. 1998, pp. 705, 707-710.
Sugumaran, V., "A Distributed Intelligent Agent-Based Spatial Decision Support System", Proceedings of the Americas Conference on Information systems (AMCIS), Dec. 31, 1998, 4 pages.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Summerfield et al., "ASIC Implementation of the Lyon Cochlea Model", Proceedings of the 1992 International Conference on Acoustics, Speech and Signal Processing, IEEE, vol. V, 1992, pp. 673-676.
Sundaram et al, "Latent Perceptual Mapping with Data-Driven Variable-Length Acoustic Units for Template-Based Speech Recognition", ICASSP 2012, Mar. 2012, pp. 4125-4128.
Sycara et al., "Coordination of Multiple Intelligent Software Agents", International Journal of Cooperative Information Systems (IJCIS), vol. 5, No. 2 & 3, 1996, 31 pages.
Sycara et al., "Distributed Intelligent Agents", IEEE Expert, vol. 11, No. 6, Dec. 1996, 32 pages.
Sycara et al., "Dynamic Service Matchmaking among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
T3 Magazine, "Creative MuVo TX 256MB"available at <http://www.t3.co.uk/reviews/entertainment/mp3_player/creative_muvo_tx_256mb>, Aug. 17, 2004, 1 page.
TAOS, "TAOS, Inc. Announces Industry's First Ambient Light Sensor to Convert Light Intensity to Digital Signals", News Release, available at <http://www.taosinc.com/presssrelease_090902.htm>, Sep. 16, 2002, 3 pages.
Taylor et al., "Speech Synthesis by Phonological Structure Matching", International Speech Communication Association, vol. 2, Section 3, 1999, 4 pages.
Tello, Ernest R., "Natural-Language Systems", Mastering AI Tools and Techniques, Howard W. Sams & Company, 1988.
Tenenbaum et al., "Data Structure Using Pascal", Prentice-Hall, Inc., 1981, 34 pages.
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
TG3 Electronics, Inc., "BL82 Series Backlit Keyboards", available at <http://www.tg3electronics.com/products/backlit/backlit.htm>, retrieved on Dec. 19, 2002, 2 pages.
The HP 150, "Hardware: Compact, Powerful, and Innovative", vol. 8, No. 10, Oct. 1983, pp. 36-50.
Tidwell, Jenifer, "Animated Transition", Designing Interfaces, Patterns for effective Interaction Design, Nov. 2005, First Edition, 4 pages.
Timothy et al, "Speech-Based Annotation and Retrieval of Digital Photographs", Interspeech. 8th Annual Conference of the International Speech Communication Association, Aug. 27, 2007, pp. 2165-2168.
Tofel, Kevin C., "SpeakToIt: A Personal Assistant for Older iPhones, iPads", Apple News, Tips and Reviews, Feb. 9, 2012, 7 pages.
Tombros et al, "Users' Perception of Relevance of Spoken Documents", Journal of the American Society for Information Science, New York, Aug. 2000, pp. 929-939.

(56) References Cited

OTHER PUBLICATIONS

Top 10 Best Practices for Voice User Interface Design available at <http://www.developer.com/voice/article.php/1567051/Top-10-Best-Practices-for-Voice-Userinterface-Design.htm>, Nov. 1, 2002, 4 pages.
Touch, Joseph, "Zoned Analog Personal Teleconferencing", USC / Information Sciences Institute, 1993, pp. 1-19.
Toutanova et al., "Feature-Rich Part-of-Speech Tagging with a Cyclic Dependency Network", Computer Science Dept., Stanford University, Stanford CA 94305-9040, 2003, 8 pages.
Trigg et al., "Hypertext Habitats: Experiences of Writers in NoteCards", Hypertext '87 Papers; Intelligent Systems Laboratory, Xerox Palo Alto Research Center, 1987, pp. 89-108.
Trowbridge, David, "Using Andrew for Development of Educational Applications", Center for Design of Educational Computing, Carnegie-Mellon University (CMU-ITC-85-065), Jun. 2, 1985, pp. 1-6.
Tsai et al., "Attributed Grammar—A Tool for Combining Syntactic and Statistical Approaches to Pattern Recognition", IEEE Transactions on Systems, Man and Cybernetics, vol. SMC-10, No. 12, Dec. 1980, 13 pages.
Tsao et al., "Matrix Quantizer Design for LPC Speech Using the Generalized Lloyd Algorithm", (IEEE Transactions on Acoustics, Speech and Signal Processing, Jun. 1985), as reprinted in Vector Quantization (IEEE Press, 1990), 1990, pp. 237-245.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Turletti Thierry, "The INRIA Videoconferencing System (IVS)", Oct. 1994, pp. 1-7.
Tyson et al., "Domain-Independent Task Specification in the TACITUS Natural Language System", SRI International, Artificial Intelligence Center, May 1990, 16 pages.
Udell, J., "Computer Telephony", BYTE, vol. 19, No. 7, Jul. 1994, 9 pages.
Uslan et al, "A Review of Henter-Joyce's MAGic for Windows NT", Journal of Visual Impairment and Blindness, Dec. 1999, pp. 666-668.
Uslan et al., "A Review of Supernova Screen Magnification Program for Windows", Journal of Visual Impairment & Blindness, Feb. 1999, pp. 108-110.
Uslan et al., "A Review of Two Screen Magnification Programs for Windows 95: Magnum 95 and LP-Windows", Journal of Visual Impairment & Blindness, Sep.-Oct. 1997, pp. 9-13.
Van Santen, J. P.H., "Contextual Effects on Vowel Duration", Journal Speech Communication, vol. 11, No. 6, Dec. 1992, pp. 513-546.
Veiga, Alex, "AT&T Wireless Launching Music Service", available at <http://bizyahoo.com/ap/041005/at_t_mobile_music_5.html?printer=1, Oct. 5, 2004, 2 pages.
Vepa et al., "New Objective Distance Measures for Spectral Discontinuities in Concatenative Speech Synthesis", Proceedings of the IEEE 2002 Workshop on Speech Synthesis, 2002, 4 pages.
Verschelde, Jan, "MATLAB Lecture 8. Special Matrices in MATLAB", UIC, Dept. of Math, Stat. & CS, MCS 320, Introduction to Symbolic Computation, 2007, 4 pages.
Viegas et al., "Chat Circles", SIGCHI Conference on Human Factors in Computing Systems, May 15-20, 1999, pp. 9-16.
Viikki et al., "Speaker- and Language-Independent Speech Recognition in Mobile Communication Systems", IEEE, vol. 1, 2001, pp. 5-8.
Vingron, Martin, "Near-Optimal Sequence Alignment", Current Opinion in Structural Biology, vol. 6, No. 3, 1996, pp. 346-352.
Vlingo InCar, "Distracted Driving Solution with Vlingo InCar", YouTube Video, Available online at <http://www.youtube.com/watch?v=Vqs8XfXxgz4>, Oct. 2010, 2 pages.
Vlingo, "Vlingo Launches Voice Enablement Application on Apple App Store", Press Release, Dec. 3, 2008, 2 pages.
Vogel et al., "Shift: A Technique for Operating Pen-Based Interfaces Using Touch", CHI '07 Proceedings, Mobile Interaction Techniques I, Apr. 28-May 3, 2007, pp. 657-666.
Voiceassist, "Send Text, Listen to and Send E-Mail by Voice", YouTube Video, Available online at <http://www.youtube.com/watch?v=0tEU61nHHA4>, Jul. 30, 2009, 1 page.
Voiceonthego, "Voice on the Go (BlackBerry)", YouTube Video, available online at <http://www.youtube.com/watch?v=pjqpWgQS98w>, Jul. 27, 2009, 1 page.
W3C Working Draft, "Speech Synthesis Markup Language Specification for the Speech Interface Framework", available at <http://www.w3org./TR/speech-synthesis>, retrieved on Dec. 14, 2000, 42 pages.
Wadlow, M. G., "The Role of Human Interface Guidelines in the Design of Multimedia Applications", Carnegie Mellon University (To be Published in Current Psychology: Research and Reviews, Summer 1990 (CMU-ITC-91-101), 1990, pp. 1-22.
Wahlster et al, "Smartkom: Multimodal Communication with a Life-Like Character", Eurospeech—Scandinavia, 7th European Conference on Speech Communication and Technology, 2001, 5 pages.
Waibel, Alex, "Interactive Translation of Conversational Speech", Computer, vol. 29, No. 7, Jul. 1996, pp. 41-48.
Waldinger et al., "Deductive Question Answering from Multiple Resources", New Directions in Question Answering, Published by AAAI, Menlo Park, 2003, 22 pages.
Walker et al., "Natural Language Access to Medical Text", SRI International, Artificial Intelligence Center, Mar. 1981, 23 pages.
Walker et al., "The LOCUS Distributed Operating System 1", University of California Los Angeles, 1983, pp. 49-70.
Waltz, D., "An English Language Question Answering System for a Large Relational Database", ACM, vol. 21, No. 7, 1978, 14 pages.
Wang et al., "An Industrial-Strength Audio Search Algorithm", in Proceedings of the International Conference on Music Information Retrieval (ISMIR), 2003, 7 pages.
Wang et al., "An Initial Study on Large Vocabulary Continuous Mandarin Speech Recognition with Limited Training Data Based on Sub-Syllabic Models", International Computer Symposium, vol. 2, 1994, pp. 1140-1145.
Wang et al., "Tone Recognition of Continuous Mandarin Speech Based on Hidden Markov Model", International Journal of Pattern Recognition and Artificial Intelligence, vol. 8, 1994, pp. 233-245.
Ward et al., "A Class Based Language Model for Speech Recognition", IEEE, 1996, 3 pages.
Ward et al, "Recent Improvements in the CMU Spoken Language Understanding System", ARPA Human Language Technology Workshop, 1994, 4 pages.
Ward, Wayne, "The CMU Air Travel Information Service: Understanding Spontaneous Speech", Proceedings of the Workshop on Speech and Natural Language, HLT '90, 1990, pp. 127-129.
Ware et al., "The DragMag Image Magnifier Prototype I", Apple Inc., Video Clip, Marlon, on a CD, Applicant is not Certain about the Date for the Video Clip., 1995.
Ware et al., "The DragMag Image Magnifier", CHI '95 Mosaic of Creativity, May 7-11, 1995, pp. 407-408.
Warren et al, "An Efficient Easily Adaptable System for Interpreting Natural Language Queries", American Journal of Computational Linguistics, vol. 8, No. 3-4, 1982, 11 pages.
Watabe et al., "Distributed Multiparty Desktop Conferencing System: MERMAID", CSCW 90 Proceedings, Oct. 1990, pp. 27-38.
Weizenbaum, J., "ELIZA—A Computer Program for the Study of Natural Language Communication Between Man and Machine", Communications of the ACM, vol. 9, No. 1, Jan. 1966, 10 pages.
Werner et al., "Prosodic Aspects of Speech, Universite de Lausanne", Fundamentals of Speech Synthesis and Speech Recognition: Basic Concepts, State of the Art and Future Challenges, 1994, 18 pages.
Westerman, Wayne, "Hand Tracking, Finger Identification and Chordic Manipulation on a Multi-Touch Surface", Doctoral Dissertation, 1999, 363 Pages.
What is Fuzzy Logic?, available at <http://www.cs.cmu.edu>, retrieved on Apr. 15, 1993, 5 pages.

(56) References Cited

OTHER PUBLICATIONS

White, George M., "Speech Recognition, Neural Nets, and Brains", Jan. 1992, pp. 1-48.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 3 pages.
Wikipedia, "Speech Recognition", available at <http://en.wikipedia.org/wiki/Speech_recognition>, retrieved on Sep. 14, 2011, 10 pages.
Wilensky et al., "Talking to UNIX in English: An Overview of UC", Communications of the ACM, vol. 27, No. 6, Jun. 1984, pp. 574-593.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 13 pages.
Windows XP: A Big Surprise!—Experiencing Amazement from Windows XP, New Computer, No. 2, Feb. 28, 2002, 8 pages.
Winiwarter et al., "Adaptive Natural Language Interfaces to FAQ Knowledge Bases", Proceedings of 4th International Conference on Applications of Natural Language to Information Systems, Austria, Jun. 1999, 22 pages.
Wirelessinfo, "SMS/MMS Ease of Use (8.0)", available at <http://www.wirelessinfo.com/content/palm-Treo-750-Cell-Phone-Review/Messaging.htm>, Mar. 2007, 3 pages.
Wolff, M., "Post Structuralism and the ARTFUL Database: Some Theoretical Considerations", Information Technology and Libraries, vol. 13, No. 1, Mar. 1994, 10 pages.
Wong et al., "An 800 Bit/s Vector Quantization LPC Vocoder", (IEEE Transactions on Acoustics, Speech and Signal Processing, Oct. 1982), as reprinted in Vector Quantization (IEEE Press, 1990), 1990, pp. 222-232.
Wong et al., "Very Low Data Rate Speech Compression with LPC Vector and Matrix Quantization", (Proceedings of the IEEE Int'l Acoustics, Speech and Signal Processing Conference, Apr. 1983), as reprinted in Vector Quantization (IEEE Press, 1990), 1990, pp. 233-236.
Worldwide Character Encoding, Version 2.0, vols. 1,2 by Unicode, Inc., 12 pages.
Written Opinion received for PCT Patent Application No. PCT/US2005/046797, dated Nov. 24, 2006, 9 pages.
Wu et al., "Automatic Generation of Synthesis Units and Prosodic Information for Chinese Concatenative Synthesis", Speech Communication, vol. 35, No. 3-4, Oct. 2001, pp. 219-237.
Wu et al., "KDA: A Knowledge-Based Database Assistant", Proceeding of the Fifth International Conference on Engineering (IEEE Cat.No. 89CH2695-5), 1989, 8 pages.
Wu, M., "Digital Speech Processing and Coding", Multimedia Signal Processing, Lecture-2 Course Presentation, University of Maryland, College Park, 2003, 8 pages.
Wu, M., "Speech Recognition, Synthesis, and H.C.I.", Multimedia Signal Processing, Lecture-3 Course Presentation, University of Maryland, College Park, 2003, 11 pages.
Wyle, M. F., "A Wide Area Network Information Filter", Proceedings of First International Conference on Artificial Intelligence on Wall Street, Oct. 1991, 6 pages.
Xiang et al, "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Yang et al., "Auditory Representations of Acoustic Signals", IEEE Transactions of Information Theory, vol. 38, No. 2, Mar. 1992, pp. 824-839.
Yang et al., "Hidden Markov Model for Mandarin Lexical Tone Recognition", IEEE Transactions on Acoustics, Speech and Signal Processing, vol. 36, No. 7, Jul. 1988, pp. 988-992.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", Computer Magazine, IEEE, Jan. 1988, 16 pages.
Yarowsky, David, "Homograph Disambiguation in Text-to-Speech Synthesis", Chapter 12, Progress in Speech Synthesis, 1997, pp. 157-172.
Yiourgalis et al., "Text-to-Speech system for Greek", ICASSP 91, vol. 1, May 14-17, 1991, pp. 525-528.
Yoon et al., "Letter-to-Sound Rules for Korean", Department of Linguistics, The Ohio State University, 2002, 4 pages.
Young, S. J., "The HTK Book", Available on <http://htk.eng.cam.ac.uk>, 4 pages.
Youtube, "New bar search for Facebook", Available at "https://www.youtube.com/watch?v=vwgN1WbvCas", 1 page.
Yunker, John, "Beyond Borders: Web Globalization Strategies", New Riders, Aug. 22, 2002, 11 pages.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zelig, "A Review of the Palm Treo 750v", available at <http://vvww.mtekk.com.au/Articles/tabid/54/articleType/ArticleView/articleId/769/A-Review-of-the-Palm-Treo-750v.aspx>, Feb. 5, 2007, 3 pages.
Zeng et al., "Cooperative Intelligent Software Agents", The Robotics Institute, Carnegie-Mellon University, Mar. 1995, 13 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhao et al., "Intelligent Agents for Flexible Workflow Systems", Proceedings of the Americas Conference on Information Systems (AMCIS), Oct. 1998, 4 pages.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zhong et al., "JustSpeak: Enabling Universal Voice Control on Android", W4A'14, Proceedings of the 11th Web for All Conference, No. 36, Apr. 7-9, 2014, 8 pages.
Ziegler, K, "A Distributed Information System Study", IBM Systems Journal, vol. 18, No. 3, 1979, pp. 374-401.
Zipnick et al., "U.S. Appl. No. 10/859,661, filed Jun. 2, 2004".
Zovato et al., "Towards Emotional Speech Synthesis: A Rule based Approach", Proceedings of 5th ISCA Speech Synthesis Workshop—Pittsburgh, 2004, pp. 219-220.
Zue et al., "From Interface to Content: Translingual Access and Delivery of On-Line Information", Eurospeech, 1997, 4 pages.
Zue et al, "Jupiter: A Telephone-Based Conversational Interface for Weather Information", IEEE Transactions on Speech and Audio Processing, Jan. 2000, 13 pages.
Zue et al., "Pegasus: A Spoken Dialogue Interface for On-Line Air Travel Planning", Speech Communication, vol. 15, 1994, 10 pages.
Zue et al, "The Voyager Speech Understanding System: Preliminary Development and Evaluation", Proceedings of IEEE, International Conference on Acoustics, Speech and Signal Processing, 1990, 4 pages.
Zue, Victor W., "Toward Systems that Understand Spoken Language", ARPA Strategic Computing Institute, Feb. 1994, 9 pages.
Zue, Victor, "Conversational Interfaces: Advances and Challenges", Spoken Language System Group, Sep. 1997, 10 pages.
Extended European Search Report received for European Patent Application No. 17173710.9, dated Oct. 4, 2017, 8 pages.
International Search Report and Written Opinion Received for PCT Patent Application No. PCT/US2016/051895, dated Nov. 18, 2016, 30 pages.
Nardi et al, Collaborative, Programmable Intelligent Agents, Communications of the ACM, Association for Computing Machinery Inc., United States, vol. 41, No. 3, Mar. 1998, pp. 96-104.

(56) References Cited

OTHER PUBLICATIONS

BlackBerry 5810, BlackBerry Wireless Handheld, Handheld User Guide, Retrieved from the Internet: URL: http://www.comparecellular.com/userguidesmanufacturer.asp?l=&ManufactureerID=52, 2003, pp. 1-77.

Intention to Grant received for Danish Patent Application No. PA201670553, dated Dec. 4, 2017, 10 pages.

Notice of Allowance received for Danish Patent Application No. PA201670553, dated Feb. 27, 2018, 2 pages.

Office Action received for Australian Patent Application No. 2017203668, dated Dec. 5, 2017, 2 pages.

Office Action received for Danish Patent Application No. PA201670553, dated Oct. 27, 2017, 3 pages.

Office Action received for Danish Patent Application No. PA201670553, dated Sep. 30, 2016, 9 pages.

Office Action received for Japanese Patent Application No. 2017-102864, dated Apr. 20, 2018, 12 pages. (7 pages of English Translation and 5 pages of Official Copy).

Office Action received for European Patent Application No. 17173710.9, dated Aug. 22, 2018, 6 pages.

Notice of Acceptance received for Australian Patent Application No. 2017203668, dated Sep. 14, 2018, 3 pages.

Office Action received for Chinese Patent Application No. 201710393363.X, dated Jul. 24, 2018, 16 pages (5 pages of English Translation and 11 pages of Official Copy).

Office Action received for Japanese Patent Application No. 2017-102864, dated Oct. 22, 2018, 6 pages (3 pages of English Translation and 3 pages of Official Copy).

International Preliminary Report on Patentability received for PCT Patent Application No. PCT/US2016/051895, dated Dec. 20, 2018, 29 pages.

Office Action received for Korean Patent Application No. 10-2017-0067655, dated Dec. 19, 2018, 14 pages (6 pages of English Translation and 8 pages of Official Copy).

Office Action received for Chinese Patent Application No. 201710393363.X, dated Feb. 19, 2019, 7 pages (English Translation Only).

\* cited by examiner

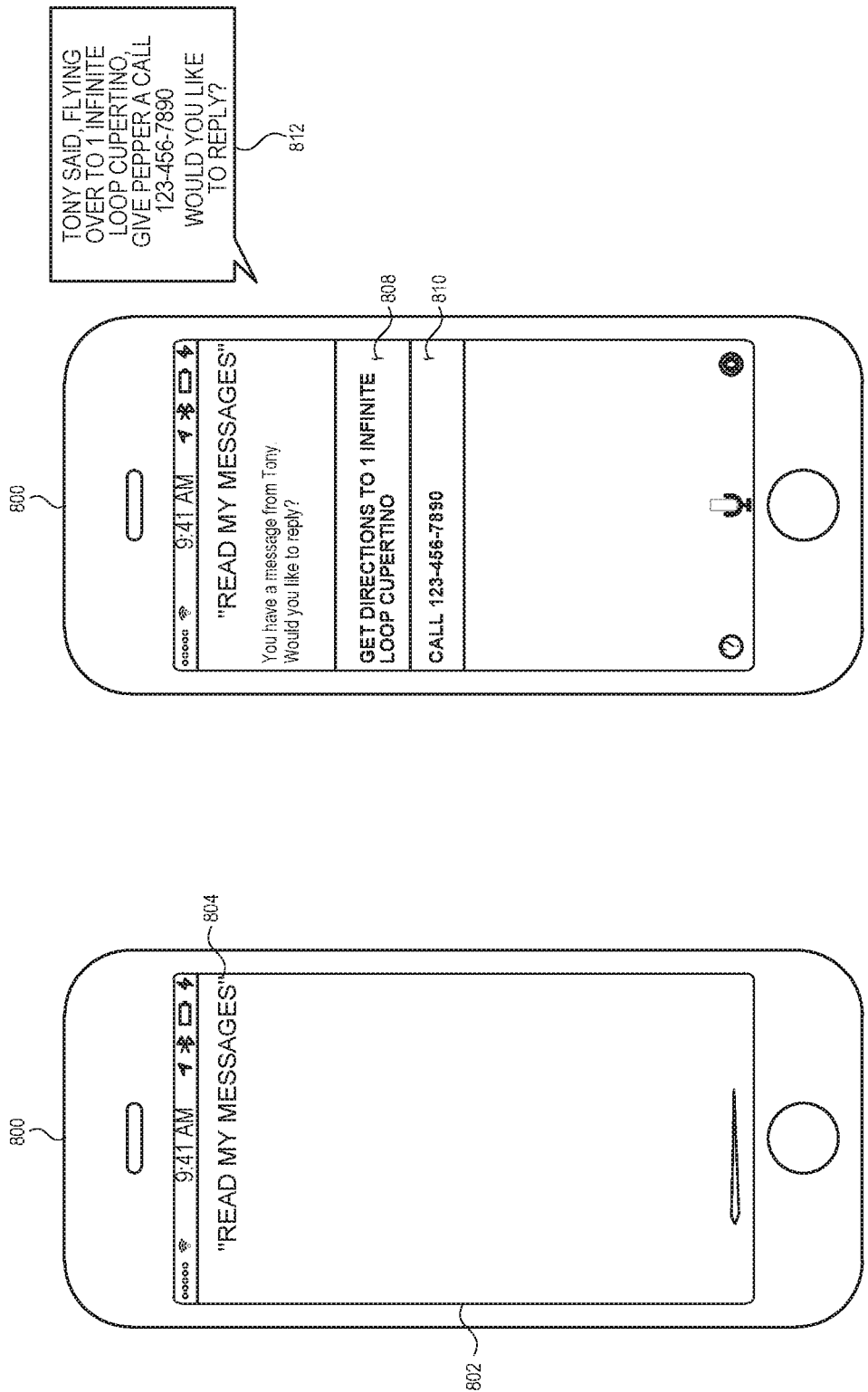

```
                                    1000
                                    Cont.                    ( B )

┌─────────────────────────────────────────────────────────────────────────┐
│ IN RESPONSE TO THE USER INPUT INDICATIVE OF THE TASK, CAUSING THE TASK TO BE PERFORMED BASED ON │
│                        THE PORTION OF THE TEXT STRING                   │
│                                  1026                                   │
└─────────────────────────────────────────────────────────────────────────┘
                                    │
┌─────────────────────────────────────────────────────────────────────────┐
│   DETERMINING, WITH THE ELECTRONIC DEVICE, WHETHER A SECOND PORTION OF THE TEXT STRING IS │
│       ASSOCIATED WITH A SECOND DATA TYPE OF THE PLURALITY OF DATA TYPES │
│                                  1070                                   │
└─────────────────────────────────────────────────────────────────────────┘
                                    │
┌─────────────────────────────────────────────────────────────────────────┐
│   IN ACCORDANCE WITH A DETERMINATION THAT THE SECOND PORTION OF THE TEXT STRING IS ASSOCIATED │
│   WITH THE SECOND DATA TYPE OF THE PLURALITY OF DATA TYPES, IDENTIFYING A SECOND TASK BASED ON │
│                            THE SECOND DATA TYPE                         │
│                                  1072                                   │
└─────────────────────────────────────────────────────────────────────────┘
                                    │
┌─────────────────────────────────────────────────────────────────────────┐
│     IN ACCORDANCE WITH A DETERMINATION THAT THE SECOND PORTION OF THE TEXT STRING IS NOT │
│  ASSOCIATED WITH THE SECOND DATA TYPE OF THE PLURALITY OF DATA TYPES, FOREGOING IDENTIFYING THE │
│                    SECOND TASK BASED ON THE SECOND DATA TYPE            │
│                                  1074                                   │
└─────────────────────────────────────────────────────────────────────────┘

┌─────────────────────────────────────────────────────────────────────────┐
│       STORING, ON THE ELECTRONIC DEVICE, INFORMATION ASSOCIATED WITH THE COMMUNICATION │
│                                  1030                                   │
└─────────────────────────────────────────────────────────────────────────┘
                                    │
┌─────────────────────────────────────────────────────────────────────────┐
│                              RECEIVING AN INPUT;                        │
│                                  1032                                   │
└─────────────────────────────────────────────────────────────────────────┘
                                    │
┌─────────────────────────────────────────────────────────────────────────┐
│                        IDENTIFYING A TASK BASED ON THE INPUT;           │
│                                  1034                                   │
└─────────────────────────────────────────────────────────────────────────┘
                                    │
┌─────────────────────────────────────────────────────────────────────────┐
│          PERFORMING THE TASK BASED ON AT LEAST PART OF THE STORED INFORMATION │
│                                  1036                                   │
└─────────────────────────────────────────────────────────────────────────┘

┌─────────────────────────────────────────────────────────────────────────┐
│       STORING, ON THE ELECTRONIC DEVICE, INFORMATION ASSOCIATED WITH THE COMMUNICATION │
│                                  1040                                   │
└─────────────────────────────────────────────────────────────────────────┘
                                    │
┌─────────────────────────────────────────────────────────────────────────┐
│                        INVOKING A SOFTWARE APPLICATION;                 │
│                                  1042                                   │
└─────────────────────────────────────────────────────────────────────────┘
                                    │
┌─────────────────────────────────────────────────────────────────────────┐
│          PERFORMING THE TASK BASED ON AT LEAST PART OF THE STORED INFORMATION │
│                                  1044                                   │
└─────────────────────────────────────────────────────────────────────────┘

FIG. 10C
```

INTELLIGENT TASK DISCOVERY

CROSS-REFERENCE TO RELATED APPLICATIONS

This application claims priority to U.S. Provisional Patent Application Ser. No. 62/348,888, "INTELLIGENT TASK DISCOVERY," filed on Jun. 11, 2016. The content of this application is hereby incorporated by reference for all purposes.

FIELD

The present disclosure relates generally to intelligent automated assistants, and more specifically, to intelligent automated assistants for intelligent task discovery.

BACKGROUND

An intelligent automated assistant can help a user consume content on an electronic device. For example, the user can ask the intelligent automated assistant to read a text message received at the electronic device, such that the user can consume the text message while engaging in other activities (e.g., driving). However, to perform a follow-up task using particular portion(s) of the content (e.g., address, phone numbers, and URLs mentioned in the text message), the user has to provide the necessary inputs to, for example, manually launch a service and manually reproduce relevant portions of content in the service.

For example, if the user receives a text message containing a physical address and wants to navigate to the physical address, the user has to manually launch a navigation application and provide (e.g., type) the address in the navigation application. This experience is not only cumbersome, but also potentially dangerous, as it distracts the user from other ongoing activities (e.g., driving). In other words, the inability to conveniently initiate and/or perform desired tasks using relevant portions of content at an electronic device causes user frustration and negatively impacts user experience.

BRIEF SUMMARY

Example methods are disclosed herein. An example method for operating an automated assistant on an electronic device includes, at the electronic device, receiving a communication comprising a text string and determining whether a portion of the text string is associated with a data type of a plurality of data types, where the data type has at least one task associated therewith. In accordance with a determination that the portion of the text string is associated with the data type of the plurality of data types, the electronic device receives a user input indicative of a task of the at least one task associated with the data type and, in response to the user input indicative of the task, causes the task to be performed based on the portion of the text string. In accordance with a determination that the portion of the text string is not associated with the data type of the plurality of data types, the electronic device foregoes causing the task to be performed based on the portion of the text string.

An example method includes, at the electronic device, receiving a communication comprising a text string and determining whether a portion of the text string is associated with a data type of a plurality of data types. In accordance with a determination that the portion of the text string is associated with the data type of the plurality of data types, the electronic device derives a task having one or more parameters based on the data type, where a parameter of the one or more parameters comprises the portion of the text string, and outputs the derived task. In accordance with a determination that the portion of the text string is not associated with the data type of the plurality of data types, the electronic device foregoes deriving a task having one or more parameters based on the data type.

Example non-transitory computer readable storage media are disclosed herein. An example non-transitory computer readable storage medium storing one or more programs, the one or more programs comprising instructions, which when executed by one or more processors of an electronic device, cause the device to receive a communication comprising a text string; determine whether a portion of the text string is associated with a data type of a plurality of data types, where the data type has at least one task associated therewith. The instructions further cause the electronic device to, in accordance with a determination that the portion of the text string is associated with the data type of the plurality of data types, receive a user input indicative of a task of the at least one task associated with the data type; and, in response to the user input indicative of the task, cause the task to be performed based on the portion of the text string. The instructions further cause the electronic device to, in accordance with a determination that the portion of the text string is not associated with the data type of the plurality of data types, forego causing the task to be performed based on the portion of the text string.

An example non-transitory computer readable storage medium storing one or more programs, the one or more programs comprising instructions, which when executed by one or more processors of an electronic device, cause the device to receive a communication comprising a text string; determine whether a portion of the text string is associated with a data type of a plurality of data types. The instructions further cause the electronic device, in accordance with a determination that the portion of the text string is associated with the data type of the plurality of data types, derive a task having one or more parameters based on the data type, where a parameter of the one or more parameters comprises the portion of the text string, and output the derived task. The instructions further cause the electronic device to, in accordance with a determination that the portion of the text string is not associated with the data type of the plurality of data types, forego deriving a task having one or more parameters based on the data type.

Example devices are disclosed herein. An example electronic device comprises one or more processors; a memory; and one or more programs, where the one or more programs are stored in the memory and configured to be executed by the one or more processors. The one or more programs including instructions for receiving a communication comprising a text string; determining whether a portion of the text string is associated with a data type of a plurality of data types, where the data type has at least one task associated therewith. The one or more programs further include instructions for, in accordance with a determination that the portion of the text string is associated with the data type of the plurality of data types, receiving a user input indicative of a task of the at least one task associated with the data type; and in response to the user input indicative of the task, causing the task to be performed based on the portion of the text string. The one or more programs further include instructions for, in accordance with a determination that the portion of the text string is not associated with the data type of the plurality of data types, foregoing causing the task to be performed based on the portion of the text string.

An example electronic device comprises one or more processors; a memory; and one or more programs, where the one or more programs are stored in the memory and configured to be executed by the one or more processors. The one or more programs including instructions for receiving a communication comprising a text string; determining whether a portion of the text string is associated with a data type of a plurality of data types. The one or more programs further include instructions for, in accordance with a determination that the portion of the text string is associated with the data type of the plurality of data types, deriving a task having one or more parameters based on the data type, where a parameter of the one or more parameters comprises the portion of the text string, and outputting the derived task. The one or more programs further include instructions for, in accordance with a determination that the portion of the text string is not associated with the data type of the plurality of data types, foregoing deriving a task having one or more parameters based on the data type.

An example electronic device comprises means for receiving a communication comprising a text string; means for determining whether a portion of the text string is associated with a data type of a plurality of data types, where the data type has at least one task associated therewith; means for, in accordance with a determination that the portion of the text string is associated with the data type of the plurality of data types, receiving a user input indicative of a task of the at least one task associated with the data type; in response to the user input indicative of the task, causing the task to be performed based on the portion of the text string; means for, in accordance with a determination that the portion of the text string is not associated with the data type of the plurality of data types, foregoing causing the task to be performed based on the portion of the text string.

An example electronic device comprises means for receiving a communication comprising a text string; means for determining whether a portion of the text string is associated with a data type of a plurality of data types; means for, in accordance with a determination that the portion of the text string is associated with the data type of the plurality of data types, deriving a task having one or more parameters based on the data type, where a parameter of the one or more parameters comprises the portion of the text string, and outputting the derived task; means for, in accordance with a determination that the portion of the text string is not associated with the data type of the plurality of data types, foregoing deriving a task having one or more parameters based on the data type.

DESCRIPTION OF THE FIGURES

For a better understanding of the various described embodiments, reference should be made to the Detailed Description below, in conjunction with the following drawings in which like reference numerals refer to corresponding parts throughout the figures.

FIGS. 8A-E illustrate exemplary user interfaces of an electronic device in accordance with some embodiments.

FIGS. 10A-C illustrate an exemplary process for intelligent task discovery according to various examples.

DETAILED DESCRIPTION

In the following description of the disclosure and embodiments, reference is made to the accompanying drawings in which it is shown by way of illustration of specific embodiments that can be practiced. It is to be understood that other embodiments and examples can be practiced and changes can be made without departing from the scope of the disclosure.

Techniques for intelligent task discovery are desirable. As described herein, described techniques improve the user's ability to interact with electronic devices, thereby enhancing productivity. Further, such techniques can reduce computational demand and battery power otherwise consumed as a result of redundant responses by electronic devices to user inputs.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input can both be outputs and, in some cases, can be separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
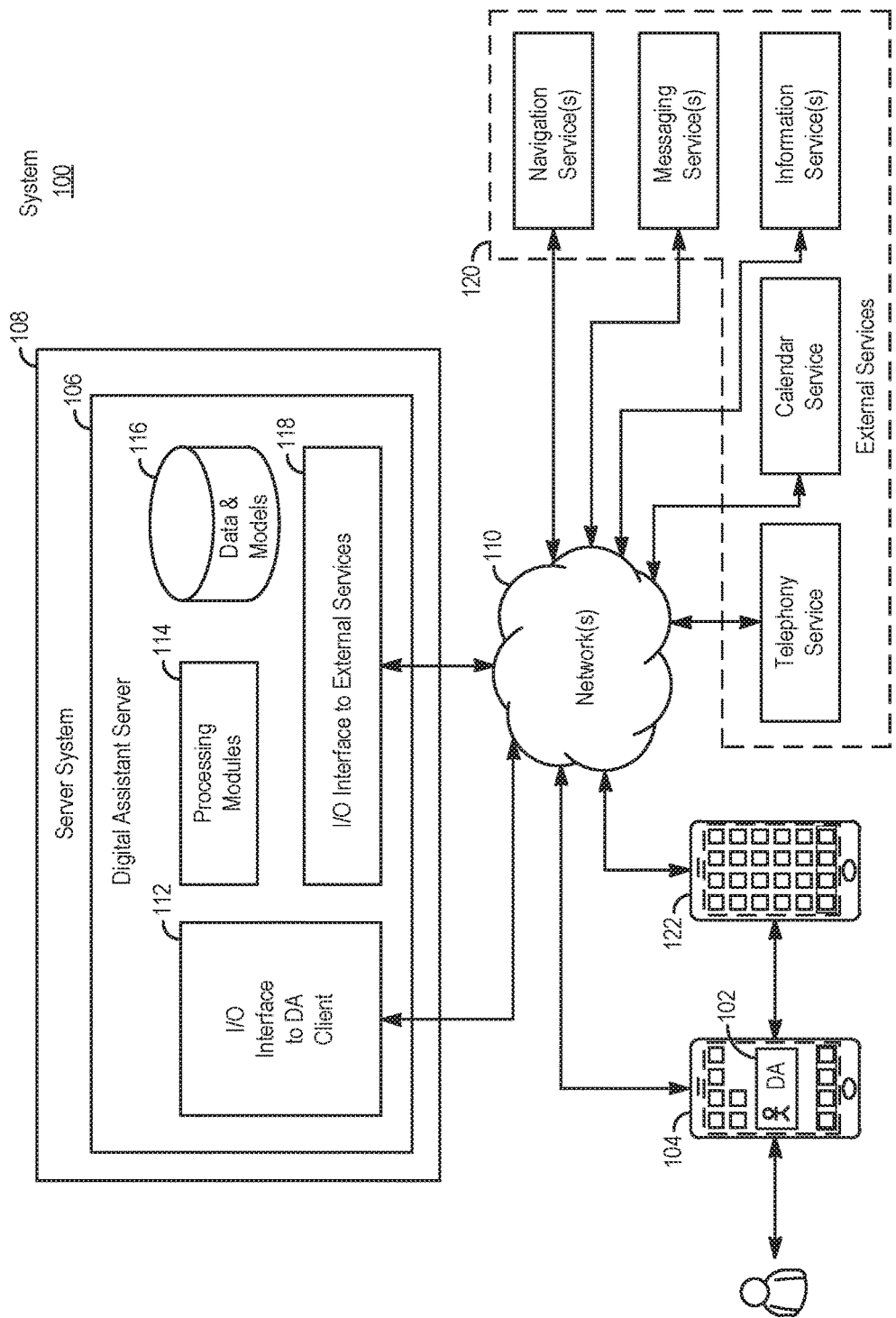
FIG. 1 is a block diagram illustrating a system and environment for implementing a digital assistant according to various examples.

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, Calif. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-B. User device 104 can be configured to communicatively couple to second user device 122 via a direct communication connection, such as Bluetooth, NFC, BTLE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it will be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. Electronic Devices

Figure 2A:
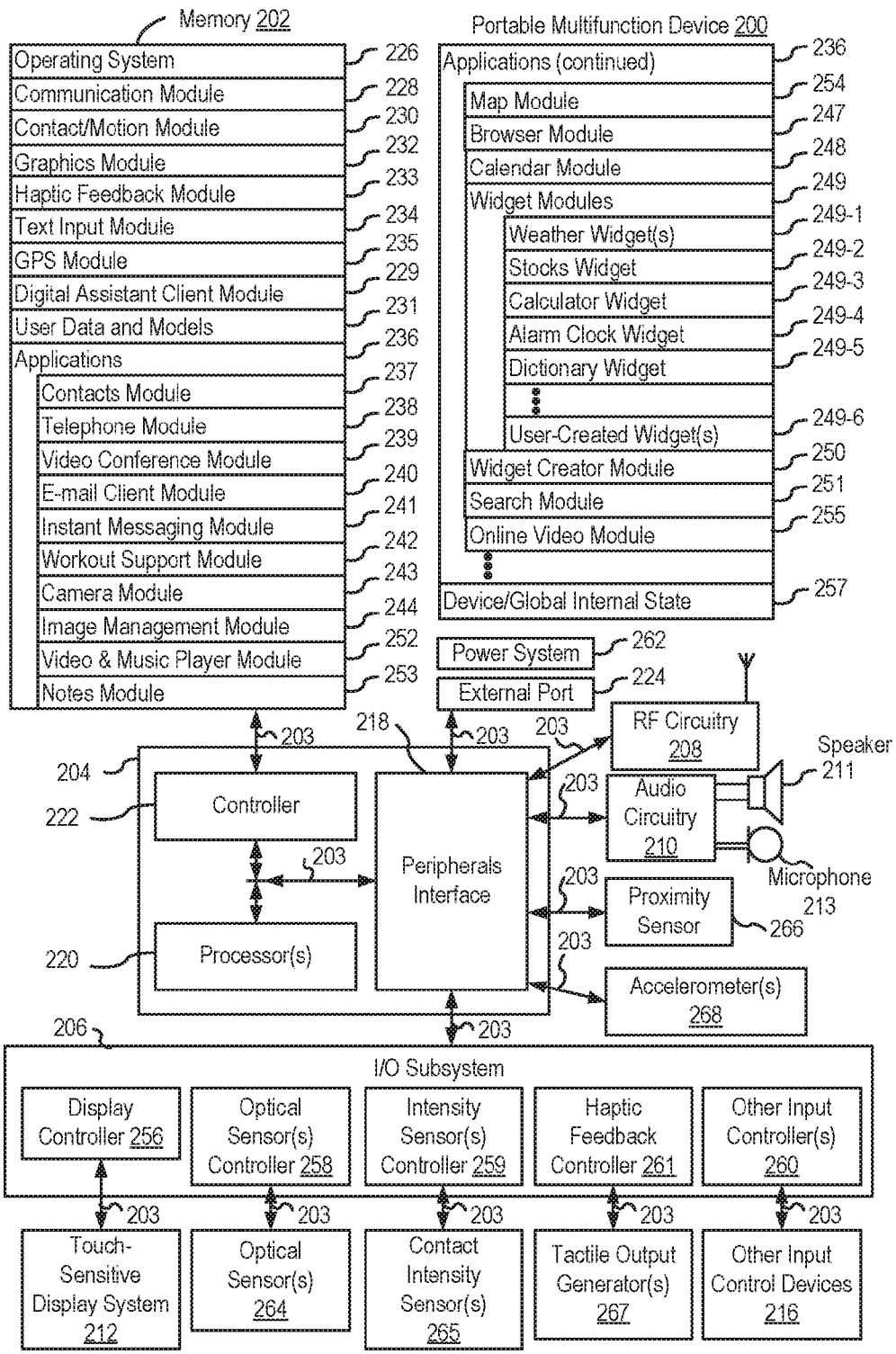
FIG. 2A is a block diagram illustrating a portable multifunction device implementing the client-side portion of a digital assistant in accordance with some embodiments.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It will be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 may include one or more computer-readable storage mediums. The computer-readable storage mediums may be tangible and non-transitory. Memory 202 may include high-speed random access memory and may also include non-volatile memory, such as one or more magnetic disk storage devices, flash memory devices, or other non-volatile solid-state memory devices. Memory controller 222 may control access to memory 202 by other components of device 200.

In some examples, a non-transitory computer-readable storage medium of memory 202 can be used to store instructions (e.g., for performing aspects of processes 1000 and 1100, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of processes 1000 and 1100, described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 may be implemented on a single chip, such as chip 204. In some other embodiments, they may be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data may be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button may disengage a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) may turn power to device 200 on or off. The user may be able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output may include graphics, text, icons, video, and any combination thereof (collectively termed "graphics"). In some embodiments, some or all of the visual output may correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 may use LCD (liquid crystal display) technology, LPD (light emitting polymer display) technology, or LED (light emitting diode) technology, although other display technologies may be used in other embodiments. Touch screen 212 and display controller 256 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 may be analogous to the multi-touch sensitive touchpads described in the following U.S. Pat. No. 6,323, 846 (Westerman et al.), U.S Pat No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 may have a video resolution in excess of 100 dpi. In some embodiments, the touch screen has a video resolution of approximately 160 dpi. The user may make contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 212 or an extension of the touch-sensitive surface formed by the touch screen.

Device 200 also includes power system 262 for powering the various components. Power system 262 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 may also include one or more optical sensors 264. FIG. 2A shows an optical sensor coupled to optical sensor controller 258 in I/O subsystem 206. Optical sensor 264 may include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 may capture still images or video. In some embodiments, an optical sensor is located on the back of device 200, opposite touch screen display 212 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 264 can be changed by the user (e.g., by rotating the lens and the sensor in the device housing) so that a single optical sensor 264 may be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 may also include one or more proximity sensors 266. FIG. 2A shows proximity sensor 266 coupled to peripherals interface 218. Alternately, proximity sensor 266 may be coupled to input controller 260 in I/O subsystem 206. Proximity sensor 266 may perform as described in U.S. patent application Ser. No. 11/241,839, "Proximity Detector In Handheld Device"; U.S. patent application Ser. No. 11/240,788, "Proximity Detector In Handheld Device"; U.S. patent application Ser. No. 11/620,702, "Using Ambient Light Sensor To Augment Proximity Sensor Output"; U.S. patent application Ser. No. 11/586,862, "Automated Response To And Sensing Of User Activity In Portable Devices"; and U.S. patent application Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 may also include one or more accelerometers 268. FIG. 2A shows accelerometer 268 coupled to peripherals interface 218. Alternately, accelerometer 268 may be coupled to an input controller 260 in I/O subsystem 206. Accelerometer 268 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
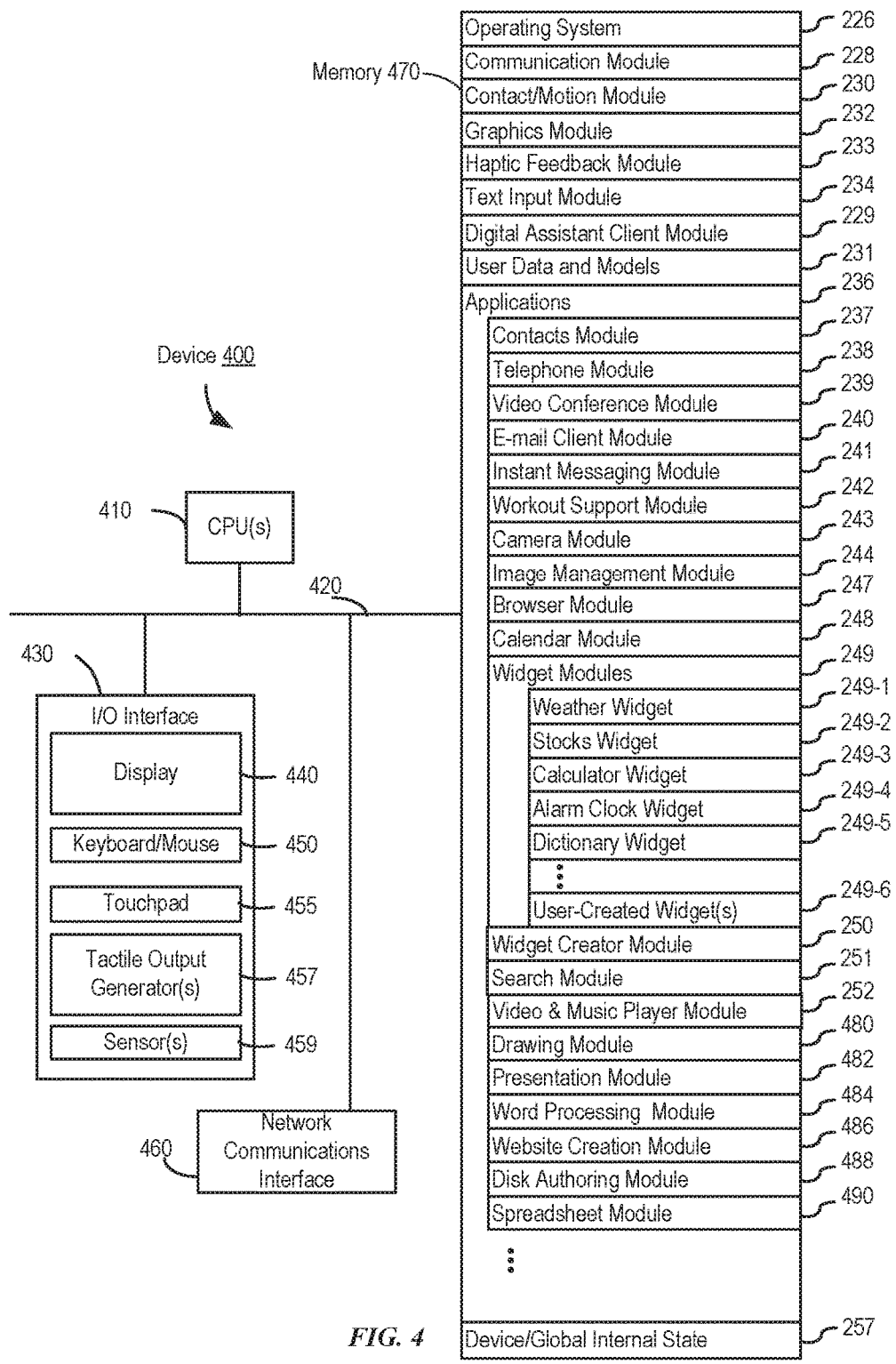
FIG. 4 is a block diagram of an exemplary multifunction device with a display and a touch-sensitive surface according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including ,without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which may be a component of graphics module 232, provides soft keyboards for entering text in various applications (e.g., contacts 237, e mail 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 229, other input control devices 216, etc.) of portable multifunction device 200. Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 may include the following modules (or sets of instructions), or a subset or superset thereof:

Contacts module 237 (sometimes called an address book or contact list);
Telephone module 238;
Video conference module 239;
Email client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which may include one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that may be stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 may be used to manage an address book or contact list (e.g., stored in application internal state 292 of contacts module 237 in memory 202 or memory 470), including: adding name(s) to the address book; deleting name(s) from the address book; associating telephone number(s), email address(es), physical address(es) or other information with a name; associating an image with a name; categorizing and sorting names; providing telephone numbers or email addresses to initiate and/or facilitate communications by telephone 238, video conference module 239, email 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 may be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, email client module 240 includes executable instructions to create, send, receive, and manage email in response to user instructions. In conjunction with image management module 244, email client module 240 makes it very easy to create and send emails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, email client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that may be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 may be used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 may be used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, email client module 240, and browser module 247, online video module 255 includes instructions that allow the user to access, browse, receive (e.g., by streaming and/or download), play back (e.g., on the touch screen or on an external, connected display via external port 224), send an email with a link to a particular online video, and otherwise manage online videos in one or more file formats, such as H.264. In some embodiments, instant messaging module 241, rather than email client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 252, FIG. 2A). In some embodiments, memory 202 may store a subset of the modules and data structures identified above. Furthermore, memory 202 may store additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 may be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
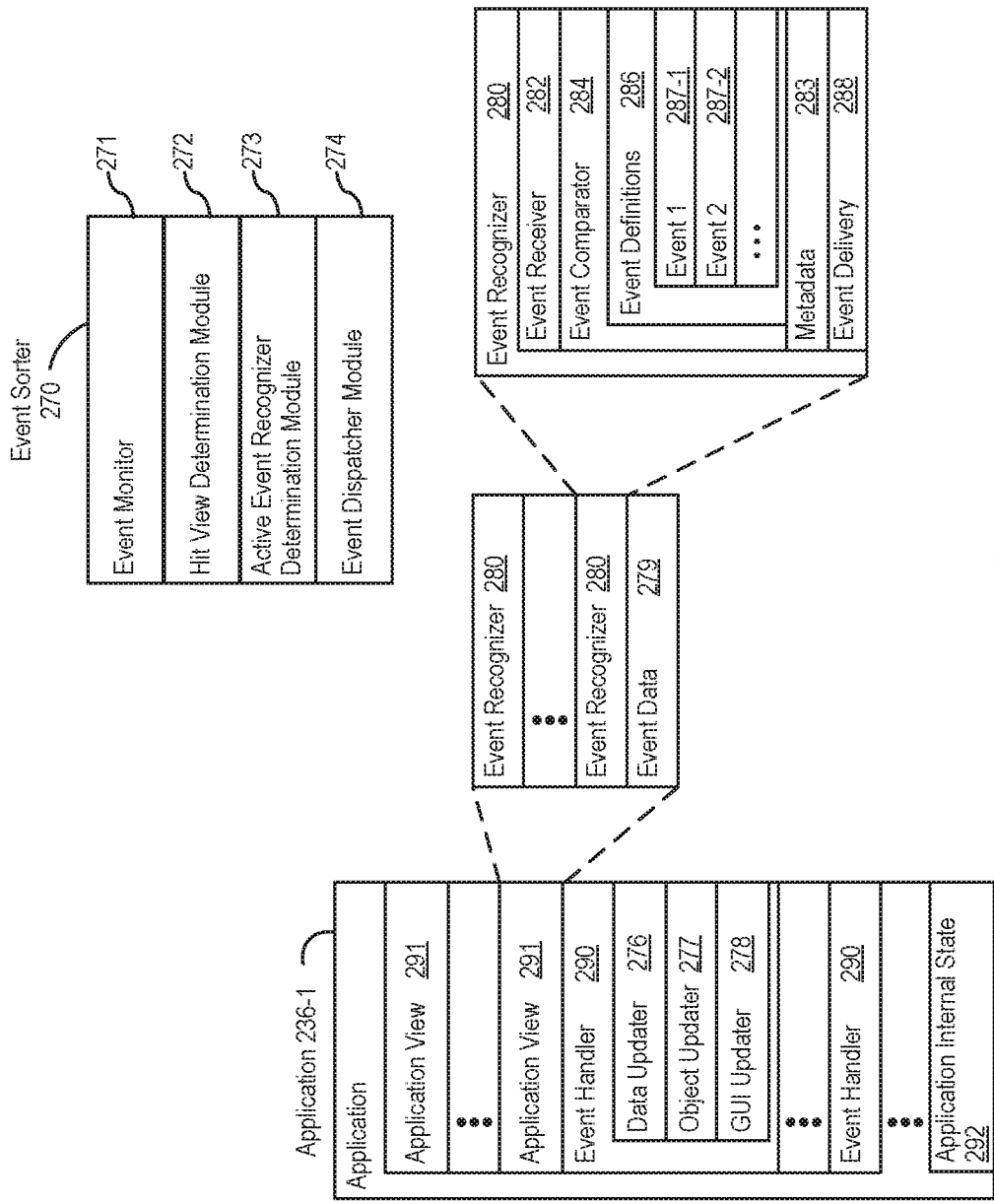
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 may utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which may include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers may interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
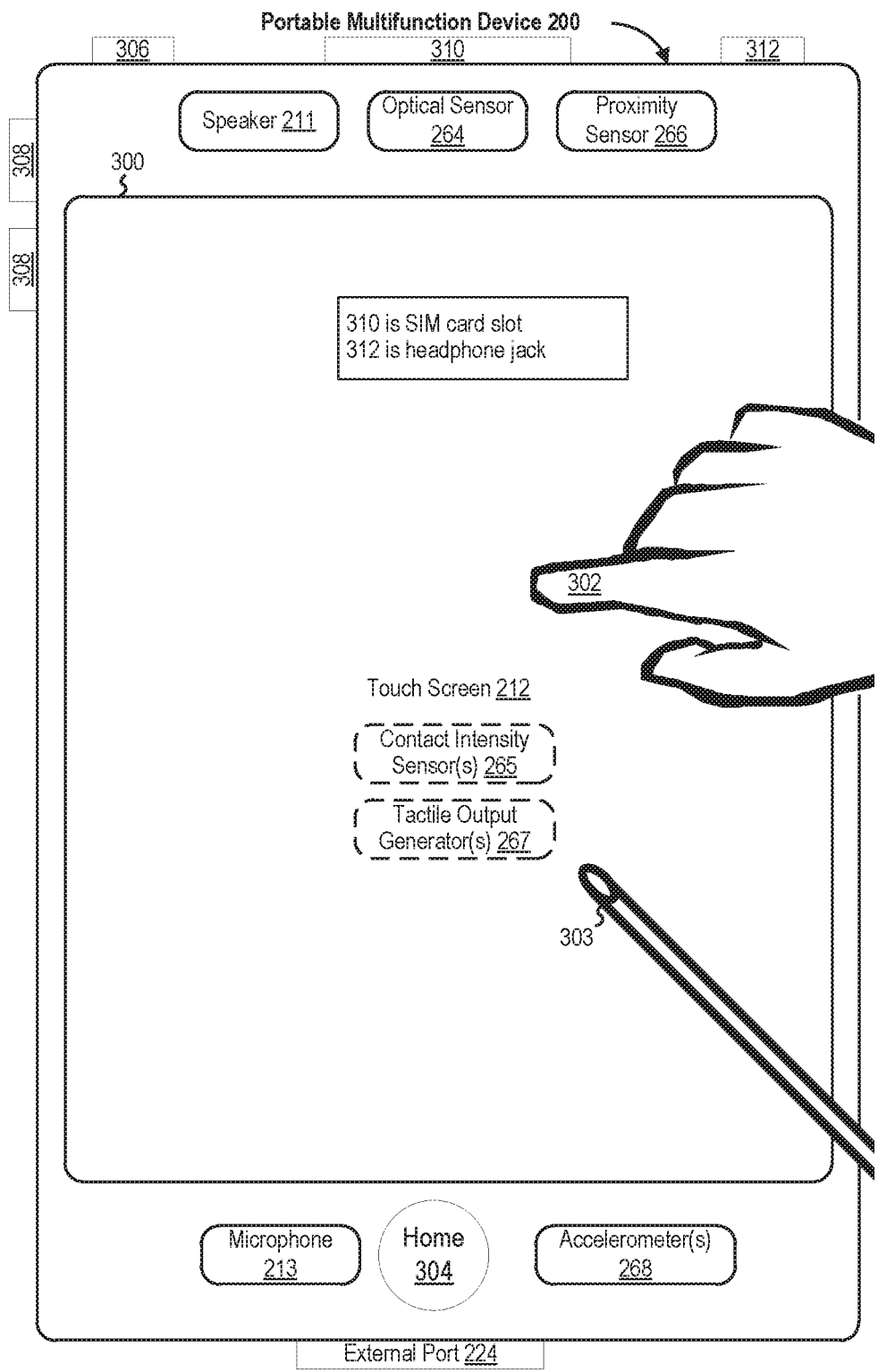
FIG. 3 illustrates a portable multifunction device implementing the client-side portion of a digital assistant according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 may also include one or more physical buttons, such as "home" or menu button 304. As described previously, menu button 304 may be used to navigate to any application 236 in a set of applications that may be executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 470 may store a subset of the modules and data structures identified above. Furthermore, memory 470 may store additional modules and data structures not described above.

Attention is now directed towards embodiments of user interfaces that may be implemented on, for example, portable multifunction device 200.

Figure 5A:
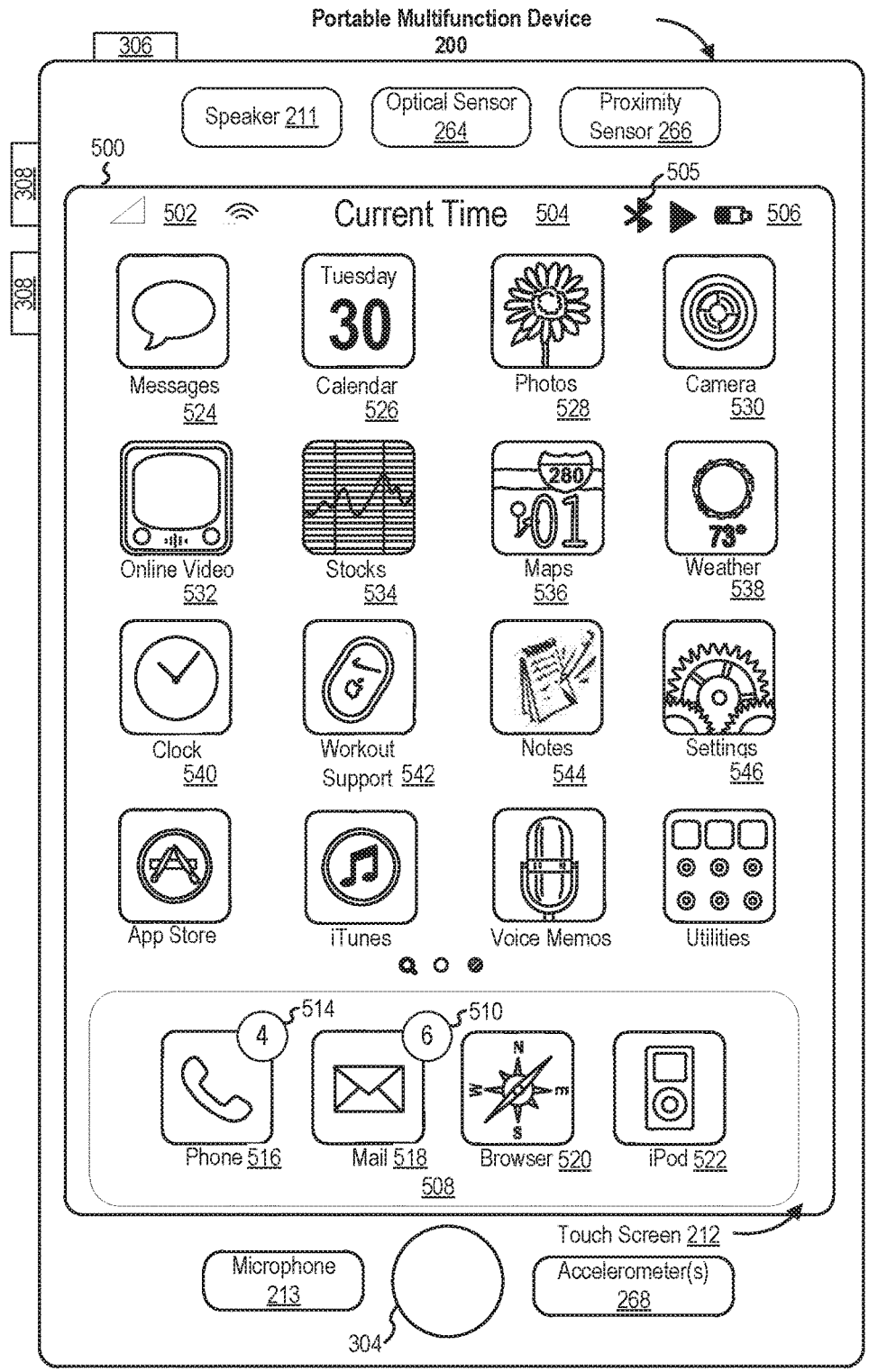
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces may be implemented on device 400. In some embodiments, user interface 500 includes the following elements, or a subset or superset thereof:

- Signal strength indicator(s) 502 for wireless communication(s), such as cellular and Wi-FI signals;
- Time 504;
- Bluetooth indicator 505;
- Battery status indicator 506;
- Tray 508 with icons for frequently used applications, such as:
  - Icon 516 for telephone module 238, labeled "Phone," which optionally includes an indicator 514 of the number of missed calls or voicemail messages;
  - Icon 518 for email client module 240, labeled "Mail," which optionally includes an indicator 510 of the number of unread emails;
  - Icon 520 for browser module 247, labeled "Browser;" and
  - Icon 522 for video and music player module 252, also referred to as iPod (trademark of Apple Inc.) module 252, labeled "iPod;" and
- Icons for other applications, such as:
  - Icon 524 for IM module 241, labeled "Messages;"
  - Icon 526 for calendar module 248, labeled "Calendar;"
  - Icon 528 for image management module 244, labeled "Photos;"
  - Icon 530 for camera module 243, labeled "Camera;"
  - Icon 532 for online video module 255, labeled "Online Video;"
  - Icon 534 for stocks widget 249-2, labeled "Stocks;"

Icon 536 for map module 254, labeled "Maps;"

Icon 538 for weather widget 249-1, labeled "Weather;"

Icon 540 for alarm clock widget 249-4, labeled "Clock;"

Icon 542 for workout support module 242, labeled "Workout Support;"

Icon 544 for notes module 253, labeled "Notes;" and

Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
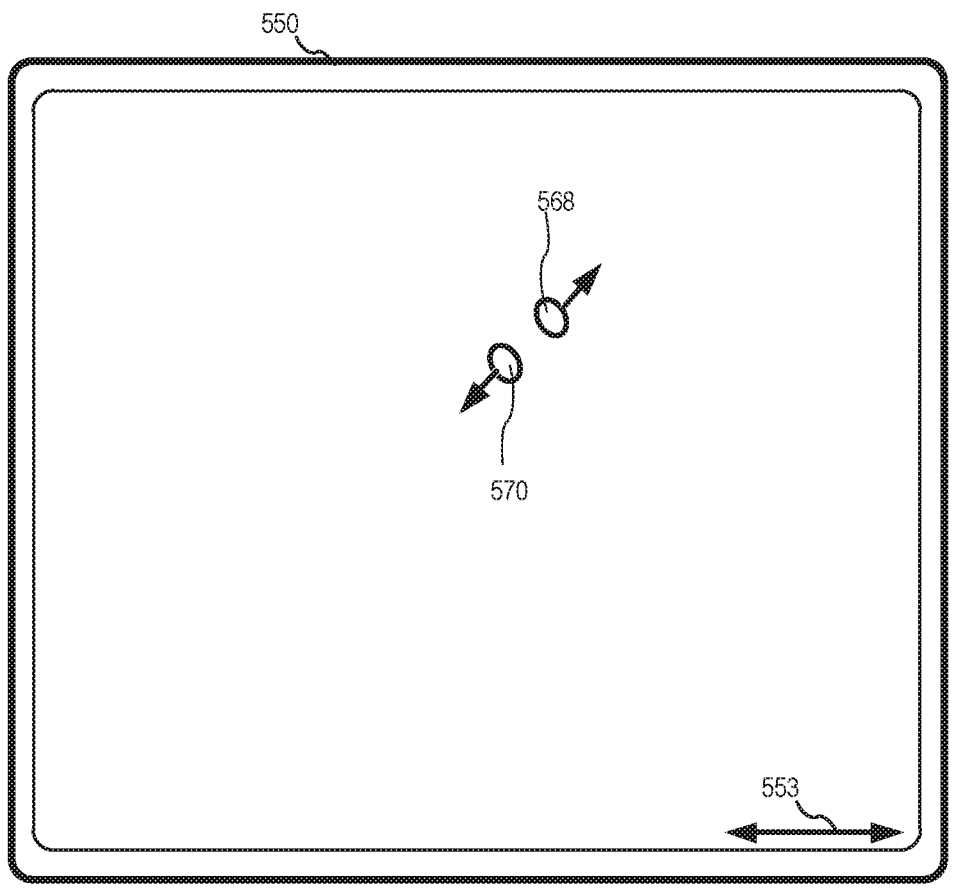
FIG. 5B illustrates an exemplary user interface for a multifunction device with a touch-sensitive surface that is separate from the display according to various examples.
Figure 5B:
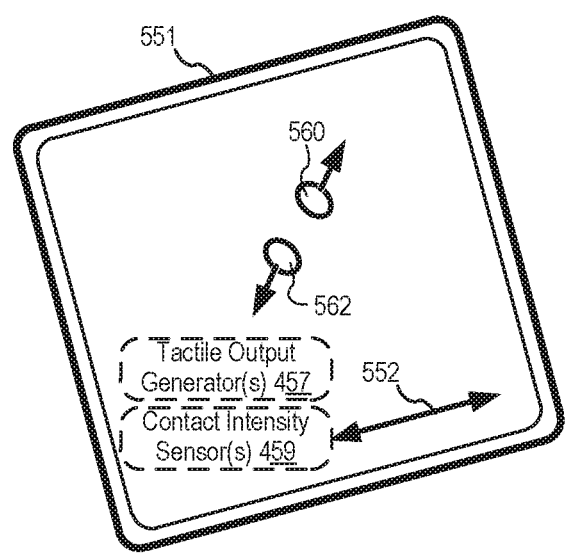

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
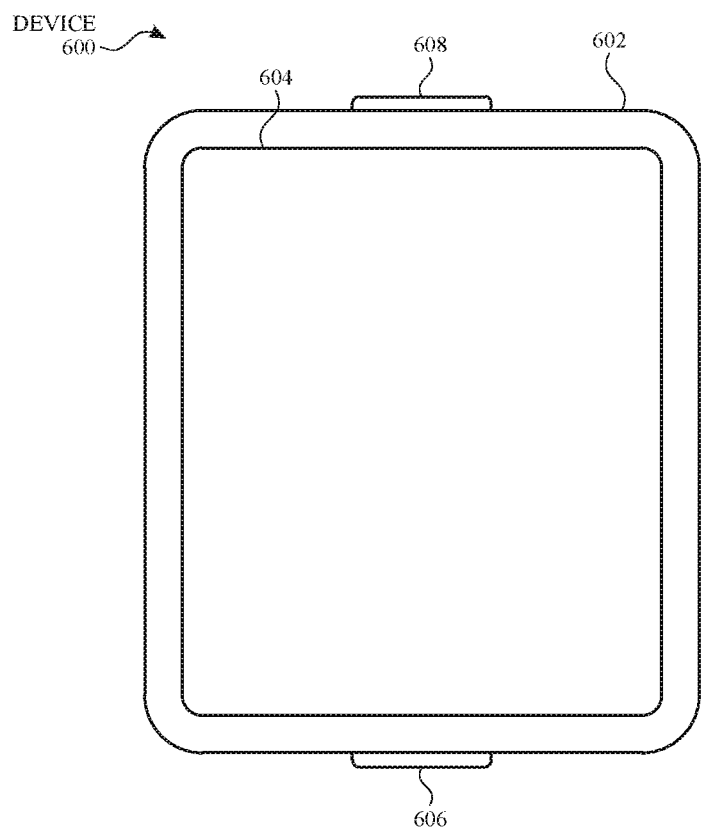
FIG. 6A illustrates a personal electronic device according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4B). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) may have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms may permit device 600 to be worn by a user.

Figure 6B:
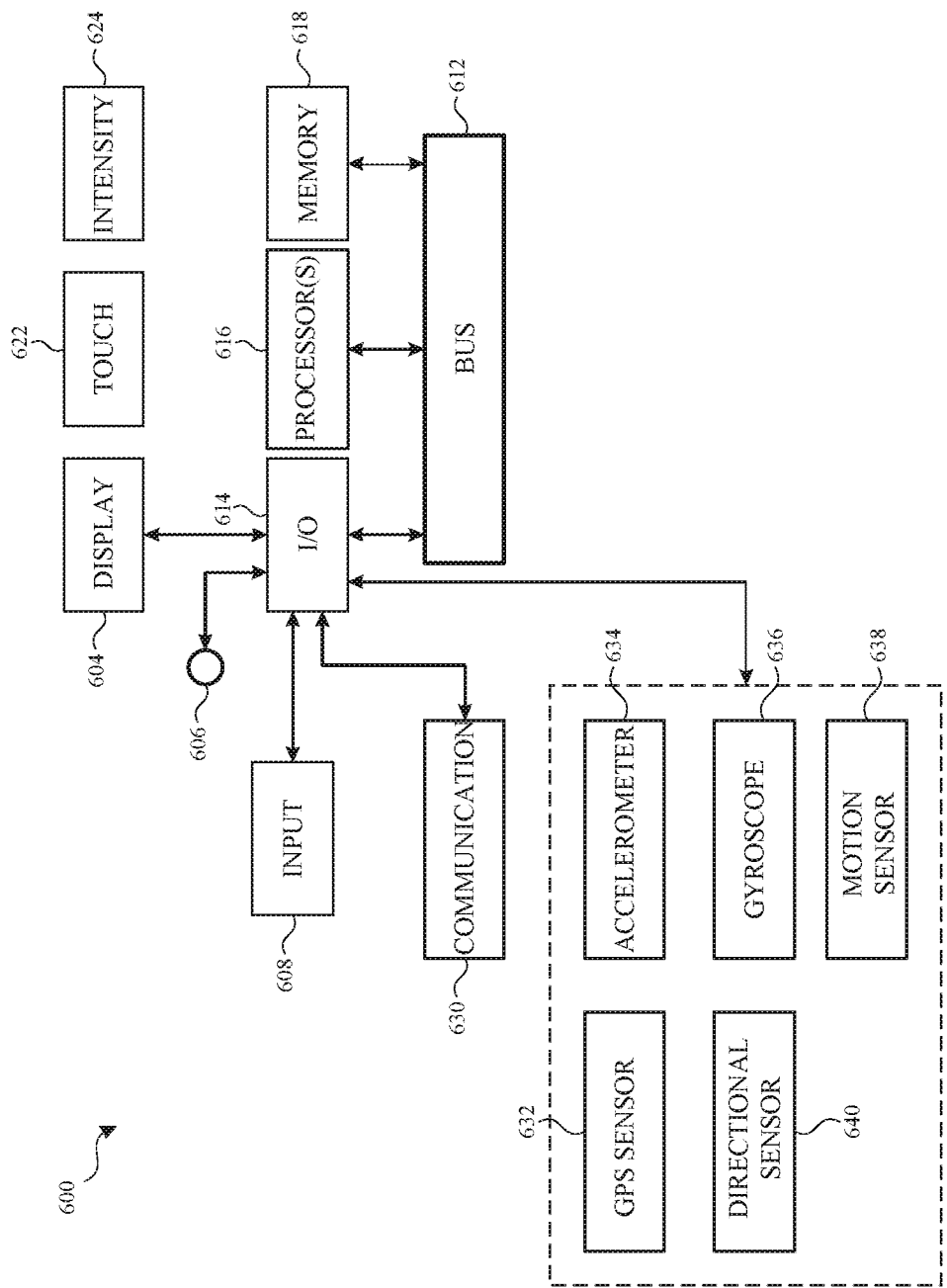
FIG. 6B is a block diagram illustrating a personal electronic device according to various examples.

FIG. 6B depicts exemplary personal electronic device 600. In some embodiments, device 600 can include some or all of the components described with respect to FIGS. 2A, 2B, and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data, using Wi-Fi, Bluetooth, near field communication (NFC), cellular, and/or other wireless communication techniques. Device 600 can include input mechanisms 606 and/or 608. Input mechanism 606 may be a rotatable input device or a depressible and rotatable input device, for example. Input mechanism 608 may be a button, in some examples.

Input mechanism 608 may be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Figure 10A:
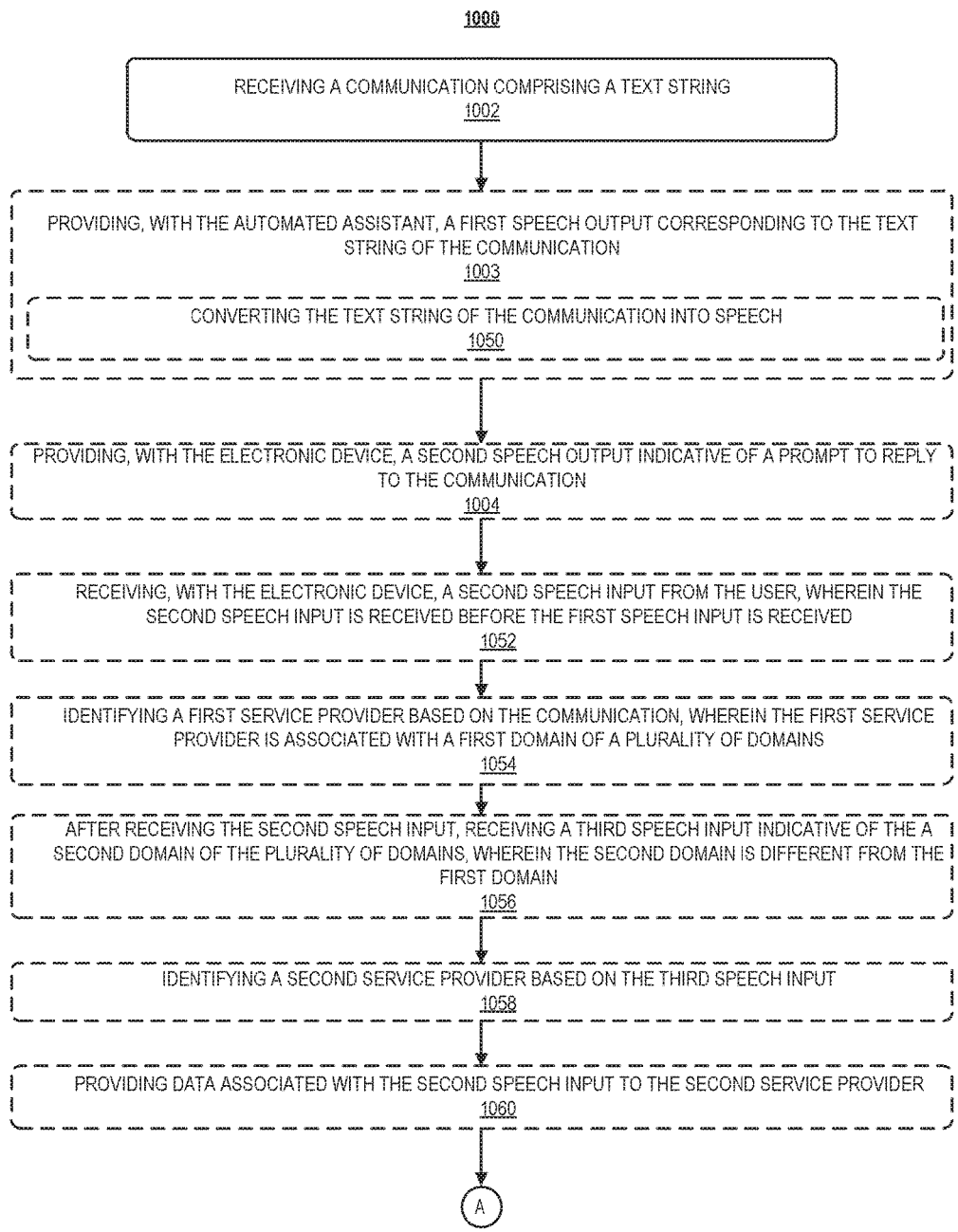
Figure 10B:
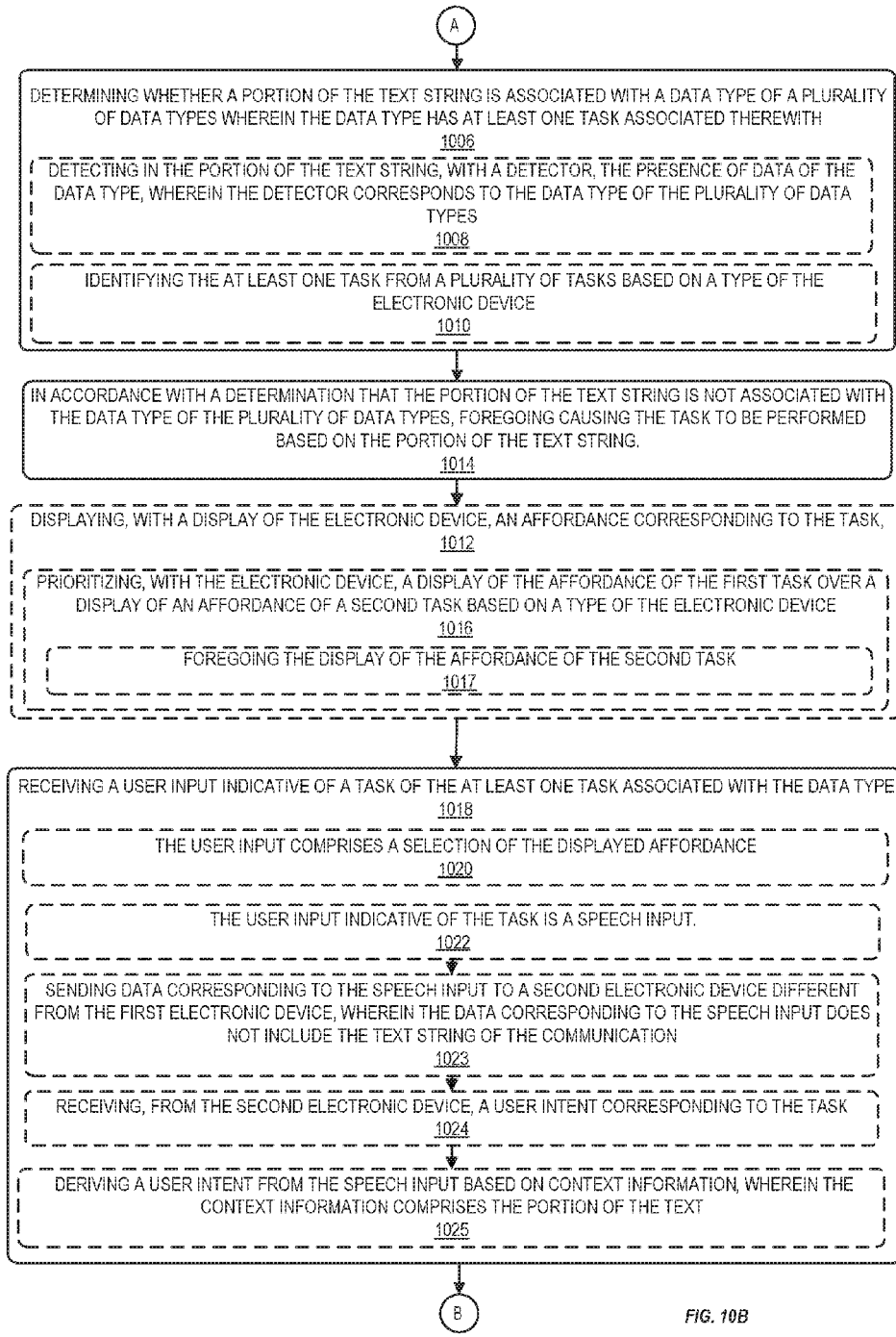
Figure 11:
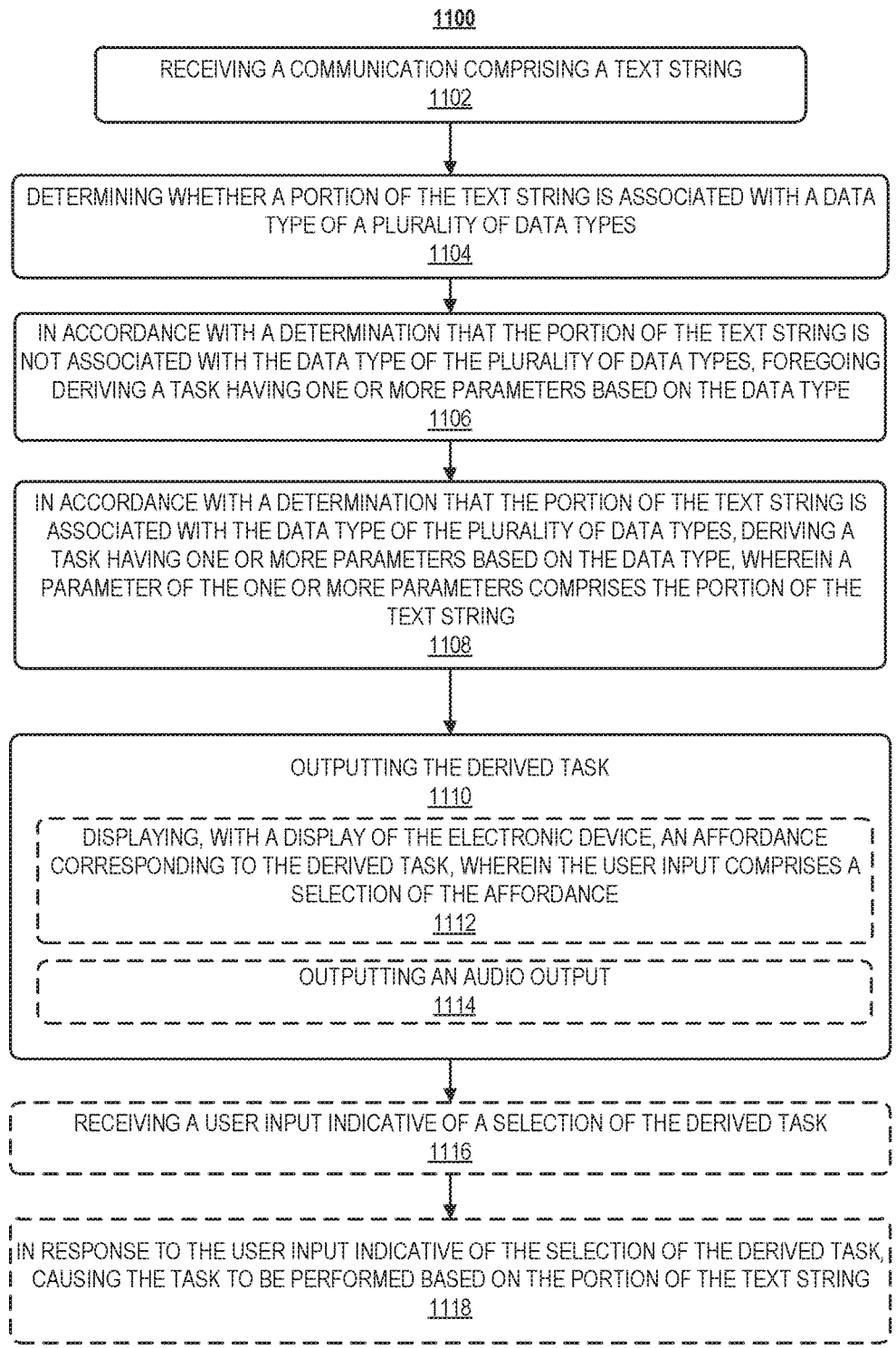
FIG. 11 illustrates an exemplary process for intelligent task discovery according to various examples.

Memory 618 of personal electronic device 600 can include one or more non-transitory computer-readable storage mediums, for storing computer-executable instructions, which, when executed by one or more computer processors 616, for example, can cause the computer processors to perform the techniques described below, including processes 1000 and 1100 (FIGS. 10-11). Personal electronic device 600 is not limited to the components and configuration of FIG. 6B, but can include other or additional components in multiple configurations.

As used here, the term "affordance" refers to a user-interactive graphical user interface object that may be displayed on the display screen of devices 200, 400, and/or 600 (FIGS. 2, 4, and 6). For example, an image (e.g., icon), a button, and text (e.g., link) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
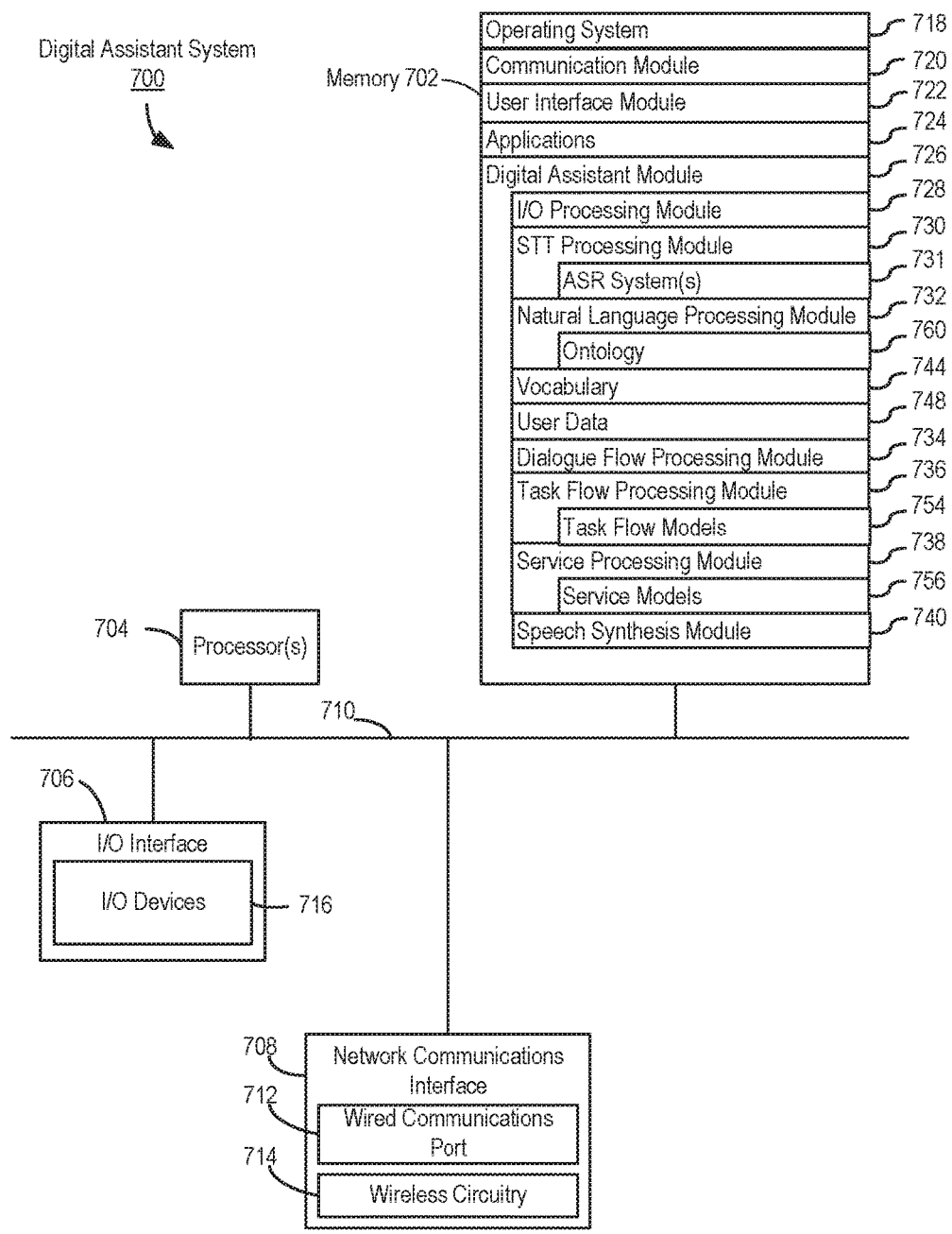
FIG. 7A is a block diagram illustrating a digital assistant system or a server portion thereof according to various examples.

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, may combine two or more components, or may have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and processes them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing processes 1000 and 1100, described below. One or more processors 704 can execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIG. 2A, 4, 6A-B, respectively. Communications module 720 can also include various components for handling data received by wireless circuitry 714 and/or wired communications port 712.

User interface module 722 can receive commands and/or inputs from a user via I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.).

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules can have access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
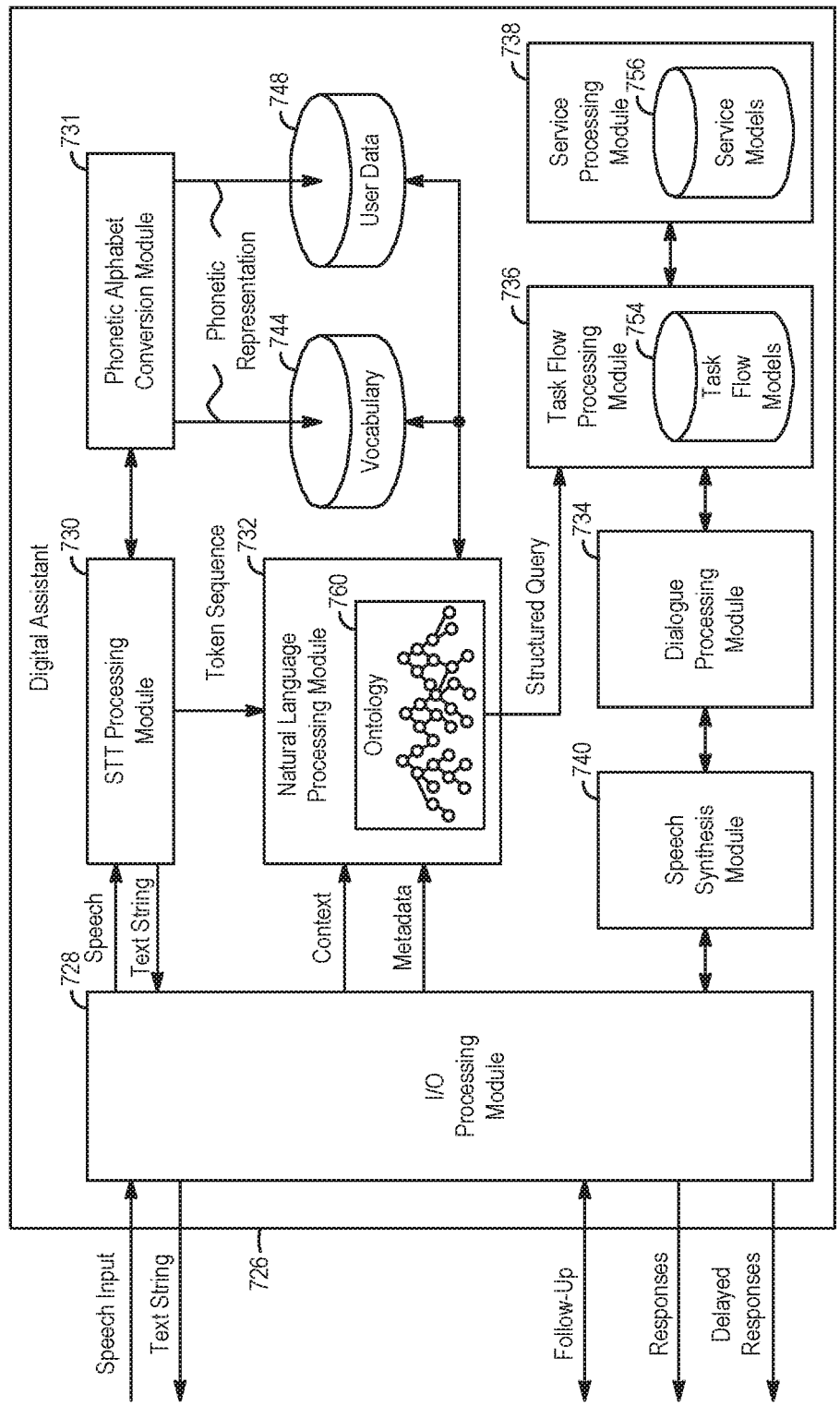
FIG. 7B illustrates the functions of the digital assistant shown in FIG. 7A according to various examples.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or speech recognizer) for speech-to-text conversions.

STT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. Utility Application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /tə'meɪroʊ/ and /tə'mɑtoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /tə'meɪroʊ/ can be ranked higher than /tə'mɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /tə'meɪroʊ/ can be associated with the United States, whereas the candidate pronunciation /tə'mɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) can be ranked higher than the candidate pronunciation /tə'mɑtoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /tə'meɪroʊ/ corresponding to a portion of the speech input, it can then determine, based on vocabulary index 744, that this sequence corresponds to the word "tomato."

In some examples, STT processing module 730 can use approximate matching techniques to determine words in an utterance. Thus, for example, the STT processing module 730 can determine that the sequence of phonemes /tə'meɪroʊ/ corresponds to the word "tomato," even if that particular sequence of phonemes is not one of the candidate sequence of phonemes for that word.

Natural language processing module 732 ("natural language processor") of the digital assistant can take the sequence of words or tokens ("token sequence") generated by STT processing module 730, and attempt to associate the token sequence with one or more "actionable intents" recognized by the digital assistant. An "actionable intent" can represent a task that can be performed by the digital assistant, and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754, or in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware, and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

Figure 7C:
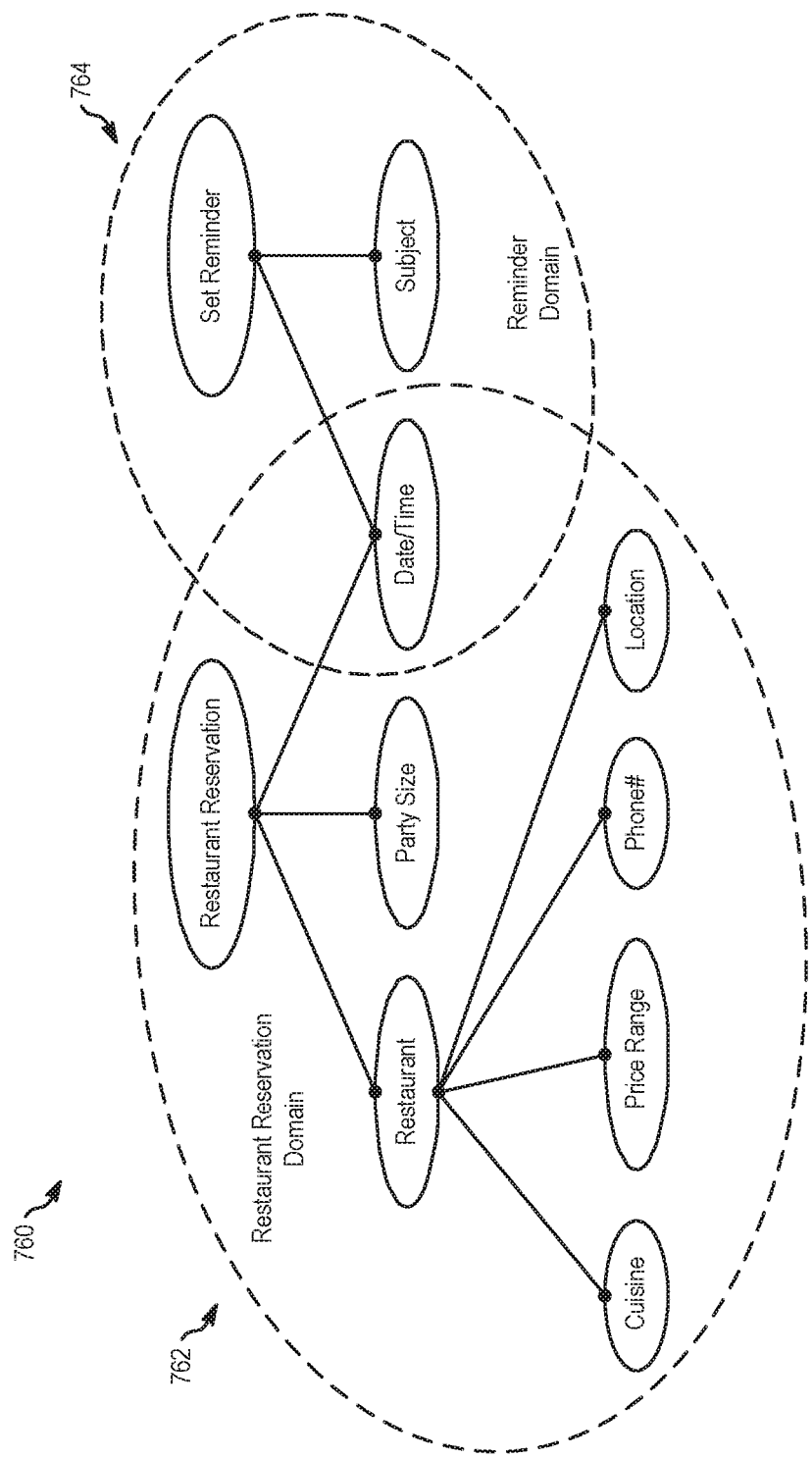
FIG. 7C illustrates a portion of an ontology according to various examples.

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e., another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent, and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "providing navigation instructions," "provide instructions for a task" and so on. A "send a message" domain can be associated with a "send a message" actionable intent node, and may further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation," "car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food," "drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, natural language processing module 732 can be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some examples, based on the speech input and the text derived from the speech input using STT processing module 730, natural language processing module 732 can generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} may not be specified in the structured query based on the information currently available. In some examples, natural language processing module 732 can populate some parameters of the structured query with received contextual information. For example, in some examples, if the user requested a sushi restaurant "near me," natural language processing module 732 can populate a {location} parameter in the structured query with GPS coordinates from the user device.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 may need to initiate additional dialogue with the user in order to obtain additional information, and/or disambiguate potentially ambiguous utterances. When such interactions are necessary, task flow processing module 736 can invoke dialogue flow processing module 734 to engage in a dialogue with the user. In some examples, dialogue flow processing module 734 can determine how (and/or when) to ask the user for the additional information and receives and processes the user responses. The questions can be provided to and answers can be received from the users through I/O processing module 728. In some examples, dialogue flow processing module 734 can present dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information, or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 can perform the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Exemplary Techniques for Intelligent Task Discovery

FIGS. 8A-E illustrate exemplary techniques including exemplary user interfaces ("UI") for intelligent task discovery in accordance with some embodiments. These figures are also used to illustrate the processes described below, including the processes in FIGS. 10A-C and 11.

FIG. 8A shows electronic device 800. Electronic device 800 may be any of devices 104, 122, 200, 400, 600, 1200, and 1300 (FIGS. 1, 2A, 3, 4, 5A, 6A-6B, 12, and 13) in some embodiments. In the illustrated example, electronic device 800 is a mobile phone. While the illustrated example is described herein with reference to electronic device 800, it will be appreciated that a variety of electronic devices, such as laptops, desktops, tablets, wearable devices, and home electronics including televisions and speakers, can be used in other implementations.

Electronic device 800 provides a user interface for a user to interact with an intelligent automated assistant. The user interface can be graphical and/or auditory. In some examples, electronic device 800 displays a graphical user interface on a display screen, such as touch-sensitive display screen 802. In some examples, electronic device 800 samples audio user inputs via a microphone of the electronic device. With reference to FIG. 8A, electronic device 800 receives a user input "READ MY MESSAGES". The user input may be a spoken utterance, a physical touch, an active gesture, or a combination thereof. In response, electronic device 800 displays a textual transcription 804 of the user input "READ MY MESSAGES" on display screen 802.

In response to the user input, electronic device 800 derives a user intent (e.g., read one or more text messages most recently received and not yet read at the electronic device) and accordingly obtains an unread text message received at the electronic device. Electronic device 800 converts the text message into speech and provides (e.g., via a speaker) an audio output that includes an audio representation of the text message. In some instances, the audio output also includes relevant information associated with the text message (e.g., sender name, time stamp, etc.) and a prompt for additional input. In the depicted example, electronic device 800 provides an audio output 812: "TONY SAID, FLYING OVER TO 1 INFINITE LOOP CUPERTINO, GIVE PEPPER A CALL 123-456-7890. WOULD YOU LIKE TO REPLY?"

Based on the received text message, the electronic device 800 identifies one or more tasks. In some examples, electronic device 800 determines whether any portion of the text message (e.g. a portion of the text string) is associated with a data type of a plurality of data types. The plurality of data types include, but are not limited to: address(es) (e.g., "1 Infinite Loop Cupertino"), phone number(s) (e.g., "123-456-7890"), Uniform Resource Locators ("URLs") (e.g. "http://www.apple.com/"), date(s) (e.g., "tomorrow", "6/1/2000"), person(s) of interest ("Tony Stark"), place(s) of interest, package tracking number(s), flight number(s), and so forth. It will be appreciated any information of interest can be defined as being of one or more data types, for example, based on word recognition, patterns and/or metadata of the information.

In some examples, one or more detectors are implemented to analyze content (e.g., text message, emails, etc.) to detect one or more predefined data types, respectively, at electronic device 800. A detector includes one or more software programs that are capable of recognizing data of predefined data type(s) in the content. In some examples, a detector is programmed to identify text (e.g., letters), numbers (e.g., integers), text and/or numbers arranged in a certain format (e.g., xx/xx/xxxx, (xxx)xxx-xxxx), predetermined keywords ("http://", "Apt"), information of interest (e.g., names in the user's address book), or a combination thereof. In some examples, a detector is implemented to detect a single data type. For example, a phone number detector can be implemented to detect phone numbers, a URL detector can be implemented to detect URLs, an address detector can be implemented to detect addresses, and so forth. In some examples, each of the detectors on electronic device 800 is executed to analyze content to detect the presence of data of the respective data type.

Electronic device 800 associates each data type with at least one task which, in some instances, has one or more parameters. For example, the "address" data type is associated with a task of navigation having a parameter of an address, or may be associated with a task of updating a contact entry, or both. As another example, the "URL" data type is associated with a first task of opening in a browser having parameter of a website link, a second task of creating a book mark of the linked address, and a third task of adding to reading list with a parameter of a website link. As another example, the "flight number" data type is associated with a task of setting a reminder with parameters of dates and time.

In some examples, electronic devices of different types associate the same data type with different sets of tasks. For example, on a mobile phone such as electronic device 800, the "URL" data type is associated with two tasks: the task of opening the URL in a browser and the task of adding the URL to a reading list. In comparison, on a navigation device, the "URL" data type is associated with only the task of adding the URL to a reading list. The task of opening a URL in a browser may, for instance, be undesirable in use cases of the navigation device (e.g., driving).

In some examples, electronic device 800 associates a data type with one or more tasks based on context information. For example, based on the speed of movement of the electronic device (e.g., as measured by the GPS coordinates of the device over time), or that the electronic device is paired to a vehicle, the electronic device can determine whether the electronic device is in a moving vehicle. If the electronic device determines that the electronic device is in a moving vehicle, the "URL" data type is not associated with the task of opening in a browser but is associated with only the task of adding the URL to a reading list, for example.

In some examples, after detecting data of a particular data type, electronic device 800 displays (e.g., on a display screen) one or more of the tasks associated with the data type along with the corresponding parameters. With reference to FIG. 8B, a number of detectors are executed to analyze the text string of the above-described text message. A phone detector detects a phone number "123-456-7890", and an address detector detects an address "1 INFINITE LOOP CUPERTINO". Based on the detected data types, electronic device 800 identifies a first task associated with the "phone number" data type (i.e., calling a number) and a second task associated with the "address" data type (i.e., navigating to an address). Accordingly, electronic device 800 displays selectable affordance 808 representing the first task (GET DIRECTIONS TO 1 INFINITE LOOP CUPERTINO) and selectable affordance 810 representing the second task (CALL 123-456-7890) on the display screen.

In some examples, if multiple tasks are available for display (e.g., because a detected data type is associated with multiple tasks and/or multiple data types are detected), electronic device 800 prioritizes the display of some tasks over the display of other tasks, for instance, based on the type of the electronic device. For example, on a navigation device, the display of a task of navigation is prioritized over the display of a task of making a phone call. The prioritization of display can be implemented in a number of ways. For example, an affordance representing the first task is displayed more prominently (e.g., different fonts, different colors, different positions) than an affordance representing the second task. As another example, the affordance representing the first task is displayed before (e.g., temporally) the affordance representing the second task is displayed. As another example, the affordance representing the second task is not displayed at all. The second task, although not displayed, can still be initiated by a speech input, as discussed in more details below with respect to FIG. 8C.

It will be appreciated that the display of tasks on electronic device 800 can vary based on other factors, such as the amount of display area available and context information. For example, the size and number of displayed affordances (e.g., buttons) can vary based on the amount of display area available, which in turn can vary based on the type of electronic device (e.g., phone, tablet, television) and/or the operating system of the electronic device. In some examples, visual enhancement(s) can be provided based on the amount of display area available. For example, on an electronic device with relatively large display capabilities (e.g. television), the electronic device can display the address (e.g., for the task of navigation) as a pin on a map as part of the intelligent automated assistant GUI. As another example, if a phone number of the user's contact is detected, the electronic device can obtain additional information related to the contact (via a look-up in the user's contact list) and provide (e.g., display) the information for the task of calling as part of the intelligent automated assistant GUI.

Figure 8C:
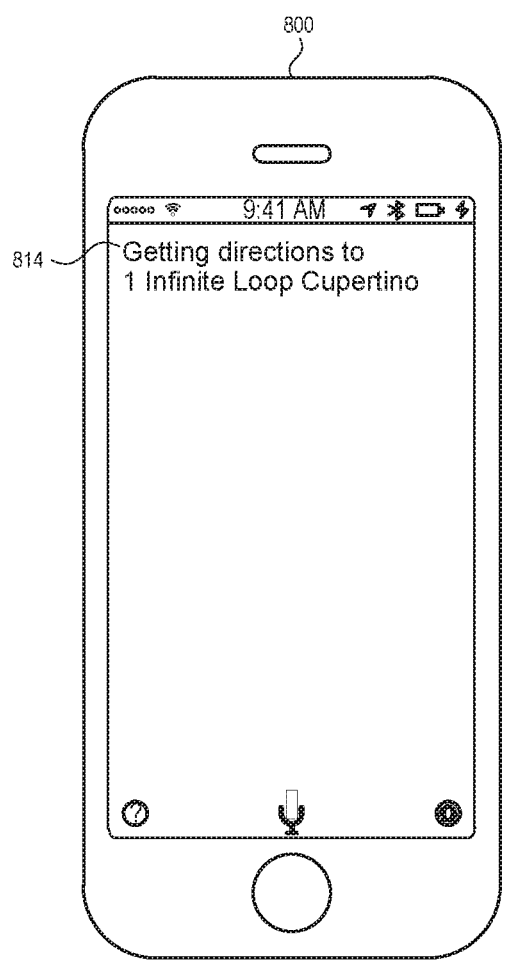

With reference to FIG. 8C, electronic device 800 receives a user input initiating the task of navigation and causes the task to be performed. As illustrated, electronic device 800 displays a text string "GETTING DIRECTIONS TO 1 INFINITE LOOP, CUPERTINO". In some examples, electronic device 800 invokes one or more software service providers (e.g., application(s), API(s), and/or function(s) for navigation) to perform the selected task. In some examples, electronic device 800 causes the task to be performed on a second electronic device different from electronic device 800. For example, upon receiving the user input, electronic device 800 causes a navigation device to initiate navigation, for example, by transmitting the address to the navigation device.

In some examples, the user input initiating the task of navigation is a physical touch on selectable affordance 808 ("GET DIRECTIONS TO 1 INFINITE LOOP CUPERTINO") as illustrated in FIG. 8B. In some examples, electronic device 800 allows the user to initiate the one or more tasks associated with the detected data types via speech inputs, such as an utterance "drive me there". In response to receiving the speech input, electronic device 800 determines whether the speech input is indicative of one or more tasks associated with the detected data type. If the speech input is indicative of a task associated with the detected data type, the electronic device causes the task to be performed, as discussed in more details below.

In some examples, electronic device 800 identifies task(s) and parameter(s) from the speech input based on context information. In some examples, the context information can include what is being currently displayed at the electronic device. For example, if affordance 808 in FIG. 8B ("GET DIRECTIONS TO 1 INFINITE LOOP CUPERTINO") is displayed when the user utters "drive me there", the electronic device derives user intent to navigate to "1 INFINITE LOOP CUPERTINO" at least partially based on what is currently displayed. In some examples, the context information can include data types that have been detected by the electronic device (e.g., address, phone number) and the corresponding data (e.g., "1 INFINITE LOOP CUPERTINO", "123-456-7890"). For example, if the user provides an audio input "drive me there" when affordance 808 is not displayed, the electronic device can still derive user intent to drive to "1 INFINITE LOOP CUPERTINO" based on the context information.

In some examples, upon receiving a speech input initiating a task to perform (e.g., "drive me there"), electronic device 800 sends data corresponding to the speech input, as well as selective portions of context information, to one or more servers for processing. In some examples, the one or more servers convert the data into a textual representation (e.g., a text string), derive at least part of a user intent based on the textual representation and the received context information, and/or operationalize the derived user intent into the task. In some examples, personal data of the user is not transmitted to the one or more servers. In some examples, context information such as text messages and emails, as well as information (e.g. detected types) derived from the text messages and emails, constitutes personal data and thus is not transmitted to the one or more servers. In some examples, the context information including personal data of the user is used locally by the electronic device to assist the processing of the speech input and the identification of task(s) and parameter(s). For example, while the detected phone number "123-456-7890" and the detected address "1 INFINITE LOOP CUPERTINO" are not transmitted to the server, the phone number and the address are still used locally to derive parameters for the task of calling and the task of navigation at the electronic device, respectively. In some examples, the identification of task(s) and parameter(s) based on a speech input is performed locally on the electronic device.

Data of particular data types detected by electronic device 800 can be automatically stored at the electronic device. For example, after processing the text message described above, electronic device stores the detected address "1 INFINITE LOOP CUPERTINO" and the detected phone number "123-456-7890", along with the respective data types (i.e., address and phone number), at electronic device 800. In some examples, metadata associated with the text message is stored. For example, the sender of the text message ("TONY STARK") and the time stamp of the text message are stored in association with the data and the data types. In some examples, the stored data, data types, and metadata are part of a short-term memory that persists for only a limited period of time (e.g. for the current user session of the intelligent automated assistant, for a few minutes, until the device enters an inactive state). In some examples, the stored data, data types, and metadata are part of a long-term memory that is associated with the user.

Figure 8E:
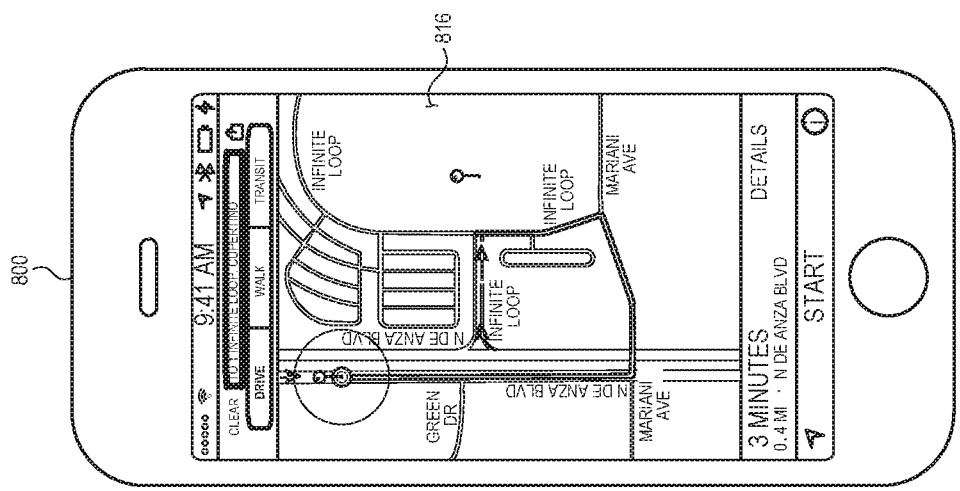
Figure 8D:
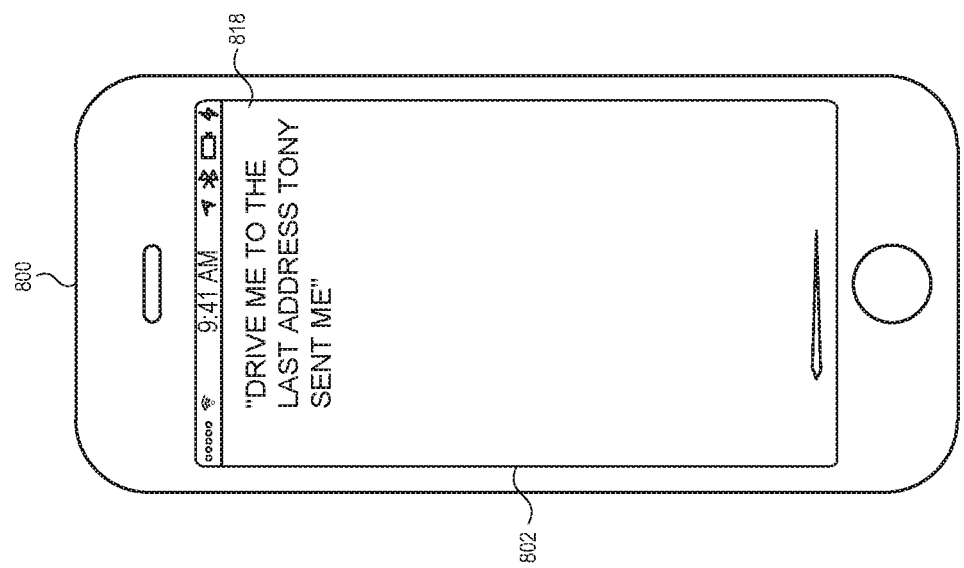

In some examples, the stored context information is used to interpret user inputs. With reference to FIG. 8D, the user provides (e.g., utters) an input "DRIVE ME TO THE LAST ADDRESS TONY SENT ME", which is transcribed and displayed as a text string 818 on display screen 802. Based on the phrase "THE LAST ADDRESS TONY SENT ME", electronic device 800 refers to the stored context information, which associates "TONY" and "address" with "1 INFINITE LOOP CUPERTINO". Accordingly, electronic device 800 is able to derive a parameter "1 INFINITE LOOP CUPERTINO" for a task of navigation. With reference to FIG. 8E, the electronic device launches a service provider (e.g., a navigation application, function, and/or API) to perform the task of navigation with the parameter "1 INFINITE LOOP CUPERTINO".

It will be appreciated that the stored context information can be used to process user inputs directed to any software application on electronic device 800. For example, if the user invokes a software application (e.g., a navigation application) and utters "THE LAST ADDRESS TONY SENT ME", the software application is able to refer to the stored context information to derive "1 INFINITE LOOP CUPERTINO". It should be further appreciated that the stored context information can be used for purposes other than interpreting user inputs by the electronic device. For example, if the user invokes a navigation application, the navigation application can provide (e.g., displays) relevant portions of the context information such as the address "1 INFINITE LOOP CUPERTINO" as a suggested destination, without a user request.

Figure 9A:
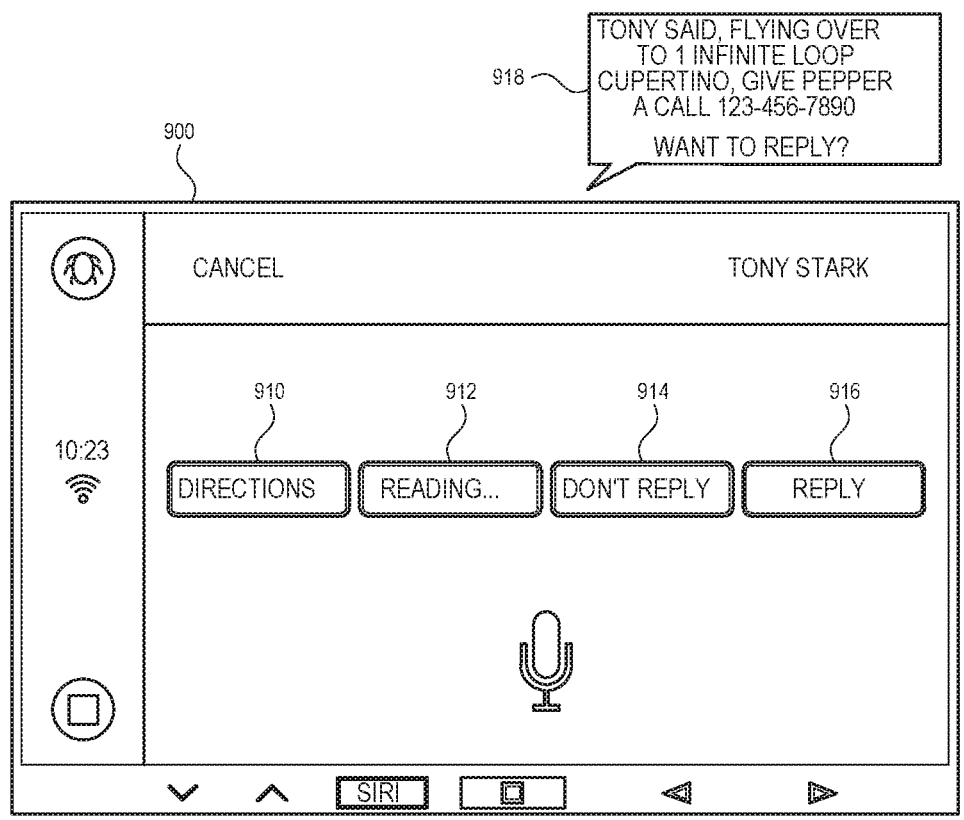
FIGS. 9A-C illustrate exemplary user interfaces of an electronic device in accordance with some embodiments.

After discovering one or more tasks, an electronic device can present (e.g., display) the discovered tasks to the user at multiple points during operation. Exemplary entry points for the discovered tasks are discussed with respect to FIGS. 9A-C. FIG. 9A shows electronic device 900. Electronic device 900 may be any of devices 104, 122, 200, 400, 600, 1200, and 1300 (FIGS. 1, 2A, 3, 4, 5A, 6A-6B, 12, and 13) in some embodiments. In the illustrated example, electronic device 900 is an electronic device with navigation capabilities. While the illustrated example is described herein with reference to electronic device 900, it will be appreciated that a variety of electronic devices, such as laptops, desktops, tablets, wearable devices (e.g., watch, headphones), and home electronics including televisions and speakers, can be used in other implementations.

In some examples, electronic device 900 provides an entry point to some of the tasks discovered in certain content (e.g., text messages, emails, documents) after presenting the content to the user and/or while presenting the content to the user. As illustrated in FIG. 9A, electronic device 900 provides an audio output 918 corresponding to text message received at electronic device 900: "TONY SAID, FLYING OVER TO 1 INFINITE LOOP CUPERTINO, GIVE PEPPER A CALL 123-456-7890. WANT TO REPLY?" Electronic device 900 also displays, on a display screen, affordance 910 ("DIRECTIONS"), affordance 912 ("READING ... "), affordance 914 ("DON'T REPLY"), and affordance 916 ("REPLY"). In particular, affordance 910 ("DIRECTION") represents a task of navigation, which is discovered based on the text message referred to in audio input 918. In some examples, affordance 910 is displayed while electronic device 900 provides the audio output 918 and/or after electronic device 900 finishes providing the audio output 918. If affordance 910 is selected by the user (e.g., via a physical touch input, via a speech input "directions"), the task of navigation to "1 INFINITE LOOP CUPERTINO" is initiated (not depicted).

Figure 9B:
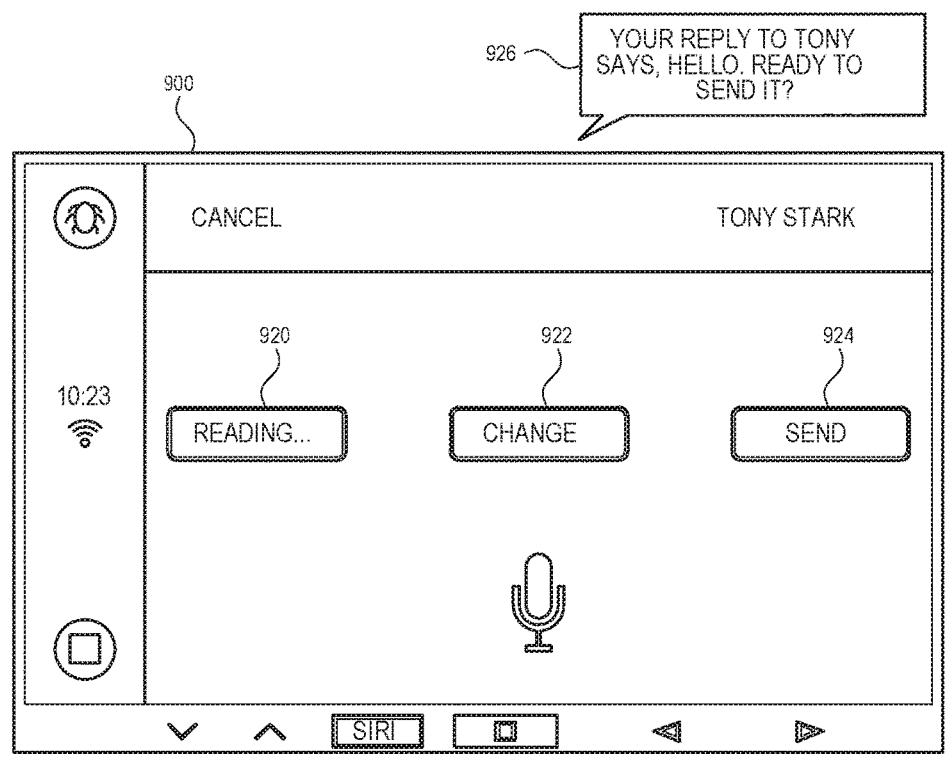

In the depicted example, after electronic device 900 finishes providing the audio output 918, electronic device 900 receives an input "Yes, Hello" from the user. As illustrated in FIG. 9B, electronic device 900 provides an audio output 926 ("YOUR REPLY TO TONY SAYS, HELLO. READY TO SEND IT?") Electronic device 900 also displays affordance 920 ("READING ... "), affordance 922 ("CHANGE"), affordance 924 ("SEND") while providing the audio output 926. If the user selects affordance 924 ("SEND"), electronic device 900 transmits the user's reply, in some instances, using a service such as a text message application.

The electronic device allows the user to make changes after composing a reply message, for example, by specifying a different service provider (e.g., from a different domain). For example, upon receiving the user input "YES, HELLO" (responsive to the prompt "WANT TO REPLY?"), electronic device 800 can identify a default service provider for transmitting the reply. In some examples, the service provider is identified based on the original content (e.g., the original text message). That is, if the reply is responsive to a text message, the electronic device identifies the text message application as the default service provider. However, if the user provides a subsequent input, for example, "SEND AS AN EMAIL" or "CREATE A REMINDER", the electronic device can identify a second service provider based on the user input and provide the composed message (e.g., "HELLO"), as well as relevant context information ("TONY STARK"), to the second service provider (e.g., an email application or a reminder API).

Figure 9C:
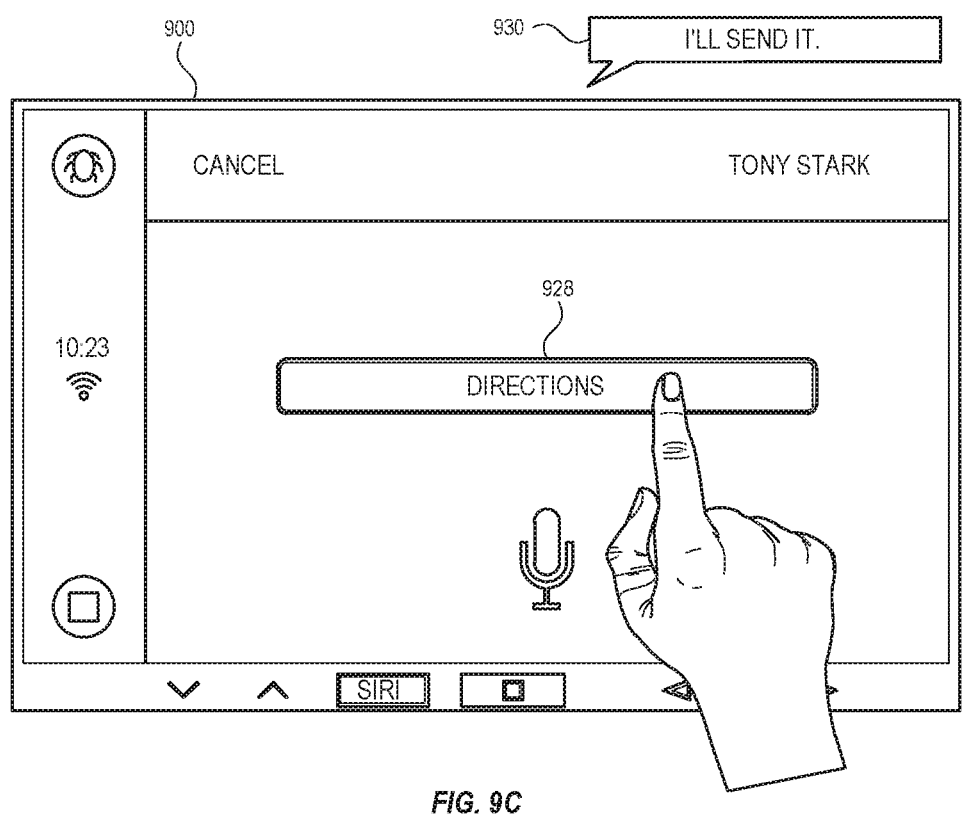

In some examples, electronic device 900 provides additional entry points to some of the discovered tasks throughout a user session with the intelligent automated assistant. As illustrated in FIG. 9C, electronic device 900 provides an audio output 930 ("I'LL SEND IT") and transmits a text message, in some instances, in response to a user input (not depicted). Electronic device 900 also displays affordance 928 ("DIRECTIONS"), which represents the task of navigation and is functionally identical to previously displayed affordance 910 (FIG. 9A). If affordance 928 is selected by the user (e.g., via a physical touch input, via a speech input "directions"), the task of navigation to "1 INFINITE LOOP CUPERTINO" is initiated (not depicted). In some examples, when no affordance representing the discovered task of navigation is displayed, the user can initiate the task via speech input, as described above.

Notably, although each of electronic device 800 (FIGS. 8A-E) and electronic device 900 (FIGS. 9A-C) receive a text message including a same text string ("FLYING OVER TO 1 INFINITE LOOP CUPERTINO, GIVE PEPPER A CALL 123-456-7890") each of the devices 800, 900 provides different visual outputs corresponding to the discovered tasks (e.g., affordances 808 and 810 in FIG. 8B as compared to affordance 910 in FIG. 9A). In some examples, the two electronic devices 800, 900 identify different numbers and types of tasks as a result of their differing device types (e.g., mobile phone v. navigation device) and context information (e.g., whether the device is in a moving vehicle), as described above. In some examples, the two electronic devices display different numbers and types of tasks as a result of differing amounts of display area available, as described above.

While the illustrated examples in FIGS. 8A-E and 9A-C are described herein with reference to text messages, it will be appreciated that a variety of content, such as emails, audio messages, videos, images, and the like, can be analyzed to detect particular data types (and the associated tasks).

It will be further appreciated that the detection of data types and the identification of associated tasks can be triggered with or without a user request. For example, electronic device 800, upon receiving a text message, can initiate intelligent task discovery without a user request (e.g., "READ MY MESSAGES"). If electronic device 800 detects one or more particular data types, the electronic device can automatically output (e.g., display or provide a spoken output) some of the tasks associated with the detected data types. The display and selection of the identified tasks can be implemented in a manner similar to what is described above.

5. Exemplary Processes for Intelligent Task Discovery

FIGS. 10A-C illustrate process 1000 for operating a digital assistant according to various examples. Process 1000 is performed, for example, using one or more electronic devices (e.g., devices 104, 106, 200, 400, 600, 1200, or 1300) implementing a digital assistant. In some examples, the process is performed at a client-server system (e.g., system 100) implementing a digital assistant. The blocks of the process can be divided up in any manner between the server (e.g., DA server 106) and the client (e.g., user device 104). In process 1000, some blocks are, optionally, combined, the order of some blocks is, optionally, changed, and some blocks are, optionally, omitted. In some examples, only a subset of the features or blocks described below with reference to FIGS. 10A-C is performed.

As described below, method 1000 provides an efficient way for task discovery in content such as text messages and emails on an electronic device. The method reduces the cognitive burden on a user for manually specifying task or service(s) to invoke and manually reproducing portions of the content to perform the task(s), thereby creating a more efficient human-machine interface. For battery-operated computing devices, enabling a user to reach the completion of tasks more efficiently conserves power and increases the time between battery charges.

At block 1002, an electronic device receives a communication. In some examples, the communication can be any content, including but not limited to, a text message, an email, a document, an audio clip, an image, or a combination thereof. In some examples, the communication comprises a text string (e.g., derived using text recognition technologies or speech-to-text technologies). Optionally, at block 1003, the electronic device provides, with an automated assistant, a speech output corresponding to the text string of the communication (e.g., "FLYING OVER TO 1 INFINITE LOOP CUPERTINO"). In some examples, the speech output corresponding to the text string of the communication is provided responsive to a user request (e.g., "READ MY MESSAGES"). In some examples, providing the speech output corresponding to the text string of the communication comprises converting the text string of the communication into speech at block 1050.

At block 1006, the electronic device determines whether a portion of the text string is associated with a data type of a plurality of data types. The data type has at least one task associated therewith. Optionally, at block 1008, the electronic device detects in the portion of the text string, with a detector, the presence of data of the data type. The detector corresponds to the data type of the plurality of data types. Optionally, at block 1010, the electronic device identifies the at least one task from a plurality of tasks based on a type of the electronic device.

In some examples, the data type of the plurality of data types comprises at least one of: an address, a phone number, a Uniform Resource Locator ("URL"), a date, a person of interest, a place of interest, a package tracking number, or a flight number.

Optionally at block 1012, the electronic device displays, with a display of the electronic device, an affordance corresponding to the task. Optionally at block 1016, the electronic device prioritizes a display of the affordance of the first task over a display of an affordance of a second task based on a type of the electronic device. Optionally at block 1017, the electronic device prioritizes the display of the affordance of the first task by foregoing the display of the affordance of the second task. In some examples where the affordance of the second task is not displayed, if the electronic device receives a user input (e.g., speech) indicative of the second task, the electronic device causes the second task to be performed.

At block 1014, the electronic device, in accordance with a determination that the portion of the text string is not associated with the data type of the plurality of data types, foregoes causing the task to be performed based on the portion of the text string.

At block 1018, the electronic device, in accordance with a determination that the portion of the text string is associated with the data type of the plurality of data types, receives a user input indicative of a task of the at least one task associated with the data type. Optionally at block 1020, the user input comprises a selection of the displayed affordance.

Optionally at block 1022, the user input indicative of the task is a speech input. In some examples, the speech input does not include the portion of the text. At block 1025, a user intent is derived from the speech input based on context information. The context information comprises the portion of the text.

In some examples, at block 1023, the electronic device sends data corresponding to the speech input to a second electronic device different from the electronic device. The data corresponding to the speech input does not include the text string of the communication. At block 1024, the electronic device receives, from the second electronic device, a user intent corresponding to the task.

In response to the user input indicative of the task at block 1018, the electronic device causes the task to be performed based on the portion of the text string. In some examples, the task is performed at a second electronic device different from the electronic device.

In some examples, the speech output corresponding to the text string of the communication is a first speech output and the speech input indicative of the task is a first speech input. At block 1004, the electronic device, after providing the first speech output at block 1003, provides a second speech output indicative of a prompt to reply to the communication (e.g., "WANT TO REPLY?"). At block 1005, the electronic device, after providing the second speech output at block 1004, receives a second speech input (e.g., "YES, HELLO") from the user. In some examples, the second speech input is received before the first speech input (e.g., "DRIVE ME THERE") is received.

In some examples, at block 1054, the electronic device identifies a first service provider (e.g., a text message software application) based on the communication. The first service provider is associated with a first domain of a plurality of domains. At block 1056, after receiving the second speech input ("YES, HELLO"), the electronic device receives a third speech input (e.g., "SEND AS AN EMAIL") indicative of a second domain of the plurality of domains. The second domain is different from the first domain. In response, at block 1058, the electronic device identifies a second service provider (e.g., an email software application) based on the third speech input and, at block 1060, provides data associated with the second speech input to the second service provider.

In some examples, more than one data type is detected in the text string. In some examples, the portion of the text string is a first portion of the text string, the data type is a first data type, and the task is a first task. At block 1070, the electronic device determines whether a second portion of the text string is associated with a second data type of the plurality of data types. At block 1072, in accordance with a determination that the second portion of the text string is associated with the second data type of the plurality of data types, the electronic device identifies a second task based on the second data type. At block 1074, in accordance with a determination that the second portion of the text string is not associated with the second data type of the plurality of data types, the electronic device foregoes identifying the second task based on the second data type.

Optionally at block 1030, the electronic device stores information associated with the communication on the electronic device. In some examples, the stored information associated with the communication comprises the portion of the text string. In some examples, the stored information associated with the communication comprises the data type. In some examples, the stored information associated with the communication comprises metadata associated with the communication. Optionally at block 1032, the electronic device receives an input. Optionally at block 1034, the electronic device identifies a task based on the input. Optionally at block 1036, the electronic device performs the task based on at least part of the stored information.

Optionally at block 1040, the electronic device stores information associated with the communication on the electronic device. In some examples, block 1040 is functionally similar and/or identical to block 1030. Optionally at block 1042, the electronic device invokes a software application, and at block 1044, performs the task based on at least part of the stored information.

FIG. 11 illustrates process 1100 for operating a digital assistant according to various examples. Process 1100 is performed, for example, using one or more electronic devices (e.g., devices 104, 106, 200, 400, 600, 1200, or 1300) implementing a digital assistant. In some examples, the processes is performed at a client-server system (e.g., system 100) implementing a digital assistant. The blocks of the processes can be divided up in any manner between the server (e.g., DA server 106) and the client (e.g., user device 104). In process 1100, some blocks are, optionally, combined, the order of some blocks is, optionally, changed, and some blocks are, optionally, omitted. In some examples, only a subset of the features or blocks described below with reference to FIG. 11 is performed.

As described below, method 1100 provides an efficient way for task discovery content such as text messages and emails on an electronic device. The method reduces the cognitive burden on a user for manually specifying task or service(s) to invoke and manually reproducing portions of the content to perform the task(s), thereby creating a more efficient human-machine interface. For battery-operated computing devices, enabling a user to reach the completion of tasks more efficiently conserves power and increases the time between battery charges.

At block 1102, the electronic device receives a communication comprising a text string. At block 1104, the electronic device determines whether a portion of the text string is associated with a data type of a plurality of data types. In some examples, the data type of the plurality of data types comprises at least one of: an address, a phone number, a Uniform Resource Locator ("URL"), a date, a person of interest, a place of interest, a package tracking number, or a flight number.

In accordance with a determination that the portion of the text string is associated with the data type of the plurality of data types, the electronic device derives a task having one or more parameters based on the data type at 1108 and outputs the derived tasks at 1110. A parameter of the one or more parameters comprises the portion of the text string.

Optionally at block 1112, the electronic device displays, with a display of the electronic device, an affordance corresponding to the derived task, wherein the user input comprises a selection of the affordance. Optionally at 1114, the electronic device outputs an audio output.

Optionally at block 1116, the electronic device receives a user input indicative of a selection of the derived task. Optionally at block 1118, in response to the user input indicative of the selection of the derived task, the electronic device causes the task to be performed based on the portion of the text string.

At block 1106, in accordance with a determination that the portion of the text string is not associated with the data type of the plurality of data types, the electronic device foregoes deriving a task having one or more parameters based on the data type.

Figure 12:
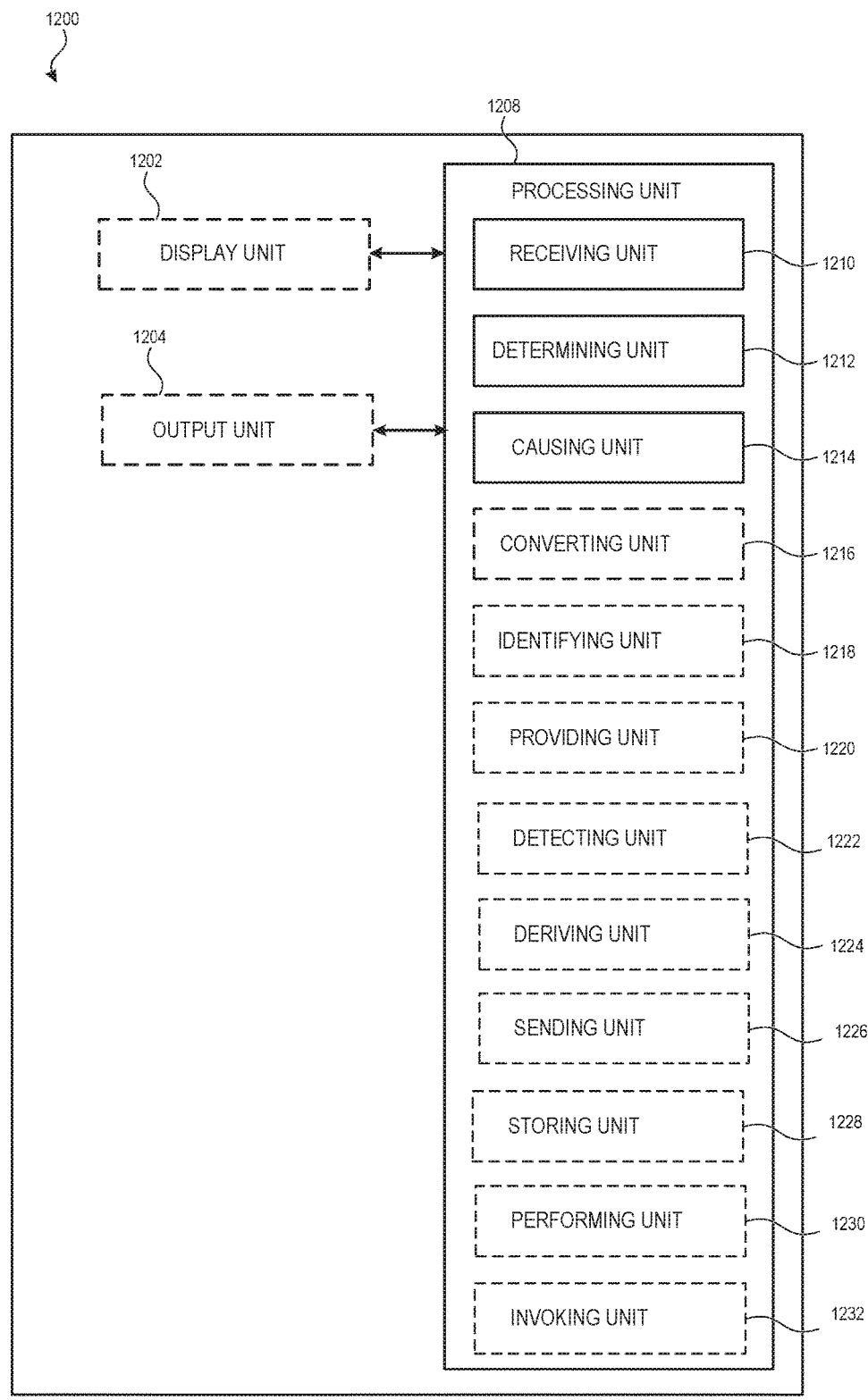
FIG. 12 illustrates a functional block diagram of an electronic device according to various examples.

In accordance with some embodiments, FIG. 12 shows a functional block diagram of an electronic device 1200 configured in accordance with the principles of the various described embodiments, including those described with reference to FIGS. 8A-E, 9A-C, and 10A-C. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein As shown in FIG. 12, an electronic device 1200 includes a processing unit 1208, and optionally, a display unit 1202 and an output unit 1204. Optionally, the processing unit 1208 is coupled to the display unit 1202 and the output unit 1204. In some embodiments, the processing unit 1208 includes a receiving unit 1210, a determining 1212, a causing unit 1214, and optionally, a converting unit 1216, an identifying unit 1218, a providing unit 1220, a detecting unit 1222, a deriving unit 1224, a sending unit 1226, a storing unit 1228, a performing unit 1230, and invoking unit 1232.

In some examples, the processing unit 1208 configured to: receive (e.g., with the receiving unit 1210) a communication comprising a text string (e.g., block 1002 of FIG. 10A); determine (e.g., with the determining unit 1212) whether a portion of the text string is associated with a data type of a plurality of data types, wherein the data type has at least one task associated therewith (e.g., block 1006 of FIG. 10B); in accordance with a determination that the portion of the text string is associated with the data type of the plurality of data types: receive (e.g., with the receiving unit 1210) a user input indicative of a task of the at least one task associated with the data type (e.g., block 1018 of FIG. 10B); in response to the user input indicative of the task, cause (e.g., with the causing unit 1214) the task to be performed based on the portion of the text string (e.g., block 1026 of FIG. 10C); in accordance with a determination that the portion of the text string is not associated with the data type of the plurality of data types, forego causing (e.g., with the causing unit 1214) the task to be performed based on the portion of the text string (e.g., block 1014 of FIG. 10B).

In some examples, the processing unit 1208 is further configured to: provide (e.g., with the outputting unit 1204), with an automated assistant, a speech output corresponding to the text string of the communication (e.g., block 1003 of FIG. 10A).

In some examples, the speech output corresponding to the text string of the communication is provided responsive to a user request.

In some examples, providing the speech output corresponding to the text string of the communication comprises converting (e.g., with the converting unit 1216) the text string of the communication into speech (e.g., block 1050 of FIG. 10A).

In some examples, the speech output corresponding to the text string of the communication is a first speech output and the speech input indicative of the task is a first speech input, and wherein the processing unit 1208 is further configured to: after providing the first speech output, provide (e.g., with the output unit 1204) a second speech output indicative of a prompt to reply to the communication (e.g., block 1004 of FIG. 10A); after providing the second speech output, receive (e.g., with the receiving unit 1210) a second speech input from the user, wherein the second speech input is received before the first speech input is received (e.g., block 1005 of FIG. 10A).

In some examples, the processing unit 1208 is further configured to: identify (e.g., with the identifying unit 1218) a first service provider based on the communication, wherein the first service provider is associated with a first domain of a plurality of domains (e.g., block 1054 of FIG. 10A); after receiving the second speech input, receive (e.g., with the receiving unit 1210) a third speech input indicative of the a second domain of the plurality of domains, wherein the second domain is different from the first domain (e.g., block 1056 of FIG. 10A); identify (e.g., with the identifying unit 1218) a second service provider based on the third speech input (e.g., block 1058 of FIG. 10A); provide (e.g., with the providing unit 1220) data associated with the second speech input to the second service provider (e.g., block 1060 of FIG. 10A).

In some examples, the data type of the plurality of data types comprises at least one of: an address, a phone number, a Uniform Resource Locator ("URL"), a date, a person of interest, a place of interest, a package tracking number, or a flight number.

In some examples, determining whether the portion of the text string is associated with the data type of a plurality of data types comprises: detecting (e.g., with the detecting unit 1222) in the portion of the text string, with a detector, the presence of data of the data type, wherein the detector corresponds to the data type of the plurality of data types (e.g., block 1008 of FIG. 10B).

In some examples, the processing unit 1208 is further configured to identify (e.g., with the identifying unit 1218) the at least one task from a plurality of tasks based on a type of the electronic device 1200 (e.g., block 1010 of FIG. 10B).

In some examples, the portion of the text string is a first portion of the text string, the data type is a first data type, and the task is a first task, and wherein the processing unit 1208 is further configured to: determine (e.g., with the determining unit 1212) whether a second portion of the text string is associated with a second data type of the plurality of data types (e.g., block 1070 of FIG. 10C); in accordance with a determination that the second portion of the text string is associated with the second data type of the plurality of data types, identify (e.g., with the identifying unit 1218) a second task based on the second data type (e.g., block 1072 of FIG. 10C), and in accordance with a determination that the second portion of the text string is not associated with the second data type of the plurality of data types, forego identifying (e.g., with the identifying unit 1218) the second task based on the second data type (e.g., block 1074 of FIG. 10C).

In some examples, the processing unit 1208 is further configured to: display (e.g., with the display unit 1202) an affordance corresponding to the task (e.g., block 1012 of FIG. 10B), wherein the user input comprises a selection of the affordance (e.g., block 1020 of FIG. 10B).

In some examples, the task is a first task, and wherein the processing unit 1208 is further configured to: prioritize a display (e.g., with the display unit 1202) of the affordance of the first task over a display of an affordance of a second task based on a type of the electronic device 1200 (e.g., block 1016 of FIG. 10B).

In some examples, prioritizing the display of the affordance of the first task over the display of the affordance of the second task comprises: foregoing the display (e.g., with the display unit 1202) of the affordance of the second task (e.g., block 1017 of FIG. 10B).

In some examples, the processing unit 1208 is further configured to: receive (e.g., with the receiving unit 1210) a user input indicative of the second task; cause (e.g., with the causing unit 1214) the second task to be performed.

In some examples, the user input indicative of the task is a speech input (e.g., block 1022 of FIG. 10B). In some examples, the speech input does not include the portion of the text.

In some examples, the processing unit 1208 is further configured to derive (e.g., with the deriving unit 1224) a user intent from the speech input based on context information, wherein the context information comprises the portion of the text (e.g., block 1025 of FIG. 10B).

In some examples, the electronic device 1200 is a first electronic device, and wherein the processing unit 1208 is further configured to: with the first electronic device: send (e.g., with the sending unit 1226) data corresponding to the speech input to a second electronic device different from the first electronic device, wherein the data corresponding to the speech input does not include the text string of the communication (e.g., block 1023 of FIG. 10B); receive (e.g., with the receiving unit 1210), from the second electronic device, a user intent corresponding to the task (e.g., block 1024 of FIG. 10B).

In some examples, the processing unit 1208 is further configured to: store (e.g., with the storing unit 1228), on the electronic device 1200, information associated with the communication (e.g., block 1030 of FIG. 10C).

In some examples, the stored information associated with the communication comprises the portion of the text string.

In some examples, the stored information associated with the communication comprises the data type.

In some examples, the stored information associated with the communication comprises metadata associated with the communication.

In some examples, the processing unit 1208 is further configured to: receive (e.g., with the receiving unit 1210) an input (e.g., block 1032 of FIG. 10C); identify (e.g., with the identifying unit 1218) a task based on the input (e.g., block 1034 of FIG. 10C); and perform (e.g., with the performing unit 1230) the task based on at least part of the stored information (e.g., block 1036 of FIG. 10C).

In some examples, the processing unit 1208 is further configured to: invoke (e.g., with the invoking unit 1230) a software application (e.g., block 1042 of FIG. 10C); perform (e.g., with the performing unit 1230) the task based on at least part of the stored information (e.g., block 1044 of FIG. 10C).

In some examples, the electronic device 1200 is a first electronic device, and wherein the task is performed on a second electronic device.

The operations described above with respect to FIG. 10A-C are, optionally, implemented by components depicted in FIGS. 1-4, 6A-B, 7A, and 12. For example, receiving operation 1002, determining operation 1006, and causing operation 1026 are optionally implemented by processor(s) 120. It would be clear to a person of ordinary skill in the art how other processes can be implemented based on the components depicted in FIGS. 1-4, 6A-B, 7A, and 12.

Figure 13:
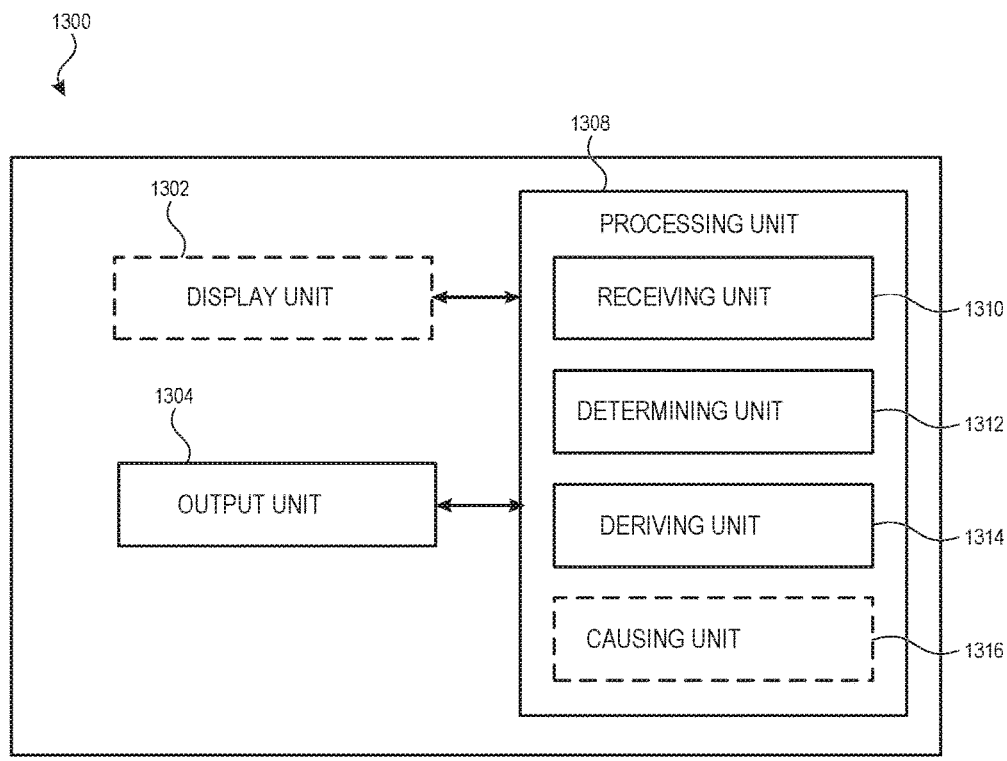
FIG. 13 illustrates a functional block diagram of an electronic device according to various examples.

In accordance with some embodiments, FIG. 13 shows a functional block diagram of an electronic device 1300 configured in accordance with the principles of the various described embodiments, including those described with reference to FIGS. 8A-D, 9A-C and 11. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein As shown in FIG. 13, an electronic device 1300 includes an output unit 1304, a processing unit 1308, and optionally, a display unit 1302. The processing unit 1308 is coupled to the output unit 1304 and optionally, the display unit 1302. In some embodiments, the processing unit 1308 includes a receiving unit 1310, a determining unit 1312, a deriving unit 1314, and optionally, a causing unit 1316.

In some examples, the processing unit 1308 configured to: receive (e.g., with the receiving unit 1310) a communication comprising a text string(e.g., block 1102 of FIG. 11); determine (e.g., with the determining unit 1312) whether a portion of the text string is associated with a data type of a plurality of data types (e.g., block 1104 of FIG. 11); in accordance with a determination that the portion of the text string is associated with the data type of the plurality of data types: derive (e.g., with the deriving unit 1314) a task having one or more parameters based on the data type, wherein a parameter of the one or more parameters comprises the portion of the text string, and output (e.g., with the output unit 1304) the derived task (e.g., block 1108 of FIG. 11); in accordance with a determination that the portion of the text string is not associated with the data type of the plurality of data types, forego deriving (e.g., with the deriving unit 1314) a task having one or more parameters based on the data type (e.g., block 1106 of FIG. 11).

In some examples, the processing unit 1300 is further configured to: receive (e.g., with the receiving unit 1310) a user input indicative of a selection of the derived task (e.g., block 1116 of FIG. 11); in response to the user input indicative of the selection of the derived task, cause (e.g., with the causing unit 1316) the task to be performed based on the portion of the text string (e.g., block 1118 of FIG. 11).

In some examples, outputting the derived task comprises displaying (e.g., with the display unit 1302) an affordance corresponding to the derived task, wherein the user input comprises a selection of the affordance (e.g., block 1112 of FIG. 11).

In some examples, outputting the derived task comprises outputting (e.g., with output unit 1304) an audio output (e.g., block 1114 of FIG. 11).

In some examples, the data type of the plurality of data types comprises at least one of: an address, a phone number, a Uniform Resource Locator ("URL"), a date, a person of interest, a place of interest, a package tracking number, or a flight number.

The operations described above with respect to FIG. 11 are, optionally, implemented by components depicted in FIGS. 1-4, 6A-B, 7A, and 13. For example, receiving operation 1102, determining operation 1104, and deriving operation 1108 are optionally implemented by processor(s) 120. It would be clear to a person of ordinary skill in the art how other processes can be implemented based on the components depicted in FIGS. 1-4, 6A-B, 7A, and 13.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the discovery of tasks in content. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
   one or more processors;
   a memory; and
   one or more programs, wherein the one or more programs are stored in the memory and configured to be executed by the one or more processors, the one or more programs including instructions for:

receiving a communication comprising a text string;
determining whether a portion of the text string is associated with a data type of a plurality of data types, wherein the data type has at least one task associated therewith;
in accordance with a determination that the portion of the text string is associated with the data type of the plurality of data types:
determining a task of the at least one task;
concurrently displaying, with a display of the electronic device, an affordance corresponding to the determined task and an affordance corresponding to a second task, wherein the display of the affordance corresponding to the determined task is prioritized over the display of the affordance corresponding to the second task based on a type of the electronic device;
receiving a user input associated with the affordance corresponding to the determined task; and
in response to receiving the user input associated with the affordance corresponding to the determined task, causing the determined task to be performed based on the portion of the text string; and
in accordance with a determination that the portion of the text string is not associated with the data type of the plurality of data types, foregoing causing a task to be performed based on the portion of the text string.

2. The electronic device of claim 1, wherein the one or more programs further include instructions for:
providing, with an automated assistant, a speech output corresponding to the text string of the communication.

3. The electronic device of claim 2, wherein the speech output corresponding to the text string of the communication is provided responsive to a user request.

4. The electronic device of claim 2, wherein providing the speech output corresponding to the text string of the communication comprises converting the text string of the communication into speech.

5. The electronic device of claim 2, wherein the speech output corresponding to the text string of the communication is a first speech output and the user input associated with the affordance corresponding to the determined task is a first speech input, wherein the one or more programs further include instructions for:
after providing the first speech output, providing, with the electronic device, a second speech output indicative of a prompt to reply to the communication; and
after providing the second speech output, receiving, with the electronic device, a second speech input from the user,
wherein the second speech input is received before the first speech input is received.

6. The electronic device of claim 5, wherein the one or more programs further include instructions for:
identifying a first service provider based on the communication, wherein the first service provider is associated with a first domain of a plurality of domains;
after receiving the second speech input, receiving a third speech input indicative of a second domain of the plurality of domains, wherein the second domain is different from the first domain;
identifying a second service provider based on the third speech input;
providing data associated with the second speech input to the second service provider.

7. The electronic device of claim 1, wherein the data type of the plurality of data types comprises at least one of:
an address,
a phone number,
a Uniform Resource Locator ("URL"),
a date,
a person of interest,
a place of interest,
a package tracking number, or
a flight number.

8. The electronic device of claim 1, wherein determining whether the portion of the text string is associated with the data type of a plurality of data types comprises:
detecting in the portion of the text string, with a detector, the presence of data of the data type, wherein the detector corresponds to the data type of the plurality of data types.

9. The electronic device of claim 1, wherein the one or more programs further include instructions for:
identifying, with the electronic device, the at least one task from a plurality of tasks based on a type of the electronic device.

10. The electronic device of claim 1, wherein the portion of the text string is a first portion of the text string, the data type is a first data type, and the determined task is a first task, wherein the one or more programs further include instructions for:
identifying the second task based on a second data type of the plurality of data types in accordance with determining, with the electronic device, that a second portion of the text string is associated with the second data type.

11. The electronic device of claim 1,
wherein the user input associated with the affordance corresponding to the determined task comprises a selection of the affordance corresponding to the determined task.

12. The electronic device of claim 1, wherein the one or more programs further include instructions for:
receiving, with the electronic device, a user input indicative of the second task; and
causing the second task to be performed.

13. The electronic device of claim 1, wherein the user input associated with the affordance corresponding to the determined task is a speech input.

14. The electronic device of claim 13, wherein the speech input does not include the portion of the text.

15. The electronic device of claim 13, wherein the one or more programs further include instructions for:
deriving a user intent from the speech input based on context information, wherein the context information comprises the portion of the text.

16. The electronic device of claim 13, wherein the electronic device is a first electronic device, wherein the one or more programs further include instructions for:
sending data corresponding to the speech input to a second electronic device different from the first electronic device, wherein the data corresponding to the speech input does not include the text string of the communication; and
receiving, from the second electronic device, a user intent corresponding to the determined task.

17. The electronic device of claim 1, wherein the one or more programs further include instructions for:
storing, on the electronic device, information associated with the communication.

18. The electronic device of claim 17, wherein the stored information associated with the communication comprises the portion of the text string.

19. The electronic device of claim 17, wherein the stored information associated with the communication comprises the data type.

20. The electronic device of claim 17, wherein the stored information associated with the communication comprises metadata associated with the communication.

21. The electronic device of claim 17, wherein the one or more programs further include instructions for:
receiving an input;
identifying a third task based on the input; and
performing the third task based on at least part of the stored information.

22. The electronic device of claim 17, wherein the one or more programs further include instructions for:
invoking a software application; and
performing the determined task based on at least part of the stored information.

23. The electronic device of claim 1, wherein the electronic device is a first electronic device, and wherein the determined task is performed on a second electronic device.

24. The electronic device of claim 1, wherein the displayed affordance corresponding to the determined task includes the portion of the text string.

25. The electronic device of claim 1, wherein the displayed affordance corresponding to the determined task includes one or more words associated with the determined task.

26. The electronic device of claim 25, wherein the one or more words associated with the determined task are not included in the portion of the text string.

27. The electronic device of claim 1, wherein determining the task of the at least one task is based on a determination of whether the electronic device is paired to an external device.

28. The electronic device of claim 1, wherein prioritizing the display of the affordance corresponding to the determined task over the display of the affordance corresponding to the second task comprises:
displaying the affordance corresponding to the determined task in a first color; and
displaying the affordance corresponding to the second task in a second color.

29. An non-transitory computer readable storage medium storing one or more programs, the one or more programs comprising instructions, which when executed by one or more processors of an electronic device, cause the device to:
receive a communication comprising a text string;
determine whether a portion of the text string is associated with a data type of a plurality of data types, wherein the data type has at least one task associated therewith;
in accordance with a determination that the portion of the text string is associated with the data type of the plurality of data types:
determine a task of the at least one task;
concurrently display, with a display of the electronic device, an affordance corresponding to the determined task and an affordance corresponding to a second task, wherein the display of the affordance corresponding to the determined task is prioritized over the display of the affordance corresponding to the second task based on a type of the electronic device;
receive a user input associated with the affordance corresponding to the determined task; and
in response to receiving the user input associated with the affordance corresponding to the determined task, cause the determined task to be performed based on the portion of the text string; and
in accordance with a determination that the portion of the text string is not associated with the data type of the plurality of data types, forego causing a task to be performed based on the portion of the text string.

30. The non-transitory computer readable storage medium of claim 29, wherein determining whether the portion of the text string is associated with the data type of a plurality of data types comprises:
detecting in the portion of the text string, with a detector, the presence of data of the data type, wherein the detector corresponds to the data type of the plurality of data types.

31. The non-transitory computer readable storage medium of claim 29, wherein the one or more programs further include instructions, which when executed by the one or more processors of the electronic device, cause the electronic device to:
identify, with the electronic device, the at least one task from a plurality of tasks based on a type of the electronic device.

32. The non-transitory computer readable storage medium of claim 29, wherein the portion of the text string is a first portion of the text string, the data type is a first data type, and the determined task is a first task, and wherein the one or more programs further include instructions, which when executed by the one or more processors of the electronic device, cause the electronic device to:
identify the second task based on a second data type of the plurality of data types in accordance with determining, with the electronic device, that a second portion of the text string is associated with the second data type.

33. The non-transitory computer readable storage medium of claim 29, wherein the one or more programs further include instructions, which when executed by the one or more processors of the electronic device, cause the electronic device to:
receive, with the electronic device, a user input indicative of the second task; and cause the second task to be performed.

34. The non-transitory computer readable storage medium of claim 29, wherein the user input associated with the affordance corresponding to the determined task is a speech input.

35. The non-transitory computer readable storage medium of claim 34, wherein the electronic device is a first electronic device, and wherein the one or more programs further include instructions, which when executed by the one or more processors of the electronic device, cause the electronic device to:
send data corresponding to the speech input to a second electronic device different from the first electronic device, wherein the data corresponding to the speech input does not include the text string of the communication; and
receive, from the second electronic device, a user intent corresponding to the determined task.

36. The non-transitory computer readable storage medium of claim 29, wherein the one or more programs further include instructions, which when executed by the one or more processors of the electronic device, cause the electronic device to:
store, on the electronic device, information associated with the communication.

37. The non-transitory computer readable storage medium of claim 36, wherein the stored information associated with the communication comprises the data type.

38. The non-transitory computer readable storage medium of claim 36, wherein the one or more programs further include instructions, which when executed by the one or more processors of the electronic device, cause the electronic device to:
receive an input;
identify a third task based on the input; and
perform the third task based on at least part of the stored information.

39. The non-transitory computer readable storage medium of claim 36, wherein the one or more programs further include instructions, which when executed by the one or more processors of the electronic device, cause the electronic device to:
invoke a software application; and
perform the determined task based on at least part of the stored information.

40. The non-transitory computer readable storage medium of claim 29, wherein the electronic device is a first electronic device, and wherein the determined task is performed on a second electronic device.

41. The non-transitory computer readable storage medium of claim 29, wherein determining the task of the at least one task is based on a determination of whether the electronic device is paired to an external device.

42. The non-transitory computer readable storage medium of claim 29, wherein prioritizing the display of the affordance corresponding to the determined task over the display of the affordance corresponding to the second task comprises:
displaying the affordance corresponding to the determined task in a first color; and
displaying the affordance corresponding to the second task in a second color.

43. A method for operating an automated assistant on an electronic device, the method comprising:
at the electronic device,
receiving a communication comprising a text string;
determining whether a portion of the text string is associated with a data type of a plurality of data types, wherein the data type has at least one task associated therewith;
in accordance with a determination that the portion of the text string is associated with the data type of the plurality of data types:
determining a task of the at least one task;
concurrently displaying, with a display of the electronic device, an affordance corresponding to the determined task and an affordance corresponding to a second task, wherein the display of the affordance corresponding to the determined task is prioritized over the display of the affordance corresponding to the second task based on a type of the electronic device;
receiving a user input associated with the affordance corresponding to the determined task; and
in response to receiving the user input associated with the affordance corresponding to the determined task, causing determined the task to he performed based on the portion of the text string; and
in accordance with a determination that the portion of the text string is not associated with the data type of the plurality of data types, foregoing causing a task to be performed based on the portion of the text string.

44. The method of claim 43, wherein determining whether the portion of the text string is associated with the data type of a plurality of data types comprises:
detecting in the portion of the text string, with a detector, the presence of data of the data type, wherein the detector corresponds to the data type of the plurality of data types.

45. The method of claim 43, further comprising:
identifying, with the electronic device, the at least one task from a plurality of tasks based on a type of the electronic device.

46. The method of claim 43, wherein the portion of the text string is a first portion of the text string, the data type is a first data type, and the determined task is a first task, the method further comprising:
identifying the second task based on a second data type of the plurality of data types in accordance with determining, with the electronic device, that a second portion of the text string is associated with the second data type.

47. The method of claim 43, further comprising:
receiving, with the electronic device, a user input indicative of the second task; and
causing the second task to be performed.

48. The method of claim 43, wherein the user input associated with the accordance corresponding to the determined task is a speech input.

49. The method of claim 48, wherein the electronic device is a first electronic device, the method further comprising:
sending data corresponding to the speech input to a second electronic device different from the first electronic device, wherein the data corresponding to the speech input does not include the text string of the communication; and
receiving, from the second electronic device, a user intent corresponding to the determined task.

50. The method of claim 43, further comprising:
storing, on the electronic device, information associated with the communication.

51. The method of claim 50, wherein the stored information associated with the communication comprises the data type.

52. The method of claim 50, further comprising:
receiving an input;
identifying a third task based on the input; and
performing the third task based on at least part of the stored information.

53. The method of claim 50, further comprising:
invoking a software application; and
performing the determined task based on at least part of the stored information.

54. The method of claim 43, wherein the electronic device is a first electronic device, and wherein the determined task is performed on a second electronic device.

55. The method of claim 43, wherein determining the task of the at least one task is based on a determination of whether the electronic device is paired to an external device.

56. The method of claim 43, wherein prioritizing the display of the affordance corresponding to the determined task over the display of the affordance corresponding to the second task comprises:

displaying the affordance corresponding to the determined task in a first color; and displaying the affordance corresponding to the second task in a second color.

\* \* \* \* \*

UNITED STATES PATENT AND TRADEMARK OFFICE
CERTIFICATE OF CORRECTION

PATENT NO. : 10,269,345 B2
APPLICATION NO. : 15/269740
DATED : April 23, 2019
INVENTOR(S) : Jose A. Castillo Sanchez et al.

Page 1 of 1

It is certified that error appears in the above-identified patent and that said Letters Patent is hereby corrected as shown below:

In the Claims

In Column 59, Line 46, Claim 29, delete "An" and insert -- A --, therefor.

In Column 61, Line 63, Claim 43, delete "he" and insert -- be --, therefor.

In Column 62, Line 30, Claim 48, delete "accordance" and insert -- affordance --, therefor.

Signed and Sealed this
Fourth Day of June, 2019

Andrei Iancu
*Director of the United States Patent and Trademark Office*